US012812160B2

(12) United States Patent
Kim et al.

(10) Patent No.: US 12,812,160 B2
(45) Date of Patent: Nov. 24, 2026

(54) METHOD, APPARATUS, AND RECORDING MEDIUM FOR IMAGE ENCODING/DECODING USING BI-DIRECTIONAL INTER-PREDICTION

(71) Applicant: ELECTRONICS AND TELECOMMUNICATIONS RESEARCH INSTITUTE, Daejeon (KR)

(72) Inventors: Dong-Hyun Kim, Daejeon (KR); Se-Yoon Jeong, Daejeon (KR); Hyoung-Jin Kwon, Daejeon (KR); Youn-Hee Kim, Daejeon (KR); Jong-Ho Kim, Daejeon (KR); Ji-Hoon Do, Daejeon (KR); Joo-Young Lee, Daejeon (KR); Woong Lim, Daejeon (KR); Jin-Soo Choi, Daejeon (KR); Tae-Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/697,343

(22) PCT Filed: Sep. 29, 2022

(86) PCT No.: PCT/KR2022/014695

§ 371 (c)(1),
(2) Date: Mar. 29, 2024

(87) PCT Pub. No.: WO2023/055146

PCT Pub. Date: Apr. 6, 2023

(65) Prior Publication Data

US 2024/0406436 A1 Dec. 5, 2024

(30) Foreign Application Priority Data

Sep. 29, 2021 (KR) ........................ 10-2021-0128843
Apr. 8, 2022 (KR) ........................ 10-2022-0044189
Sep. 29, 2022 (KR) ........................ 10-2022-0124378

(51) Int. Cl.
*H04N 19/52* (2014.01)
*H04N 19/109* (2014.01)
(Continued)

(52) U.S. Cl.
CPC ........... *H04N 19/52* (2014.11); *H04N 19/109* (2014.11); *H04N 19/139* (2014.11); *H04N 19/176* (2014.11); *H04N 19/573* (2014.11)

(58) Field of Classification Search
None
See application file for complete search history.

(56) References Cited

U.S. PATENT DOCUMENTS 8,532,409 B2 9/2013 Lee et al.
2015/0036747 A1 2/2015 Oh et al.
(Continued)

FOREIGN PATENT DOCUMENTS

KR 10-2018-0084662 A 7/2018
KR 10-2020-0040940 A 4/2020
(Continued)

OTHER PUBLICATIONS

International Search Report for PCT/KR2022/014695 by Korean Intellectual Property Office dated Jan. 16, 2023.

*Primary Examiner* — Edemio Navas, Jr.
(74) *Attorney, Agent, or Firm* — BROADVIEW IP LAW, PC

(57) ABSTRACT

Disclosed herein are a method, an apparatus and a storage medium for image encoding/decoding. In typical image encoding/decoding methods, a decoder-side motion information derivation method may be limitedly used. Therefore, the improvement of encoding efficiency attributable to the decoder-side motion information derivation method may
(Continued)

also be limited. In embodiments, a motion information search method used in inter-prediction is disclosed. With the use of various motion search methods, encoding efficiency in inter-prediction may be improved.

12 Claims, 51 Drawing Sheets

(51) Int. Cl.
*H04N 19/139* (2014.01)
*H04N 19/176* (2014.01)
*H04N 19/573* (2014.01)

(56) References Cited

U.S. PATENT DOCUMENTS

| | | | | |
|---|---|---|---|---|
| 2020/0221110 | A1* | 7/2020 | Chien | H04N 19/44 |
| 2021/0274212 | A1 | 9/2021 | Liu et al. | |
| 2022/0174286 | A1 | 6/2022 | Lee et al. | |
| 2022/0295088 | A1* | 9/2022 | Zhang | H04N 19/52 |
| 2023/0100477 | A1 | 3/2023 | Francois et al. | |
| 2023/0269367 | A1 | 8/2023 | Moon et al. | |
| 2023/0336722 | A1 | 10/2023 | Lim et al. | |
| 2024/0089468 | A1 | 3/2024 | Helle et al. | |

FOREIGN PATENT DOCUMENTS

| | | | |
|---|---|---|---|
| KR | 10-2020-0058445 | A | 5/2020 |
| KR | 10-2020-0096451 | A | 8/2020 |
| KR | 10-2020-0107869 | A | 9/2020 |
| KR | 10-2021-0099017 | A | 8/2021 |

* cited by examiner

| | |
|---|---|
| if( sps_smvd_enabled_flag && !ph_mvd_l1_zero_flag && inter_pred_idc[ x0 ][ y0 ] = = PRED_BI && !inter_affine_flag[ x0 ][ y0 ] && RefIdxSymL0 > −1 && RefIdxSymL1 > −1 ) | |
| **sym_mvd_flag**[ x0 ][ y0 ] | ae(v) |
| if( inter_pred_idc[ x0 ][ y0 ] != PRED_L1 ) { | |
| if( NumRefIdxActive[ 0 ] > 1 && !sym_mvd_flag[ x0 ][ y0 ] ) | |
| **ref_idx_l0**[ x0 ][ y0 ] | ae(v) |
| mvd_coding( x0, y0, 0, 0 ) | |
| if( MotionModelIdc[ x0 ][ y0 ] > 0 ) | |
| mvd_coding( x0, y0, 0, 1 ) | |
| if(MotionModelIdc[ x0 ][ y0 ] > 1 ) | |
| mvd_coding( x0, y0, 0, 2 ) | |
| **mvp_l0_flag**[ x0 ][ y0 ] | ae(v) |
| } else { | |
| MvdL0[ x0 ][ y0 ][ 0 ] = 0 | |
| MvdL0[ x0 ][ y0 ][ 1 ] = 0 | |
| } | |
| if( inter_pred_idc[ x0 ][ y0 ] != PRED_L0 ) { | |
| if( NumRefIdxActive[ 1 ] > 1 && !sym_mvd_flag[ x0 ][ y0 ] ) | |
| **ref_idx_l1**[ x0 ][ y0 ] | ae(v) |
| if( ph_mvd_l1_zero_flag && inter_pred_idc[ x0 ][ y0 ] = = PRED_BI ) { | |
| MvdL1[ x0 ][ y0 ][ 0 ] = 0 | |
| MvdL1[ x0 ][ y0 ][ 1 ] = 0 | |
| MvdCpL1[ x0 ][ y0 ][ 0 ][ 0 ] = 0 | |
| MvdCpL1[ x0 ][ y0 ][ 0 ][ 1 ] = 0 | |
| MvdCpL1[ x0 ][ y0 ][ 1 ][ 0 ] = 0 | |
| MvdCpL1[ x0 ][ y0 ][ 1 ][ 1 ] = 0 | |
| MvdCpL1[ x0 ][ y0 ][ 2 ][ 0 ] = 0 | |
| MvdCpL1[ x0 ][ y0 ][ 2 ][ 1 ] = 0 | |
| } else { | |
| if( sym_mvd_flag[ x0 ][ y0 ] ) { | |
| MvdL1[ x0 ][ y0 ][ 0 ] = −MvdL0[ x0 ][ y0 ][ 0 ] | |
| MvdL1[ x0 ][ y0 ][ 1 ] = −MvdL0[ x0 ][ y0 ][ 1 ] | |
| } else | |
| mvd_coding( x0, y0, 1, 0 ) | |
| if( MotionModelIdc[ x0 ][ y0 ] > 0 ) | |
| mvd_coding( x0, y0, 1, 1 ) | |
| if(MotionModelIdc[ x0 ][ y0 ] > 1 ) | |
| mvd_coding( x0, y0, 1, 2 ) | |
| } | |
| **mvp_l1_flag**[ x0 ][ y0 ] | ae(v) |
| } else { | |
| MvdL1[ x0 ][ y0 ][ 0 ] = 0 | |
| MvdL1[ x0 ][ y0 ][ 1 ] = 0 | |
| } | |

FIG. 21

| SEARCH PATTERN AND SEARCH RESOLUTION | ADVANCED MOTION VECTOR PREDICTION MODE<br>INDEX OF ADAPTIVE MOTION VECTOR RESOLUTION | | | | MERGE MODE | |
|---|---|---|---|---|---|---|
| | 4-PEL | FULL-PEL | HALF-PEL | QUARTER-PEL | AltIF=0 | AltIF=1 |
| 4-PEL DIAMOND | V | | | | | |
| 4-PEL CROSS | V | | | | | |
| FULL-PEL DIAMOND | | V | V | V | V | V |
| FULL-PEL CROSS | | V | V | V | V | V |
| HALF-PEL CROSS | | | V | V | V | V |
| QUARTER-PEL CROSS | | | | V | V | |
| OCTA-PEL CROSS | | | | | V | |

FIG. 24

| SEARCH PATTERN AND SEARCH RESOLUTION | ADVANCED MOTION VECTOR PREDICTION MODE | | | | MERGE MODE | |
|---|---|---|---|---|---|---|
| | INDEX OF ADAPTIVE MOTION VECTOR RESOLUTION | | | | | |
| | 4-PEL | FULL-PEL | HALF-PEL | QUARTER-PEL | AltIF=0 | AltIF=1 |
| 4-PEL DIAMOND | V | | | | | |
| 4-PEL CROSS | V | | | | | |
| FULL-PEL DIAMOND | | V | V | V | V | V |
| FULL-PEL CROSS | | V | V | V | V | V |
| HALF-PEL CROSS | | | V | V | V | V |
| QUARTER-PEL CROSS | | | | V | V | |
| OCTA-PEL CROSS | | | | | | |

FIG. 25

| SEARCH PATTERN AND SEARCH RESOLUTION | ADVANCED MOTION VECTOR PREDICTION MODE | | | | MERGE MODE | |
|---|---|---|---|---|---|---|
| | INDEX OF ADAPTIVE MOTION VECTOR RESOLUTION | | | | | |
| | 4-PEL | FULL-PEL | HALF-PEL | QUARTER-PEL | AltIF=0 | AltIF=1 |
| 4-PEL DIAMOND | V | V | V | V | V | V |
| 4-PEL CROSS | V | V | V | V | V | V |
| FULL-PEL DIAMOND | | V | V | V | V | V |
| FULL-PEL CROSS | | V | V | V | V | V |
| HALF-PEL CROSS | | | V | V | V | V |
| QUARTER-PEL CROSS | | | | V | V | |
| OCTA-PEL CROSS | | | | | V | |

FIG. 26

| SEARCH PATTERN AND SEARCH RESOLUTION | ADVANCED MOTION VECTOR PREDICTION MODE | | | | MERGE MODE | |
|---|---|---|---|---|---|---|
| | INDEX OF ADAPTIVE MOTION VECTOR RESOLUTION | | | | | |
| | 4-PEL | FULL-PEL | HALF-PEL | QUARTER-PEL | AltIF=0 | AltIF=1 |
| 4-PEL DIAMOND | V | | | | | |
| 4-PEL CROSS | V | | | | | |
| FULL-PEL DIAMOND | | V | V | V | V | V |
| FULL-PEL CROSS | | V | V | V | V | V |
| HALF-PEL CROSS | | | V | V | V | V |
| QUARTER-PEL CROSS | | | | V | | |
| OCTA-PEL CROSS | | | | | | |

FIG. 27

| SEARCH PATTERN AND SEARCH RESOLUTION | ADVANCED MOTION VECTOR PREDICTION MODE | | | | MERGE MODE | |
|---|---|---|---|---|---|---|
| | INDEX OF ADAPTIVE MOTION VECTOR RESOLUTION | | | | | |
| | 4-PEL | FULL-PEL | HALF-PEL | QUARTER-PEL | AltIF=0 | AltIF=1 |
| 4-PEL DIAMOND | | | | | | |
| 4-PEL CROSS | V | | | | | |
| FULL-PEL DIAMOND | | | | | | |
| FULL-PEL CROSS | | V | V | V | V | V |
| HALF-PEL CROSS | | | | | | |
| QUARTER-PEL CROSS | | | | V | V | |
| OCTA-PEL CROSS | | | | | | |

FIG. 28

| SEARCH PATTERN AND SEARCH RESOLUTION | ADVANCED MOTION VECTOR PREDICTION MODE | | | | MERGE MODE | |
|---|---|---|---|---|---|---|
| | INDEX OF ADAPTIVE MOTION VECTOR RESOLUTION | | | | | |
| | 4-PEL | FULL-PEL | HALF-PEL | QUARTER-PEL | AltIF=0 | AltIF=1 |
| 4-PEL DIAMOND | V | V | V | V | V | V |
| 4-PEL CROSS | V | V | V | V | V | V |
| FULL-PEL DIAMOND | | | V | V | V | V |
| FULL-PEL CROSS | | | V | V | V | V |
| HALF-PEL CROSS | | | | V | V | |
| QUARTER-PEL CROSS | | | | | V | |
| OCTA-PEL CROSS | | | | | | |

FIG. 29

| | MOTION INFORMATION INDEX FOR L0 DIRECTION == 0 | MOTION INFORMATION INDEX FOR L0 DIRECTION == 1 |
|---|---|---|
| MOTION INFORMATION INDEX FOR L1 DIRECTION == 0 | IDENTICAL_MVP_FLAG = TRUE; MVP_L0_FLAG = 0; | IDENTICAL_MVP_FLAG = FALSE; MVP_L0_FLAG = 1; |
| MOTION INFORMATION INDEX FOR L1 DIRECTION == 1 | IDENTICAL_MVP_FLAG = FALSE; MVP_L0_FLAG = 0; | IDENTICAL_MVP_FLAG = TRUE; MVP_L0_FLAG = 1; |

FIG. 37

| | MOTION INFORMATION INDEX FOR L0 DIRECTION == 0 | MOTION INFORMATION INDEX FOR L0 DIRECTION == 1 |
|---|---|---|
| MOTION INFORMATION INDEX FOR L1 DIRECTION == 0 | MVP_L01_IDX = 0; | MVP_L01_IDX = 1; |
| MOTION INFORMATION INDEX FOR L1 DIRECTION == 1 | MVP_L01_IDX = 2; | MVP_L01_IDX = 3; |

FIG. 38

| | MOTION INFORMATION INDEX FOR L0 DIRECTION == 0 | MOTION INFORMATION INDEX FOR L0 DIRECTION == 1 |
|---|---|---|
| MOTION INFORMATION INDEX FOR L1 DIRECTION == 0 | MVP_L01_IDX = 0; | MVP_L01_IDX = 2; |
| MOTION INFORMATION INDEX FOR L1 DIRECTION == 1 | MVP_L01_IDX = 1; | MVP_L01_IDX = 3; |

FIG. 39

| | REFERENCE IMAGE INDEX FOR L0 DIRECTION == 0 | REFERENCE IMAGE INDEX FOR L0 DIRECTION == 1 |
|---|---|---|
| REFERENCE IMAGE INDEX FOR L1 DIRECTION == 0 | REFIDX_L01 = 0; | REFIDX_L01 = 1; |
| REFERENCE IMAGE INDEX FOR L1 DIRECTION == 1 | REFIDX_L01 = 2; | REFIDX_L01 = 3; |

FIG. 40

| | REFERENCE IMAGE INDEX FOR L0 DIRECTION == 0 | REFERENCE IMAGE INDEX FOR L0 DIRECTION == 1 |
|---|---|---|
| REFERENCE IMAGE INDEX FOR L1 DIRECTION == 0 | REFIDX_L01 = 0; | REFIDX_L01 = 2; |
| REFERENCE IMAGE INDEX FOR L1 DIRECTION == 1 | REFIDX_L01 = 1; | REFIDX_L01 = 3; |

FIG. 41

| | REFERENCE IMAGE INDEX FOR L0 DIRECTION == 0 | REFERENCE IMAGE INDEX FOR L0 DIRECTION == 1 |
|---|---|---|
| REFERENCE IMAGE INDEX FOR L1 DIRECTION == 0 | IDENTICAL_REFIDX_FLAG = TRUE;<br>REFIDX_LX_FLAG = 0; | IDENTICAL_REFIDX_FLAG = FALSE;<br>REFIDX_LX_FLAG = 1; |
| REFERENCE IMAGE INDEX FOR L1 DIRECTION == 1 | IDENTICAL_REFIDX_FLAG = FALSE;<br>REFIDX_LX_FLAG = 0; | IDENTICAL_REFIDX_FLAG = TRUE;<br>REFIDX_LX_FLAG = 1; |

FIG. 42

| mvd_coding( x0, y0, refList ,cpIdx ) { | Descriptor |
|---|---|
| abs_mvd_greater0_flag[ 0 ] | ae(v) |
| abs_mvd_greater0_flag[ 1 ] | ae(v) |
| if( abs_mvd_greater0_flag[ 0 ] ) | |
| abs_mvd_greater1_flag[ 0 ] | ae(v) |
| if( abs_mvd_greater0_flag[ 1 ] ) | |
| abs_mvd_greater1_flag[ 1 ] | ae(v) |
| if( abs_mvd_greater0_flag[ 0 ] ) { | |
| if( abs_mvd_greater1_flag[ 0 ] ) | |
| abs_mvd_minus2[ 0 ] | ae(v) |
| } | |
| if( abs_mvd_greater0_flag[ 1 ] ) { | |
| if( abs_mvd_greater1_flag[ 1 ] ) | |
| abs_mvd_minus2[ 1 ] | ae(v) |
| } | |
| } | |

FIG. 44

| mvd_sign_coding( x0, y0, refList ) { | Descriptor |
|---|---|
| if( mvd[refList].hor != 0 ) | |
| sign_idx_hor[x0][y0] | ae(v) |
| if( mvd[refList].ver != 0 ) | |
| sign_idx_ver[x0][y0] | ae(v) |
| } | |

FIG. 45

| mvd_sign_coding( x0, y0, refList ) { | Descriptor |
|---|---|
| if( mvd[refList][0].hor != 0 ) | |
| sign_idx_hor[0][x0][y0] | ae(v) |
| if( mvd[refList][0].ver != 0 ) | |
| sign_idx_ver[0][x0][y0] | ae(v) |
| if( mvd[refList][1].hor != 0 ) | |
| sign_idx_hor[1][x0][y0] | ae(v) |
| if( mvd[refList][1].ver != 0 ) | |
| sign_idx_ver[1][x0][y0] | ae(v) |
| } | |

FIG. 46

| mvd_sign_coding( x0, y0, refList ) { | Descriptor |
|---|---|
| if( mvd[refList][0].hor != 0 ) | |
| sign_idx_hor[0][x0][y0] | ae(v) |
| if( mvd[refList][0].ver != 0 ) | |
| sign_idx_ver[0][x0][y0] | ae(v) |
| if( mvd[refList][1].hor != 0 ) | |
| sign_idx_hor[1][x0][y0] | ae(v) |
| if( mvd[refList][1].ver != 0 ) | |
| sign_idx_ver[1][x0][y0] | ae(v) |
| if( mvd[refList][2].hor != 0 ) | |
| sign_idx_hor[2][x0][y0] | ae(v) |
| if( mvd[refList][2].ver != 0 ) | |
| sign_idx_ver[2][x0][y0] | ae(v) |
| } | |

FIG. 47

| mvd_sign_coding( x0, y0, refList ) { | Descriptor |
|---|---|
| if( mvd[refList][0].hor != 0 ) | |
| sign_idx_hor[0][x0][y0] | ae(v) |
| if( mvd[refList][0].ver != 0 ) | |
| sign_idx_ver[0][x0][y0] | ae(v) |
| if( mvd[refList][1].hor != 0 ) | |
| sign_idx_hor[1][x0][y0] | ae(v) |
| if( mvd[refList][1].ver != 0 ) | |
| sign_idx_ver[1][x0][y0] | ae(v) |
| if( mvd[refList][2].hor != 0 ) | |
| sign_idx_hor[2][x0][y0] | ae(v) |
| if( mvd[refList][2].ver != 0 ) | |
| sign_idx_ver[2][x0][y0] | ae(v) |
| | |
| ... | |
| | |
| if( mvd[refList][MVD_NUM_ATSAMETIME].hor != 0 ) | |
| sign_idx_hor[MVD_NUM_ATSAMETIME][x0][y0] | ae(v) |
| if( mvd[refList][MVD_NUM_ATSAMETIME].ver != 0 ) | |
| sign_idx_ver[MVD_NUM_ATSAMETIME][x0][y0] | ae(v) |
| } | |

FIG. 48

| | MVP_L0 == 0 | MVP_L0 == 1 |
|---|---|---|
| MVP_L1 == 0 | MVP_BOTH_ZERO_FLAG = TRUE; | MVP_BOTH_ZERO_FLAG = FALSE;<br>MVP_BOTH_ONE_FLAG = FALSE;<br>MVP_L0_FLAG = 1; |
| MVP_L1 == 1 | MVP_BOTH_ZERO_FLAG = FALSE;<br>MVP_BOTH_ONE_FLAG = FALSE;<br>MVP_L0_FLAG = 0; | MVP_BOTH_ZERO_FLAG = FALSE;<br>MVP_BOTH_ONE_FLAG = TRUE; |

FIG. 49

<table>
<tr><td>coding_unit( x0, y0, cbWidth, cbHeight, treeType ) {</td><td>Descriptor</td></tr>
<tr><td>if( slice_type != I || sps_ibc_enabled_flag ) {</td><td></td></tr>
<tr><td>if( treeType != DUAL_TREE_CHROMA &&<br>!( cbWidth = = 4 && cbHeight = = 4 && !sps_ibc_enabled_flag ) )</td><td></td></tr>
<tr><td>cu_skip_flag[ x0 ][ y0 ]</td><td>ae(v)</td></tr>
<tr><td>if( cu_skip_flag[ x0 ][ y0 ] = = 0 && slice_type != I<br>&& !( cbWidth = = 4 && cbHeight = = 4 ) )</td><td></td></tr>
<tr><td>pred_mode_flag</td><td>ae(v)</td></tr>
<tr><td>if( ( ( slice_type = = I && cu_skip_flag[ x0 ][ y0 ] = =0 ) ||<br>( slice_type != I && ( CuPredMode[ x0 ][ y0 ] != MODE_INTRA ||<br>( cbWidth = = 4 && cbHeight = = 4 && cu_skip_flag[ x0 ][ y0 ] = = 0 ) ) ) ) &&<br>sps_ibc_enabled_flag && ( cbWidth != 128 || cbHeight != 128 ) )</td><td></td></tr>
<tr><td>pred_mode_ibc_flag</td><td>ae(v)</td></tr>
<tr><td>}</td><td></td></tr>
<tr><td>if( CuPredMode[ x0 ][ y0 ] = = MODE_INTRA ) {</td><td></td></tr>
<tr><td>....</td><td></td></tr>
<tr><td>} else if( treeType != DUAL_TREE_CHROMA ) { /* MODE_INTER or MODE_IBC */</td><td></td></tr>
<tr><td>if( cu_skip_flag[ x0 ][ y0 ] = = 0 )</td><td></td></tr>
<tr><td>general_merge_flag[ x0 ][ y0 ]</td><td>ae(v)</td></tr>
<tr><td>if( general_merge_flag[ x0 ][ y0 ] ) {</td><td></td></tr>
<tr><td>merge_data( x0, y0, cbWidth, cbHeight )</td><td></td></tr>
<tr><td>} else if ( CuPredMode[ x0 ][ y0 ] = = MODE_IBC ) {</td><td></td></tr>
<tr><td>mvd_coding( x0, y0, 0, 0 )</td><td></td></tr>
<tr><td>mvp_l0_flag[ x0 ][ y0 ]</td><td>ae(v)</td></tr>
<tr><td>if( sps_amvr_enabled_flag &&<br>( MvdL0[ x0 ][ y0 ][ 0 ] != 0 || MvdL0[ x0 ][ y0 ][ 1 ] != 0 ) ) {</td><td></td></tr>
<tr><td>amvr_precision_flag[ x0 ][ y0 ]</td><td>ae(v)</td></tr>
<tr><td>}</td><td></td></tr>
<tr><td>} else if( treeType != DUAL_TREE_CHROMA ) { /* MODE_INTER or MODE_IBC */</td><td></td></tr>
<tr><td>...</td><td></td></tr>
<tr><td>}</td><td></td></tr>
<tr><td>}</td><td></td></tr>
<tr><td>if( !pcm_flag[ x0 ][ y0 ] ) {</td><td></td></tr>
<tr><td>if( CuPredMode[ x0 ][ y0 ] != MODE_INTRA && merge_flag[ x0 ][ y0 ] = = 0 )</td><td></td></tr>
<tr><td>cu_cbf</td><td>ae(v)</td></tr>
<tr><td>if( cu_cbf ) {</td><td></td></tr>
<tr><td>...</td><td></td></tr>
<tr><td>transform_tree( x0, y0, cbWidth, cbHeight, treeType )</td><td></td></tr>
<tr><td>}</td><td></td></tr>
<tr><td>}</td><td></td></tr>
<tr><td>}</td><td></td></tr>
</table>

FIG. 50

<table>
<tr><td>transform_unit( x0, y0, tbWidth, tbHeight, treeType, subTuIndex ) {</td><td>Descriptor</td></tr>
<tr><td>  if( treeType = = SINGLE_TREE || treeType = = DUAL_TREE_LUMA ) {</td><td></td></tr>
<tr><td>    if( ( IntraSubPartitionsSplitType = = ISP_NO_SPLIT && !( cu_sbt_flag && ( ( subTuIndex = = 0 && cu_sbt_pos_flag ) ||<br>      ( subTuIndex = = 1 && !cu_sbt_pos_flag ) ) ) ) || ( IntraSubPartitionsSplitType != ISP_NO_SPLIT &&<br>      ( subTuIndex < NumIntraSubPartitions − 1 || !InferTuCbfLuma ) ) )</td><td></td></tr>
<tr><td>      tu_cbf_luma[ x0 ][ y0 ]</td><td>ae(v)</td></tr>
<tr><td>    if (IntraSubPartitionsSplitType != ISP_NO_SPLIT )</td><td></td></tr>
<tr><td>      InferTuCbfLuma = InferTuCbfLuma && !tu_cbf_luma[ x0 ][ y0 ]</td><td></td></tr>
<tr><td>  }</td><td></td></tr>
<tr><td>  if( ( treeType = = SINGLE_TREE || treeType = = DUAL_TREE_CHROMA ) {</td><td></td></tr>
<tr><td>    if( ( IntraSubPartitionsSplitType = = ISP_NO_SPLIT && !( cu_sbt_flag && ( ( subTuIndex = = 0 && cu_sbt_pos_flag ) ||<br>      ( subTuIndex = = 1 && !cu_sbt_pos_flag ) ) ) ) || ( IntraSubPartitionsSplitType != ISP_NO_SPLIT &&<br>      ( subTuIndex = = NumIntraSubPartitions − 1 ) ) ) {</td><td></td></tr>
<tr><td>      tu_cbf_cb[ x0 ][ y0 ]</td><td>ae(v)</td></tr>
<tr><td>      tu_cbf_cr[ x0 ][ y0 ]</td><td>ae(v)</td></tr>
<tr><td>    }</td><td></td></tr>
<tr><td>  }</td><td></td></tr>
<tr><td>  ...</td><td></td></tr>
<tr><td>  if( tu_cbf_luma[ x0 ][ y0 ] )</td><td></td></tr>
<tr><td>    residual_coding( x0, y0, Log2( tbWidth ), Log2( tbHeight ), 0 )</td><td></td></tr>
<tr><td>  if( tu_cbf_cb[ x0 ][ y0 ] )</td><td></td></tr>
<tr><td>    residual_coding( xC, yC, Log2( wC ), Log2( hC ), 1 )</td><td></td></tr>
<tr><td>  if( tu_cbf_cr[ x0 ][ y0 ] )</td><td></td></tr>
<tr><td>    residual_coding( xC, yC, Log2( wC ), Log2( hC ), 2 )</td><td></td></tr>
<tr><td>}</td><td></td></tr>
</table>

FIG. 51

METHOD, APPARATUS, AND RECORDING MEDIUM FOR IMAGE ENCODING/DECODING USING BI-DIRECTIONAL INTER-PREDICTION

CROSS-REFERENCE TO RELATED APPLICATIONS

This application is a National Phase Entry Application of PCT Application No. PCT/KR2022/014695 filed on Sep. 29, 2022, which claims priority to Korean Patent Application No. 10-2021-0128843 filed on Sep. 29, 2021, Korean Patent Application No. 10-2022-0044189 filed on Apr. 8, 2022, and Korean Patent Application No. 10-2022-0124378 filed on Sep. 29, 2022, in the Korean Intellectual Property Office, the entire contents of which are hereby incorporated by reference in its entirety.

TECHNICAL FIELD

The present disclosure relates generally to a method, an apparatus, and a storage medium for image encoding/decoding.

BACKGROUND ART

With the continuous development of the information and communication industries, broadcasting services supporting High-Definition (HD) resolution have been popularized all over the world. Through this popularization, a large number of users have become accustomed to high-resolution and high-definition images and/or video.

To satisfy users' demand for high definition, many institutions have accelerated the development of next-generation imaging devices. Users' interest in UHD TVs, having resolution that is more than four times as high as that of Full HD (FHD) TVs, as well as High-Definition TVs (HDTV) and FHD TVs, has increased. As interest therein has increased, image encoding/decoding technology for images having higher resolution and higher definition is currently required.

As image compression technology, there are various technologies, such as inter-prediction technology, intra-prediction technology, transform, quantization technology and entropy coding technology.

Inter-prediction technology is technology for predicting the value of a pixel included in a current picture using a picture previous to and/or a picture subsequent to the current picture. Intra-prediction technology is technology for predicting the value of a pixel included in a current picture using information about pixels in the current picture. Transform and quantization technology may be technology for compressing the energy of a residual signal. The entropy coding technology is technology for assigning a short codeword to a frequently occurring value and assigning a long codeword to a less frequently occurring value.

By utilizing this image compression technology, data about images may be effectively compressed, transmitted, and stored.

DISCLOSURE

Technical Problem

An embodiment is intended to provide an apparatus, a method and a storage medium, which perform encoding/decoding on a target block using inter-prediction.

Technical Solution

In accordance with an aspect, there is provided an image encoding method, including determining prediction information to be used for encoding of a target block; generating encoded encoding information by performing encoding on coding information; and generating a bitstream including the encoded coding information.

The prediction information may include a motion information candidate list and final motion information.

The image encoding method may further include performing inter-prediction for the target block.

A motion vector search method for the inter-prediction may be used.

The motion vector search method may be template matching.

The inter-prediction may be bidirectional prediction.

A motion vector may be fixed for one of two directions in the bidirectional prediction.

A motion search may be performed for a remaining one of the two directions.

A motion vector search method for the inter-prediction may be used.

The motion vector search method may be bilateral matching.

In accordance with another aspect, there is provided an image decoding method, including acquiring a bitstream including encoded coding information; generating coding information by performing decoding on the encoded coding information; and determining prediction information to be used for decoding of a target block.

The prediction information may include a motion information candidate list and final motion information.

The image decoding method may further include performing inter-prediction for the target block using the prediction information.

A motion vector search method for the inter-prediction may be used.

The motion vector search method may be template matching.

The inter-prediction may be bidirectional prediction.

A motion vector may be fixed for one of two directions of the bidirectional prediction.

A motion search may be performed for a remaining one of the two directions.

A motion vector search method for the inter-prediction may be used.

The motion vector search method may be bilateral matching.

In accordance with a further aspect, there is provided a computer-readable storage medium for storing a bitstream for image decoding, wherein the bitstream includes encoded coding information, coding information is generated by performing decoding on the encoded coding information, and prediction information to be used for decoding of a target block is determined.

The prediction information may include a motion information candidate list and final motion information.

Inter-prediction for the target block may be performed using the prediction information.

A motion vector search method for the inter-prediction may be used.

The motion vector search method may be template matching.

The inter-prediction may be bidirectional prediction.

A motion vector may be fixed for one of two directions of the bidirectional prediction.

A motion search may be performed for a remaining one of the two directions.

Advantageous Effects

There are provided an apparatus, a method and a storage medium, which perform encoding/decoding on a target block using inter-prediction.

DESCRIPTION OF DRAWINGS

FIG. 21 illustrates syntax elements signaled/encoded/decoded in a symmetrical motion vector difference mode according to an example;

FIG. 24 illustrates a first relationship between a search pattern and resolution according to an example;

FIG. 25 illustrates a second relationship between a search pattern and resolution according to an example;

FIG. 26 illustrates a third relationship between a search pattern and resolution according to an example;

FIG. 27 illustrates a fourth relationship between a search pattern and resolution according to an example;

FIG. 28 illustrates a fifth relationship between a search pattern and resolution according to an example;

FIG. 29 illustrates a sixth relationship between a search pattern and resolution according to an example;

FIG. 37 illustrates the setting of flags depending on the values of motion information indices according to an example;

FIG. 38 illustrates first setting of indices depending on the values of motion information indices according to an example;

FIG. 39 illustrates second setting of indices depending on the values of motion information indices according to an example;

FIG. 40 illustrates first setting of indices depending on the values of reference image indices according to an example;

FIG. 41 illustrates second setting of indices depending on the values of reference image indices according to an example;

FIG. 42 illustrates the setting of flags depending on the values of reference image indices according to an example;

FIG. 44 illustrates first code for signaling/encoding/decoding of a motion vector difference according to an example;

FIG. 45 illustrates second code for signaling/encoding/decoding of a motion vector difference according to an example;

FIG. 46 illustrates third code for signaling/encoding/decoding of a motion vector difference according to an example;

FIG. 47 illustrates fourth code for signaling/encoding/decoding of a motion vector difference according to an example;

FIG. 48 illustrates fifth code for signaling/encoding/decoding of a motion vector difference according to an example;

FIG. 49 illustrates a method for signaling information for a motion vector search mode according to an example;

FIG. 50 illustrates first code indicating coding information signaled in association with a block partitioning structure according to an example; and FIG. 51 illustrates second code indicating coding information signaled in association with a block partitioning structure according to an example.

MODE FOR INVENTION

Figure 1:
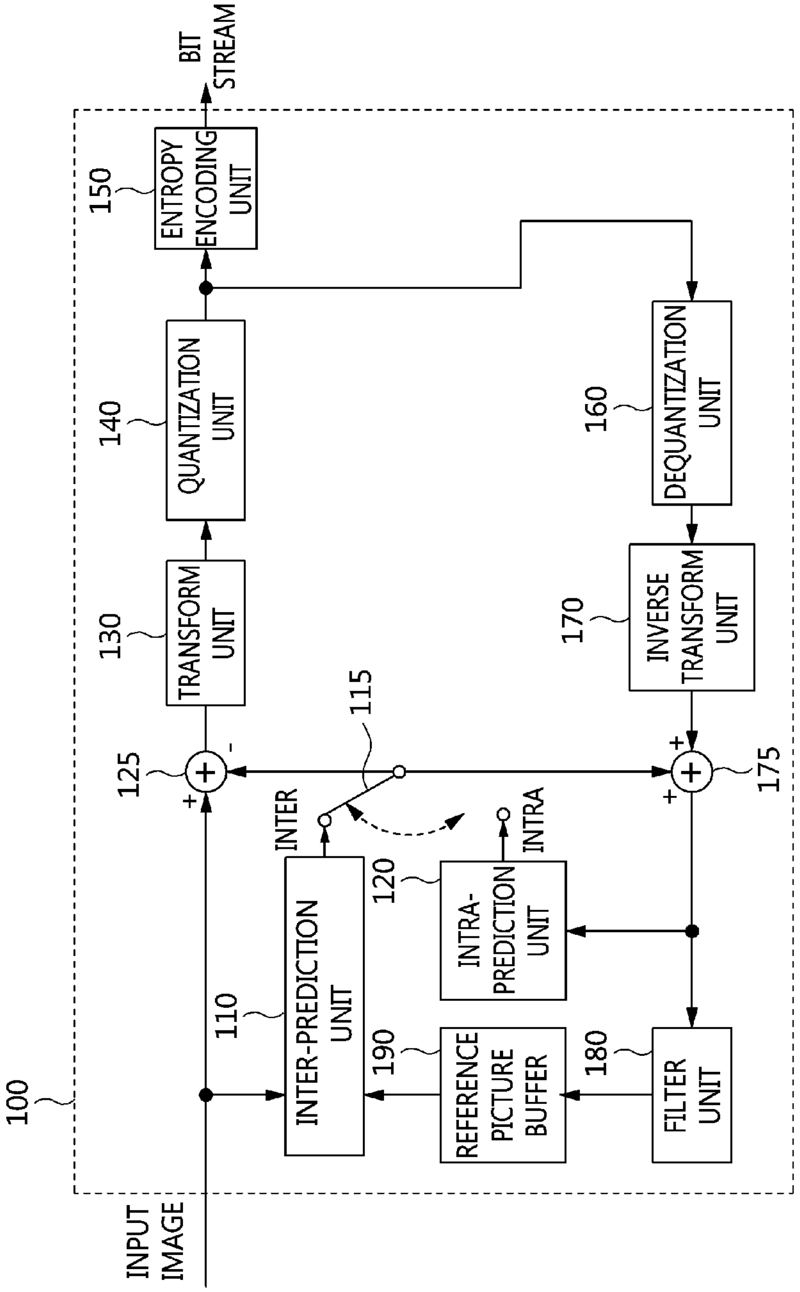
FIG. 1 is a block diagram illustrating the configuration of an embodiment of an encoding apparatus to which the present disclosure is applied.

The present invention may be variously changed, and may have various embodiments, and specific embodiments will be described in detail below with reference to the attached drawings. However, it should be understood that those embodiments are not intended to limit the present invention to specific disclosure forms, and that they include all changes, equivalents or modifications included in the spirit and scope of the present invention.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but do not need to be mutually exclusive of each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

Terms such as “first” and “second” may be used to describe various components, but the components are not restricted by the terms. The terms are used only to distinguish one component from another component. For example, a first component may be named a second component without departing from the scope of the present specification. Likewise, a second component may be named a first component. The terms “and/or” may include combinations of a plurality of related described items or any of a plurality of related described items.

It will be understood that when a component is referred to as being “connected” or “coupled” to another component, the two components may be directly connected or coupled to each other, or intervening components may be present between the two components. On the other hand, it will be understood that when a component is referred to as being “directly connected or coupled”, no intervening components are present between the two components.

Components described in the embodiments are independently shown in order to indicate different characteristic functions, but this does not mean that each of the components is formed of a separate piece of hardware or software. That is, the components are arranged and included separately for convenience of description. For example, at least two of the components may be integrated into a single component. Conversely, one component may be divided into multiple components. An embodiment into which the components are integrated or an embodiment in which some components are separated is included in the scope of the present specification as long as it does not depart from the essence of the present specification.

The terms used in the embodiment are merely used to describe specific embodiments and are not intended to limit the present invention. A singular expression includes a plural expression unless a description to the contrary is specifically pointed out in context. In the embodiments, it should be understood that the terms such as “include” or “have” are merely intended to indicate that features, numbers, steps, operations, components, parts, or combinations thereof are present, and are not intended to exclude the possibility that one or more other features, numbers, steps, operations, components, parts, or combinations thereof will be present or added. That is, in the embodiments, an expression describing that a component “comprises” a specific component means that additional components may be included within the scope of the practice of the present invention or the technical spirit of the present invention, but does not preclude the presence of components other than the specific component.

In the embodiments, a term “at least one” may mean one of one or more numbers, such as 1, 2, 3, and 4. In the embodiments, a term “a plurality of” may mean one of two or more numbers, such as 2, 3 and 4.

Some components of the embodiments are not essential components for performing essential functions, but may be optional components for improving only performance. The embodiments may be implemented using only essential components for implementing the essence of the embodiments. For example, a structure including only essential components, excluding optional components used only to improve performance, is also included in the scope of the embodiments.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted. Further, the same reference numerals are used to designate the same components throughout the drawings, and repeated descriptions of the same components will be omitted.

Hereinafter, “image” may mean a single picture constituting a video, or may mean the video itself. For example, “encoding and/or decoding of an image” may mean “encoding and/or decoding of a video”, and may also mean “encoding and/or decoding of any one of images constituting the video”.

Hereinafter, the terms “video” and “motion picture” may be used to have the same meaning, and may be used interchangeably with each other.

Hereinafter, a target image may be an encoding target image, which is the target to be encoded, and/or a decoding target image, which is the target to be decoded. Further, the target image may be an input image that is input to an encoding apparatus or an input image that is input to a decoding apparatus. And, a target image may be a current image, that is, the target to be currently encoded and/or decoded. For example, the terms “target image” and “current image” may be used to have the same meaning, and may be used interchangeably with each other.

Hereinafter, the terms “image”, “picture”, “frame”, and “screen” may be used to have the same meaning and may be used interchangeably with each other.

Hereinafter, a target block may be an encoding target block, i.e. the target to be encoded and/or a decoding target block, i.e. the target to be decoded. Further, the target block may be a current block, i.e. the target to be currently encoded and/or decoded. Here, the terms “target block” and “current block” may be used to have the same meaning, and may be used interchangeably with each other. A current block may denote an encoding target block, which is the target of encoding, during encoding and/or a decoding target block, which is the target of decoding, during decoding. Also, the current block may be at least one of a coding block, a prediction block, a residual block, and a transform block.

Hereinafter, the terms “block” and “unit” may be used to have the same meaning, and may be used interchangeably with each other. Alternatively, “block” may denote a specific unit.

Hereinafter, the terms “region” and “segment” may be used interchangeably with each other.

In the following embodiments, specific information, data, a flag, an index, an element, and an attribute may have their respective values. A value of “0” corresponding to each of the information, data, flag, index, element, and attribute may indicate a false, a logical false or a first predefined value. In other words, the value of “0”, a false, logical false, and a first predefined value may be used interchangeably with each other. A value of “1” corresponding to each of the information, data, flag, index, element, and attribute may indicate a true, a logical true or a second predefined value. In other words, the value of “1”, true, logical true, and a second predefined value may be used interchangeably with each other.

When a variable such as i or j is used to indicate a row, a column, or an index, the value of i may be an integer of 0 or more or an integer of 1 or more. In other words, in the embodiments, each of a row, a column, and an index may be counted from 0 or may be counted from 1.

In embodiments, the term “one or more” or the term “at least one” may mean the term “plural”. The term “one or more” or the term “at least one” may be used interchangeably with “plural”.

Below, the terms to be used in embodiments will be described.

Encoder: An encoder denotes a device for performing encoding. That is, an encoder may mean an encoding apparatus.

Decoder: A decoder denotes a device for performing decoding. That is, a decoder may mean a decoding apparatus.

Unit: A unit may denote the unit of image encoding and decoding. The terms “unit” and “block” may be used to have the same meaning, and may be used interchangeably with each other.

- A unit may be an M×N array of samples. Each of M and N may be a positive integer. A unit may typically mean an array of samples in the form of two-dimensions.
- In the encoding and decoding of an image, “unit” may be an area generated by the partitioning of one image. In other words, “unit” may be a region specified in one image. A single image may be partitioned into multiple units. Alternatively, one image may be partitioned into sub-parts, and the unit may denote each partitioned sub-part when encoding or decoding is performed on the partitioned sub-part.
- In the encoding and decoding of an image, predefined processing may be performed on each unit depending on the type of the unit.
- Depending on functions, the unit types may be classified into a macro unit, a Coding Unit (CU), a Prediction Unit (PU), a residual unit, a Transform Unit (TU), etc. Alternatively, depending on functions, the unit may denote a block, a macroblock, a coding tree unit, a coding tree block, a coding unit, a coding block, a prediction unit, a prediction block, a residual unit, a residual block, a transform unit, a transform block, etc. For example, a target unit, which is the target of encoding and/or decoding, may be at least one of a CU, a PU, a residual unit, and a TU.
- The term “unit” may mean information including a luminance (luma) component block, a chrominance (chroma) component block corresponding thereto, and syntax elements for respective blocks so that the unit is designated to be distinguished from a block.
- The size and shape of a unit may be variously implemented. Further, a unit may have any of various sizes and shapes. In particular, the shapes of the unit may include not only a square, but also a geometric figure that can be represented in two dimensions (2D), such as a rectangle, a trapezoid, a triangle, and a pentagon.
- Further, unit information may include one or more of the type of a unit, the size of a unit, the depth of a unit, the order of encoding of a unit and the order of decoding of a unit, etc. For example, the type of a unit may indicate one of a CU, a PU, a residual unit and a TU.
- One unit may be partitioned into sub-units, each having a smaller size than that of the relevant unit.

Depth: A depth may mean an extent to which the unit is partitioned. Further, the depth of the unit may indicate the level at which the corresponding unit is present when unit(s) are represented by a tree structure.

- Unit partition information may include a depth indicating the depth of a unit. A depth may indicate the number of times the unit is partitioned and/or the degree to which the unit is partitioned.
- In a tree structure, it may be considered that the depth of a root node is the smallest, and the depth of a leaf node is the largest. The root node may be the highest (top) node. The leaf node may be a lowest node.
- A single unit may be hierarchically partitioned into multiple sub-units while having depth information based on a tree structure. In other words, the unit and sub-units, generated by partitioning the unit, may correspond to a node and child nodes of the node, respectively. Each of the partitioned sub-units may have a unit depth. Since the depth indicates the number of times the unit is partitioned and/or the degree to which the unit is partitioned, the partition information of the sub-units may include information about the sizes of the sub-units.
- In a tree structure, the top node may correspond to the initial node before partitioning. The top node may be referred to as a “root node”. Further, the root node may have a minimum depth value. Here, the top node may have a depth of level ‘0’.
- A node having a depth of level ‘1’ may denote a unit generated when the initial unit is partitioned once. A node having a depth of level ‘2’ may denote a unit generated when the initial unit is partitioned twice.
- A leaf node having a depth of level ‘n’ may denote a unit generated when the initial unit has been partitioned n times.
- The leaf node may be a bottom node, which cannot be partitioned any further. The depth of the leaf node may be the maximum level. For example, a predefined value for the maximum level may be 3.

A QT depth may denote a depth for a quad-partitioning. A BT depth may denote a depth for a binary-partitioning. A TT depth may denote a depth for a ternary-partitioning.

Sample: A sample may be a base unit constituting a block. A sample may be represented by values from 0 to $2^{Bd}-1$ depending on the bit depth (Bd).

A sample may be a pixel or a pixel value.

Hereinafter, the terms "pixel" and "sample" may be used to have the same meaning, and may be used interchangeably with each other.

A Coding Tree Unit (CTU): A CTU may be composed of a single luma component (Y) coding tree block and two chroma component (Cb, Cr) coding tree blocks related to the luma component coding tree block. Further, a CTU may mean information including the above blocks and a syntax element for each of the blocks.

Each coding tree unit (CTU) may be partitioned using one or more partitioning methods, such as a quad tree (QT), a binary tree (BT), and a ternary tree (TT) so as to configure sub-units, such as a coding unit, a prediction unit, and a transform unit. A quad tree may mean a quarternary tree. Further, each coding tree unit may be partitioned using a multitype tree (MTT) using one or more partitioning methods.

"CTU" may be used as a term designating a pixel block, which is a processing unit in an image-decoding and encoding process, as in the case of partitioning of an input image.

Coding Tree Block (CTB): "CTB" may be used as a term designating any one of a Y coding tree block, a Cb coding tree block, and a Cr coding tree block.

Neighbor block: A neighbor block (or neighboring block) may mean a block adjacent to a target block. A neighbor block may mean a reconstructed neighbor block.

Hereinafter, the terms "neighbor block" and "adjacent block" may be used to have the same meaning and may be used interchangeably with each other.

A neighbor block may mean a reconstructed neighbor block.

Spatial neighbor block; A spatial neighbor block may a block spatially adjacent to a target block. A neighbor block may include a spatial neighbor block.

The target block and the spatial neighbor block may be included in a target picture.

The spatial neighbor block may mean a block, the boundary of which is in contact with the target block, or a block located within a predetermined distance from the target block.

The spatial neighbor block may mean a block adjacent to the vertex of the target block. Here, the block adjacent to the vertex of the target block may mean a block vertically adjacent to a neighbor block which is horizontally adjacent to the target block or a block horizontally adjacent to a neighbor block which is vertically adjacent to the target block.

Temporal neighbor block: A temporal neighbor block may be a block temporally adjacent to a target block. A neighbor block may include a temporal neighbor block.

The temporal neighbor block may include a co-located block (col block).

The col block may be a block in a previously reconstructed co-located picture (col picture). The location of the col block in the col-picture may correspond to the location of the target block in a target picture. Alternatively, the location of the col block in the col-picture may be equal to the location of the target block in the target picture. The col picture may be a picture included in a reference picture list.

The temporal neighbor block may be a block temporally adjacent to a spatial neighbor block of a target block.

Prediction mode: The prediction mode may be information indicating the mode used for intra prediction, or the mode used for inter prediction.

Prediction unit: A prediction unit may be a base unit for prediction, such as inter prediction, intra prediction, inter compensation, intra compensation, and motion compensation.

A single prediction unit may be divided into multiple partitions having smaller sizes or sub-prediction units. The multiple partitions may also be base units in the performance of prediction or compensation. The partitions generated by dividing the prediction unit may also be prediction units.

Prediction unit partition: A prediction unit partition may be the shape into which a prediction unit is divided.

Reconstructed neighbor unit: A reconstructed neighbor unit may be a unit which has already been decoded and reconstructed neighboring a target unit.

A reconstructed neighbor unit may be a unit that is spatially adjacent to the target unit or that is temporally adjacent to the target unit.

A reconstructed spatial neighbor unit may be a unit which is included in a target picture and which has already been reconstructed through encoding and/or decoding.

A reconstructed temporal neighbor unit may be a unit which is included in a reference image and which has already been reconstructed through encoding and/or decoding. The location of the reconstructed temporal neighbor unit in the reference image may be identical to that of the target unit in the target picture, or may correspond to the location of the target unit in the target picture. Also, a reconstructed temporal neighbor unit may be a block neighboring the corresponding block in a reference image. Here, the location of the corresponding block in the reference image may correspond to the location of the target block in the target image. Here, the fact that the locations of blocks correspond to each other may mean that the locations of the blocks are identical to each other, may mean that one block is included in another block, or may mean that one block occupies a specific location in another block.

Sub-picture: A picture may be divided into one or more sub-pictures. A sub-picture may be composed of one or more tile rows and one or more tile columns.

A sub-picture may be a region having a square shape or a rectangular (i.e., a non-square rectangular) shape in a picture. Further, a sub-picture may include one or more CTUs.

A sub-picture may be a rectangular region of one or more slices in a picture.

One sub-picture may include one or more tiles, one or more bricks, and/or one or more slices.

Tile: A tile may be a region having a square shape or rectangular (i.e., a non-square rectangular) shape in a picture.

A tile may include one or more CTUs.

A tile may be partitioned into one or more bricks.

Brick: A brick may denote one or more CTU rows in a tile.

A tile may be partitioned into one or more bricks. Each brick may include one or more CTU rows.

A tile that is not partitioned into two parts may also denote a brick.

Slice: A slice may include one or more tiles in a picture. Alternatively, a slice may include one or more bricks in a tile.

A sub-picture may contain one or more slices that collectively cover a rectangular region of a picture. Consequently, each sub-picture boundary is also always a slice boundary, and each vertical sub-picture boundary is always also a vertical tile boundary.

Parameter set: A parameter set may correspond to header information in the internal structure of a bitstream.

A parameter set may include at least one of a video parameter set (VPS), a sequence parameter set (SPS), a picture parameter set (PPS), an adaptation parameter set (APS), a decoding parameter set (DPS), etc.

Information signaled through each parameter set may be applied to pictures which refer to the corresponding parameter set. For example, information in a VPS may be applied to pictures which refer to the VPS. Information in an SPS may be applied to pictures which refer to the SPS. Information in a PPS may be applied to pictures which refer to the PPS.

Each parameter set may refer to a higher parameter set. For example, a PPS may refer to an SPS. An SPS may refer to a VPS.

Further, a parameter set may include a tile group, slice header information, and tile header information. The tile group may be a group including multiple tiles. Also, the meaning of "tile group" may be identical to that of "slice".

Rate-distortion optimization: An encoding apparatus may use rate-distortion optimization so as to provide high coding efficiency by utilizing combinations of the size of a coding unit (CU), a prediction mode, the size of a prediction unit (PU), motion information, and the size of a transform unit (TU).

A rate-distortion optimization scheme may calculate rate-distortion costs of respective combinations so as to select an optimal combination from among the combinations. The rate-distortion costs may be calculated using the equation "$D+\lambda*R$". Generally, a combination enabling the rate-distortion cost to be minimized may be selected as the optimal combination in the rate-distortion optimization scheme.

D may denote distortion. D may be the mean of squares of differences (i.e. mean square error) between original transform coefficients and reconstructed transform coefficients in a transform unit.

R may denote the rate, which may denote a bit rate using related-context information.

$\lambda$ denotes a Lagrangian multiplier. R may include not only coding parameter information, such as a prediction mode, motion information, and a coded block flag, but also bits generated due to the encoding of transform coefficients.

An encoding apparatus may perform procedures, such as inter prediction and/or intra prediction, transform, quantization, entropy encoding, inverse quantization (dequantization), and/or inverse transform so as to calculate precise D and R. These procedures may greatly increase the complexity of the encoding apparatus.

Bitstream: A bitstream may denote a stream of bits including encoded image information.

Parsing: Parsing may be the decision on the value of a syntax element, made by performing entropy decoding on a bitstream. Alternatively, the term "parsing" may mean such entropy decoding itself.

Symbol: A symbol may be at least one of the syntax element, the coding parameter, and the transform coefficient of an encoding target unit and/or a decoding target unit. Further, a symbol may be the target of entropy encoding or the result of entropy decoding.

Reference picture: A reference picture may be an image referred to by a unit so as to perform inter prediction or motion compensation. Alternatively, a reference picture may be an image including a reference unit referred to by a target unit so as to perform inter prediction or motion compensation.

Hereinafter, the terms "reference picture" and "reference image" may be used to have the same meaning, and may be used interchangeably with each other.

Reference picture list: A reference picture list may be a list including one or more reference images used for inter prediction or motion compensation.

The types of a reference picture list may include List Combined (LC), List 0 (L0), List 1 (L1), List 2 (L2), List 3 (L3), etc.

For inter prediction, one or more reference picture lists may be used.

Inter-prediction indicator: An inter-prediction indicator may indicate the inter-prediction direction for a target unit. Inter prediction may be one of unidirectional prediction and bidirectional prediction. Alternatively, the inter-prediction indicator may denote the number of reference pictures used to generate a prediction unit of a target unit. Alternatively, the inter-prediction indicator may denote the number of prediction blocks used for inter prediction or motion compensation of a target unit.

Prediction list utilization flag: A prediction list utilization flag may indicate whether a prediction unit is generated using at least one reference picture in a specific reference picture list.

An inter-prediction indicator may be derived using the prediction list utilization flag. In contrast, the prediction list utilization flag may be derived using the inter-prediction indicator. For example, the case where the prediction list utilization flag indicates "0", which is a first value, may indicate that, for a target unit, a prediction block is not generated using a reference picture in a reference picture list. The case where the prediction list utilization flag indicates "1", which is a second value, may indicate that, for a target unit, a prediction unit is generated using the reference picture list.

Reference picture index: A reference picture index may be an index indicating a specific reference picture in a reference picture list.

Picture Order Count (POC): A POC value for a picture may denote an order in which the corresponding picture is displayed.

Motion vector (MV): A motion vector may be a 2D vector used for inter prediction or motion compensation. A motion vector may mean an offset between a target image and a reference image.

For example, a MV may be represented in a form such as ($mv_x$, $mv_y$). $mv_x$ may indicate a horizontal component, and $mv_y$ may indicate a vertical component.

Search range: A search range may be a 2D area in which a search for a MV is performed during inter prediction.

For example, the size of the search range may be M×N. M and N may be respective positive integers.

Motion vector candidate: A motion vector candidate may be a block that is a prediction candidate or the motion vector of the block that is a prediction candidate when a motion vector is predicted.

A motion vector candidate may be included in a motion vector candidate list.

Motion vector candidate list: A motion vector candidate list may be a list configured using one or more motion vector candidates.

Motion vector candidate index: A motion vector candidate index may be an indicator for indicating a motion vector candidate in the motion vector candidate list. Alternatively, a motion vector candidate index may be the index of a motion vector predictor.

Motion information: Motion information may be information including at least one of a reference picture list, a reference image, a motion vector candidate, a motion vector candidate index, a merge candidate, and a merge index, as well as a motion vector, a reference picture index, and an inter-prediction indicator.

Merge candidate list: A merge candidate list may be a list configured using one or more merge candidates.

Merge candidate: A merge candidate may be a spatial merge candidate, a temporal merge candidate, a combined merge candidate, a combined bi-prediction merge candidate, a candidate based on a history, a candidate based on an average of two candidates, a zero-merge candidate, etc. A merge candidate may include an inter-prediction indicator, and may include motion information such as prediction type information, a reference picture index for each list, a motion vector, a prediction list utilization flag, and an inter-prediction indicator.

Merge index: A merge index may be an indicator for indicating a merge candidate in a merge candidate list.

A merge index may indicate a reconstructed unit used to derive a merge candidate between a reconstructed unit spatially adjacent to a target unit and a reconstructed unit temporally adjacent to the target unit.

A merge index may indicate at least one of pieces of motion information of a merge candidate.

Transform unit: A transform unit may be the base unit of residual signal encoding and/or residual signal decoding, such as transform, inverse transform, quantization, dequantization, transform coefficient encoding, and transform coefficient decoding. A single transform unit may be partitioned into multiple sub-transform units having a smaller size. Here, a transform may include one or more of a primary transform and a secondary transform, and an inverse transform may include one or more of a primary inverse transform and a secondary inverse transform.

Scaling: Scaling may denote a procedure for multiplying a factor by a transform coefficient level.

As a result of scaling of the transform coefficient level, a transform coefficient may be generated. Scaling may also be referred to as "dequantization".

Quantization Parameter (QP): A quantization parameter may be a value used to generate a transform coefficient level for a transform coefficient in quantization. Alternatively, a quantization parameter may also be a value used to generate a transform coefficient by scaling the transform coefficient level in dequantization. Alternatively, a quantization parameter may be a value mapped to a quantization step size.

Delta quantization parameter: A delta quantization parameter may mean a difference value between a predicted quantization parameter and the quantization parameter of a target unit.

Scan: Scan may denote a method for aligning the order of coefficients in a unit, a block or a matrix. For example, a method for aligning a 2D array in the form of a one-dimensional (1D) array may be referred to as a "scan". Alternatively, a method for aligning a 1D array in the form of a 2D array may also be referred to as a "scan" or an "inverse scan".

Transform coefficient: A transform coefficient may be a coefficient value generated as an encoding apparatus performs a transform. Alternatively, the transform coefficient may be a coefficient value generated as a decoding apparatus performs at least one of entropy decoding and dequantization.

A quantized level or a quantized transform coefficient level generated by applying quantization to a transform coefficient or a residual signal may also be included in the meaning of the term "transform coefficient".

Quantized level: A quantized level may be a value generated as the encoding apparatus performs quantization on a transform coefficient or a residual signal. Alternatively, the quantized level may be a value that is the target of dequantization as the decoding apparatus performs dequantization.

A quantized transform coefficient level, which is the result of transform and quantization, may also be included in the meaning of a quantized level.

Non-zero transform coefficient: A non-zero transform coefficient may be a transform coefficient having a value other than 0 or a transform coefficient level having a value other than 0. Alternatively, a non-zero transform coefficient may be a transform coefficient, the magnitude of the value of which is not 0, or a transform coefficient level, the magnitude of the value of which is not 0.

Quantization matrix: A quantization matrix may be a matrix used in a quantization procedure or a dequantization procedure so as to improve the subjective image quality or objective image quality of an image. A quantization matrix may also be referred to as a "scaling list".

Quantization matrix coefficient: A quantization matrix coefficient may be each element in a quantization matrix. A quantization matrix coefficient may also be referred to as a "matrix coefficient".

Default matrix: A default matrix may be a quantization matrix predefined by the encoding apparatus and the decoding apparatus.

Non-default matrix: A non-default matrix may be a quantization matrix that is not predefined by the encoding apparatus and the decoding apparatus. The non-default matrix may mean a quantization matrix to be signaled from the encoding apparatus to the decoding apparatus by a user.

Most Probable Mode (MPM): An MPM may denote an intra-prediction mode having a high probability of being used for intra prediction for a target block.

An encoding apparatus and a decoding apparatus may determine one or more MPMs based on coding parameters related to the target block and the attributes of entities related to the target block.

The encoding apparatus and the decoding apparatus may determine one or more MPMs based on the intra-prediction mode of a reference block. The reference block may include multiple reference blocks. The multiple reference blocks may include spatial neighbor blocks adjacent to the left of the target block and spatial neighbor blocks adjacent to the top of the target block. In other words, depending on which intra-prediction modes have been used for the reference blocks, one or more different MPMs may be determined.

The one or more MPMs may be determined in the same manner both in the encoding apparatus and in the decoding apparatus. That is, the encoding apparatus and the decoding apparatus may share the same MPM list including one or more MPMs.

MPM list: An MPM list may be a list including one or more MPMs. The number of the one or more MPMs in the MPM list may be defined in advance.

MPM indicator: An MPM indicator may indicate an MPM to be used for intra prediction for a target block among one or more MPMs in the MPM list. For example, the MPM indicator may be an index for the MPM list.

Since the MPM list is determined in the same manner both in the encoding apparatus and in the decoding apparatus, there may be no need to transmit the MPM list itself from the encoding apparatus to the decoding apparatus.

The MPM indicator may be signaled from the encoding apparatus to the decoding apparatus. As the MPM indicator is signaled, the decoding apparatus may determine the MPM to be used for intra prediction for the target block among the MPMs in the MPM list.

MPM use indicator: An MPM use indicator may indicate whether an MPM usage mode is to be used for prediction for a target block. The MPM usage mode may be a mode in which the MPM to be used for intra prediction for the target block is determined using the MPM list.

The MPM use indicator may be signaled from the encoding apparatus to the decoding apparatus.

Signaling: "signaling" may denote that information is transferred from an encoding apparatus to a decoding apparatus. Alternatively, "signaling" may mean information is included in in a bitstream or a recoding medium by an encoding apparatus. Information signaled by an encoding apparatus may be used by a decoding apparatus.

The encoding apparatus may generate encoded information by performing encoding on information to be signaled. The encoded information may be transmitted from the encoding apparatus to the decoding apparatus. The decoding apparatus may obtain information by decoding the transmitted encoded information. Here, the encoding may be entropy encoding, and the decoding may be entropy decoding.

Selective Signaling: Information may be signaled selectively. A selective signaling FOR information may mean that an encoding apparatus selectively includes information (according to a specific condition) in a bitstream or a recording medium. Selective signaling for information may mean that a decoding apparatus selectively extracts information from a bitstream (according to a specific condition).

Omission of signaling: Signaling for information may be omitted. Omission of signaling for information on information may mean that an encoding apparatus does not include information (according to a specific condition) in a bitstream or a recording medium. Omission of signaling for information may mean that a decoding apparatus does not extract information from a bitstream (according to a specific condition).

Statistic value: A variable, a coding parameter, a constant, etc. may have values that can be calculated. The statistic value may be a value generated by performing calculations (operations) on the values of specified targets. For example, the statistic value may indicate one or more of the average, weighted average, weighted sum, minimum value, maximum value, mode, median value, and interpolated value of the values of a specific variable, a specific coding parameter, a specific constant, or the like.

FIG. 1 is a block diagram illustrating the configuration of an embodiment of an encoding apparatus to which the present disclosure is applied.

An encoding apparatus 100 may be an encoder, a video encoding apparatus or an image encoding apparatus. A video may include one or more images (pictures). The encoding apparatus 100 may sequentially encode one or more images of the video.

Referring to FIG. 1, the encoding apparatus 100 includes an inter-prediction unit 110, an intra-prediction unit 120, a switch 115, a subtractor 125, a transform unit 130, a quantization unit 140, an entropy encoding unit 150, a dequantization (inverse quantization) unit 160, an inverse transform unit 170, an adder 175, a filter unit 180, and a reference picture buffer 190.

The encoding apparatus 100 may perform encoding on a target image using an intra mode and/or an inter mode. In other words, a prediction mode for a target block may be one of an intra mode and an inter mode.

Hereinafter, the terms "intra mode", "intra-prediction mode", "intra-picture mode" and "intra-picture prediction mode" may be used to have the same meaning, and may be used interchangeably with each other.

Hereinafter, the terms "inter mode", "inter-prediction mode", "inter-picture mode" and "inter-picture prediction mode" may be used to have the same meaning, and may be used interchangeably with each other.

Hereinafter, the term "image" may indicate only part of an image, or may indicate a block. Also, the processing of an "image" may indicate sequential processing of multiple blocks.

Further, the encoding apparatus 100 may generate a bitstream, including encoded information, via encoding on the target image, and may output and store the generated bitstream. The generated bitstream may be stored in a computer-readable storage medium and may be streamed through a wired and/or wireless transmission medium.

When the intra mode is used as a prediction mode, the switch 115 may switch to the intra mode. When the inter mode is used as a prediction mode, the switch 115 may switch to the inter mode.

The encoding apparatus 100 may generate a prediction block of a target block. Further, after the prediction block has been generated, the encoding apparatus 100 may encode a residual block for the target block using a residual between the target block and the prediction block.

When the prediction mode is the intra mode, the intra-prediction unit 120 may use pixels of previously encoded/decoded neighbor blocks adjacent to the target block as reference samples. The intra-prediction unit 120 may perform spatial prediction on the target block using the reference samples, and may generate prediction samples for the target block via spatial prediction, the prediction samples may mean samples in the prediction block.

The inter-prediction unit 110 may include a motion prediction unit and a motion compensation unit.

When the prediction mode is an inter mode, the motion prediction unit may search a reference image for the area most closely matching the target block in a motion prediction procedure, and may derive a motion vector for the target block and the found area based on the found area. Here, the motion-prediction unit may use a search range as a target area for searching.

The reference image may be stored in the reference picture buffer 190. More specifically, an encoded and/or decoded reference image may be stored in the reference picture buffer 190 when the encoding and/or decoding of the reference image have been processed.

Since a decoded picture is stored, the reference picture buffer 190 may be a Decoded Picture Buffer (DPB).

The motion compensation unit may generate a prediction block for the target block by performing motion compensation using a motion vector. Here, the motion vector may be a two-dimensional (2D) vector used for inter-prediction. Further, the motion vector may indicate an offset between the target image and the reference image.

The motion prediction unit and the motion compensation unit may generate a prediction block by applying an interpolation filter to a partial area of a reference image when the motion vector has a value other than an integer. In order to perform inter prediction or motion compensation, it may be determined which one of a skip mode, a merge mode, an advanced motion vector prediction (AMVP) mode, and a current picture reference mode corresponds to a method for predicting the motion of a PU included in a CU, based on the CU, and compensating for the motion, and inter prediction or motion compensation may be performed depending on the mode.

The subtractor 125 may generate a residual block, which is the differential between the target block and the prediction block. A residual block may also be referred to as a "residual signal".

The residual signal may be the difference between an original signal and a prediction signal. Alternatively, the residual signal may be a signal generated by transforming or quantizing the difference between an original signal and a prediction signal or by transforming and quantizing the difference. A residual block may be a residual signal for a block unit.

The transform unit 130 may generate a transform coefficient by transforming the residual block, and may output the generated transform coefficient. Here, the transform coefficient may be a coefficient value generated by transforming the residual block.

The transform unit 130 may use one of multiple predefined transform methods when performing a transform.

The multiple predefined transform methods may include a Discrete Cosine Transform (DCT), a Discrete Sine Transform (DST), a Karhunen-Loeve Transform (KLT), etc.

The transform method used to transform a residual block may be determined depending on at least one of coding parameters for a target block and/or a neighbor block. For example, the transform method may be determined based on at least one of an inter-prediction mode for a PU, an intra-prediction mode for a PU, the size of a TU, and the shape of a TU. Alternatively, transformation information indicating the transform method may be signaled from the encoding apparatus 100 to the decoding apparatus 200.

When a transform skip mode is used, the transform unit 130 may omit transforming the residual block.

By applying quantization to the transform coefficient, a quantized transform coefficient level or a quantized level may be generated. Hereinafter, in the embodiments, each of the quantized transform coefficient level and the quantized level may also be referred to as a 'transform coefficient'.

The quantization unit 140 may generate a quantized transform coefficient level (i.e., a quantized level or a quantized coefficient) by quantizing the transform coefficient depending on quantization parameters. The quantization unit 140 may output the quantized transform coefficient level that is generated. In this case, the quantization unit 140 may quantize the transform coefficient using a quantization matrix.

The entropy encoding unit 150 may generate a bitstream by performing probability distribution-based entropy encoding based on values, calculated by the quantization unit 140, and/or coding parameter values, calculated in the encoding procedure. The entropy encoding unit 150 may output the generated bitstream.

The entropy encoding unit 150 may perform entropy encoding on information about the pixels of the image and information required to decode the image. For example, the information required to decode the image may include syntax elements or the like.

When entropy encoding is applied, fewer bits may be assigned to more frequently occurring symbols, and more bits may be assigned to rarely occurring symbols. As symbols are represented by means of this assignment, the size of a bit string for target symbols to be encoded may be reduced. Therefore, the compression performance of video encoding may be improved through entropy encoding.

Further, for entropy encoding, the entropy encoding unit 150 may use a coding method such as exponential Golomb, Context-Adaptive Variable Length Coding (CAVLC), or Context-Adaptive Binary Arithmetic Coding (CABAC). For example, the entropy encoding unit 150 may perform entropy encoding using a Variable Length Coding/Code (VLC) table. For example, the entropy encoding unit 150 may derive a binarization method for a target symbol. Further, the entropy encoding unit 150 may derive a probability model for a target symbol/bin. The entropy encoding unit 150 may perform arithmetic coding using the derived binarization method, a probability model, and a context model.

The entropy encoding unit 150 may transform the coefficient of the form of a 2D block into the form of a 1D vector through a transform coefficient scanning method so as to encode a quantized transform coefficient level.

The coding parameters may be information required for encoding and/or decoding. The coding parameters may include information encoded by the encoding apparatus 100 and transferred from the encoding apparatus 100 to a decoding apparatus, and may also include information that may be derived in the encoding or decoding procedure. For example, information transferred to the decoding apparatus may include syntax elements.

The coding parameters may include not only information (or a flag or an index), such as a syntax element, which is encoded by the encoding apparatus and is signaled by the encoding apparatus to the decoding apparatus, but also information derived in an encoding or decoding process. Further, the coding parameters may include information required so as to encode or decode images. For example, the coding parameters may include at least one value, combinations or statistics of a size of a unit/block, a shape/form of a unit/block, a depth of a unit/block, partition information of a unit/block, a partition structure of a unit/block, information indicating whether a unit/block is partitioned in a quad-tree structure, information indicating whether a unit/block is partitioned in a binary tree structure, a partitioning direction of a binary tree structure (horizontal direction or vertical direction), a partitioning form of a binary tree structure (symmetrical partitioning or asymmetrical partitioning), information indicating whether a unit/block is partitioned in a ternary tree structure, a partitioning direction of a ternary tree structure (horizontal direction or vertical direction), a partitioning form of a ternary tree structure (symmetrical partitioning or asymmetrical partitioning, etc.), information indicating whether a unit/block is partitioned in a multi-type tree structure, a combination and a direction (horizontal direction or vertical direction, etc.) of a partitioning of the multi-type tree structure, a partitioning form of a multi-type tree structure (symmetrical partitioning or asymmetrical partitioning, etc.), a partitioning tree (a binary tree or a ternary tree) of the multi-type tree form, a type of a prediction (intra prediction or inter prediction), an intra-prediction mode/direction, an intra luma prediction mode/direction, an intra chroma prediction mode/direction, an intra partitioning information, an inter partitioning information, a coding block partitioning flag, a prediction block partitioning flag, a transform block partitioning flag, a reference sample filtering method, a reference sample filter tap, a reference sample filter coefficient, a prediction block filtering method, a prediction block filter tap, a prediction block filter coefficient, a prediction block boundary filtering method, a prediction block boundary filter tap, a prediction block boundary filter coefficient, an inter-prediction mode, motion information, a motion vector, a motion vector difference, a reference picture index, an inter-prediction direction, an inter-prediction indicator, a prediction list utilization flag, a reference picture list, a reference image, a POC, a motion vector predictor, a motion vector prediction index, a motion vector prediction candidate, a motion vector candidate list, information indicating whether a merge mode is used, a merge index, a merge candidate, a merge candidate list, information indicating whether a skip mode is used, a type of an interpolation filter, a tap of an interpolation filter, a filter coefficient of an interpolation filter, a magnitude of a motion vector, accuracy of motion vector representation, a transform type, a transform size, information indicating whether a first transform is used, information indicating whether an additional (secondary) transform is used, first transform selection information (or a first transform index), secondary transform selection information (or a secondary transform index), information indicating a presence or absence of a residual signal, a coded block pattern, a coded block flag, a quantization parameter, a residual quantization parameter, a quantization matrix, information about an intra-loop filter, information indicating whether an intra-loop filter is applied, a coefficient of an intra-loop filter, a tap of an intra-loop filter, a shape/form of an intra-loop filter, information indicating whether a deblocking filter is applied, a coefficient of a deblocking filter, a tap of a deblocking filter, deblocking filter strength, a shape/form of a deblocking filter, information indicating whether an adaptive sample offset is applied, a value of an adaptive sample offset, a category of an adaptive sample offset, a type of an adaptive sample offset, information indicating whether an adaptive in-loop filter is applied, a coefficient of an adaptive in-loop filter, a tap of an adaptive in-loop filter, a shape/form of an adaptive in-loop filter, a binarization/inverse binarization method, a context model, a context model decision method, a context model update method, information indicating whether a regular mode is performed, information whether a bypass mode is performed, a significant coefficient flag, a last significant coefficient flag, a coding flag for a coefficient group, a position of a last significant coefficient, information indicating whether a value of a coefficient is greater than 1, information indicating whether a value of a coefficient is greater than 2, information indicating whether a value of a coefficient is greater than 3, a remaining coefficient value information, a sign information, a reconstructed luma sample, a reconstructed chroma sample, a context bin, a bypass bin, a residual luma sample, a residual chroma sample, a transform coefficient, a luma transform coefficient, a chroma transform coefficient, a quantized level, a luma quantized level, a chroma quantized level, a transform coefficient level, a transform coefficient level scanning method, a size of a motion vector search region on a side of a decoding apparatus, a shape/form of a motion vector search region on a side of a decoding apparatus, the number of a motion vector search on a side of a decoding apparatus, a size of a CTU, a minimum block size, a maximum block size, a maximum block depth, a minimum block depth, an image display/output order, slice identification information, a slice type, slice partition information, tile group identification information, a tile group type, a tile group partitioning information, tile identification information, a tile type, tile partitioning information, a picture type, bit depth, input sample bit depth, reconstructed sample bit depth, residual sample bit depth, transform coefficient bit depth, quantized level bit depth, information about a luma signal, information about a chroma signal, a color space of a target block and a color space of a residual block. Further, the above-described coding parameter-related information may also be included in the coding parameter. Information used to calculate and/or derive the above-described coding parameter may also be included in the coding parameter. Information calculated or derived using the above-described coding parameter may also be included in the coding parameter.

The first transform selection information may indicate a first transform which is applied to a target block.

The second transform selection information may indicate a second transform which is applied to a target block.

The residual signal may denote the difference between the original signal and a prediction signal. Alternatively, the residual signal may be a signal generated by transforming the difference between the original signal and the prediction signal. Alternatively, the residual signal may be a signal generated by transforming and quantizing the difference between the original signal and the prediction signal. A residual block may be the residual signal for a block.

Here, signaling information may mean that the encoding apparatus 100 includes an entropy-encoded information, generated by performing entropy encoding a flag or an index, in a bitstream, and that the decoding apparatus 200 acquires information by performing entropy decoding on the entropy-encoded information, extracted from the bitstream. Here, the information may comprise a flag, an index, etc.

A signal may mean information to be signaled. Hereinafter, information for an image and a block may be referred to as a signal. Further, hereinafter, the terms “information” and “signal” may be used to have the same meaning and may be used interchangeably with each other. For example, a specific signal may be a signal representing a specific block. An original signal may be a signal representing a target block. A prediction signal may be a signal representing a prediction block. A residual signal may be a signal representing a residual block.

A bitstream may include information based on a specific syntax. The encoding apparatus 100 may generate a bitstream including information depending on a specific syntax. The decoding apparatus 200 may acquire information from the bitstream depending on a specific syntax.

Since the encoding apparatus 100 performs encoding via inter prediction, the encoded target image may be used as a reference image for additional image(s) to be subsequently processed. Therefore, the encoding apparatus 100 may reconstruct or decode the encoded target image and store the reconstructed or decoded image as a reference image in the reference picture buffer 190. For decoding, dequantization and inverse transform on the encoded target image may be processed.

The quantized level may be inversely quantized by the dequantization unit 160, and may be inversely transformed by the inverse transform unit 170. The dequantization unit 160 may generate an inversely quantized coefficient by performing inverse transform for the quantized level. The inverse transform unit 170 may generate a inversely quantized and inversely transformed coefficient by performing inverse transform for the inversely quantized coefficient.

The inversely quantized and inversely transformed coefficient may be added to the prediction block by the adder 175. The inversely quantized and inversely transformed coefficient and the prediction block are added, and then a reconstructed block may be generated. Here, the inversely quantized and/or inversely transformed coefficient may denote a coefficient on which one or more of dequantization and inverse transform are performed, and may also denote a reconstructed residual block. Here, the reconstructed block may mean a recovered block or a decoded block.

The reconstructed block may be subjected to filtering through the filter unit 180. The filter unit 180 may apply one or more of a deblocking filter, a Sample Adaptive Offset (SAO) filter, an Adaptive Loop Filter (ALF), and a Non Local Filter (NLF) to a reconstructed sample, the reconstructed block or a reconstructed picture. The filter unit 180 may also be referred to as an "in-loop filter".

The deblocking filter may eliminate block distortion occurring at the boundaries between blocks in a reconstructed picture. In order to determine whether to apply the deblocking filter, the number of columns or rows which are included in a block and which include pixel(s) based on which it is determined whether to apply the deblocking filter to a target block may be decided on.

When the deblocking filter is applied to the target block, the applied filter may differ depending on the strength of the required deblocking filtering. In other words, among different filters, a filter decided on in consideration of the strength of deblocking filtering may be applied to the target block. When a deblocking filter is applied to a target block, one or more filters of a long-tap filter, a strong filter, a weak filter and Gaussian filter may be applied to the target block depending on the strength of required deblocking filtering.

Also, when vertical filtering and horizontal filtering are performed on the target block, the horizontal filtering and the vertical filtering may be processed in parallel.

The SAO may add a suitable offset to the values of pixels to compensate for coding error. The SAO may perform, for the image to which deblocking is applied, correction that uses an offset in the difference between an original image and the image to which deblocking is applied, on a pixel basis. To perform an offset correction for an image, a method for dividing the pixels included in the image into a certain number of regions, determining a region to which an offset is to be applied, among the divided regions, and applying an offset to the determined region may be used, and a method for applying an offset in consideration of edge information of each pixel may also be used.

The ALF may perform filtering based on a value obtained by comparing a reconstructed image with an original image. After pixels included in an image have been divided into a predetermined number of groups, filters to be applied to each group may be determined, and filtering may be differentially performed for respective groups. information related to whether to apply an adaptive loop filter may be signaled for each CU. Such information may be signaled for a luma signal. The shapes and filter coefficients of ALFs to be applied to respective blocks may differ for respective blocks. Alternatively, regardless of the features of a block, an ALF having a fixed form may be applied to the block.

A non-local filter may perform filtering based on reconstructed blocks, similar to a target block. A region similar to the target block may be selected from a reconstructed picture, and filtering of the target block may be performed using the statistical properties of the selected similar region. Information about whether to apply a non-local filter may be signaled for a Coding Unit (CU). Also, the shapes and filter coefficients of the non-local filter to be applied to blocks may differ depending on the blocks.

The reconstructed block or the reconstructed image subjected to filtering through the filter unit 180 may be stored in the reference picture buffer 190 as a reference picture. The reconstructed block subjected to filtering through the filter unit 180 may be a part of a reference picture. In other words, the reference picture may be a reconstructed picture composed of reconstructed blocks subjected to filtering through the filter unit 180. The stored reference picture may be subsequently used for inter prediction or a motion compensation.

Figure 2:
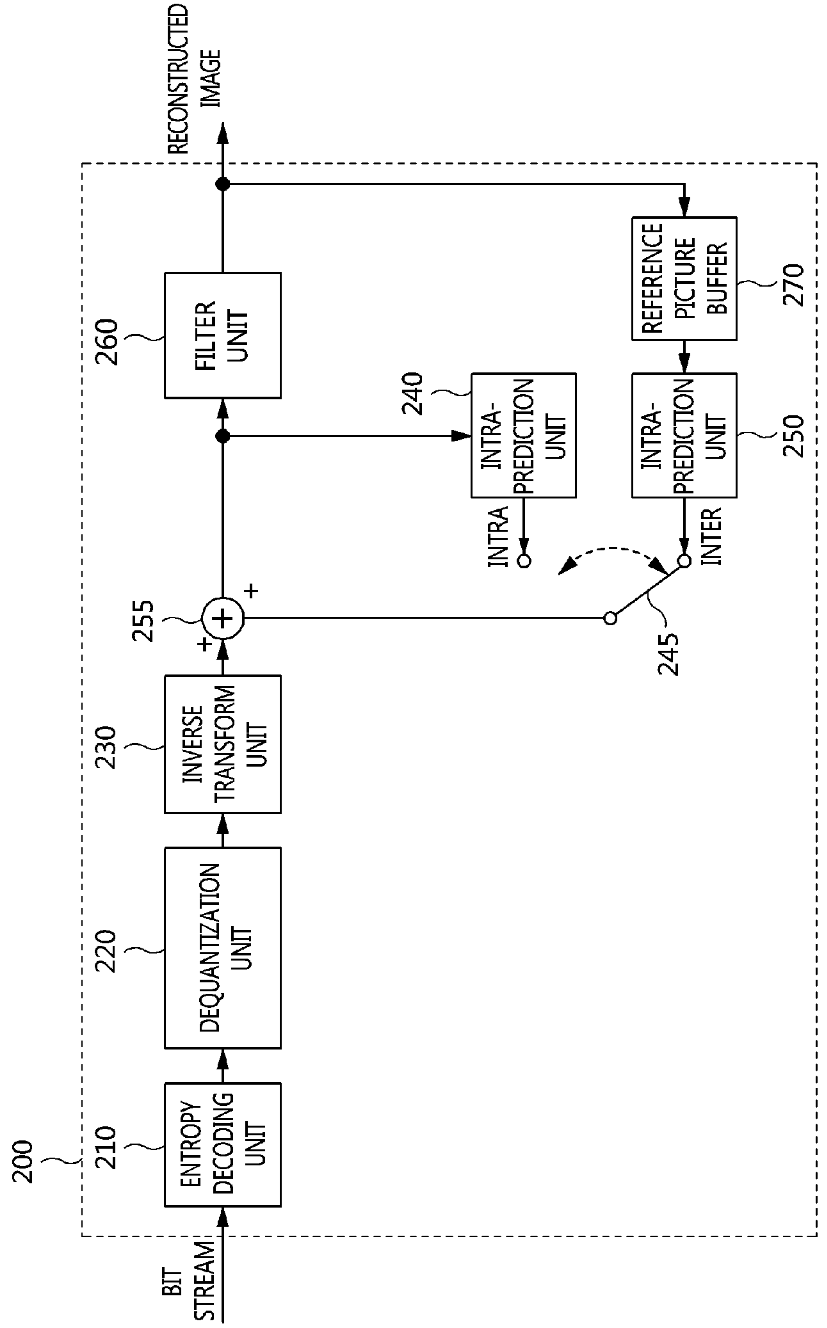
FIG. 2 is a block diagram illustrating the configuration of an embodiment of a decoding apparatus to which the present disclosure is applied.

FIG. 2 is a block diagram illustrating the configuration of an embodiment of a decoding apparatus to which the present disclosure is applied.

A decoding apparatus 200 may be a decoder, a video decoding apparatus or an image decoding apparatus.

Referring to FIG. 2, the decoding apparatus 200 may include an entropy decoding unit 210, a dequantization (inverse quantization) unit 220, an inverse transform unit 230, an intra-prediction unit 240, an inter-prediction unit 250, a switch 245 an adder 255, a filter unit 260, and a reference picture buffer 270.

The decoding apparatus 200 may receive a bitstream output from the encoding apparatus 100. The decoding apparatus 200 may receive a bitstream stored in a computer-readable storage medium, and may receive a bitstream that is streamed through a wired/wireless transmission medium.

The decoding apparatus 200 may perform decoding on the bitstream in an intra mode and/or an inter mode. Further, the decoding apparatus 200 may generate a reconstructed image or a decoded image via decoding, and may output the reconstructed image or decoded image.

For example, switching to an intra mode or an inter mode based on the prediction mode used for decoding may be performed by the switch 245. When the prediction mode used for decoding is an intra mode, the switch 245 may be operated to switch to the intra mode. When the prediction mode used for decoding is an inter mode, the switch 245 may be operated to switch to the inter mode.

The decoding apparatus 200 may acquire a reconstructed residual block by decoding the input bitstream, and may generate a prediction block. When the reconstructed residual block and the prediction block are acquired, the decoding apparatus 200 may generate a reconstructed block, which is the target to be decoded, by adding the reconstructed residual block and the prediction block.

The entropy decoding unit 210 may generate symbols by performing entropy decoding on the bitstream based on the probability distribution of a bitstream. The generated symbols may include symbols in a form of a quantized transform coefficient level (i.e., a quantized level or a quantized coefficient). Here, the entropy decoding method may be similar to the above-described entropy encoding method. That is, the entropy decoding method may be the reverse procedure of the above-described entropy encoding method.

The entropy decoding unit 210 may change a coefficient having a one-dimensional (1D) vector form to a 2D block shape through a transform coefficient scanning method in order to decode a quantized transform coefficient level.

For example, the coefficients of the block may be changed to 2D block shapes by scanning the block coefficients using up-right diagonal scanning. Alternatively, which one of up-right diagonal scanning, vertical scanning, and horizontal scanning is to be used may be determined depending on the size and/or the intra-prediction mode of the corresponding block.

The quantized coefficient may be inversely quantized by the dequantization unit 220. The dequantization unit 220 may generate an inversely quantized coefficient by performing dequantization on the quantized coefficient. Further, the inversely quantized coefficient may be inversely transformed by the inverse transform unit 230. The inverse transform unit 230 may generate a reconstructed residual block by performing an inverse transform on the inversely quantized coefficient. As a result of performing dequantization and the inverse transform on the quantized coefficient, the reconstructed residual block may be generated. Here, the dequantization unit 220 may apply a quantization matrix to the quantized coefficient when generating the reconstructed residual block.

When the intra mode is used, the intra-prediction unit 240 may generate a prediction block by performing spatial prediction that uses the pixel values of previously decoded neighbor blocks adjacent to a target block for the target block.

The inter-prediction unit 250 may include a motion compensation unit. Alternatively, the inter-prediction unit 250 may be designated as a "motion compensation unit".

When the inter mode is used, the motion compensation unit may generate a prediction block by performing motion compensation that uses a motion vector and a reference image stored in the reference picture buffer 270 for the target block.

The motion compensation unit may apply an interpolation filter to a partial area of the reference image when the motion vector has a value other than an integer, and may generate a prediction block using the reference image to which the interpolation filter is applied. In order to perform motion compensation, the motion compensation unit may determine which one of a skip mode, a merge mode, an Advanced Motion Vector Prediction (AMVP) mode, and a current picture reference mode corresponds to the motion compensation method used for a PU included in a CU, based on the CU, and may perform motion compensation depending on the determined mode.

The reconstructed residual block and the prediction block may be added to each other by the adder 255. The adder 255 may generate a reconstructed block by adding the reconstructed residual block to the prediction block.

The reconstructed block may be subjected to filtering through the filter unit 260. The filter unit 260 may apply at least one of a deblocking filter, an SAO filter, an ALF, and a NLF to the reconstructed block or the reconstructed image. The reconstructed image may be a picture including the reconstructed block.

The filter unit may output the reconstructed image.

The reconstructed image and/or the reconstructed block subjected to filtering through the filter unit 260 may be stored as a reference picture in the reference picture buffer 270. The reconstructed block subjected to filtering through the filter unit 260 may be a part of the reference picture. In other words, the reference picture may be an image composed of reconstructed blocks subjected to filtering through the filter unit 260. The stored reference picture may be subsequently used for inter prediction or a motion compensation.

Figure 3:
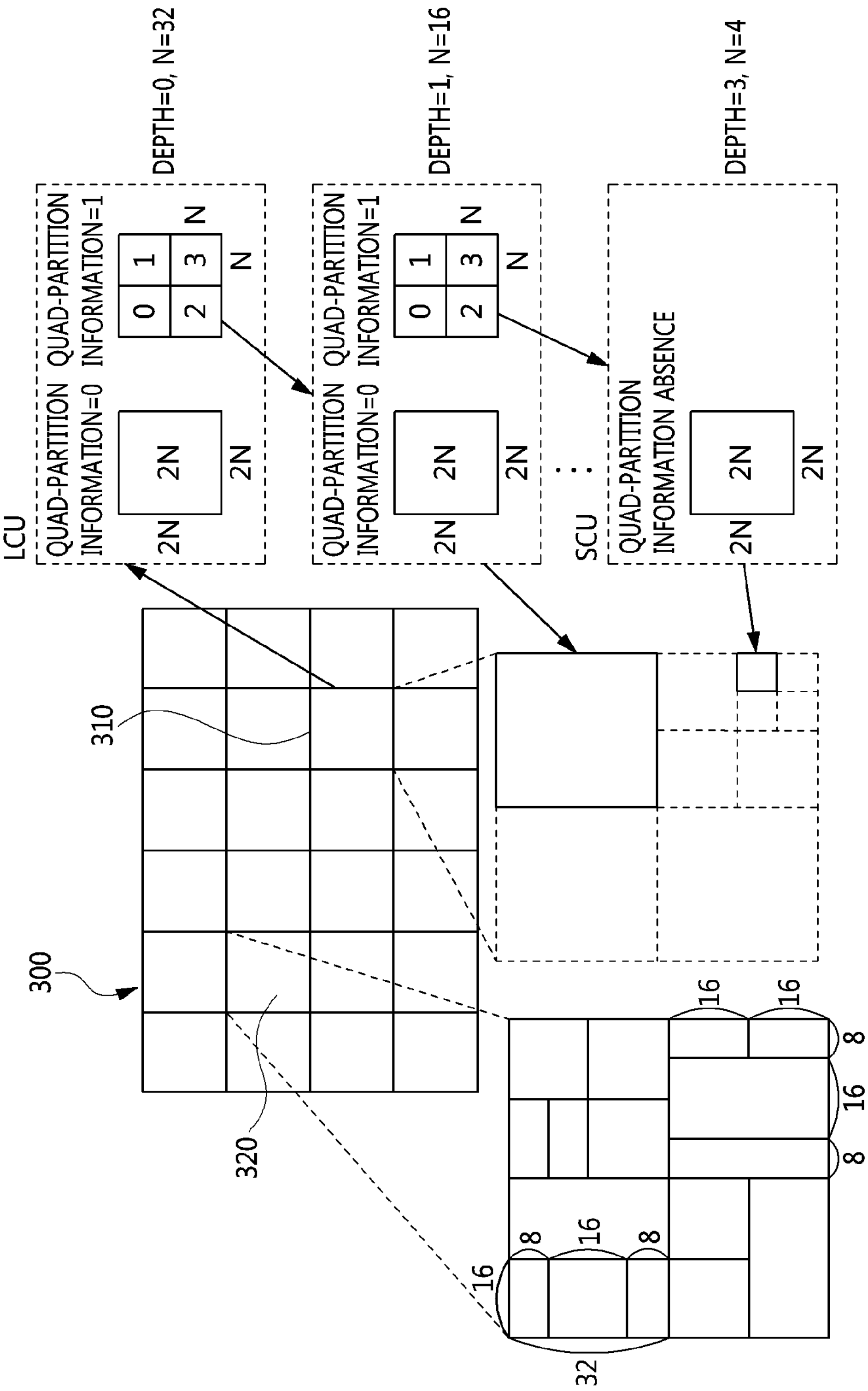
FIG. 3 is a diagram schematically illustrating the partition structure of an image when the image is encoded and decoded.

FIG. 3 is a diagram schematically illustrating the partition structure of an image when the image is encoded and decoded.

FIG. 3 may schematically illustrate an example in which a single unit is partitioned into multiple sub-units.

In order to efficiently partition the image, a Coding Unit (CU) may be used in encoding and decoding. The term "unit" may be used to collectively designate 1) a block including image samples and 2) a syntax element. For example, the "partitioning of a unit" may mean the "partitioning of a block corresponding to a unit".

A CU may be used as a base unit for image encoding/decoding. A CU may be used as a unit to which one mode selected from an intra mode and an inter mode in image encoding/decoding is applied. In other words, in image encoding/decoding, which one of an intra mode and an inter mode is to be applied to each CU may be determined.

Further, a CU may be a base unit in prediction, transform, quantization, inverse transform, dequantization, and encoding/decoding of transform coefficients.

Referring to FIG. 3, an image 200 may be sequentially partitioned into units corresponding to a Largest Coding Unit (LCU), and a partition structure may be determined for each LCU. Here, the LCU may be used to have the same meaning as a Coding Tree Unit (CTU).

The partitioning of a unit may mean the partitioning of a block corresponding to the unit. Block partition information may include depth information about the depth of a unit. The depth information may indicate the number of times the unit is partitioned and/or the degree to which the unit is partitioned. A single unit may be hierarchically partitioned into a plurality of sub-units while having depth information based on a tree structure.

Each of partitioned sub-units may have depth information. The depth information may be information indicating the size of a CU. The depth information may be stored for each CU.

Each CU may have depth information. When the CU is partitioned, CUs resulting from partitioning may have a depth increased from the depth of the partitioned CU by 1.

The partition structure may mean the distribution of Coding Units (CUs) to efficiently encode the image in an LCU 310. Such a distribution may be determined depending on whether a single CU is to be partitioned into multiple CUs. The number of CUs generated by partitioning may be a positive integer of 2 or more, including 2, 3, 4, 8, 16, etc.

The horizontal size and the vertical size of each of CUs generated by the partitioning may be less than the horizontal size and the vertical size of a CU before being partitioned, depending on the number of CUs generated by partitioning. For example, the horizontal size and the vertical size of each of CUs generated by the partitioning may be half of the horizontal size and the vertical size of a CU before being partitioned.

Each partitioned CU may be recursively partitioned into four CUs in the same way. Via the recursive partitioning, at least one of the horizontal size and the vertical size of each partitioned CU may be reduced compared to at least one of the horizontal size and the vertical size of the CU before being partitioned.

The partitioning of a CU may be recursively performed up to a predefined depth or a predefined size.

For example, the depth of a CU may have a value ranging from 0 to 3. The size of the CU may range from a size of 64×64 to a size of 8×8 depending on the depth of the CU.

For example, the depth of an LCU 310 may be 0, and the depth of a Smallest Coding Unit (SCU) may be a predefined maximum depth. Here, as described above, the LCU may be the CU having the maximum coding unit size, and the SCU may be the CU having the minimum coding unit size.

Partitioning may start at the LCU 310, and the depth of a CU may be increased by 1 whenever the horizontal and/or vertical sizes of the CU are reduced by partitioning.

For example, for respective depths, a CU that is not partitioned may have a size of 2N×2N. Further, in the case of a CU that is partitioned, a CU having a size of 2N×2N may be partitioned into four CUs, each having a size of N×N. The value of N may be halved whenever the depth is increased by 1.

Referring to FIG. 3, an LCU having a depth of 0 may have 64×64 pixels or 64×64 blocks. 0 may be a minimum depth. An SCU having a depth of 3 may have 8×8 pixels or 8×8 blocks. 3 may be a maximum depth. Here, a CU having 64×64 blocks, which is the LCU, may be represented by a depth of 0. A CU having 32×32 blocks may be represented by a depth of 1. A CU having 16×16 blocks may be represented by a depth of 2. A CU having 8×8 blocks, which is the SCU, may be represented by a depth of 3.

Information about whether the corresponding CU is partitioned may be represented by the partition information of the CU. The partition information may be 1-bit information. All CUs except the SCU may include partition information. For example, the value of the partition information of a CU that is not partitioned may be a first value. The value of the partition information of a CU that is partitioned may be a second value. When the partition information indicates whether a CU is partitioned or not, the first value may be "0" and the second value may be "1".

For example, when a single CU is partitioned into four CUs, the horizontal size and vertical size of each of four CUs generated by partitioning may be half the horizontal size and the vertical size of the CU before being partitioned. When a CU having a 32×32 size is partitioned into four CUs, the size of each of four partitioned CUs may be 16×16. When a single CU is partitioned into four CUs, it may be considered that the CU has been partitioned in a quad-tree structure. In other words, it may be considered that a quad-tree partition has been applied to a CU.

For example, when a single CU is partitioned into two CUs, the horizontal size or the vertical size of each of two CUs generated by partitioning may be half the horizontal size or the vertical size of the CU before being partitioned. When a CU having a 32×32 size is vertically partitioned into two CUs, the size of each of two partitioned CUs may be 16×32. When a CU having a 32×32 size is horizontally partitioned into two CUs, the size of each of two partitioned CUs may be 32×16. When a single CU is partitioned into two CUs, it may be considered that the CU has been partitioned in a binary-tree structure. In other words, it may be considered that a binary-tree partition has been applied to a CU.

For example, when a single CU is partitioned (or split) into three CUs, the original CU before being partitioned is partitioned so that the horizontal size or vertical size thereof is divided at a ratio of 1:2:1, thus enabling three sub-CUs to be generated. For example, when a CU having a 16×32 size is horizontally partitioned into three sub-CUs, the three sub-CUs resulting from the partitioning may have sizes of 16×8, 16×16, and 16×8, respectively, in a direction from the top to the bottom. For example, when a CU having a 32×32 size is vertically partitioned into three sub-CUs, the three sub-CUs resulting from the partitioning may have sizes of 8×32, 16×32, and 8×32, respectively, in a direction from the left to the right. When a single CU is partitioned into three CUs, it may be considered that the CU is partitioned in a ternary-tree form. In other words, it may be considered that a ternary-tree partition has been applied to the CU.

Both of quad-tree partitioning and binary-tree partitioning are applied to the LCU 310 of FIG. 3.

In the encoding apparatus 100, a Coding Tree Unit (CTU) having a size of 64×64 may be partitioned into multiple smaller CUs by a recursive quad-tree structure. A single CU may be partitioned into four CUs having the same size. Each CU may be recursively partitioned, and may have a quad-tree structure.

By the recursive partitioning of a CU, an optimal partitioning method that incurs a minimum rate-distortion cost may be selected.

The Coding Tree Unit (CTU) 320 in FIG. 3 is an example of a CTU to which all of a quad-tree partition, a binary-tree partition, and a ternary-tree partition are applied.

As described above, in order to partition a CTU, at least one of a quad-tree partition, a binary-tree partition, and a ternary-tree partition may be applied to the CTU. Partitions may be applied based on specific priority.

For example, a quad-tree partition may be preferentially applied to the CTU. A CU that cannot be partitioned in a quad-tree form any further may correspond to a leaf node of a quad-tree. A CU corresponding to the leaf node of the quad-tree may be a root node of a binary tree and/or a ternary tree. That is, the CU corresponding to the leaf node of the quad-tree may be partitioned in a binary-tree form or a ternary-tree form, or may not be partitioned any further. In this case, each CU, which is generated by applying a binary-tree partition or a ternary-tree partition to the CU corresponding to the leaf node of a quad-tree, is prevented from being subjected again to quad-tree partitioning, thus effectively performing partitioning of a block and/or signaling of block partition information.

The partition of a CU corresponding to each node of a quad-tree may be signaled using quad-partition information. Quad-partition information having a first value (e.g., "1") may indicate that the corresponding CU is partitioned in a quad-tree form. Quad-partition information having a second value (e.g., "0") may indicate that the corresponding CU is not partitioned in a quad-tree form. The quad-partition information may be a flag having a specific length (e.g., 1 bit).

Priority may not exist between a binary-tree partition and a ternary-tree partition. That is, a CU corresponding to the leaf node of a quad-tree may be partitioned in a binary-tree form or a ternary-tree form. Also, the CU generated through a binary-tree partition or a ternary-tree partition may be further partitioned in a binary-tree form or a ternary-tree form, or may not be partitioned any further.

Partitioning performed when priority does not exist between a binary-tree partition and a ternary-tree partition may be referred to as a "multi-type tree partition". That is, a CU corresponding to the leaf node of a quad-tree may be the root node of a multi-type tree. Partitioning of a CU corresponding to each node of the multi-type tree may be signaled using at least one of information indicating whether the CU is partitioned in a multi-type tree, partition direction information, and partition tree information. For partitioning of a CU corresponding to each node of a multi-type tree, information indicating whether partitioning in the multi-type tree is performed, partition direction information, and partition tree information may be sequentially signaled.

For example, information indicating whether a CU is partitioned in a multi-type tree and having a first value (e.g., "1") may indicate that the corresponding CU is partitioned in a multi-type tree form. Information indicating whether a CU is partitioned in a multi-type tree and having a second value (e.g., "0") may indicate that the corresponding CU is not partitioned in a multi-type tree form.

When a CU corresponding to each node of a multi-type tree is partitioned in a multi-type tree form, the corresponding CU may further include partition direction information.

The partition direction information may indicate the partition direction of the multi-type tree partition. Partition direction information having a first value (e.g., "1") may indicate that the corresponding CU is partitioned in a vertical direction. Partition direction information having a second value (e.g., "0") may indicate that the corresponding CU is partitioned in a horizontal direction.

When a CU corresponding to each node of a multi-type tree is partitioned in a multi-type tree form, the corresponding CU may further include partition-tree information. The partition-tree information may indicate the tree that is used for a multi-type tree partition.

For example, partition-tree information having a first value (e.g., "1") may indicate that the corresponding CU is partitioned in a binary-tree form. Partition-tree information having a second value (e.g., "0") may indicate that the corresponding CU is partitioned in a ternary-tree form.

Here, each of the above-described information indicating whether partitioning in the multi-type tree is performed, partition-tree information, and partition direction information may be a flag having a specific length (e.g., 1 bit).

At least one of the above-described quad-partition information, information indicating whether partitioning in the multi-type tree is performed, partition direction information, and partition-tree information may be entropy-encoded and/or entropy-decoded. In order to perform entropy encoding/decoding of such information, information of a neighbor CU adjacent to a target CU may be used.

For example, it may be considered that there is a high probability that the partition form of a left CU and/or an above CU (i.e., partitioning/non-partitioning, a partition tree and/or a partition direction) and the partition form of a target CU will be similar to each other. Therefore, based on the information of a neighbor CU, context information for entropy encoding and/or entropy decoding of the information of the target CU may be derived. Here, the information of the neighbor CU may include at least one of 1) quad-partition information of the neighbor CU, 2) information indicating whether the neighbor CU is partitioned in a multi-type tree, 3) partition direction information of the neighbor CU, and 4) partition-tree information of the neighbor CU.

In another embodiment, of a binary-tree partition and a ternary-tree partition, the binary-tree partition may be preferentially performed. That is, the binary-tree partition may be first applied, and then a CU corresponding to the leaf node of a binary tree may be set to the root node of a ternary tree. In this case, a quad-tree partition or a binary-tree partition may not be performed on the CU corresponding to the node of the ternary tree.

A CU, which is not partitioned any further through a quad-tree partition, a binary-tree partition, and/or a ternary-tree partition, may be the unit of encoding, prediction and/or transform. That is, the CU may not be partitioned any further for prediction and/or transform. Therefore, a partition structure for partitioning the CU into Prediction Units (PUs) and/or Transform Units (TUs), partition information thereof, etc. may not be present in a bitstream.

However, when the size of a CU, which is the unit of partitioning, is greater than the size of a maximum transform block, the CU may be recursively partitioned until the size of the CU becomes less than or equal to the size of the maximum transform block. For example, when the size of a CU is 64×64 and the size of the maximum transform block is 32×32, the CU may be partitioned into four 32×32 blocks so as to perform a transform. For example, when the size of a CU is 32×64 and the size of the maximum transform block is 32×32, the CU may be partitioned into two 32×32 blocks.

In this case, information indicating whether a CU is partitioned for a transform may not be separately signaled. Without signaling, whether a CU is partitioned may be determined via a comparison between the horizontal size (and/or vertical size) of the CU and the horizontal size (and/or vertical size) of the maximum transform block. For example, when the horizontal size of the CU is greater than the horizontal size of the maximum transform block, the CU may be vertically bisected. Further, when the vertical size of the CU is greater than the vertical size of the maximum transform block, the CU may be horizontally bisected.

Information about the maximum size and/or minimum size of a CU and information about the maximum size and/or minimum size of a transform block may be signaled or determined at a level higher than that of the CU. For example, the higher level may be a sequence level, a picture level, a tile level, a tile group level or a slice level. For example, the minimum size of the CU may be set to 4×4. For example, the maximum size of the transform block may be set to 64×64. For example, the maximum size of the transform block may be set to 4×4.

Information about the minimum size of a CU corresponding to the leaf node of a quad-tree (i.e., the minimum size of the quad-tree) and/or information about the maximum depth of a path from the root node to the leaf node of a multi-type tree (i.e., the maximum depth of a multi-type tree) may be signaled or determined at a level higher than that of the CU. For example, the higher level may be a sequence level, a picture level, a slice level, a tile group level or a tile level. Information about the minimum size of a quad-tree and/or information about the maximum depth of a multi-type tree may be separately signaled or determined at each of an intra-slice level and an inter-slice level.

Information about the difference between the size of a CTU and the maximum size of a transform block may be signaled or determined at a level higher than that of a CU. For example, the higher level may be a sequence level, a picture level, a slice level, a tile group level or a tile level. Information about the maximum size of a CU corresponding to each node of a binary tree (i.e., the maximum size of the binary tree) may be determined based on the size and the difference information of a CTU. The maximum size of a CU corresponding to each node of a ternary tree (i.e., the maximum size of the ternary tree) may have different values depending on the type of slice. For example, the maximum size of the ternary tree at an intra-slice level may be 32×32. For example, the maximum size of the ternary tree at an inter-slice level may be 128×128. For example, the minimum size of a CU corresponding to each node of a binary tree (i.e., the minimum size of the binary tree) and/or the minimum size of a CU corresponding to each node of a ternary tree (i.e., the minimum size of the ternary tree) may be set to the minimum size of a CU.

In a further example, the maximum size of a binary tree and/or the maximum size of a ternary tree may be signaled or determined at a slice level. Also, the minimum size of a binary tree and/or the minimum size of a ternary tree may be signaled or determined at a slice level.

Based on the above-described various block sizes and depths, quad-partition information, information indicating whether partitioning in a multi-type tree is performed, partition tree information and/or partition direction information may or may not be present in a bitstream.

For example, when the size of a CU is not greater than the minimum size of a quad-tree, the CU may not include quad-partition information, and quad-partition information of the CU may be inferred as a second value.

For example, when the size of a CU corresponding to each node of a multi-type tree (horizontal size and vertical size) is greater than the maximum size of a binary tree (horizontal size and vertical size) and/or the maximum size of a ternary tree (horizontal size and vertical size), the CU may not be partitioned in a binary-tree form and/or a ternary-tree form. By means of this determination manner, information indicating whether partitioning in a multi-type tree is performed may not be signaled, but may be inferred as a second value.

Alternatively, when the size of a CU corresponding to each node of a multi-type tree (horizontal size and vertical size) is equal to the minimum size of a binary tree (horizontal size and vertical size), or when the size of a CU (horizontal size and vertical size) is equal to twice the minimum size of a ternary tree (horizontal size and vertical size), the CU may not be partitioned in a binary tree form and/or a ternary tree form. By means of this determination manner, information indicating whether partitioning in a multi-type tree is performed may not be signaled, but may be inferred as a second value. The reason for this is that, when a CU is partitioned in a binary tree form and/or a ternary tree form, a CU smaller than the minimum size of the binary tree and/or the minimum size of the ternary tree is generated.

Alternatively, a binary-tree partition or a ternary-tree partition may be limited based on the size of a virtual pipeline data unit (i.e., the size of a pipeline buffer). For example, when a CU is partitioned into sub-CUs unsuitable for the size of a pipeline buffer through a binary-tree partition or a ternary-tree partition, a binary-tree partition or a ternary-tree partition may be limited. The size of the pipeline buffer may be equal to the maximum size of a transform block (e.g., 64×64).

For example, when the size of the pipeline buffer is 64×64, the following partitions may be limited.

Ternary-tree partition for N×M CU (where N and/or M are 128)

Horizontal binary-tree partition for 128×N CU (where N<=64)

Vertical binary-tree partition for N×128 CU (where N<=64)

Alternatively, when the depth of a CU corresponding to each node of a multi-type tree is equal to the maximum depth of the multi-type tree, the CU may not be partitioned in a binary-tree form and/or a ternary-tree form. By means of this determination manner, information indicating whether partitioning in a multi-type tree is performed may not be signaled, but may be inferred as a second value.

Alternatively, information indicating whether partitioning in a multi-type tree is performed may be signaled only when at least one of a vertical binary-tree partition, a horizontal binary-tree partition, a vertical ternary-tree partition, and a horizontal ternary-tree partition is possible for a CU corresponding to each node of a multi-type tree. Otherwise, the CU may not be partitioned in a binary-tree form and/or a ternary-tree form. By means of this determination manner, information indicating whether partitioning in a multi-type tree is performed may not be signaled, but may be inferred as a second value.

Alternatively, partition direction information may be signaled only when both a vertical binary-tree partition and a horizontal binary-tree partition are possible or only when both a vertical ternary-tree partition and a horizontal ternary-tree partition are possible, for a CU corresponding to each node of a multi-type tree. Otherwise, the partition direction information may not be signaled, but may be inferred as a value indicating the direction in which the CU can be partitioned.

Alternatively, partition tree information may be signaled only when both a vertical binary-tree partition and a vertical ternary-tree partition are possible or only when both a horizontal binary-tree partition and a horizontal ternary-tree partition are possible, for a CU corresponding to each node of a multi-type tree. Otherwise, the partition tree information may not be signaled, but may be inferred as a value indicating a tree that can be applied to the partition of the CU.

Figure 4:
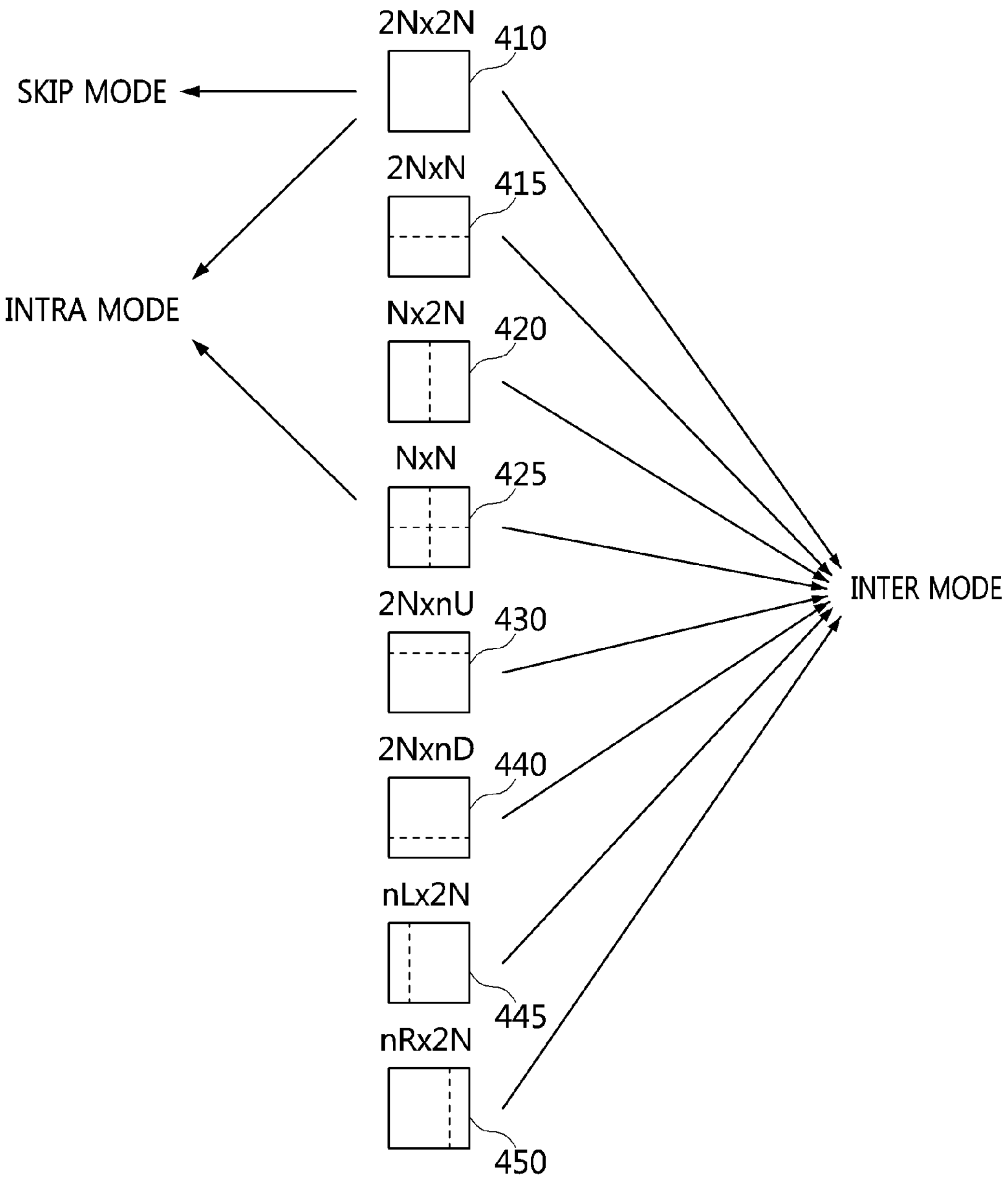
FIG. 4 is a diagram illustrating the form of a Prediction Unit (PU) that a Coding Unit (CU) can include.

FIG. 4 is a diagram illustrating the form of a Prediction Unit that a Coding Unit can include.

When, among CUs partitioned from an LCU, a CU, which is not partitioned any further, may be divided into one or more Prediction Units (PUs). Such division is also referred to as "partitioning".

A PU may be a base unit for prediction. A PU may be encoded and decoded in any one of a skip mode, an inter mode, and an intra mode. A PU may be partitioned into various shapes depending on respective modes. For example, the target block, described above with reference to FIG. 1, and the target block, described above with reference to FIG. 2, may each be a PU.

A CU may not be split into PUs. When the CU is not split into PUs, the size of the CU and the size of a PU may be equal to each other.

In a skip mode, partitioning may not be present in a CU. In the skip mode, a 2N×2N mode 410, in which the sizes of a PU and a CU are identical to each other, may be supported without partitioning.

In an inter mode, 8 types of partition shapes may be present in a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported.

In an intra mode, the 2N×2N mode 410 and the N×N mode 425 may be supported.

In the 2N×2N mode 410, a PU having a size of 2N×2N may be encoded. The PU having a size of 2N×2N may mean a PU having a size identical to that of the CU. For example, the PU having a size of 2N×2N may have a size of 64×64, 32×32, 16×16 or 8×8.

In the N×N mode 425, a PU having a size of N×N may be encoded.

For example, in intra prediction, when the size of a PU is 8×8, four partitioned PUs may be encoded. The size of each partitioned PU may be 4×4.

When a PU is encoded in an intra mode, the PU may be encoded using any one of multiple intra-prediction modes. For example, HEVC technology may provide 35 intra-prediction modes, and the PU may be encoded in any one of the 35 intra-prediction modes.

Which one of the 2N×2N mode 410 and the N×N mode 425 is to be used to encode the PU may be determined based on rate-distortion cost.

The encoding apparatus 100 may perform an encoding operation on a PU having a size of 2N×2N. Here, the encoding operation may be the operation of encoding the PU in each of multiple intra-prediction modes that can be used by the encoding apparatus 100. Through the encoding operation, the optimal intra-prediction mode for a PU having a size of 2N×2N may be derived. The optimal intra-prediction mode may be an intra-prediction mode in which a minimum rate-distortion cost occurs upon encoding the PU having a size of 2N×2N, among multiple intra-prediction modes that can be used by the encoding apparatus 100.

Further, the encoding apparatus 100 may sequentially perform an encoding operation on respective PUs obtained from N×N partitioning. Here, the encoding operation may be the operation of encoding a PU in each of multiple intra-prediction modes that can be used by the encoding apparatus 100. By means of the encoding operation, the optimal intra-prediction mode for the PU having a size of N×N may be derived. The optimal intra-prediction mode may be an intra-prediction mode in which a minimum rate-distortion cost occurs upon encoding the PU having a size of N×N, among multiple intra-prediction modes that can be used by the encoding apparatus 100.

The encoding apparatus 100 may determine which of a PU having a size of 2N×2N and PUs having sizes of N×N to be encoded based on a comparison of a rate-distortion cost of the PU having a size of 2N×2N and a rate-distortion costs of the PUs having sizes of N×N.

A single CU may be partitioned into one or more PUs, and a PU may be partitioned into multiple PUs.

For example, when a single PU is partitioned into four PUs, the horizontal size and vertical size of each of four PUs generated by partitioning may be half the horizontal size and the vertical size of the PU before being partitioned. When a PU having a 32×32 size is partitioned into four PUs, the size of each of four partitioned PUs may be 16×16. When a single PU is partitioned into four PUs, it may be considered that the PU has been partitioned in a quad-tree structure.

For example, when a single PU is partitioned into two PUs, the horizontal size or the vertical size of each of two PUs generated by partitioning may be half the horizontal size or the vertical size of the PU before being partitioned. When a PU having a 32×32 size is vertically partitioned into two PUs, the size of each of two partitioned PUs may be 16×32. When a PU having a 32×32 size is horizontally partitioned into two PUs, the size of each of two partitioned PUs may be 32×16. When a single PU is partitioned into two PUs, it may be considered that the PU has been partitioned in a binary-tree structure.

Figure 5:
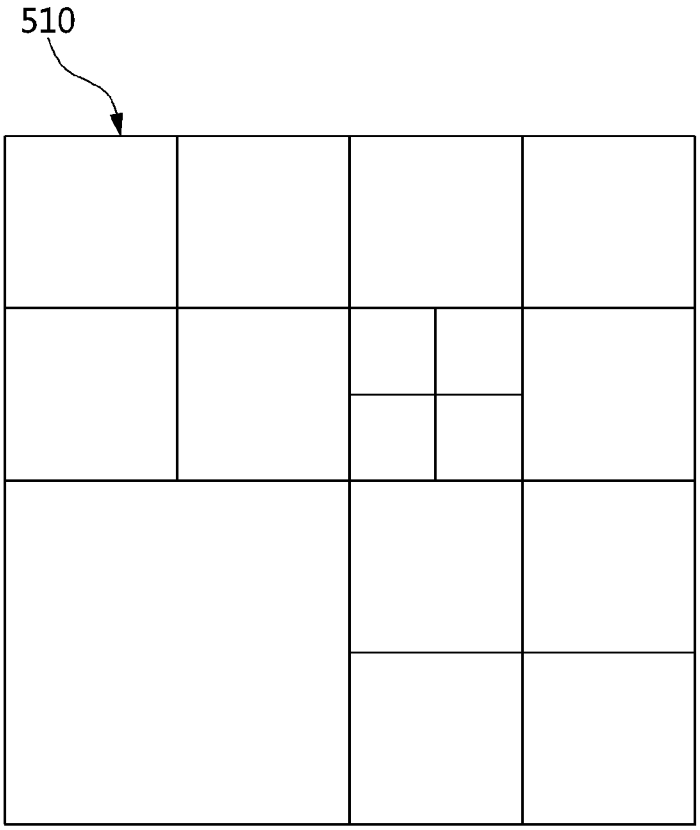
FIG. 5 is a diagram illustrating the form of a Transform Unit (TU) that can be included in a CU.

FIG. 5 is a diagram illustrating the form of a Transform Unit that can be included in a Coding Unit.

A Transform Unit (TU) may have a base unit that is used for a procedure, such as transform, quantization, inverse transform, dequantization, entropy encoding, and entropy decoding, in a CU.

A TU may have a square shape or a rectangular shape. A shape of a TU may be determined based on a size and/or a shape of a CU.

Among CUs partitioned from the LCU, a CU which is not partitioned into CUs any further may be partitioned into one or more TUs. Here, the partition structure of a TU may be a quad-tree structure. For example, as shown in FIG. 5, a single CU 510 may be partitioned one or more times depending on the quad-tree structure. By means of this partitioning, the single CU 510 may be composed of TUs having various sizes.

It can be considered that when a single CU is split two or more times, the CU is recursively split. Through splitting, a single CU may be composed of Transform Units (TUs) having various sizes.

Alternatively, a single CU may be split into one or more TUs based on the number of vertical lines and/or horizontal lines that split the CU.

A CU may be split into symmetric TUs or asymmetric TUs. For splitting into asymmetric TUs, information about the size and/or shape of each TU may be signaled from the encoding apparatus 100 to the decoding apparatus 200. Alternatively, the size and/or shape of each TU may be derived from information about the size and/or shape of the CU.

A CU may not be split into TUs. When the CU is not split into TUs, the size of the CU and the size of a TU may be equal to each other.

A single CU may be partitioned into one or more TUs, and a TU may be partitioned into multiple TUs.

For example, when a single TU is partitioned into four TUs, the horizontal size and vertical size of each of four TUs generated by partitioning may be half the horizontal size and the vertical size of the TU before being partitioned. When a TU having a 32×32 size is partitioned into four TUs, the size of each of four partitioned TUs may be 16×16. When a single TU is partitioned into four TUs, it may be considered that the TU has been partitioned in a quad-tree structure.

For example, when a single TU is partitioned into two TUs, the horizontal size or the vertical size of each of two TUs generated by partitioning may be half the horizontal size or the vertical size of the TU before being partitioned. When a TU having a 32×32 size is vertically partitioned into two TUs, the size of each of two partitioned TUs may be 16×32. When a TU having a 32×32 size is horizontally partitioned into two TUs, the size of each of two partitioned TUs may be 32×16. When a single TU is partitioned into two TUs, it may be considered that the TU has been partitioned in a binary-tree structure.

In a way differing from that illustrated in FIG. 5, a CU may be split.

For example, a single CU may be split into three CUs. The horizontal sizes or vertical sizes of the three CUs generated from splitting may be 1/4, 1/2, and 1/4, respectively, of the horizontal size or vertical size of the original CU before being split.

For example, when a CU having a 32×32 size is vertically split into three CUS, the sizes of the three CUs generated from the splitting may be 8×32, 16×32, and 8×32, respectively. In this way, when a single CU is split into three CUs, it may be considered that the CU is split in the form of a ternary tree.

One of exemplary splitting forms, that is, quad-tree splitting, binary tree splitting, and ternary tree splitting, may be applied to the splitting of a CU, and multiple splitting schemes may be combined and used together for splitting of a CU. Here, the case where multiple splitting schemes are combined and used together may be referred to as "complex tree-format splitting".

Figure 6:
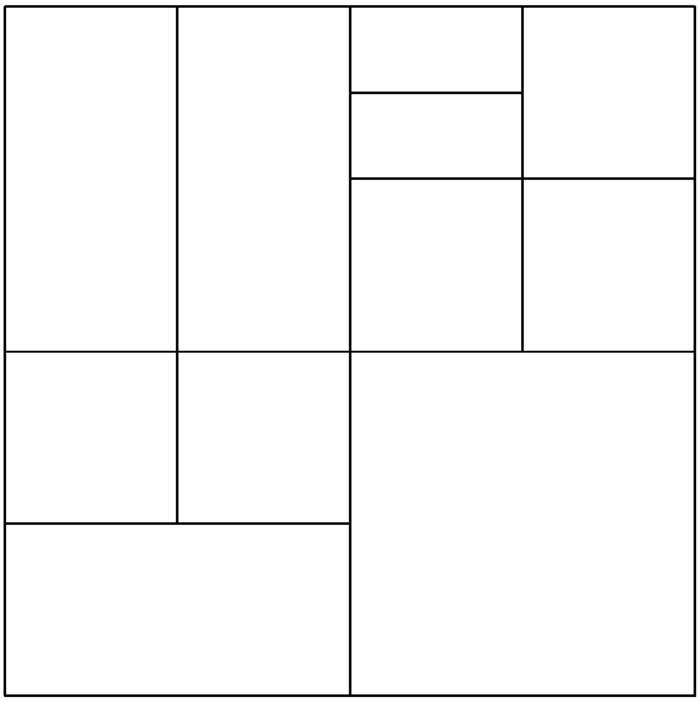
FIG. 6 illustrates splitting of a block according to an example.

FIG. 6 illustrates the splitting of a block according to an example.

In a video encoding and/or decoding process, a target block may be split, as illustrated in FIG. 6. For example, the target block may be a CU.

For splitting of the target block, an indicator indicating split information may be signaled from the encoding apparatus 100 to the decoding apparatus 200. The split information may be information indicating how the target block is split.

The split information may be one or more of a split flag (hereinafter referred to as "split_flag"), a quad-binary flag (hereinafter referred to as "QB_flag"), a quad-tree flag (hereinafter referred to as "quadtree_flag"), a binary tree flag (hereinafter referred to as "binarytree_flag"), and a binary type flag (hereinafter referred to as "Btype_flag").

"split_flag" may be a flag indicating whether a block is split. For example, a split_flag value of 1 may indicate that the corresponding block is split. A split_flag value of 0 may indicate that the corresponding block is not split.

"QB_flag" may be a flag indicating which one of a quad-tree form and a binary tree form corresponds to the shape in which the block is split. For example, a QB_flag value of 0 may indicate that the block is split in a quad-tree form. A QB_flag value of 1 may indicate that the block is split in a binary tree form. Alternatively, a QB_flag value of 0 may indicate that the block is split in a binary tree form. A QB_flag value of 1 may indicate that the block is split in a quad-tree form.

"quadtree_flag" may be a flag indicating whether a block is split in a quad-tree form. For example, a quadtree_flag value of 1 may indicate that the block is split in a quad-tree form. A quadtree_flag value of 0 may indicate that the block is not split in a quad-tree form.

"binarytree_flag" may be a flag indicating whether a block is split in a binary tree form. For example, a binarytree_flag value of 1 may indicate that the block is split in a binary tree form. A binarytree_flag value of 0 may indicate that the block is not split in a binary tree form.

"Btype_flag" may be a flag indicating which one of a vertical split and a horizontal split corresponds to a split direction when a block is split in a binary tree form. For example, a Btype_flag value of 0 may indicate that the block is split in a horizontal direction. A Btype_flag value of 1 may indicate that a block is split in a vertical direction. Alternatively, a Btype_flag value of 0 may indicate that the block is split in a vertical direction. A Btype_flag value of 1 may indicate that a block is split in a horizontal direction.

For example, the split information of the block in FIG. 6 may be derived by signaling at least one of quadtree_flag, binarytree_flag, and Btype_flag, as shown in the following Table 1.

TABLE 1

| quadtree_flag | binarytree_flag | Btype_flag |
|---|---|---|
| 1 | | |
| 0 | | |
| | 1 | |
| | | 1 |
| | 0 | |
| | 0 | |
| 1 | | |
| 0 | | |
| | 1 | |
| | | 0 |
| | 0 | |
| | 0 | |
| 0 | | |
| | 0 | |
| 0 | | |
| | 0 | |
| 0 | | |
| | 0 | |
| 0 | | |
| | 1 | |
| | | 0 |
| | 1 | |
| | | 1 |
| | 0 | |
| | 0 | |
| | 0 | |
| 0 | | |
| | 0 | |

For example, the split information of the block in FIG. 6 may be derived by signaling at least one of split_flag, QB_flag and Btype_flag, as shown in the following Table 2.

TABLE 2

| split_flag | QB_flag | Btype_flag |
|---|---|---|
| 1 | | |
| | 0 | |
| 1 | | |
| | 1 | |
| | | 1 |
| 0 | | |
| 0 | | |
| 1 | | |
| | 0 | |
| 1 | | |
| | 1 | |
| | | 0 |
| 0 | | |
| 0 | | |
| 0 | | |
| 0 | | |
| 0 | | |
| 1 | | |
| | 1 | |
| | | 0 |
| 1 | | |
| | | 1 |
| 0 | | |
| 0 | | |
| 0 | | |
| 0 | | |

The splitting method may be limited only to a quad-tree or to a binary tree depending on the size and/or shape of the block. When this limitation is applied, split_flag may be a flag indicating whether a block is split in a quad-tree form or a flag indicating whether a block is split in a binary tree form. The size and shape of a block may be derived depending on the depth information of the block, and the depth information may be signaled from the encoding apparatus 100 to the decoding apparatus 200.

When the size of a block falls within a specific range, only splitting in a quad-tree form may be possible. For example, the specific range may be defined by at least one of a maximum block size and a minimum block size at which only splitting in a quad-tree form is possible.

Information indicating the maximum block size and the minimum block size at which only splitting in a quad-tree form is possible may be signaled from the encoding apparatus 100 to the decoding apparatus 200 through a bitstream. Further, this information may be signaled for at least one of units such as a video, a sequence, a picture, a parameter, a tile group, and a slice (or a segment).

Alternatively, the maximum block size and/or the minimum block size may be fixed sizes predefined by the encoding apparatus 100 and the decoding apparatus 200. For example, when the size of a block is above 64×64 and below 256×256, only splitting in a quad-tree form may be possible. In this case, split_flag may be a flag indicating whether splitting in a quad-tree form is performed.

When the size of a block is greater than the maximum size of a transform block, only partitioning in a quad-tree form may be possible. Here, a sub-block resulting from partitioning may be at least one of a CU and a TU.

In this case, split_flag may be a flag indicating whether a CU is partitioned in a quad-tree form.

When the size of a block falls within the specific range, only splitting in a binary tree form or a ternary tree form may be possible. For example, the specific range may be defined by at least one of a maximum block size and a minimum block size at which only splitting in a binary tree form or a ternary tree form is possible.

Information indicating the maximum block size and/or the minimum block size at which only splitting in a binary tree form or splitting in a ternary tree form is possible may be signaled from the encoding apparatus 100 to the decoding apparatus 200 through a bitstream. Further, this information may be signaled for at least one of units such as a sequence, a picture, and a slice (or a segment).

Alternatively, the maximum block size and/or the minimum block size may be fixed sizes predefined by the encoding apparatus 100 and the decoding apparatus 200. For example, when the size of a block is above 8×8 and below 16×16, only splitting in a binary tree form may be possible. In this case, split_flag may be a flag indicating whether splitting in a binary tree form or a ternary tree form is performed.

The above description of partitioning in a quad-tree form may be equally applied to a binary-tree form and/or a ternary-tree form.

The partition of a block may be limited by a previous partition. For example, when a block is partitioned in a specific binary-tree form and then multiple sub-blocks are generated from the partitioning, each sub-block may be additionally partitioned only in a specific tree form. Here, the specific tree form may be at least one of a binary-tree form, a ternary-tree form, and a quad-tree form.

When the horizontal size or vertical size of a partition block is a size that cannot be split further, the above-described indicator may not be signaled.

Figure 7:
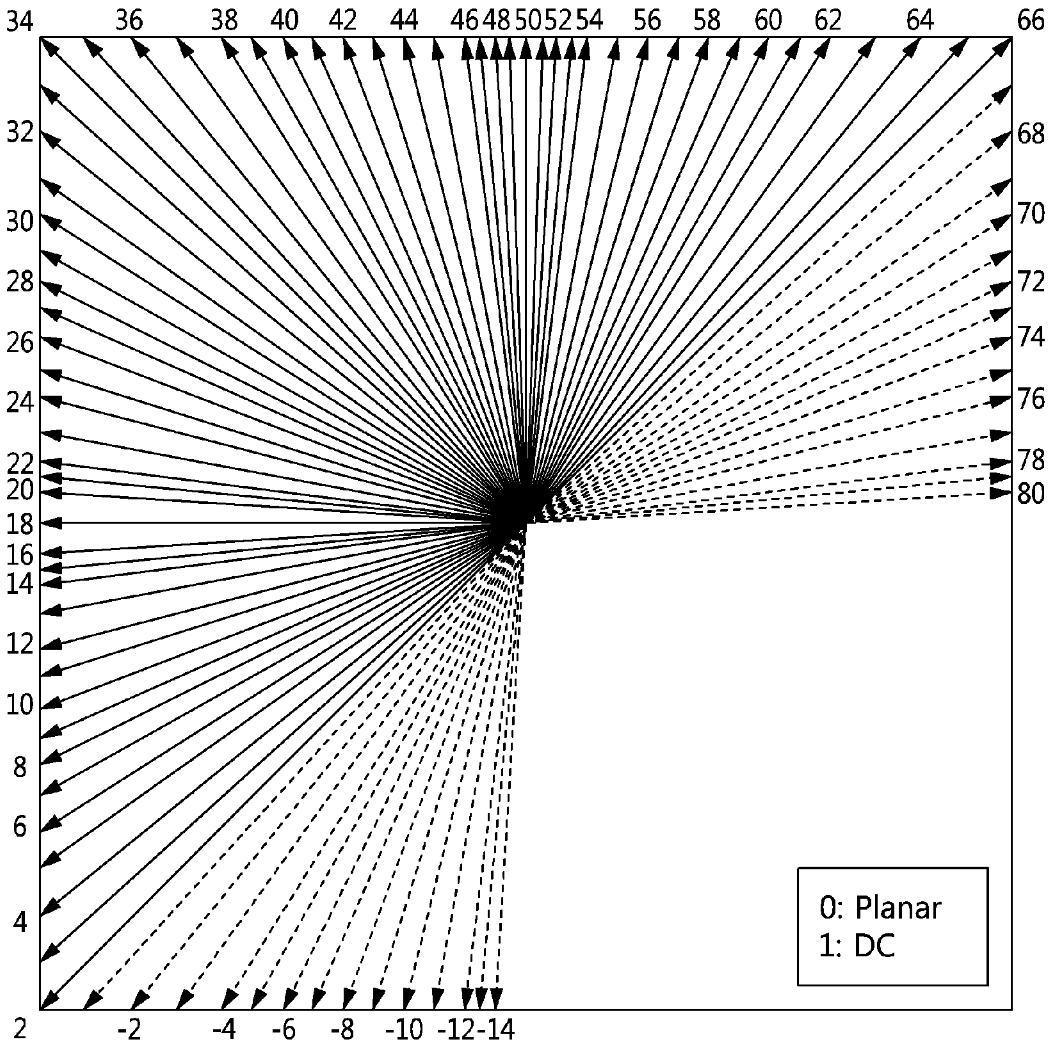
FIG. 7 is a diagram for explaining an embodiment of an intra-prediction procedure.

FIG. 7 is a diagram for explaining an embodiment of an intra-prediction process.

Arrows radially extending from the center of the graph in FIG. 7 indicate the prediction directions of intra-prediction modes. Further, numbers appearing near the arrows indicate examples of mode values assigned to intra-prediction modes or to the prediction directions of the intra-prediction modes.

In FIG. 7, A number 0 may represent a Planar mode which is a non-directional intra prediction mode. A number 1 may represent a DC mode which is a non-directional intra prediction mode Intra encoding and/or decoding may be performed using a reference sample of neighbor block of a target block. The neighbor block may be a reconstructed neighbor block. The reference sample may mean a neighbor sample.

For example, intra encoding and/or decoding may be performed using the value of a reference sample which are included in are reconstructed neighbor block or the coding parameters of the reconstructed neighbor block.

The encoding apparatus 100 and/or the decoding apparatus 200 may generate a prediction block by performing intra prediction on a target block based on information about samples in a target image. When intra prediction is performed, the encoding apparatus 100 and/or the decoding apparatus 200 may generate a prediction block for the target block by performing intra prediction based on information about samples in the target image. When intra prediction is performed, the encoding apparatus 100 and/or the decoding apparatus 200 may perform directional prediction and/or non-directional prediction based on at least one reconstructed reference sample.

A prediction block may be a block generated as a result of performing intra prediction. A prediction block may correspond to at least one of a CU, a PU, and a TU.

The unit of a prediction block may have a size corresponding to at least one of a CU, a PU, and a TU. The prediction block may have a square shape having a size of 2N×2N or N×N. The size of N×N may include sizes of 4×4, 8×8, 16×16, 32×32, 64×64, or the like.

Alternatively, a prediction block may a square block having a size of 2×2, 4×4, 8×8, 16×16, 32×32, 64×64 or the like or a rectangular block having a size of 2×8, 4×8, 2×16, 4×16, 8×16, or the like.

Intra prediction may be performed in consideration of the intra-prediction mode for the target block. The number of intra-prediction modes that the target block can have may be a predefined fixed value, and may be a value determined differently depending on the attributes of a prediction block. For example, the attributes of the prediction block may include the size of the prediction block, the type of prediction block, etc. Further, the attribute of a prediction block may indicate a coding parameter for the prediction block.

For example, the number of intra-prediction modes may be fixed at N regardless of the size of a prediction block. Alternatively, the number of intra-prediction modes may be, for example, 3, 5, 9, 17, 34, 35, 36, 65, 67 or 95.

The intra-prediction modes may be non-directional modes or directional modes.

For example, the intra-prediction modes may include two non-directional modes and 65 directional modes corresponding to numbers 0 to 66 illustrated in FIG. 7.

For example, the intra-prediction modes may include two non-directional modes and 93 directional modes corresponding to numbers −14 to 80 illustrated in FIG. 7 in a case that a specific intra prediction method is used.

The two non-directional modes may include a DC mode and a planar mode.

A directional mode may be a prediction mode having a specific direction or a specific angle. The directional mode may also be referred to as an "angular mode".

An intra-prediction mode may be represented by at least one of a mode number, a mode value, a mode angle, and a mode direction. In other words, the terms "(mode) number of the intra-prediction mode", "(mode) value of the intra-prediction mode", "(mode) angle of the intra-prediction mode", and "(mode) direction of the intra-prediction mode" may be used to have the same meaning, and may be used interchangeably with each other.

The number of intra-prediction modes may be M. The value of M may be 1 or more. In other words, the number of intra-prediction modes may be M, which includes the number of non-directional modes and the number of directional modes.

The number of intra-prediction modes may be fixed to M regardless of the size and/or the color component of a block. For example, the number of intra-prediction modes may be fixed at any one of 35 and 67 regardless of the size of a block.

Alternatively, the number of intra-prediction modes may differ depending on the shape, the size and/or the type of the color component of a block.

For example, in FIG. 7, directional prediction modes illustrated as dashed lines may be applied only for a prediction for a non-square block.

For example, the larger the size of the block, the greater the number of intra-prediction modes. Alternatively, the larger the size of the block, the smaller the number of intra-prediction modes. When the size of the block is 4×4 or 8×8, the number of intra-prediction modes may be 67. When the size of the block is 16×16, the number of intra-prediction modes may be 35. When the size of the block is 32×32, the number of intra-prediction modes may be 19. When the size of a block is 64×64, the number of intra-prediction modes may be 7.

For example, the number of intra prediction modes may differ depending on whether a color component is a luma signal or a chroma signal. Alternatively, the number of intra-prediction modes corresponding to a luma component block may be greater than the number of intra-prediction modes corresponding to a chroma component block.

For example, in a vertical mode having a mode value of 50, prediction may be performed in a vertical direction based on the pixel value of a reference sample. For example, in a horizontal mode having a mode value of 18, prediction may be performed in a horizontal direction based on the pixel value of a reference sample.

Even in directional modes other than the above-described mode, the encoding apparatus 100 and the decoding apparatus 200 may perform intra prediction on a target unit using reference samples depending on angles corresponding to the directional modes.

Intra-prediction modes located on a right side with respect to the vertical mode may be referred to as 'vertical-right modes'. Intra-prediction modes located below the horizontal mode may be referred to as 'horizontal-below modes'. For example, in FIG. 7, the intra-prediction modes in which a mode value is one of 51, 52, 53, 54, 55, 56, 57, 58, 59, 60, 61, 62, 63, 64, 65, and 66 may be vertical-right modes. Intra-prediction modes in which a mode value is one of 2, 3, 4, 5, 6, 7, 8, 9, 10, 11, 12, 13, 14, 15, 16, and 17 may be horizontal-below modes.

The non-directional mode may include a DC mode and a planar mode. For example, a value of the DC mode may be 1. A value of the planar mode may be 0.

The directional mode may include an angular mode. Among the plurality of the intra prediction modes, remaining modes except for the DC mode and the planar mode may be directional modes.

When the intra-prediction mode is a DC mode, a prediction block may be generated based on the average of pixel values of a plurality of reference pixels. For example, a value of a pixel of a prediction block may be determined based on the average of pixel values of a plurality of reference pixels.

The number of above-described intra-prediction modes and the mode values of respective intra-prediction modes are merely exemplary. The number of above-described intra-prediction modes and the mode values of respective intra-prediction modes may be defined differently depending on the embodiments, implementation and/or requirements.

In order to perform intra prediction on a target block, the step of checking whether samples included in a reconstructed neighbor block can be used as reference samples of a target block may be performed. When a sample that cannot be used as a reference sample of the target block is present among samples in the neighbor block, a value generated via copying and/or interpolation that uses at least one sample value, among the samples included in the reconstructed neighbor block, may replace the sample value of the sample that cannot be used as the reference sample. When the value generated via copying and/or interpolation replaces the sample value of the existing sample, the sample may be used as the reference sample of the target block.

When intra prediction is used, a filter may be applied to at least one of a reference sample and a prediction sample based on at least one of the intra-prediction mode and the size of the target block.

The type of filter to be applied to at least one of a reference sample and a prediction sample may differ depending on at least one of the intra-prediction mode of a target block, the size of the target block, and the shape of the target block. The types of filters may be classified depending on one or more of the length of filter tap, the value of a filter coefficient, and filter strength. The length of filter tap may mean the number of filter taps. Also, the number of filter tap may mean the length of the filter.

When the intra-prediction mode is a planar mode, a sample value of a prediction target block may be generated using a weighted sum of an above reference sample of the target block, a left reference sample of the target block, an above-right reference sample of the target block, and a below-left reference sample of the target block depending on the location of the prediction target sample in the prediction block when the prediction block of the target block is generated.

When the intra-prediction mode is a DC mode, the average of reference samples above the target block and the reference samples to the left of the target block may be used when the prediction block of the target block is generated. Also, filtering using the values of reference samples may be performed on specific rows or specific columns in the target block. The specific rows may be one or more upper rows adjacent to the reference sample. The specific columns may be one or more left columns adjacent to the reference sample.

When the intra-prediction mode is a directional mode, a prediction block may be generated using the above reference samples, left reference samples, above-right reference sample and/or below-left reference sample of the target block.

In order to generate the above-described prediction sample, real-number-based interpolation may be performed.

The intra-prediction mode of the target block may be predicted from intra prediction mode of a neighbor block adjacent to the target block, and the information used for prediction may be entropy-encoded/decoded.

For example, when the intra-prediction modes of the target block and the neighbor block are identical to each other, it may be signaled, using a predefined flag, that the intra-prediction modes of the target block and the neighbor block are identical.

For example, an indicator for indicating an intra-prediction mode identical to that of the target block, among intra-prediction modes of multiple neighbor blocks, may be signaled.

When the intra-prediction modes of the target block and a neighbor block are different from each other, information about the intra-prediction mode of the target block may be encoded and/or decoded using entropy encoding and/or decoding.

Figure 8:
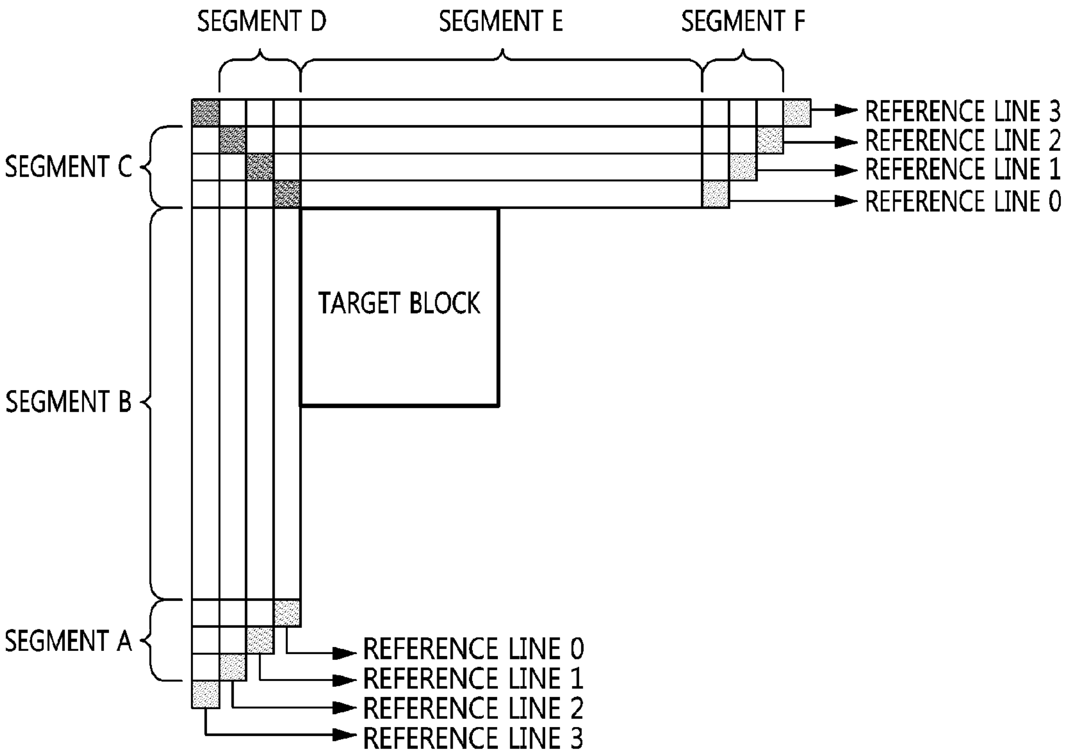
FIG. 8 is a diagram illustrating reference samples used in an intra-prediction procedure.

FIG. 8 is a diagram illustrating reference samples used in an intra-prediction procedure.

Reconstructed reference samples used for intra prediction of the target block may include below-left reference samples, left reference samples, an above-left corner reference sample, above reference samples, and above-right reference samples.

For example, the left reference samples may mean reconstructed reference pixels adjacent to the left side of the target block. The above reference samples may mean reconstructed reference pixels adjacent to the top of the target block. The above-left corner reference sample may mean a reconstructed reference pixel located at the above-left corner of the target block. The below-left reference samples may mean reference samples located below a left sample line composed of the left reference samples, among samples located on the same line as the left sample line. The above-right reference samples may mean reference samples located to the right of an above sample line composed of the above reference samples, among samples located on the same line as the above sample line.

When the size of a target block is N×N, the numbers of the below-left reference samples, the left reference samples, the above reference samples, and the above-right reference samples may each be N.

By performing intra prediction on the target block, a prediction block may be generated. The generation of the prediction block may include the determination of the values of pixels in the prediction block. The sizes of the target block and the prediction block may be equal.

The reference samples used for intra prediction of the target block may vary depending on the intra-prediction mode of the target block. The direction of the intra-prediction mode may represent a dependence relationship between the reference samples and the pixels of the prediction block. For example, the value of a specified reference sample may be used as the values of one or more specified pixels in the prediction block. In this case, the specified reference sample and the one or more specified pixels in the prediction block may be the sample and pixels which are positioned in a straight line in the direction of an intra-prediction mode. In other words, the value of the specified reference sample may be copied as the value of a pixel located in a direction reverse to the direction of the intra-prediction mode. Alternatively, the value of a pixel in the prediction block may be the value of a reference sample located in the direction of the intra-prediction mode with respect to the location of the pixel.

In an example, when the intra-prediction mode of a target block is a vertical mode, the above reference samples may be used for intra prediction. When the intra-prediction mode is the vertical mode, the value of a pixel in the prediction block may be the value of a reference sample vertically located above the location of the pixel. Therefore, the above reference samples adjacent to the top of the target block may be used for intra prediction. Furthermore, the values of pixels in one row of the prediction block may be identical to those of the above reference samples.

In an example, when the intra-prediction mode of a target block is a horizontal mode, the left reference samples may be used for intra prediction. When the intra-prediction mode is the horizontal mode, the value of a pixel in the prediction block may be the value of a reference sample horizontally located left to the location of the pixel. Therefore, the left reference samples adjacent to the left of the target block may be used for intra prediction. Furthermore, the values of pixels in one column of the prediction block may be identical to those of the left reference samples.

In an example, when the mode value of the intra-prediction mode of the current block is 34, at least some of the left reference samples, the above-left corner reference sample, and at least some of the above reference samples may be used for intra prediction. When the mode value of the intra-prediction mode is 34, the value of a pixel in the prediction block may be the value of a reference sample diagonally located at the above-left corner of the pixel.

Further, At least a part of the above-right reference samples may be used for intra prediction in a case that an intra prediction mode of which a mode value is a value ranging from 52 to 66.

Further, At least a part of the below-left reference samples may be used for intra prediction in a case that an intra prediction mode of which a mode value is a value ranging from 2 to 17.

Further, the above-left corner reference sample may be used for intra prediction in a case that an intra prediction mode of which a mode value is a value ranging from 19 to 49.

The number of reference samples used to determine the pixel value of one pixel in the prediction block may be either 1, or 2 or more.

As described above, the pixel value of a pixel in the prediction block may be determined depending on the location of the pixel and the location of a reference sample indicated by the direction of the intra-prediction mode. When the location of the pixel and the location of the reference sample indicated by the direction of the intra-prediction mode are integer positions, the value of one reference sample indicated by an integer position may be used to determine the pixel value of the pixel in the prediction block.

When the location of the pixel and the location of the reference sample indicated by the direction of the intra-prediction mode are not integer positions, an interpolated reference sample based on two reference samples closest to the location of the reference sample may be generated. The value of the interpolated reference sample may be used to determine the pixel value of the pixel in the prediction block. In other words, when the location of the pixel in the prediction block and the location of the reference sample indicated by the direction of the intra-prediction mode indicate the location between two reference samples, an interpolated value based on the values of the two samples may be generated.

The prediction block generated via prediction may not be identical to an original target block. In other words, there may be a prediction error which is the difference between the target block and the prediction block, and there may also be a prediction error between the pixel of the target block and the pixel of the prediction block.

Hereinafter, the terms "difference", "error", and "residual" may be used to have the same meaning, and may be used interchangeably with each other.

For example, in the case of directional intra prediction, the longer the distance between the pixel of the prediction block and the reference sample, the greater the prediction error that may occur. Such a prediction error may result in discontinuity between the generated prediction block and neighbor blocks.

In order to reduce the prediction error, filtering for the prediction block may be used. Filtering may be configured to adaptively apply a filter to an area, regarded as having a large prediction error, in the prediction block. For example, the area regarded as having a large prediction error may be the boundary of the prediction block. Further, an area regarded as having a large prediction error in the prediction block may differ depending on the intra-prediction mode, and the characteristics of filters may also differ depending thereon.

As illustrated in FIG. 8, for intra prediction of a target block, at least one of reference line 0 to reference line 3 may be used.

Each reference line in FIG. 8 may indicate a reference sample line comprising one or more reference samples. As the number of the reference line is lower, a line of reference samples closer to a target block may be indicated.

Samples in segment A and segment F may be acquired through padding that uses samples closest to the target block in segment B and segment E instead of being acquired from reconstructed neighbor blocks.

Index information indicating a reference sample line to be used for intra-prediction of the target block may be signaled. The index information may indicate a reference sample line to be used for intra-prediction of the target block, among multiple reference sample lines. For example, the index information may have a value corresponding to any one of 0 to 3.

When the top boundary of the target block is the boundary of a CTU, only reference sample line 0 may be available. Therefore, in this case, index information may not be signaled. When an additional reference sample line other than reference sample line 0 is used, filtering of a prediction block, which will be described later, may not be performed.

In the case of inter-color intra prediction, a prediction block for a target block of a second color component may be generated based on the corresponding reconstructed block of a first color component.

For example, the first color component may be a luma component, and the second color component may be a chroma component.

In order to perform inter-color intra prediction, parameters for a linear model between the first color component and the second color component may be derived based on a template.

The template may include reference samples above the target block (above reference samples) and/or reference samples to the left of the target block (left reference samples), and may include above reference samples and/or left reference samples of a reconstructed block of the first color component, which correspond to the reference samples.

For example, parameters for a linear model may be derived using 1) the value of the sample of a first color component having the maximum value, among the samples in the template, 2) the value of the sample of a second color component corresponding to the sample of the first color component, 3) the value of the sample of a first color component having the minimum value, among the samples in the template, and 4) the value of the sample of a second color component corresponding to the sample of the first color component.

When the parameters for the linear model are derived, a prediction block for the target block may be generated by applying the corresponding reconstructed block to the linear model.

Depending on the image format, sub-sampling may be performed on samples adjacent to the reconstructed block of the first color component and the corresponding reconstructed block of the first color component. For example, when one sample of the second color component corresponds to four samples of the first color component, one corresponding sample may be calculated by performing sub-sampling on the four samples of the first color component. When sub-sampling is performed, derivation of the parameters for the linear model and inter-color intra prediction may be performed based on the sub-sampled corresponding sample.

Information about whether inter-color intra prediction is performed and/or the range of the template may be signaled in an intra-prediction mode.

The target block may be partitioned into two or four sub-blocks in a horizontal direction and/or a vertical direction.

The sub-blocks resulting from the partitioning may be sequentially reconstructed. That is, as intra-prediction is performed on each sub-block, a sub-prediction block for the sub-block may be generated. Also, as dequantization (inverse quantization) and/or an inverse transform are performed on each sub-block, a sub-residual block for the corresponding sub-block may be generated. A reconstructed sub-block may be generated by adding the sub-prediction block to the sub-residual block. The reconstructed sub-block may be used as a reference sample for intra prediction of the sub-block having the next priority.

A sub-block may be a block including a specific number (e.g., 16) of samples or more. For example, when the target block is an 8×4 block or a 4×8 block, the target block may be partitioned into two sub-blocks. Also, when the target block is a 4×4 block, the target block cannot be partitioned into sub-blocks. When the target block has another size, the target block may be partitioned into four sub-blocks.

Information about whether intra prediction based on such sub-blocks is performed and/or information about a partition direction (horizontal direction or vertical direction) may be signaled.

Such sub-block-based intra prediction may be limited such that it is performed only when reference sample line 0 is used. When sub-block-based intra-prediction is performed, filtering of a prediction block, which will be described below, may not be performed.

A final prediction block may be generated by performing filtering on the prediction block generated via intra prediction.

Filtering may be performed by applying specific weights to a filtering target sample, which is the target to be filtered, a left reference sample, an above reference sample, and/or an above-left reference sample.

The weights and/or reference samples (e.g., the range of reference samples, the locations of the reference samples, etc.) used for filtering may be determined based on at least one of a block size, an intra-prediction mode, and the location of the filtering target sample in a prediction block.

For example, filtering may be performed only in a specific intra-prediction mode (e.g., DC mode, planar mode, vertical mode, horizontal mode, diagonal mode and/or adjacent diagonal mode).

The adjacent diagonal mode may be a mode having a number obtained by adding k to the number of the diagonal mode, and may be a mode having a number obtained by subtracting k from the number of the diagonal mode. In other words, the number of the adjacent diagonal mode may be the sum of the number of the diagonal mode and k, or may be the difference between the number of the diagonal mode and k. For example, k may be a positive integer of 8 or less.

The intra-prediction mode of a target block may be derived using the intra-prediction mode of a neighboring block present around the target block, and such a derived intra-prediction mode may be entropy-encoded and/or entropy-decoded.

For example, when the intra-prediction mode of the target block is identical to the intra-prediction mode of the neighbor block, information indicating that the intra-prediction mode of the target block is identical to the intra-prediction mode of the neighbor block may be signaled using specific flag information.

Further, for example, indicator information for a neighbor block having an intra-prediction mode identical to the intra-prediction mode of the target block, among intra-prediction modes of multiple neighbor blocks, may be signaled.

For example, when the intra-prediction mode of the target block is different from the intra-prediction mode of the neighbor block, entropy encoding and/or entropy decoding may be performed on information about the intra-prediction mode of the target block by performing entropy encoding and/or entropy decoding based on the intra-prediction mode of the neighbor block.

Figure 9:
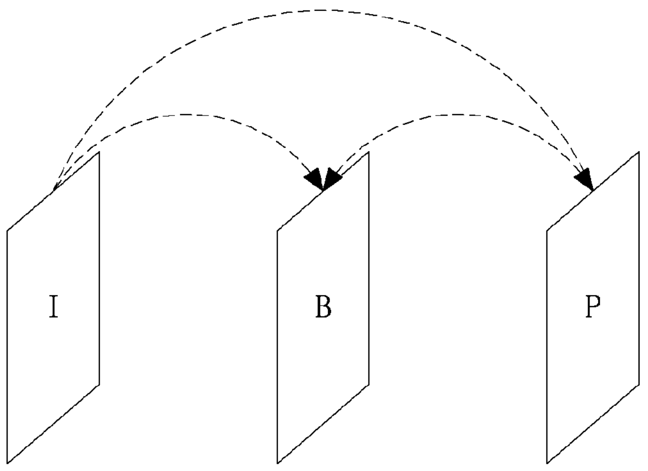
FIG. 9 is a diagram for explaining an embodiment of an inter-prediction procedure.

FIG. 9 is a diagram for explaining an embodiment of an inter prediction procedure.

The rectangles shown in FIG. 9 may represent images (or pictures). Further, in FIG. 9, arrows may represent prediction directions. An arrow pointing from a first picture to a second picture means that the second picture refers to the first picture. That is, each image may be encoded and/or decoded depending on the prediction direction.

Images may be classified into an Intra Picture (I picture), a Uni-prediction Picture or Predictive Coded Picture (P picture), and a Bi-prediction Picture or Bi-predictive Coded Picture (B picture) depending on the encoding type. Each picture may be encoded and/or decoded depending on the encoding type thereof.

When a target image that is the target to be encoded is an I picture, the target image may be encoded using data contained in the image itself without inter prediction that refers to other images. For example, an I picture may be encoded only via intra prediction.

When a target image is a P picture, the target image may be encoded via inter prediction, which uses reference pictures existing in one direction. Here, the one direction may be a forward direction or a backward direction.

When a target image is a B picture, the image may be encoded via inter prediction that uses reference pictures existing in two directions, or may be encoded via inter prediction that uses reference pictures existing in one of a forward direction and a backward direction. Here, the two directions may be the forward direction and the backward direction.

A P picture and a B picture that are encoded and/or decoded using reference pictures may be regarded as images in which inter prediction is used.

Below, inter prediction in an inter mode according to an embodiment will be described in detail.

Inter prediction or a motion compensation may be performed using a reference image and motion information.

In an inter mode, the encoding apparatus 100 may perform inter prediction and/or motion compensation on a target block. The decoding apparatus 200 may perform inter prediction and/or motion compensation, corresponding to inter prediction and/or motion compensation performed by the encoding apparatus 100, on a target block.

Motion information of the target block may be individually derived by the encoding apparatus 100 and the decoding apparatus 200 during the inter prediction. The motion information may be derived using motion information of a reconstructed neighbor block, motion information of a col block, and/or motion information of a block adjacent to the col block.

For example, the encoding apparatus 100 or the decoding apparatus 200 may perform prediction and/or motion compensation by using motion information of a spatial candidate and/or a temporal candidate as motion information of the target block. The target block may mean a PU and/or a PU partition.

A spatial candidate may be a reconstructed block which is spatially adjacent to the target block.

A temporal candidate may be a reconstructed block corresponding to the target block in a previously reconstructed co-located picture (col picture).

In inter prediction, the encoding apparatus 100 and the decoding apparatus 200 may improve encoding efficiency and decoding efficiency by utilizing the motion information of a spatial candidate and/or a temporal candidate. The motion information of a spatial candidate may be referred to as ‘spatial motion information’. The motion information of a temporal candidate may be referred to as ‘temporal motion information’.

Below, the motion information of a spatial candidate may be the motion information of a PU including the spatial candidate. The motion information of a temporal candidate may be the motion information of a PU including the temporal candidate. The motion information of a candidate block may be the motion information of a PU including the candidate block.

Inter prediction may be performed using a reference picture.

The reference picture may be at least one of a picture previous to a target picture and a picture subsequent to the target picture. The reference picture may be an image used for the prediction of the target block.

In inter prediction, a region in the reference picture may be specified by utilizing a reference picture index (or refIdx) for indicating a reference picture, a motion vector, which will be described later, etc. Here, the region specified in the reference picture may indicate a reference block.

Inter prediction may select a reference picture, and may also select a reference block corresponding to the target block from the reference picture. Further, inter prediction may generate a prediction block for the target block using the selected reference block.

The motion information may be derived during inter prediction by each of the encoding apparatus 100 and the decoding apparatus 200.

A spatial candidate may be a block 1) which is present in a target picture, 2) which has been previously reconstructed via encoding and/or decoding, and 3) which is adjacent to the target block or is located at the corner of the target block. Here, the “block located at the corner of the target block” may be either a block vertically adjacent to a neighbor block that is horizontally adjacent to the target block, or a block horizontally adjacent to a neighbor block that is vertically adjacent to the target block. Further, “block located at the corner of the target block” may have the same meaning as “block adjacent to the corner of the target block”. The meaning of “block located at the corner of the target block” may be included in the meaning of “block adjacent to the target block”.

For example, a spatial candidate may be a reconstructed block located to the left of the target block, a reconstructed block located above the target block, a reconstructed block located at the below-left corner of the target block, a reconstructed block located at the above-right corner of the target block, or a reconstructed block located at the above-left corner of the target block.

Each of the encoding apparatus 100 and the decoding apparatus 200 may identify a block present at the location spatially corresponding to the target block in a col picture. The location of the target block in the target picture and the location of the identified block in the col picture may correspond to each other.

Each of the encoding apparatus 100 and the decoding apparatus 200 may determine a col block present at the predefined relative location for the identified block to be a temporal candidate. The predefined relative location may be a location present inside and/or outside the identified block.

For example, the col block may include a first col block and a second col block. When the coordinates of the identified block are (xP, yP) and the size of the identified block is represented by (nPSW, nPSH), the first col block may be a block located at coordinates (xP+nPSW, yP+nPSH). The second col block may be a block located at coordinates (xP+(nPSW>>1), yP+(nPSH>>1)). The second col block may be selectively used when the first col block is unavailable.

The motion vector of the target block may be determined based on the motion vector of the col block. Each of the encoding apparatus 100 and the decoding apparatus 200 may scale the motion vector of the col block. The scaled motion vector of the col block may be used as the motion vector of the target block. Further, a motion vector for the motion information of a temporal candidate stored in a list may be a scaled motion vector.

The ratio of the motion vector of the target block to the motion vector of the col block may be identical to the ratio of a first temporal distance to a second temporal distance. The first temporal distance may be the distance between the reference picture and the target picture of the target block. The second temporal distance may be the distance between the reference picture and the col picture of the col block.

The scheme for deriving motion information may change depending on the inter-prediction mode of a target block. For example, as inter-prediction modes applied for inter prediction, an Advanced Motion Vector Predictor (AMVP) mode, a merge mode, a skip mode, a merge mode with a motion vector difference, a sub block merge mode, a triangle partition mode, an inter-intra combined prediction mode, an affine inter mode, a current picture reference mode, etc. may be present. The merge mode may also be referred to as a "motion merge mode". Individual modes will be described in detail below.

1) AMVP Mode

When an AMVP mode is used, the encoding apparatus 100 may search a neighbor region of a target block for a similar block. The encoding apparatus 100 may acquire a prediction block by performing prediction on the target block using motion information of the found similar block. The encoding apparatus 100 may encode a residual block, which is the difference between the target block and the prediction block.

1-1) Creation of List of Prediction Motion Vector Candidates

When an AMVP mode is used as the prediction mode, each of the encoding apparatus 100 and the decoding apparatus 200 may create a list of prediction motion vector candidates using the motion vector of a spatial candidate, the motion vector of a temporal candidate, and a zero vector. The prediction motion vector candidate list may include one or more prediction motion vector candidates. At least one of the motion vector of a spatial candidate, the motion vector of a temporal candidate, and a zero vector may be determined and used as a prediction motion vector candidate.

Hereinafter, the terms "prediction motion vector (candidate)" and "motion vector (candidate)" may be used to have the same meaning, and may be used interchangeably with each other.

Hereinafter, the terms "prediction motion vector candidate" and "AMVP candidate" may be used to have the same meaning, and may be used interchangeably with each other.

Hereinafter, the terms "prediction motion vector candidate list" and "AMVP candidate list" may be used to have the same meaning, and may be used interchangeably with each other.

Spatial candidates may include a reconstructed spatial neighbor block. In other words, the motion vector of the reconstructed neighbor block may be referred to as a "spatial prediction motion vector candidate".

Temporal candidates may include a col block and a block adjacent to the col block. In other words, the motion vector of the col block or the motion vector of the block adjacent to the col block may be referred to as a "temporal prediction motion vector candidate".

The zero vector may be a (0, 0) motion vector.

The prediction motion vector candidates may be motion vector predictors for predicting a motion vector. Also, in the encoding apparatus 100, each prediction motion vector candidate may be an initial search location for a motion vector.

1-2) Search for Motion Vectors that Use List of Prediction Motion Vector Candidates The encoding apparatus 100 may determine the motion vector to be used to encode a target block within a search range using a list of prediction motion vector candidates. Further, the encoding apparatus 100 may determine a prediction motion vector candidate to be used as the prediction motion vector of the target block, among prediction motion vector candidates present in the prediction motion vector candidate list.

The motion vector to be used to encode the target block may be a motion vector that can be encoded at minimum cost.

Further, the encoding apparatus 100 may determine whether to use the AMVP mode to encode the target block.

1-3) Transmission of Inter-Prediction Information

The encoding apparatus 100 may generate a bitstream including inter-prediction information required for inter prediction. The decoding apparatus 200 may perform inter prediction on the target block using the inter-prediction information of the bitstream.

The inter-prediction information may contain 1) mode information indicating whether an AMVP mode is used, 2) a prediction motion vector index, 3) a Motion Vector Difference (MVD), 4) a reference direction, and 5) a reference picture index.

Hereinafter, the terms "prediction motion vector index" and "AMVP index" may be used to have the same meaning, and may be used interchangeably with each other. Further, the inter-prediction information may contain a residual signal.

The decoding apparatus 200 may acquire a prediction motion vector index, an MVD, a reference direction, and a reference picture index from the bitstream through entropy decoding when mode information indicates that the AMVP mode is used.

The prediction motion vector index may indicate a prediction motion vector candidate to be used for the prediction of a target block, among prediction motion vector candidates included in the prediction motion vector candidate list.

1-4) Inter Prediction in AMVP Mode that Uses Inter-Prediction Information

The decoding apparatus 200 may derive prediction motion vector candidates using a prediction motion vector candidate list, and may determine the motion information of a target block based on the derived prediction motion vector candidates.

The decoding apparatus 200 may determine a motion vector candidate for the target block, among the prediction motion vector candidates included in the prediction motion vector candidate list, using a prediction motion vector index. The decoding apparatus 200 may select a prediction motion vector candidate, indicated by the prediction motion vector index, from among prediction motion vector candidates included in the prediction motion vector candidate list, as the prediction motion vector of the target block.

The encoding apparatus 100 may generate an entropy-encoded prediction motion vector index by applying entropy encoding to a prediction motion vector index, and may generate a bitstream including the entropy-encoded prediction motion vector index. The entropy-encoded prediction motion vector index may be signaled from the encoding apparatus 100 to the decoding apparatus 200 through a bitstream. The decoding apparatus 200 may extract the entropy-encoded prediction motion vector index from the bitstream, and may acquire the prediction motion vector index by applying entropy decoding to the entropy-encoded prediction motion vector index.

The motion vector to be actually used for inter prediction of the target block may not match the prediction motion vector. In order to indicate the difference between the motion vector to be actually used for inter prediction of the target block and the prediction motion vector, an MVD may be used. The encoding apparatus 100 may derive a prediction motion vector similar to the motion vector to be actually used for inter prediction of the target block so as to use an MVD that is as small as possible.

A Motion Vector Difference (MVD) may be the difference between the motion vector of the target block and the prediction motion vector. The encoding apparatus 100 may calculate the MVD, and may generate an entropy-encoded MVD by applying entropy encoding to the MVD. The encoding apparatus 100 may generate a bitstream including the entropy-encoded MVD.

The MVD may be transmitted from the encoding apparatus 100 to the decoding apparatus 200 through the bitstream. The decoding apparatus 200 may extract the entropy-encoded MVD from the bitstream, and may acquire the MVD by applying entropy decoding to the entropy-encoded MVD.

The decoding apparatus 200 may derive the motion vector of the target block by summing the MVD and the prediction motion vector. In other words, the motion vector of the target block derived by the decoding apparatus 200 may be the sum of the MVD and the motion vector candidate.

Also, the encoding apparatus 100 may generate entropy-encoded MVD resolution information by applying entropy encoding to calculated MVD resolution information, and may generate a bitstream including the entropy-encoded MVD resolution information. The decoding apparatus 200 may extract the entropy-encoded MVD resolution information from the bitstream, and may acquire MVD resolution information by applying entropy decoding to the entropy-encoded MVD resolution information. The decoding apparatus 200 may adjust the resolution of the MVD using the MVD resolution information.

Meanwhile, the encoding apparatus 100 may calculate an MVD based on an affine model. The decoding apparatus 200 may derive the affine control motion vector of the target block through the sum of the MVD and an affine control motion vector candidate, and may derive the motion vector of a sub-block using the affine control motion vector.

The reference direction may indicate a list of reference pictures to be used for prediction of the target block. For example, the reference direction may indicate one of a reference picture list L0 and a reference picture list L1.

The reference direction merely indicates the reference picture list to be used for prediction of the target block, and may not mean that the directions of reference pictures are limited to a forward direction or a backward direction. In other words, each of the reference picture list L0 and the reference picture list L1 may include pictures in a forward direction and/or a backward direction.

That the reference direction is unidirectional may mean that a single reference picture list is used. That the reference direction is bidirectional may mean that two reference picture lists are used. In other words, the reference direction may indicate one of the case where only the reference picture list L0 is used, the case where only the reference picture list L1 is used, and the case where two reference picture lists are used.

The reference picture index may indicate a reference picture that is used for prediction of the target block, among reference pictures present in a reference picture list. The encoding apparatus 100 may generate an entropy-encoded reference picture index by applying entropy encoding to the reference picture index, and may generate a bitstream including the entropy-encoded reference picture index. The entropy-encoded reference picture index may be signaled from the encoding apparatus 100 to the decoding apparatus 200 through the bitstream. The decoding apparatus 200 may extract the entropy-encoded reference picture index from the bitstream, and may acquire the reference picture index by applying entropy decoding to the entropy-encoded reference picture index.

When two reference picture lists are used to predict the target block, a single reference picture index and a single motion vector may be used for each of the reference picture lists. Further, when two reference picture lists are used to predict the target block, two prediction blocks may be specified for the target block. For example, the (final) prediction block of the target block may be generated using the average or weighted sum of the two prediction blocks for the target block.

The motion vector of the target block may be derived by the prediction motion vector index, the MVD, the reference direction, and the reference picture index.

The decoding apparatus 200 may generate a prediction block for the target block based on the derived motion vector and the reference picture index. For example, the prediction block may be a reference block, indicated by the derived motion vector, in the reference picture indicated by the reference picture index.

Since the prediction motion vector index and the MVD are encoded without the motion vector itself of the target block being encoded, the number of bits transmitted from the encoding apparatus 100 to the decoding apparatus 200 may be decreased, and encoding efficiency may be improved.

For the target block, the motion information of reconstructed neighbor blocks may be used. In a specific inter-prediction mode, the encoding apparatus 100 may not separately encode the actual motion information of the target block. The motion information of the target block is not encoded, and additional information that enables the motion information of the target block to be derived using the motion information of reconstructed neighbor blocks may be encoded instead. As the additional information is encoded, the number of bits transmitted to the decoding apparatus 200 may be decreased, and encoding efficiency may be improved.

For example, as inter-prediction modes in which the motion information of the target block is not directly encoded, there may be a skip mode and/or a merge mode. Here, each of the encoding apparatus 100 and the decoding apparatus 200 may use an identifier and/or an index that indicates a unit, the motion information of which is to be used as the motion information of the target unit, among reconstructed neighbor units.

2) Merge Mode

As a scheme for deriving the motion information of a target block, there is merging. The term "merging" may mean the merging of the motion of multiple blocks. "Merging" may mean that the motion information of one block is also applied to other blocks. In other words, a merge mode may be a mode in which the motion information of the target block is derived from the motion information of a neighbor block.

When a merge mode is used, the encoding apparatus 100 may predict the motion information of a target block using the motion information of a spatial candidate and/or the motion information of a temporal candidate. The spatial candidate may include a reconstructed spatial neighbor block that is spatially adjacent to the target block. The spatial neighbor block may include a left neighbor block and an above neighbor block. The temporal candidate may include a col block. The terms "spatial candidate" and "spatial merge candidate" may be used to have the same meaning, and may be used interchangeably with each other. The terms "temporal candidate" and "temporal merge candidate" may be used to have the same meaning, and may be used interchangeably with each other.

The encoding apparatus 100 may acquire a prediction block via prediction. The encoding apparatus 100 may encode a residual block, which is the difference between the target block and the prediction block.

2-1) Creation of Merge Candidate List

When the merge mode is used, each of the encoding apparatus 100 and the decoding apparatus 200 may create a merge candidate list using the motion information of a spatial candidate and/or the motion information of a temporal candidate. The motion information may include 1) a motion vector, 2) a reference picture index, and 3) a reference direction. The reference direction may be unidirectional or bidirectional. The reference direction may mean a inter prediction indicator.

The merge candidate list may include merge candidates. The merge candidates may be motion information. In other words, the merge candidate list may be a list in which pieces of motion information are stored.

The merge candidates may be pieces of motion information of temporal candidates and/or spatial candidates. In other words, the merge candidates list may comprise motion information of a temporal candidates and/or spatial candidates, etc.

Further, the merge candidate list may include new merge candidates generated by a combination of merge candidates that are already present in the merge candidate list. In other words, the merge candidate list may include new motion information generated by a combination of pieces of motion information previously present in the merge candidate list.

Also, a merge candidate list may include history-based merge candidates. The history-based merge candidates may be the motion information of a block which is encoded and/or decoded prior to a target block.

Also, a merge candidate list may include a merge candidate based on an average of two merge candidates.

The merge candidates may be specific modes deriving inter prediction information. The merge candidate may be information indicating a specific mode deriving inter prediction information. Inter prediction information of a target block may be derived according to a specific mode which the merge candidate indicates. Furthermore, the specific mode may include a process of deriving a series of inter prediction information. This specific mode may be an inter prediction information derivation mode or a motion information derivation mode.

The inter prediction information of the target block may be derived according to the mode indicated by the merge candidate selected by the merge index among the merge candidates in the merge candidate list.

For example, the motion information derivation modes in the merge candidate list may be at least one of 1) motion information derivation mode for a sub-block unit and 2) an affine motion information derivation mode.

Furthermore, the merge candidate list may include motion information of a zero vector. The zero vector may also be referred to as a "zero-merge candidate".

In other words, pieces of motion information in the merge candidate list may be at least one of 1) motion information of a spatial candidate, 2) motion information of a temporal candidate, 3) motion information generated by a combination of pieces of motion information previously present in the merge candidate list, and 4) a zero vector.

Motion information may include 1) a motion vector, 2) a reference picture index, and 3) a reference direction. The reference direction may also be referred to as an "inter-prediction indicator". The reference direction may be unidirectional or bidirectional. The unidirectional reference direction may indicate L0 prediction or L1 prediction.

The merge candidate list may be created before prediction in the merge mode is performed.

The number of merge candidates in the merge candidate list may be predefined. Each of the encoding apparatus 100 and the decoding apparatus 200 may add merge candidates to the merge candidate list depending on the predefined scheme and predefined priorities so that the merge candidate list has a predefined number of merge candidates. The merge candidate list of the encoding apparatus 100 and the merge candidate list of the decoding apparatus 200 may be made identical to each other using the predefined scheme and the predefined priorities.

Merging may be applied on a CU basis or a PU basis. When merging is performed on a CU basis or a PU basis, the encoding apparatus 100 may transmit a bitstream including predefined information to the decoding apparatus 200. For example, the predefined information may contain 1) information indicating whether to perform merging for individual block partitions, and 2) information about a block with which merging is to be performed, among blocks that are spatial candidates and/or temporal candidates for the target block.

2-2) Search for Motion Vector that Uses Merge Candidate List

The encoding apparatus 100 may determine merge candidates to be used to encode a target block. For example, the encoding apparatus 100 may perform prediction on the target block using merge candidates in the merge candidate list, and may generate residual blocks for the merge candidates. The encoding apparatus 100 may use a merge candidate that incurs the minimum cost in prediction and in the encoding of residual blocks to encode the target block.

Further, the encoding apparatus 100 may determine whether to use a merge mode to encode the target block.

2-3) Transmission of Inter-Prediction Information

The encoding apparatus 100 may generate a bitstream that includes inter-prediction information required for inter prediction. The encoding apparatus 100 may generate entropy-encoded inter-prediction information by performing entropy encoding on inter-prediction information, and may transmit a bitstream including the entropy-encoded inter-prediction information to the decoding apparatus 200. Through the bitstream, the entropy-encoded inter-prediction information may be signaled to the decoding apparatus 200 by the encoding apparatus 100. The decoding apparatus 200 may extract entropy-encoded inter-prediction information from the bitstream, and may acquire inter-prediction information by applying entropy decoding to the entropy-encoded inter-prediction information.

The decoding apparatus 200 may perform inter prediction on the target block using the inter-prediction information of the bitstream.

The inter-prediction information may contain 1) mode information indicating whether a merge mode is used, 2) a merge index and 3) correction information.

Further, the inter-prediction information may contain a residual signal.

The decoding apparatus 200 may acquire the merge index from the bitstream only when the mode information indicates that the merge mode is used.

The mode information may be a merge flag. The unit of the mode information may be a block. Information about the block may include mode information, and the mode information may indicate whether a merge mode is applied to the block.

The merge index may indicate a merge candidate to be used for the prediction of the target block, among merge candidates included in the merge candidate list. Alternatively, the merge index may indicate a block with which the target block is to be merged, among neighbor blocks spatially or temporally adjacent to the target block.

The encoding apparatus 100 may select a merge candidate having the highest encoding performance among the merge candidates included in the merge candidate list and set a value of the merge index to indicate the selected merge candidate.

Correction information may be information used to correct a motion vector. The encoding apparatus 100 may generate correction information. The decoding apparatus 200 may correct the motion vector of a merge candidate selected by a merge index based on the correction information.

The correction information may include at least one of information indicating whether correction is to be performed, correction direction information, and correction size information. A prediction mode in which the motion vector is corrected based on the signaled correction information may be referred to as a "merge mode having a motion vector difference".

2-4) Inter Prediction of Merge Mode that Uses Inter-Prediction Information

The decoding apparatus 200 may perform prediction on the target block using the merge candidate indicated by the merge index, among merge candidates included in the merge candidate list.

The motion vector of the target block may be specified by the motion vector, reference picture index, and reference direction of the merge candidate indicated by the merge index.

3) Skip Mode

A skip mode may be a mode in which the motion information of a spatial candidate or the motion information of a temporal candidate is applied to the target block without change. Also, the skip mode may be a mode in which a residual signal is not used. In other words, when the skip mode is used, a reconstructed block may be the same as a prediction block.

The difference between the merge mode and the skip mode lies in whether or not a residual signal is transmitted or used. That is, the skip mode may be similar to the merge mode except that a residual signal is not transmitted or used.

When the skip mode is used, the encoding apparatus 100 may transmit information about a block, the motion information of which is to be used as the motion information of the target block, among blocks that are spatial candidates or temporal candidates, to the decoding apparatus 200 through a bitstream. The encoding apparatus 100 may generate entropy-encoded information by performing entropy encoding on the information, and may signal the entropy-encoded information to the decoding apparatus 200 through a bitstream. The decoding apparatus 200 may extract entropy-encoded information from the bitstream, and may acquire information by applying entropy decoding to the entropy-encoded information.

Further, when the skip mode is used, the encoding apparatus 100 may not transmit other syntax information, such as an MVD, to the decoding apparatus 200. For example, when the skip mode is used, the encoding apparatus 100 may not signal a syntax element related to at least one of an MVD, a coded block flag, and a transform coefficient level to the decoding apparatus 200.

3-1) Creation of Merge Candidate List

The skip mode may also use a merge candidate list. In other words, a merge candidate list may be used both in the merge mode and in the skip mode. In this aspect, the merge candidate list may also be referred to as a "skip candidate list" or a "merge/skip candidate list".

Alternatively, the skip mode may use an additional candidate list different from that of the merge mode. In this case, in the following description, a merge candidate list and a merge candidate may be replaced with a skip candidate list and a skip candidate, respectively.

The merge candidate list may be created before prediction in the skip mode is performed.

3-2) Search for Motion Vector that Uses Merge Candidate List

The encoding apparatus 100 may determine the merge candidates to be used to encode a target block. For example, the encoding apparatus 100 may perform prediction on the target block using the merge candidates in a merge candidate list. The encoding apparatus 100 may use a merge candidate that incurs the minimum cost in prediction to encode the target block.

Further, the encoding apparatus 100 may determine whether to use a skip mode to encode the target block.

3-3) Transmission of Inter-Prediction Information

The encoding apparatus 100 may generate a bitstream that includes inter-prediction information required for inter prediction. The decoding apparatus 200 may perform inter prediction on the target block using the inter-prediction information of the bitstream.

The inter-prediction information may include 1) mode information indicating whether a skip mode is used, and 2) a skip index.

The skip index may be identical to the above-described merge index.

When the skip mode is used, the target block may be encoded without using a residual signal. The inter-prediction information may not contain a residual signal. Alternatively, the bitstream may not include a residual signal.

The decoding apparatus 200 may acquire a skip index from the bitstream only when the mode information indicates that the skip mode is used. As described above, a merge index and a skip index may be identical to each other. The decoding apparatus 200 may acquire the skip index from the bitstream only when the mode information indicates that the merge mode or the skip mode is used.

The skip index may indicate the merge candidate to be used for the prediction of the target block, among the merge candidates included in the merge candidate list.

3-4) Inter Prediction in Skip Mode that Uses Inter-Prediction Information

The decoding apparatus 200 may perform prediction on the target block using a merge candidate indicated by a skip index, among the merge candidates included in a merge candidate list.

The motion vector of the target block may be specified by the motion vector, reference picture index, and reference direction of the merge candidate indicated by the skip index.

4) Current Picture Reference Mode

The current picture reference mode may denote a prediction mode that uses a previously reconstructed region in a target picture to which a target block belongs.

A motion vector for specifying the previously reconstructed region may be used. Whether the target block has been encoded in the current picture reference mode may be determined using the reference picture index of the target block.

A flag or index indicating whether the target block is a block encoded in the current picture reference mode may be signaled by the encoding apparatus 100 to the decoding apparatus 200. Alternatively, whether the target block is a block encoded in the current picture reference mode may be inferred through the reference picture index of the target block.

When the target block is encoded in the current picture reference mode, the target picture may exist at a fixed location or an arbitrary location in a reference picture list for the target block.

For example, the fixed location may be either a location where a value of the reference picture index is 0 or the last location.

When the target picture exists at an arbitrary location in the reference picture list, an additional reference picture index indicating such an arbitrary location may be signaled by the encoding apparatus 100 to the decoding apparatus 200.

5) Sub-Block Merge Mode

A sub-block merge mode may be a mode in which motion information is derived from the sub-block of a CU.

When the sub-block merge mode is applied, a sub-block merge candidate list may be generated using the motion information of a co-located sub-block (col-sub-block) of a target sub-block (i.e., a sub-block-based temporal merge candidate) in a reference image and/or an affine control point motion vector merge candidate.

6) Triangle Partition Mode

In a triangle partition mode, a target block may be partitioned in a diagonal direction, and sub-target blocks resulting from partitioning may be generated. For each sub-target block, motion information of the corresponding sub-target block may be derived, and a prediction sample for each sub-target block may be derived using the derived motion information. A prediction sample for the target block may be derived through a weighted sum of the prediction samples for the sub-target blocks resulting from the partitioning.

7) Combination Inter-Intra Prediction Mode

The combination inter-intra prediction mode may be a mode in which a prediction sample for a target block is derived using a weighted sum of a prediction sample generated via inter-prediction and a prediction sample generated via intra-prediction.

In the above-described modes, the decoding apparatus 200 may autonomously correct derived motion information. For example, the decoding apparatus 200 may search a specific area for motion information having the minimum sum of Absolute Differences (SAD) based on a reference block indicated by the derived motion information, and may derive the found motion information as corrected motion information.

In the above-described modes, the decoding apparatus 200 may compensate for the prediction sample derived via inter prediction using an optical flow.

In the above-described AMVP mode, merge mode, skip mode, etc., motion information to be used for prediction of the target block may be specified among pieces of motion information in a list using the index information of the list.

In order to improve encoding efficiency, the encoding apparatus 100 may signal only the index of an element that incurs the minimum cost in inter prediction of the target block, among elements in the list. The encoding apparatus 100 may encode the index, and may signal the encoded index.

Therefore, the above-described lists (i.e. the prediction motion vector candidate list and the merge candidate list) must be able to be derived by the encoding apparatus 100 and the decoding apparatus 200 using the same scheme based on the same data. Here, the same data may include a reconstructed picture and a reconstructed block. Further, in order to specify an element using an index, the order of the elements in the list must be fixed.

Figure 10:
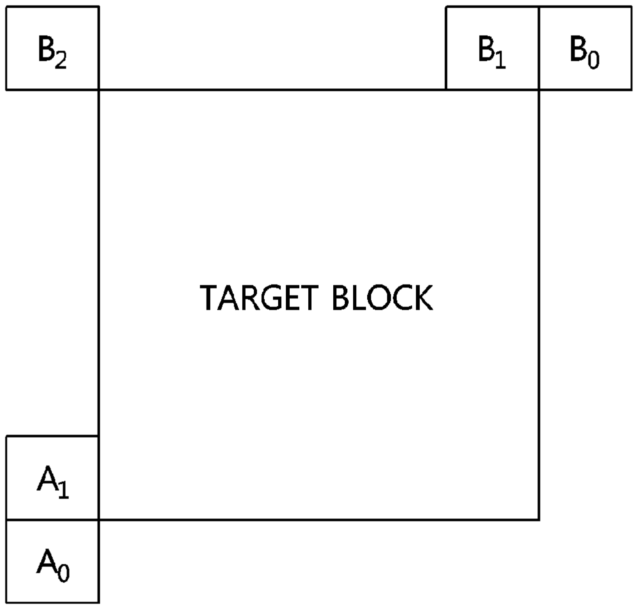
FIG. 10 illustrates spatial candidates according to an embodiment.

FIG. 10 illustrates spatial candidates according to an embodiment.

In FIG. 10, the locations of spatial candidates are illustrated.

The large block in the center of the drawing may denote a target block. Five small blocks may denote spatial candidates.

The coordinates of the target block may be (xP, yP), and the size of the target block may be represented by (nPSW, nPSH).

Spatial candidate A may be a block adjacent to the below-left corner of the target block. A may be a block that occupies pixels located at coordinates (xP−1, yP+nPSH).

Spatial candidate $A_1$ may be a block adjacent to the left of the target block. $A_1$ may be a lowermost block, among blocks adjacent to the left of the target block. Alternatively, $A_1$ may be a block adjacent to the top of $A_0$. $A_1$ may be a block that occupies pixels located at coordinates (xP−1, yP+nPSH−1).

Spatial candidate $B_0$ may be a block adjacent to the above-right corner of the target block. $B_0$ may be a block that occupies pixels located at coordinates (xP+nPSW, yP−1).

Spatial candidate $B_1$ may be a block adjacent to the top of the target block. $B_1$ may be a rightmost block, among blocks adjacent to the top of the target block. Alternatively, $B_1$ may be a block adjacent to the left of $B_0$. $B_1$ may be a block that occupies pixels located at coordinates (xP+nPSW−1, yP−1).

Spatial candidate $B_2$ may be a block adjacent to the above-left corner of the target block. $B_2$ may be a block that occupies pixels located at coordinates (xP−1, yP−1).

Determination of Availability of Spatial Candidate and Temporal Candidate

In order to include the motion information of a spatial candidate or the motion information of a temporal candidate in a list, it must be determined whether the motion information of the spatial candidate or the motion information of the temporal candidate is available.

Hereinafter, a candidate block may include a spatial candidate and a temporal candidate.

For example, the determination may be performed by sequentially applying the following steps 1) to 4).

Step 1) When a PU including a candidate block is out of the boundary of a picture, the availability of the candidate block may be set to "false". The expression "availability is set to false" may have the same meaning as "set to be unavailable".

Step 2) When a PU including a candidate block is out of the boundary of a slice, the availability of the candidate block may be set to "false". When the target block and the candidate block are located in different slices, the availability of the candidate block may be set to "false".

Step 3) When a PU including a candidate block is out of the boundary of a tile, the availability of the candidate block may be set to "false". When the target block and the candidate block are located in different tiles, the availability of the candidate block may be set to "false".

Step 4) When the prediction mode of a PU including a candidate block is an intra-prediction mode, the availability of the candidate block may be set to "false". When a PU including a candidate block does not use inter prediction, the availability of the candidate block may be set to "false".

Figure 11:
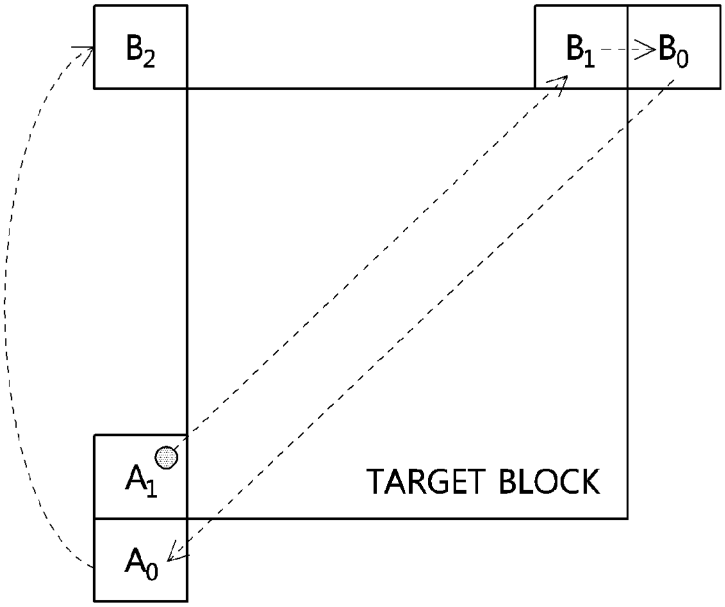
FIG. 11 illustrates the order of addition of motion information of spatial candidates to a merge list according to an embodiment.

FIG. 11 illustrates the order of addition of motion information of spatial candidates to a merge list according to an embodiment.

As shown in FIG. 11, when pieces of motion information of spatial candidates are added to a merge list, the order of $A_1$, $B_1$, $B_0$, $A_0$, and $B_2$ may be used. That is, pieces of motion information of available spatial candidates may be added to the merge list in the order of $A_1$, $B_1$, $B_0$, $A_0$, and $B_2$.

Method for Deriving Merge List in Merge Mode and Skip Mode

As described above, the maximum number of merge candidates in the merge list may be set. The set maximum number is indicated by "N". The set number may be transmitted from the encoding apparatus 100 to the decoding apparatus 200. The slice header of a slice may include N. In other words, the maximum number of merge candidates in the merge list for the target block of the slice may be set by the slice header. For example, the value of N may be basically 5.

Pieces of motion information (i.e., merge candidates) may be added to the merge list in the order of the following steps 1) to 4).

Step 1) Among spatial candidates, available spatial candidates may be added to the merge list. Pieces of motion information of the available spatial candidates may be added to the merge list in the order illustrated in FIG. 11. Here, when the motion information of an available spatial candidate overlaps other motion information already present in the merge list, the motion information may not be added to the merge list. The operation of checking whether the corresponding motion information overlaps other motion information present in the list may be referred to in brief as an "overlap check".

The maximum number of pieces of motion information that are added may be N.

Step 2) When the number of pieces of motion information in the merge list is less than N and a temporal candidate is available, the motion information of the temporal candidate may be added to the merge list. Here, when the motion information of the available temporal candidate overlaps other motion information already present in the merge list, the motion information may not be added to the merge list.

Step 3) When the number of pieces of motion information in the merge list is less than N and the type of a target slice is "B", combined motion information generated by combined bidirectional prediction (bi-prediction) may be added to the merge list.

The target slice may be a slice including a target block.

The combined motion information may be a combination of L0 motion information and L1 motion information. L0 motion information may be motion information that refers only to a reference picture list L0. L1 motion information may be motion information that refers only to a reference picture list L1.

In the merge list, one or more pieces of L0 motion information may be present. Further, in the merge list, one or more pieces of L1 motion information may be present.

The combined motion information may include one or more pieces of combined motion information. When the combined motion information is generated, L0 motion information and L1 motion information, which are to be used for generation, among the one or more pieces of L0 motion information and the one or more pieces of L1 motion information, may be predefined. One or more pieces of combined motion information may be generated in a predefined order via combined bidirectional prediction, which uses a pair of different pieces of motion information in the merge list. One of the pair of different pieces of motion information may be L0 motion information and the other of the pair may be L1 motion information.

For example, combined motion information that is added with the highest priority may be a combination of L0 motion information having a merge index of 0 and L1 motion information having a merge index of 1. When motion information having a merge index of 0 is not L0 motion information or when motion information having a merge index of 1 is not L1 motion information, the combined motion information may be neither generated nor added. Next, the combined motion information that is added with the next priority may be a combination of L0 motion information, having a merge index of 1, and L1 motion information, having a merge index of 0. Subsequent detailed combinations may conform to other combinations of video encoding/decoding fields.

Here, when the combined motion information overlaps other motion information already present in the merge list, the combined motion information may not be added to the merge list.

Step 4) When the number of pieces of motion information in the merge list is less than N, motion information of a zero vector may be added to the merge list.

The zero-vector motion information may be motion information for which the motion vector is a zero vector.

The number of pieces of zero-vector motion information may be one or more. The reference picture indices of one or more pieces of zero-vector motion information may be different from each other. For example, the value of the reference picture index of first zero-vector motion information may be 0. The value of the reference picture index of second zero-vector motion information may be 1.

The number of pieces of zero-vector motion information may be identical to the number of reference pictures in the reference picture list.

The reference direction of zero-vector motion information may be bidirectional. Both of the motion vectors may be zero vectors. The number of pieces of zero-vector motion information may be the smaller one of the number of reference pictures in the reference picture list L0 and the number of reference pictures in the reference picture list L1. Alternatively, when the number of reference pictures in the reference picture list L0 and the number of reference pictures in the reference picture list L1 are different from each other, a reference direction that is unidirectional may be used for a reference picture index that may be applied only to a single reference picture list.

The encoding apparatus 100 and/or the decoding apparatus 200 may sequentially add the zero-vector motion information to the merge list while changing the reference picture index.

When zero-vector motion information overlaps other motion information already present in the merge list, the zero-vector motion information may not be added to the merge list.

The order of the above-described steps 1) to 4) is merely exemplary, and may be changed. Further, some of the above steps may be omitted depending on predefined conditions.

Method for Deriving Prediction Motion Vector Candidate List in AMVP Mode

The maximum number of prediction motion vector candidates in a prediction motion vector candidate list may be predefined. The predefined maximum number is indicated by N. For example, the predefined maximum number may be 2.

Pieces of motion information (i.e. prediction motion vector candidates) may be added to the prediction motion vector candidate list in the order of the following steps 1) to 3).

Step 1) Available spatial candidates, among spatial candidates, may be added to the prediction motion vector candidate list. The spatial candidates may include a first spatial candidate and a second spatial candidate.

The first spatial candidate may be one of $A_0$, $A_1$, scaled $A_0$, and scaled $A_1$. The second spatial candidate may be one of $B_0$, $B_1$, $B_2$, scaled $B_0$, scaled $B_1$, and scaled $B_2$.

Pieces of motion information of available spatial candidates may be added to the prediction motion vector candidate list in the order of the first spatial candidate and the second spatial candidate. In this case, when the motion information of an available spatial candidate overlaps other motion information already present in the prediction motion vector candidate list, the motion information may not be added to the prediction motion vector candidate list. In other words, when the value of N is 2, if the motion information of a second spatial candidate is identical to the motion information of a first spatial candidate, the motion information of the second spatial candidate may not be added to the prediction motion vector candidate list.

The maximum number of pieces of motion information that are added may be N.

Step 2) When the number of pieces of motion information in the prediction motion vector candidate list is less than N and a temporal candidate is available, the motion information of the temporal candidate may be added to the prediction motion vector candidate list. In this case, when the motion information of the available temporal candidate overlaps other motion information already present in the prediction motion vector candidate list, the motion information may not be added to the prediction motion vector candidate list.

Step 3) When the number of pieces of motion information in the prediction motion vector candidate list is less than N, zero-vector motion information may be added to the prediction motion vector candidate list.

The zero-vector motion information may include one or more pieces of zero-vector motion information. The reference picture indices of the one or more pieces of zero-vector motion information may be different from each other.

The encoding apparatus 100 and/or the decoding apparatus 200 may sequentially add pieces of zero-vector motion information to the prediction motion vector candidate list while changing the reference picture index.

When zero-vector motion information overlaps other motion information already present in the prediction motion vector candidate list, the zero-vector motion information may not be added to the prediction motion vector candidate list.

The description of the zero-vector motion information, made above in connection with the merge list, may also be applied to zero-vector motion information. A repeated description thereof will be omitted.

The order of the above-described steps 1) to 3) is merely exemplary, and may be changed. Further, some of the steps may be omitted depending on predefined conditions.

Figure 12:
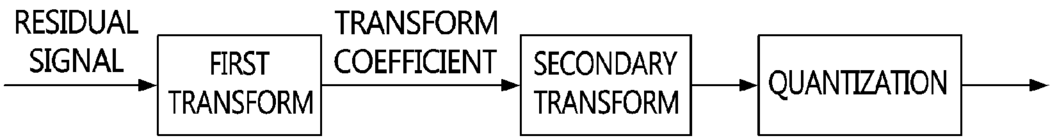
FIG. 12 illustrates a transform and quantization process according to an example.

FIG. 12 illustrates a transform and quantization process according to an example.

As illustrated in FIG. 12, quantized levels may be generated by performing a transform and/or quantization process on a residual signal.

A residual signal may be generated as the difference between an original block and a prediction block. Here, the prediction block may be a block generated via intra prediction or inter prediction.

The residual signal may be transformed into a signal in a frequency domain through a transform procedure that is a part of a quantization procedure.

A transform kernel used for a transform may include various DCT kernels, such as Discrete Cosine Transform (DCT) type 2 (DCT-II) and Discrete Sine Transform (DST) kernels.

These transform kernels may perform a separable transform or a two-dimensional (2D) non-separable transform on the residual signal. The separable transform may be a transform indicating that a one-dimensional (1D) transform is performed on the residual signal in each of a horizontal direction and a vertical direction.

The DCT type and the DST type, which are adaptively used for a 1D transform, may include DCT-V, DCT-VIII, DST-I, and DST-VII in addition to DCT-II, as shown in each of the following Table 3 and the following table 4.

TABLE 3

| Transform set | Transform candidates |
|---|---|
| 0 | DST-VII, DCT-VIII |
| 1 | DST-VII, DST-I |
| 2 | DST-VII, DCT-V |

TABLE 4

| Transform set | Transform candidates |
|---|---|
| 0 | DST-VII, DCT-VIII, DST-I |
| 1 | DST-VII, DST-I, DCT-VIII |
| 2 | DST-VII, DCT-V, DST-I |

As shown in Table 3 and Table 4, when a DCT type or a DST type to be used for a transform is derived, transform sets may be used. Each transform set may include multiple transform candidates. Each transform candidate may be a DCT type or a DST type.

The following Table 5 shows examples of a transform set to be applied to a horizontal direction and a transform set to be applied to a vertical direction depending on intra-prediction modes.

TABLE 5

| | Intra-prediction mode | | | | | | | | | |
|---|---|---|---|---|---|---|---|---|---|---|
| | 0 | 1 | 2 | 3 | 4 | 5 | 6 | 7 | 8 | 9 |
| Vertical transform set | 2 | 1 | 0 | 1 | 0 | 1 | 0 | 1 | 0 | 1 |
| Horizontal transform set | 2 | 1 | 0 | 1 | 0 | 1 | 0 | 1 | 0 | 1 |

| | Intra-prediction mode | | | | | | | | | |
|---|---|---|---|---|---|---|---|---|---|---|
| | 10 | 11 | 12 | 13 | 14 | 15 | 16 | 17 | 18 | 19 |
| Vertical transform set | 0 | 1 | 0 | 1 | 0 | 0 | 0 | 0 | 0 | 0 |
| Horizontal transform set | 0 | 1 | 0 | 1 | 2 | 2 | 2 | 2 | 2 | 2 |

| | Intra-prediction mode | | | | | | | | | |
|---|---|---|---|---|---|---|---|---|---|---|
| | 20 | 21 | 22 | 23 | 24 | 25 | 26 | 27 | 28 | 29 |
| Vertical transform set | 0 | 0 | 0 | 1 | 0 | 1 | 0 | 1 | 0 | 1 |
| Horizontal transform set | 2 | 2 | 2 | 1 | 0 | 1 | 0 | 1 | 0 | 1 |

| | Intra-prediction mode | | | | | | | | | |
|---|---|---|---|---|---|---|---|---|---|---|
| | 30 | 31 | 32 | 33 | 34 | 35 | 36 | 37 | 38 | 39 |
| Vertical transform set | 0 | 1 | 0 | 1 | 0 | 1 | 0 | 1 | 0 | 1 |
| Horizontal transform set | 0 | 1 | 0 | 1 | 0 | 1 | 0 | 1 | 0 | 1 |

| | Intra-prediction mode | | | | | | | | | |
|---|---|---|---|---|---|---|---|---|---|---|
| | 40 | 41 | 42 | 43 | 44 | 45 | 46 | 47 | 48 | 49 |
| Vertical transform set | 0 | 1 | 0 | 1 | 0 | 1 | 2 | 2 | 2 | 2 |
| Horizontal transform set | 0 | 1 | 0 | 1 | 0 | 1 | 0 | 0 | 0 | 0 |

TABLE 5-continued

| | Intra-prediction mode | | | | | | | | | |
|---|---|---|---|---|---|---|---|---|---|---|
| | 50 | 51 | 52 | 53 | 54 | 55 | 56 | 57 | 58 | 59 |
| Vertical transform set | 2 | 2 | 2 | 2 | 2 | 1 | 0 | 1 | 0 | 1 |
| Horizontal transform set | 0 | 0 | 0 | 0 | 0 | 1 | 0 | 1 | 0 | 1 |

| | Intra-prediction mode | | | | | | |
|---|---|---|---|---|---|---|---|
| | 60 | 61 | 62 | 63 | 64 | 65 | 66 |
| Vertical transform set | 0 | 1 | 0 | 1 | 0 | 1 | 0 |
| Horizontal transform set | 0 | 1 | 0 | 1 | 0 | 1 | 0 |

In Table 5, numbers of vertical transform sets and horizontal transform sets that are to be applied to the horizontal direction of a residual signal depending on the intra-prediction modes of the target block are indicated.

As exemplified in FIGS. 4 and 5, transform sets to be applied to the horizontal direction and the vertical direction may be predefined depending on the intra-prediction mode of the target block. The encoding apparatus 100 may perform a transform and an inverse transform on the residual signal using a transform included in the transform set corresponding to the intra-prediction mode of the target block. Further, the decoding apparatus 200 may perform an inverse transform on the residual signal using a transform included in the transform set corresponding to the intra-prediction mode of the target block.

In the transform and inverse transform, transform sets to be applied to the residual signal may be determined, as exemplified in Tables 3, 4, and 5, and may not be signaled. Transform indication information may be signaled from the encoding apparatus 100 to the decoding apparatus 200. The transform indication information may be information indicating which one of multiple transform candidates included in the transform set to be applied to the residual signal is used.

For example, when the size of the target block is 64×64, transform sets, each having three transforms, may be configured depending on the intra-prediction mode. An optimal transform method may be selected from among a total of nine multiple transform methods resulting from combinations of three transforms in a horizontal direction and three transforms in a vertical direction. Through such an optimal transform method, the residual signal may be encoded and/or decoded, and thus coding efficiency may be improved.

Here, information indicating which one of transforms belonging to each transform set has been used for at least one of a vertical transform and a horizontal transform may be entropy-encoded and/or -decoded. Here, truncated unary binarization may be used to encode and/or decode such information.

As described above, methods using various transforms may be applied to a residual signal generated via intra prediction or inter prediction.

The transform may include at least one of a first transform and a secondary transform. A transform coefficient may be generated by performing the first transform on the residual signal, and a secondary transform coefficient may be generated by performing the secondary transform on the transform coefficient.

The first transform may be referred to as a "primary transform". Further, the first transform may also be referred to as an "Adaptive Multiple Transform (AMT) scheme". AMT may mean that, as described above, different transforms are applied to respective 1D directions (i.e. a vertical direction and a horizontal direction).

A secondary transform may be a transform for improving energy concentration on a transform coefficient generated by the first transform. Similar to the first transform, the secondary transform may be a separable transform or a non-separable transform. Such a non-separable transform may be a Non-Separable Secondary Transform (NSST).

The first transform may be performed using at least one of predefined multiple transform methods. For example, the predefined multiple transform methods may include a Discrete Cosine Transform (DCT), a Discrete Sine Transform (DST), a Karhunen-Loeve Transform (KLT), etc.

Further, a first transform may be a transform having various transform types depending on a kernel function that defines a Discrete Cosine Transform (DCT) or a Discrete Sine Transform (DST).

For example, the transform type may be determined based at least one of 1) a prediction mode of a target block (for example, one of an intra prediction and an inter prediction), 2) a size of a target block, 3) a shape of a target block, 4) an intra prediction mode of a target block, 5) a component of a target block (for example, one of a luma component an a chroma component), and 6) a partitioning type applied to a target block (for example, one of a Quad Tree, a Binary Tree and a Ternary Tree).

For example, the first transform may include transforms, such as DCT-2, DCT-5, DCT-7, DST-7, DST-1, DST-8, and DCT-8 depending on the transform kernel presented in the following Table 6. In the following Table 6, various transform types and transform kernel functions for Multiple Transform Selection (MTS) are exemplified.

MTS may refer to the selection of combinations of one or more DCT and/or DST kernels so as to transform a residual signal in a horizontal and/or vertical direction.

TABLE 6

| Transform type | Transform kernel function $T_i(j)$ |
|---|---|
| DCT-2 | $T_i(j) = \omega_0 \cdot \sqrt{\frac{2}{N}} \cdot \cos\left(\frac{\pi \cdot i \cdot (2j+1)}{2N}\right)$ where $\omega_0 = \sqrt{\frac{2}{N}}$ (i = 0) or 1 (otherwise) |
| DST-7 | $T_i(j) = \sqrt{\frac{4}{2N+1}} \cdot \sin\left(\frac{\pi \cdot (2j+1) \cdot (j+1)}{2N+1}\right)$ |
| DCT-5 | $T_i(j) = \omega_0 \cdot \omega_1 \cdot \sqrt{\frac{2}{2N-1}} \cdot \cos\left(\frac{2\pi \cdot i \cdot j}{2N+1}\right)$ where $\omega_{0/1} = \sqrt{\frac{2}{N}}$ (i or j = 0) or 1 (otherwise) |
| DCT-8 | $T_i(j) = \sqrt{\frac{4}{2N+1}} \cdot \cos\left(\frac{\pi \cdot (2j+1) \cdot (2j+1)}{4N+2}\right)$ |
| DST-1 | $T_i(j) = \sqrt{\frac{2}{N+1}} \cdot \sin\left(\frac{\pi \cdot (i+1) \cdot (j+1)}{N+1}\right)$ |

In Table 6, i and j may be integer values that are equal to or greater than 0 and are less than or equal to N−1.

The secondary transform may be performed on the transform coefficient generated by performing the first transform.

As in the first transform, transform sets may also be defined in a secondary transform. The methods for deriving and/or determining the above-described transform sets may be applied not only to the first transform but also to the secondary transform.

The first transform and the secondary transform may be determined for a specific target.

For example, a first transform and a secondary transform may be applied to signal components corresponding to one or more of a luminance (luma) component and a chrominance (chroma) component. Whether to apply the first transform and/or the secondary transform may be determined depending on at least one of coding parameters for a target block and/or a neighbor block. For example, whether to apply the first transform and/or the secondary transform may be determined depending on the size and/or shape of the target block.

In the encoding apparatus 100 and the decoding apparatus 200, transform information indicating the transform method to be used for the target may be derived by utilizing specified information.

For example, the transform information may include a transform index to be used for a primary transform and/or a secondary transform. Alternatively, the transform information may indicate that a primary transform and/or a secondary transform are not used.

For example, when the target of a primary transform and a secondary transform is a target block, the transform method(s) to be applied to the primary transform and/or the secondary transform indicated by the transform information may be determined depending on at least one of coding parameters for the target block and/or blocks neighbor the target block.

Alternatively, transform information indicating a transform method for a specific target may be signaled from the encoding apparatus 100 to the decoding apparatus 200.

For example, for a single CU, whether to use a primary transform, an index indicating the primary transform, whether to use a secondary transform, and an index indicating the secondary transform may be derived as the transform information by the decoding apparatus 200. Alternatively, for a single CU, the transform information, which indicates whether to use a primary transform, an index indicating the primary transform, whether to use a secondary transform, and an index indicating the secondary transform, may be signaled.

The quantized transform coefficient (i.e. the quantized levels) may be generated by performing quantization on the result, generated by performing the first transform and/or the secondary transform, or on the residual signal.

Figure 13:
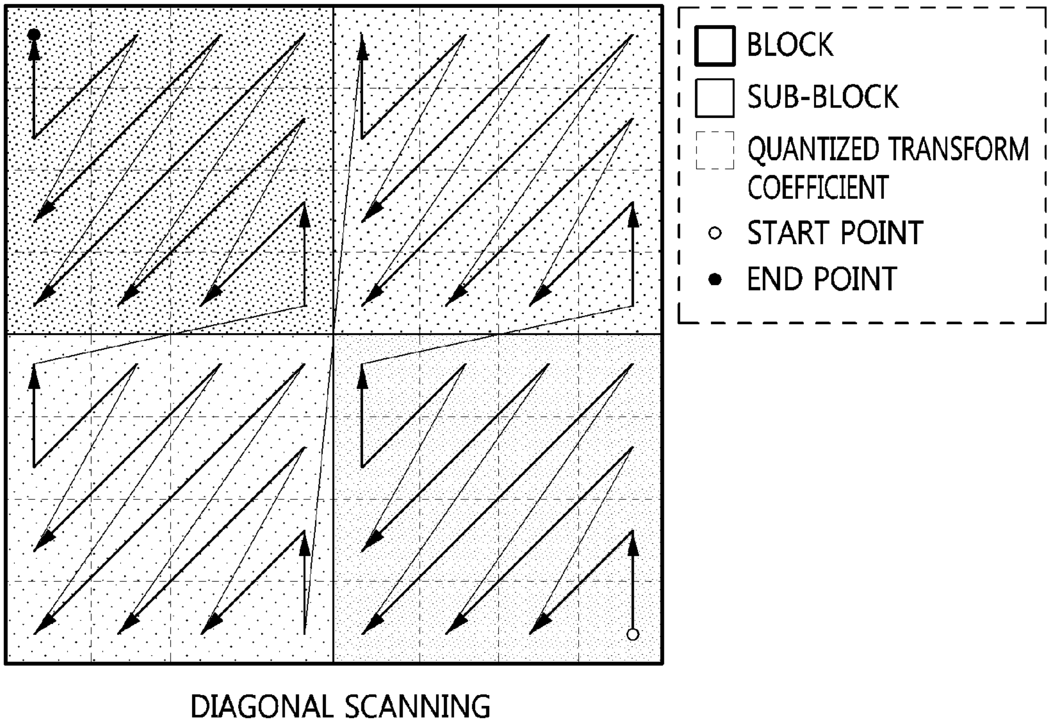
FIG. 13 illustrates diagonal scanning according to an example.

FIG. 13 illustrates diagonal scanning according to an example.

Figure 14:
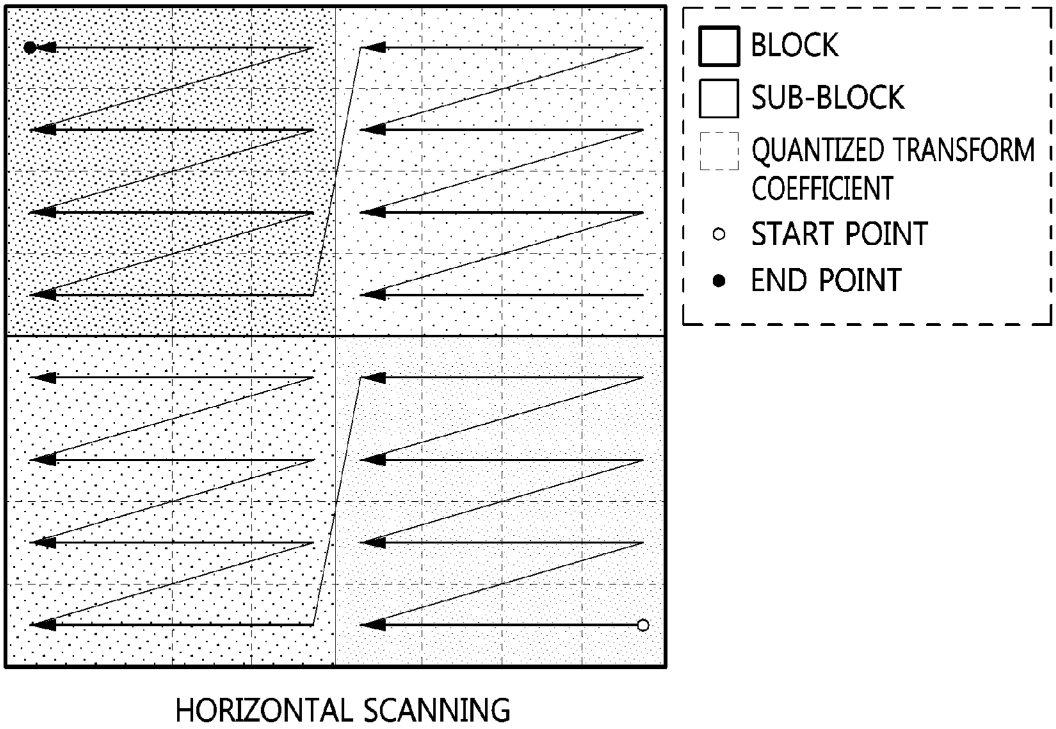
FIG. 14 illustrates horizontal scanning according to an example.

FIG. 14 illustrates horizontal scanning according to an example.

Figure 15:
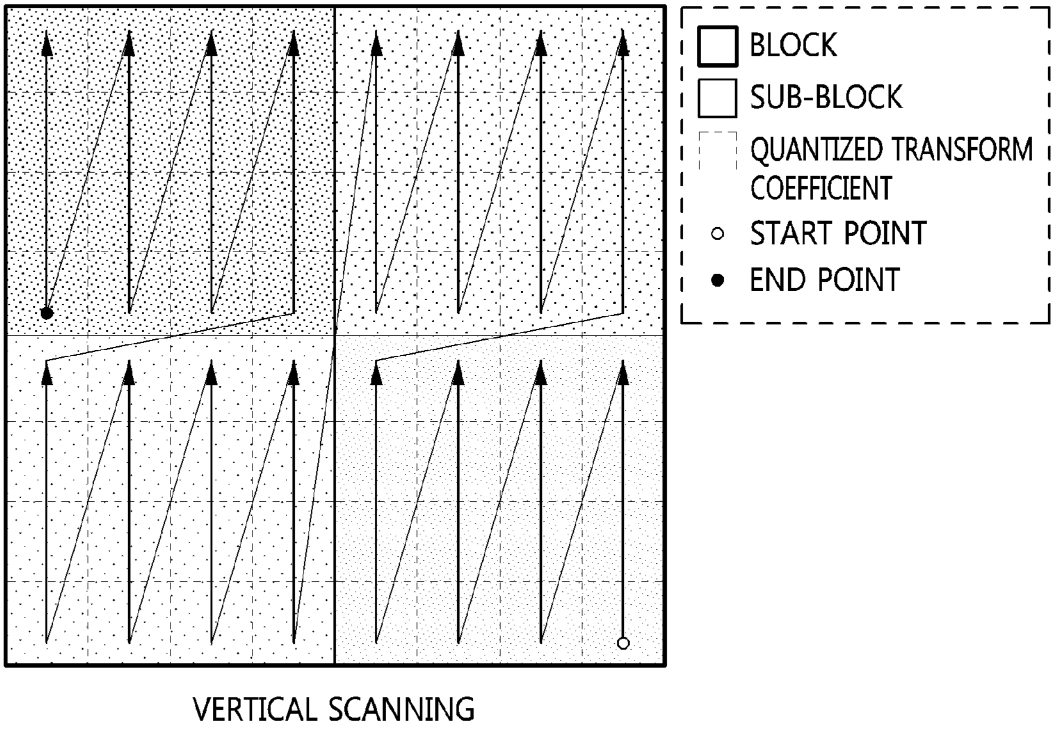
FIG. 15 illustrates vertical scanning according to an example.

FIG. 15 illustrates vertical scanning according to an example.

Quantized transform coefficients may be scanned via at least one of (up-right) diagonal scanning, vertical scanning, and horizontal scanning depending on at least one of an intra-prediction mode, a block size, and a block shape. The block may be a Transform Unit (TU).

Each scanning may be initiated at a specific start point, and may be terminated at a specific end point.

For example, quantized transform coefficients may be changed to 1D vector forms by scanning the coefficients of a block using diagonal scanning of FIG. 13. Alternatively, horizontal scanning of FIG. 14 or vertical scanning of FIG. 15, instead of diagonal scanning, may be used depending on the size and/or intra-prediction mode of a block.

Vertical scanning may be the operation of scanning 2D block-type coefficients in a column direction. Horizontal scanning may be the operation of scanning 2D block-type coefficients in a row direction.

In other words, which one of diagonal scanning, vertical scanning, and horizontal scanning is to be used may be determined depending on the size and/or inter-prediction mode of the block.

As illustrated in FIGS. 13, 14, and 15, the quantized transform coefficients may be scanned along a diagonal direction, a horizontal direction or a vertical direction.

The quantized transform coefficients may be represented by block shapes. Each block may include multiple sub-blocks. Each sub-block may be defined depending on a minimum block size or a minimum block shape.

In scanning, a scanning sequence depending on the type or direction of scanning may be primarily applied to sub-blocks. Further, a scanning sequence depending on the direction of scanning may be applied to quantized transform coefficients in each sub-block.

For example, as illustrated in FIGS. 13, 14, and 15, when the size of a target block is 8×8, quantized transform coefficients may be generated through a first transform, a secondary transform, and quantization on the residual signal of the target block. Therefore, one of three types of scanning sequences may be applied to four 4×4 sub-blocks, and quantized transform coefficients may also be scanned for each 4×4 sub-block depending on the scanning sequence.

The encoding apparatus 100 may generate entropy-encoded quantized transform coefficients by performing entropy encoding on scanned quantized transform coefficients, and may generate a bitstream including the entropy-encoded quantized transform coefficients.

The decoding apparatus 200 may extract the entropy-encoded quantized transform coefficients from the bitstream, and may generate quantized transform coefficients by performing entropy decoding on the entropy-encoded quantized transform coefficients. The quantized transform coefficients may be aligned in the form of a 2D block via inverse scanning. Here, as the method of inverse scanning, at least one of up-right diagonal scanning, vertical scanning, and horizontal scanning may be performed.

In the decoding apparatus 200, dequantization may be performed on the quantized transform coefficients. A secondary inverse transform may be performed on the result generated by performing dequantization depending on whether to perform the secondary inverse transform. Further, a first inverse transform may be performed on the result generated by performing the secondary inverse transform depending on whether the first inverse transform is to be performed. A reconstructed residual signal may be generated by performing the first inverse transform on the result generated by performing the secondary inverse transform.

For a luma component which is reconstructed via intra prediction or inter prediction, inverse mapping having a dynamic range may be performed before in-loop filtering.

The dynamic range may be divided into 16 equal pieces, and mapping functions for respective pieces may be signaled. Such a mapping function may be signaled at a slice level or a tile group level.

An inverse mapping function for performing inverse mapping may be derived based on the mapping function.

In-loop filtering, the storage of a reference picture, and motion compensation may be performed in an inverse mapping area.

A prediction block generated via inter prediction may be changed to a mapped area through mapping using a mapping function, and the changed prediction block may be used to generate a reconstructed block. However, since intra prediction is performed in the mapped area, a prediction block generated via intra prediction may be used to generate a reconstructed block without requiring mapping and/or inverse mapping.

For example, when the target block is a residual block of a chroma component, the residual block may be changed to an inversely mapped area by scaling the chroma component of the mapped area.

Whether scaling is available may be signaled at a slice level or a tile group level.

For example, scaling may be applied only to the case where mapping is available for a luma component and where the partitioning of the luma component and the partitioning of the chroma component follow the same tree structure.

Scaling may be performed based on the average of the values of samples in a luma prediction block, which corresponds to a chroma prediction block. Here, when the target block uses inter prediction, the luma prediction block may mean a mapped luma prediction block.

A value required for scaling may be derived by referring to a look-up table using the index of a piece to which the average of sample values of the luma prediction block belongs.

The residual block may be changed to an inversely mapped area by scaling the residual block using a finally derived value. Thereafter, for the block of a chroma component, reconstruction, intra prediction, inter prediction, in-loop filtering, and the storage of a reference picture may be performed in the inversely mapped area.

For example, information indicating whether the mapping and/or inverse mapping of a luma component and a chroma component are available may be signaled through a sequence parameter set.

A prediction block for the target block may be generated based on a block vector. The block vector may indicate displacement between the target block and a reference block. The reference block may be a block in a target image.

In this way, a prediction mode in which the prediction block is generated by referring to the target image may be referred to as an "Intra-Block Copy (IBC) mode".

An IBC mode may be applied to a CU having a specific size. For example, the IBC mode may be applied to an M×N CU. Here, M and N may be less than or equal to 64.

The IBC mode may include a skip mode, a merge mode, an AMVP mode, etc. In the case of the skip mode or the merge mode, a merge candidate list may be configured, and a merge index is signaled, and thus a single merge candidate may be specified among merge candidates present in the merge candidate list. The block vector of the specified merge candidate may be used as the block vector of the target block.

In the case of the AMVP mode, a differential block vector may be signaled. Also, a prediction block vector may be derived from the left neighbor block and the above neighbor block of the target block. Further, an index indicating which neighbor block is to be used may be signaled.

A prediction block in the IBC mode may be included in a target CTU or a left CTU, and may be limited to a block within a previously reconstructed area. For example, the value of a block vector may be limited so that a prediction block for a target block is located in a specific area. The specific area may be an area defined by three 64×64 blocks that are encoded and/or decoded prior to a 64×64 block including the target block. The value of the block vector is limited in this way, and thus memory consumption and device complexity caused by the implementation of the IBC mode may be decreased.

Figure 16:
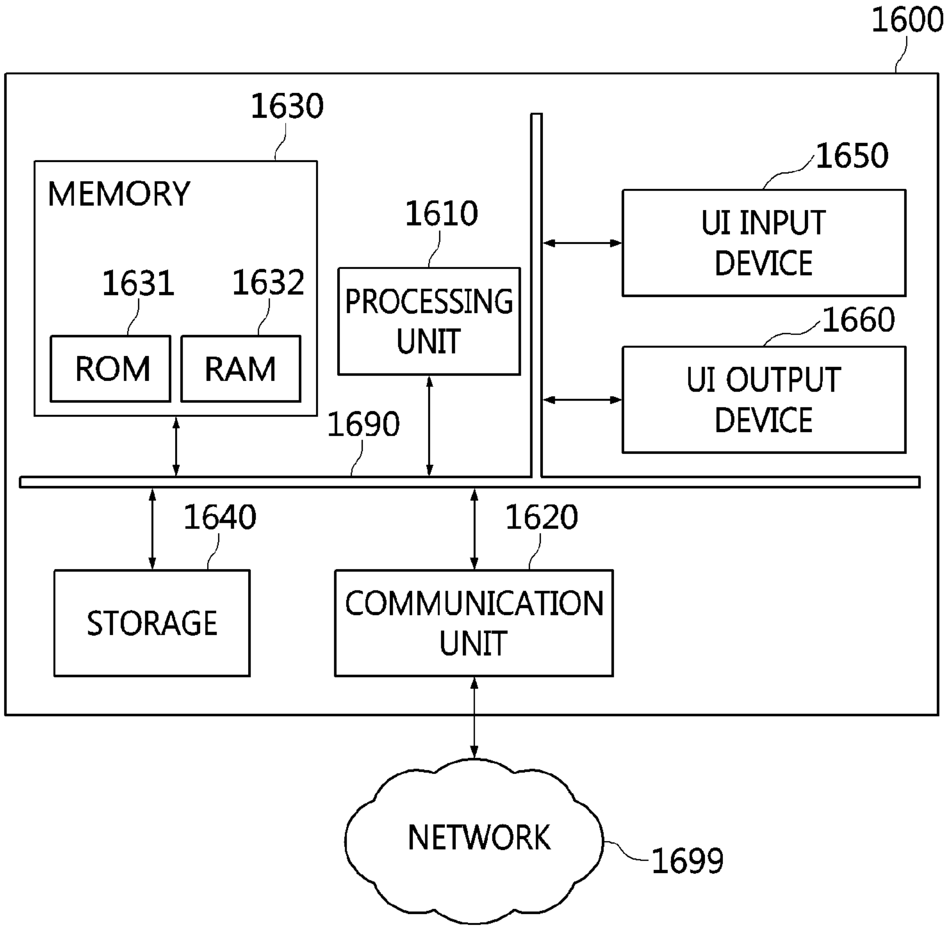
FIG. 16 is a configuration diagram of an encoding apparatus according to an embodiment.

FIG. 16 is a configuration diagram of an encoding apparatus according to an embodiment.

An encoding apparatus 1600 may correspond to the above-described encoding apparatus 100.

The encoding apparatus 1600 may include a processing unit 1610, memory 1630, a user interface (UI) input device 1650, a UI output device 1660, and storage 1640, which communicate with each other through a bus 1690. The encoding apparatus 1600 may further include a communication unit 1620 coupled to a network 1699.

The processing unit 1610 may be a Central Processing Unit (CPU) or a semiconductor device for executing processing instructions stored in the memory 1630 or the storage 1640. The processing unit 1610 may be at least one hardware processor.

The processing unit 1610 may generate and process signals, data or information that are input to the encoding apparatus 1600, are output from the encoding apparatus 1600, or are used in the encoding apparatus 1600, and may perform examination, comparison, determination, etc. related to the signals, data or information. In other words, in embodiments, the generation and processing of data or information and examination, comparison and determination related to data or information may be performed by the processing unit 1610.

The processing unit 1610 may include an inter-prediction unit 110, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

At least some of the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190 may be program modules, and may communicate with an external device or system. The program modules may be included in the encoding apparatus 1600 in the form of an operating system, an application program module, or other program modules.

The program modules may be physically stored in various types of well-known storage devices. Further, at least some of the program modules may also be stored in a remote storage device that is capable of communicating with the encoding apparatus 1200.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the encoding apparatus 1600.

The processing unit 1610 may execute instructions or code in the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190.

A storage unit may denote the memory 1630 and/or the storage 1640. Each of the memory 1630 and the storage 1640 may be any of various types of volatile or nonvolatile storage media. For example, the memory 1630 may include at least one of Read-Only Memory (ROM) 1631 and Random Access Memory (RAM) 1632.

The storage unit may store data or information used for the operation of the encoding apparatus 1600. In an embodiment, the data or information of the encoding apparatus 1600 may be stored in the storage unit.

For example, the storage unit may store pictures, blocks, lists, motion information, inter-prediction information, bitstreams, etc.

The encoding apparatus 1600 may be implemented in a computer system including a computer-readable storage medium.

The storage medium may store at least one module required for the operation of the encoding apparatus 1600. The memory 1630 may store at least one module, and may be configured such that the at least one module is executed by the processing unit 1610.

Functions related to communication of the data or information of the encoding apparatus 1600 may be performed through the communication unit 1620.

For example, the communication unit 1620 may transmit a bitstream to a decoding apparatus 1600, which will be described later.

Figure 17:
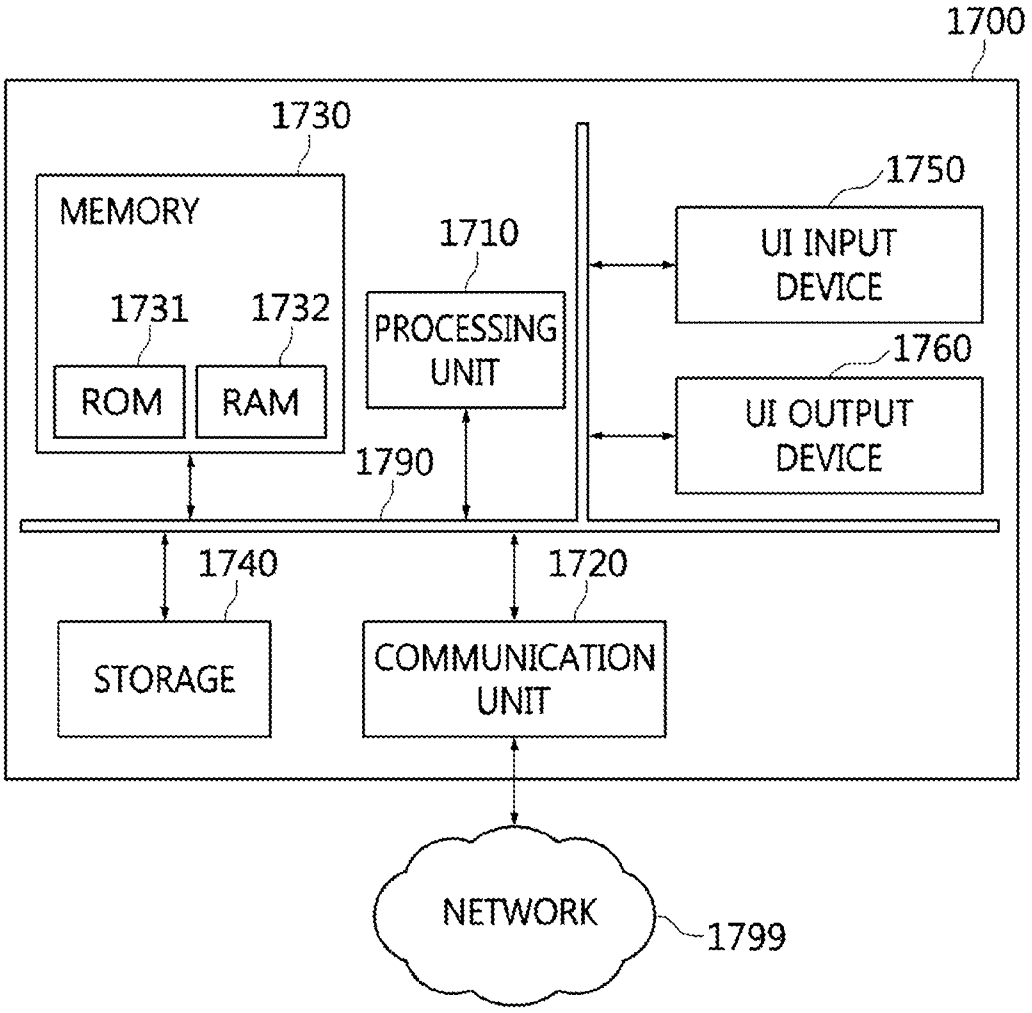
FIG. 17 is a configuration diagram of a decoding apparatus according to an embodiment.

FIG. 17 is a configuration diagram of a decoding apparatus according to an embodiment.

The decoding apparatus 1700 may correspond to the above-described decoding apparatus 200.

The decoding apparatus 1700 may include a processing unit 1710, memory 1730, a user interface (UI) input device 1750, a UI output device 1760, and storage 1740, which communicate with each other through a bus 1790. The decoding apparatus 1700 may further include a communication unit 1720 coupled to a network 1799.

The processing unit 1710 may be a Central Processing Unit (CPU) or a semiconductor device for executing processing instructions stored in the memory 1730 or the storage 1740. The processing unit 1710 may be at least one hardware processor.

The processing unit 1710 may generate and process signals, data or information that are input to the decoding apparatus 1700, are output from the decoding apparatus 1700, or are used in the decoding apparatus 1700, and may perform examination, comparison, determination, etc. related to the signals, data or information. In other words, in embodiments, the generation and processing of data or information and examination, comparison and determination related to data or information may be performed by the processing unit 1710.

The processing unit 1710 may include an entropy decoding unit 210, a dequantization unit 220, an inverse transform unit 230, an intra-prediction unit 240, an inter-prediction unit 250, a switch 245, an adder 255, a filter unit 260, and a reference picture buffer 270.

At least some of the entropy decoding unit 210, the dequantization unit 220, the inverse transform unit 230, the intra-prediction unit 240, the inter-prediction unit 250, the adder 255, the switch 245, the filter unit 260, and the reference picture buffer 270 of the decoding apparatus 200 may be program modules, and may communicate with an external device or system. The program modules may be included in the decoding apparatus 1700 in the form of an operating system, an application program module, or other program modules.

The program modules may be physically stored in various types of well-known storage devices. Further, at least some of the program modules may also be stored in a remote storage device that is capable of communicating with the decoding apparatus 1700.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the decoding apparatus 1700.

The processing unit 1710 may execute instructions or code in the entropy decoding unit 210, the dequantization unit 220, the inverse transform unit 230, the intra-prediction unit 240, the inter-prediction unit 250, the switch 245, the adder 255, the filter unit 260, and the reference picture buffer 270.

A storage unit may denote the memory 1730 and/or the storage 1740. Each of the memory 1730 and the storage 1740 may be any of various types of volatile or nonvolatile storage media. For example, the memory 1730 may include at least one of ROM 1731 and RAM 1732.

The storage unit may store data or information used for the operation of the decoding apparatus 1700. In an embodiment, the data or information of the decoding apparatus 1700 may be stored in the storage unit.

For example, the storage unit may store pictures, blocks, lists, motion information, inter-prediction information, bitstreams, etc.

The decoding apparatus 1700 may be implemented in a computer system including a computer-readable storage medium.

The storage medium may store at least one module required for the operation of the decoding apparatus 1700. The memory 1730 may store at least one module, and may be configured such that the at least one module is executed by the processing unit 1710.

Functions related to communication of the data or information of the decoding apparatus 1700 may be performed through the communication unit 1720.

For example, the communication unit 1720 may receive a bitstream from the encoding apparatus 1700.

Hereinafter, a processing unit may represent the processing unit 1610 of the encoding apparatus 1600 and/or the processing unit 1710 of the decoding apparatus 1700. For example, as to functions relating to prediction, the processing unit may represent the switch 115 and/or the switch 245. As to functions relating to inter prediction, the processing unit may represent the inter-prediction unit 110, the subtractor 125 and the adder 175, and may represent the inter prediction unit 250 and the adder 255. As to functions relating to intra prediction, the processing unit may represent the intra prediction unit 120, the subtractor 125, and the adder 175, and may represent the intra prediction unit 240 and the adder 255. As to functions related to transform, the processing unit may represent the transform unit 130 and the inverse transform unit 170, and may represent the inverse transform unit 230. As to functions relating quantization, the processing unit may represent the quantization unit 140 and the inverse quantization unit 160, and may indicate the inverse quantization unit 220. As to functions relating to entropy encoding and/or entropy decoding, the processing unit may represent the entropy encoding unit 150 and/or the entropy decoding unit 210. As to functions relating filtering, the processing unit may represent the filter unit 180 and/or the filter unit 260. As to functions relating a reference picture, the processing unit may indicate the reference picture buffer 190 and/or the reference picture buffer 270.

In typical image encoding/decoding methods, a decoder-side motion information derivation method may be limitedly used. Therefore, the improvement of encoding efficiency attributable to the decoder-side motion information derivation method may also be limited.

In embodiments, in order to improve encoding efficiency in inter-prediction, there can be provided an encoding/decoding method, apparatus, and storage medium using a motion information search method.

The processing unit may perform inter-prediction for a target block. Here, the processing unit may derive motion information of the target block from available information when prediction for the target block is performed through the motion information search method.

By means of the derivation of the motion information, encoding efficiency may be improved by minimizing the number of bits to be used for signaling coding information required for decoding of the target block.

In embodiments, the coding information may include information required for the decoding of the target block (transmitted from the encoding apparatus 1600 to the decoding apparatus 1700) described in embodiments. For example, the coding information may include coding parameters.

In embodiments, information described as being signaled through a bitstream may be included in the coding information. Furthermore, the coding information may be signaled through the bitstream.

In embodiments, the available information may refer to previously decoded (or reconstructed) information before prediction for the target block is performed.

In embodiments, the available information may include at least one of a coding parameter, motion information, prediction sample information, reconstructed sample information, and in-loop filtered decoded sample information at a specific sample location in a target picture.

In embodiments, the available information may include at least one of a coding parameter, motion information, prediction sample information, reconstructed sample information, and in-loop filtered decoded sample information of a specific block including the specific sample location in the target picture.

In embodiments, the specific sample location may refer to the locations of neighbor samples adjacent to the left, top and/or top-left of the target block.

In embodiments, the available information may include at least one of a coding parameter, motion information, prediction sample information, reconstructed sample information, and in-loop filtered reconstructed sample information at a specific sample location in a reference picture for the target block.

In embodiments, the available information may include at least one of a coding parameter, motion information, prediction sample information, reconstructed sample information, and in-loop filtered reconstructed sample information of a block including a specific sample location in the reference picture for the target block.

For example, the specific sample location may be indicated by the motion information of the target block.

In embodiments, the available information may include at least one of a coding parameter, motion information, prediction sample information, reconstructed sample information, and in-loop filtered reconstructed sample information at a specific sample location in a col picture for the target block.

In embodiments, the available information may include at least one of a coding parameter, motion information, prediction sample information, reconstructed sample information, and in-loop filtered reconstructed sample information of a block including a specific sample location in the col picture for the target block.

For example, the specific sample location may be indicated by the motion information of the target block.

For example, the specific sample location may refer to the locations of neighbor samples adjacent to the left, top and/or top-left of the col block.

Hereinafter, embodiments in which a motion information search method is implemented will be described.

Figure 18:
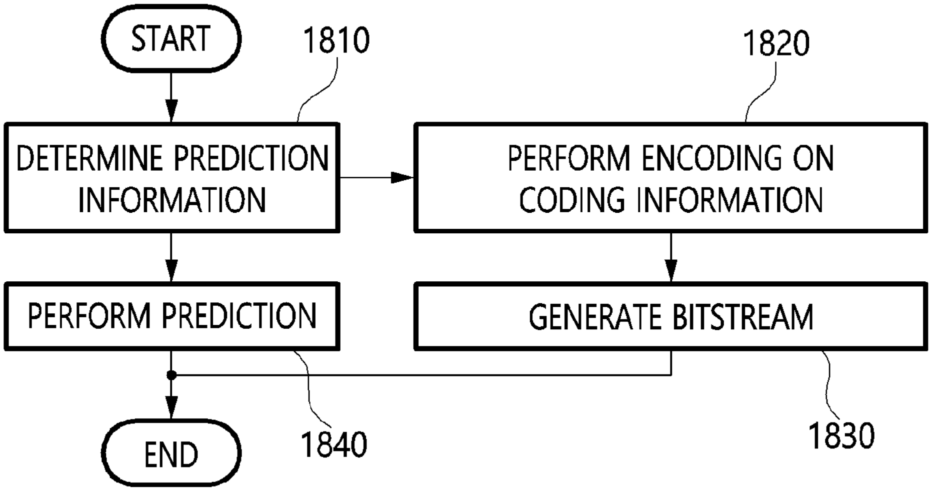
FIG. 18 is a flowchart illustrating a target block prediction method and a bitstream generation method according to an embodiment.

FIG. 18 is a flowchart illustrating a target block prediction method and a bitstream generation method according to an embodiment.

The target block prediction method and the bitstream generation method according to the embodiment may be performed by the encoding apparatus 1600. The embodiment may be a part of a target block encoding method or a video encoding method.

Prediction may be one of prediction methods described above in embodiments. For example, prediction may be inter-prediction or intra-prediction.

At step 1810, the processing unit 1610 may determine prediction information to be used for the encoding of the target block.

The prediction information may include information used for prediction, described in embodiments.

For example, the prediction information may include inter-prediction information. For example, the prediction information may include intra-prediction information.

For example, the prediction information may include a motion information candidate list and final motion information, which will be described later. Determination of the prediction information may include the configuration of the motion information candidate list and the determination of the final motion information.

At step 1820, encoded coding information may be generated by performing encoding on the coding information.

The coding information may refer to signaled/encoded/decoded information, described in embodiments. In other words, the coding information may be information that is used to allow the decoding apparatus 1700 to perform prediction corresponding to prediction performed by the encoding apparatus 1600.

At step 1830, the processing unit 1610 may generate a bitstream.

The bitstream may include information about the target block. Also, the bitstream may include the information, described above in the embodiments.

For example, the bitstream may include either the encoded coding information or the coding information.

For example, the bitstream may include coding parameters related to the target block and/or the attributes of the target block.

The information included in the bitstream may be generated at step 1820, or may be at least partially generated at steps 1810 and 1820.

The processing unit 1610 may store the generated bitstream in the storage 1640. Alternatively, the communication unit 1620 may transmit the bitstream to the decoding apparatus 1700.

The bitstream may include the encoded information about the target block. The processing unit 1610 may generate the encoded information about the target block by performing entropy encoding on the information about the target block.

At step 1840, the processing unit 1610 may perform prediction for the target block using the information about the target block and the prediction information.

The processing unit 1610 may use the coding information when performing prediction for the target block. Alternatively, the coding information may be generated to correspond to information used in prediction for the target block.

A prediction block may be generated by prediction for the target block. A residual block that is the difference between the target block and the prediction block may be generated. The information about the target block may be generated by applying transform and quantization to the residual block.

The information about the target block may include transformed and quantized coefficients for the target block. A reconstructed residual block may be generated by applying dequantization and inverse transform to the transformed and quantized coefficients for the target block. A reconstructed block that is the sum of the prediction block and the reconstructed residual block may be generated.

Figure 19:
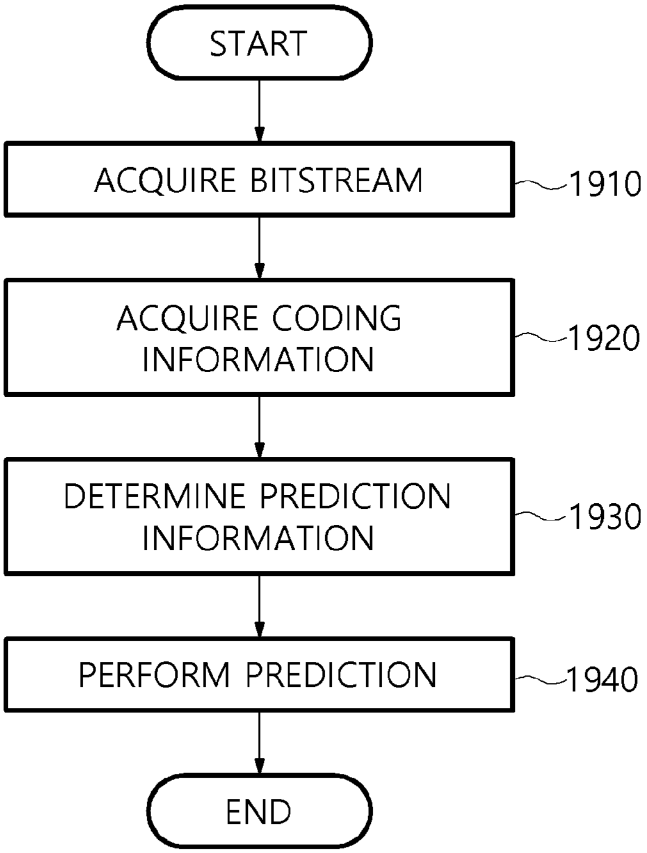
FIG. 19 is a flowchart illustrating a target block prediction method using a bitstream according to an embodiment.

FIG. 19 is a flowchart illustrating a target block prediction method using a bitstream according to an embodiment.

The target block prediction method using a bitstream according to the embodiment may be performed by the decoding apparatus 1700. The embodiment may be a part of a target block decoding method or a video decoding method.

Prediction may be one of prediction methods, described above in embodiments. For example, second prediction may be inter-prediction or intra-prediction.

At step 1910, the communication unit 1720 may acquire a bitstream. The communication unit 1720 may receive the bitstream from the encoding apparatus 1600. The processing unit 1710 may store the acquired bitstream in the storage 1740.

The processing unit 1710 may read the bitstream from the storage 1740.

The bitstream may include information about a target block.

The information about the target block may include transformed and quantized coefficients for the target block.

Also, the bitstream may include the information, described above in the embodiments.

For example, the bitstream may include either encoded coding information or coding information.

For example, the bitstream may include coding parameters related to the target block and/or the attributes of the target block.

A computer-readable storage medium may include the bitstream, and prediction and decoding for the target block may be performed using the information about the target block included in the bitstream.

The computer-readable storage medium may be a non-transitory computer-readable storage medium.

The bitstream may include the encoded information about the target block. The processing unit 1710 may generate information about the target block by performing entropy decoding on the encoded information about the target block.

At step 1920, the processing unit 1710 may acquire coding information from the bitstream.

The processing unit 1710 may generate coding information by performing decoding on the encoded coding information of the bitstream.

The coding information may refer to signaled/encoded/decoded information, described in embodiments. In other words, the coding information may be information that is used to allow the decoding apparatus 1700 to perform prediction corresponding to prediction performed by the encoding apparatus 1600.

At step 1930, the processing unit 1710 may determine prediction information to be used for the decoding of the target block.

The prediction information may include information used for prediction, described in embodiments.

The prediction information in the decoding apparatus 1700 may be identical to the prediction information in the encoding apparatus 1600. In other words, the processing unit 1710 may generate prediction information identical to the prediction information used at step 1840 so as to perform the same prediction as that performed at step 1840.

For example, the prediction information may include inter-prediction information. For example, the prediction information may include intra-prediction information.

For example, the prediction information may include a motion information candidate list and final motion information, which will be described later. Determination of the prediction information may include the configuration of the motion information candidate list and the determination of the final motion information.

The processing unit 1710 may determine the prediction information using the methods used in embodiments.

The processing unit 1710 may determine the prediction information for the target block based on prediction method-related information acquired from the bitstream.

The prediction information may include inter-prediction information. The prediction information may include intra-prediction information.

At step 1940, the processing unit 1710 may perform prediction for the target block using the information about the target block and the prediction information.

The processing unit 1710 may use the coding information when performing prediction for the target block. A prediction block may be generated by prediction for the target block.

The information about the target block may include transformed and quantized coefficients for the target block. A reconstructed residual block may be generated by applying dequantization and inverse transform to the transformed and quantized coefficients for the target block. A reconstructed block that is the sum of the prediction block and the reconstructed residual block may be generated.

Intra Block Copy (IBC)

An Intra Block Copy (IBC) mode may refer to a mode in which a region indicated by the block vector of a target block is used as a prediction block for the target block.

The target block may be encoded/decoded in one of an intra-prediction mode, an inter-prediction mode, and an intra block copy mode.

An encoding/decoding method based on prediction using intra block copy may be used 1) when a luma component and a chroma component have independent block partitioning structures (i.e., when a dual-tree structure is used) and 2) when a luma component and a chroma component have the same block partitioning structure (i.e., when a single-tree structure is used).

The intra block copy mode may be a method for deriving a block (e.g., a reference block or a prediction block) from a previously encoded/decoded region in a target image using a derived block vector (BV).

The target image may be an image including the target block. Here, because a block is derived from the image including the target block, intra block copy may correspond to intra-prediction.

The block vector may refer to an intra block vector.

The previously encoded/decoded region may be a region in a reconstructed image or a decoded image for the target picture (target image). Here, the region in the reconstructed image may refer to a reconstructed region. The region in the decoded image may refer to a decoded region.

The previously encoded/decoded region in the target image may be a reconstructed region to which at least one of in-loop filtering schemes is not applied.

In embodiments, in-loop filtering may include 1) chroma scaling and luma mapping, 2) deblocking filtering, Adaptive Sample Offset (ASO), and adaptive in-loop filtering.

In embodiments, the previously encoded/decoded region in the target image may be a reconstructed/decoded region on which at least one of in-loop filtering schemes is performed.

Adaptive Motion Vector Resolution (AMVR)

In embodiments, the term "resolution" may refer to the term "motion vector resolution".

In adaptive motion vector resolution, the resolution of a motion vector difference may be adjusted on a block basis.

Adaptive motion vector resolution information may indicate the resolution of the motion vector difference. The resolution of the motion vector difference for the target block may be determined through signaling/encoding/decoding on the adaptive motion vector resolution information.

Motion vector resolutions applicable to blocks may be identical to or different from each other.

For example, the resolutions of the motion vector applicable to the target block may be determined based on at least one of the coding parameter, motion information and mode information of the target block.

The adaptive motion vector resolution may improve encoding efficiency by adjusting the resolution of the motion vector difference.

For example, the adjusted resolution may be one of 16-pel (pixel), 8-pel, 4-pel, full-pel, half-pel, and quarter-pel, and is not limited to the above-listed pel values.

When the value of the component of the motion vector difference is changed by 1 in case the adjusted resolution is n-pel, a location indicated by the motion vector difference may be changed by n pixel(s). In other words, when the adjusted resolution of the target block is n-pel, each component of the motion vector difference may indicate a reference block in units of n pixels.

For example, when the motion vector difference to be actually applied to the target block is (a, b) and the adjusted resolution is p-pel, (a/p, b/p) other than (a, b) may be encoded. That is, the motion vector difference that is signaled/encoded by the encoding apparatus 1600 may be (a/p, b/p). The decoding apparatus 1700 may derive the original motion vector difference (a, b) by multiplying p by the signaled motion vector difference (a/p, b/p).

Decoder-Side Motion Vector Derivation

In an embodiment, a decoder-side motion information derivation method may derive motion information of the target block by 1) deriving initial motion information of the target block and 2) performing refinement on the initial motion information using a predefined operation.

In embodiments, refinement of specific information may involve amending, correcting, or updating the specific information. In embodiments, the terms "refinement", "amendment", and "correction" may be used interchangeably with each other. Refined information may be generated by performing refinement on the specific information.

For example, the decoder-side motion information derivation method 1) may derive a motion information offset and/or a motion vector difference for a second direction by applying a predefined operation to a motion information offset and/or a motion vector difference for a first direction, and 2) may refine motion information by adding the derived motion information offset and/or the derived motion vector difference to motion information in the second direction.

For example, the predefined operation may include at least one of mirroring, scaling, and copying, and is not limited to the above-listed operations.

For example, when mirroring is applied to a specific motion vector MV, the result of mirroring may be −MV.

For example, when scaling is applied to the specific motion vector MV, a scaled motion vector may be derived by changing the magnitude of the specific motion vector MV based on 1) a Picture-Order-Count (POC) interval between an image including the specific motion vector MV and a reference image indicated by the MV and 2) a POC interval between an image including the target block and a reference image for the target block. The direction of the specific motion vector MV and the direction of the scaled motion vector generated by applying scaling to the MV may be identical to each other.

For example, when copying is applied to the specific motion vector MV, the result of the copying may be a MV.

In an embodiment, the decoder-side motion information derivation method may refine the motion information by searching a location indicated by the initial motion information.

In an embodiment, the decoder-side motion information derivation method may refine a motion information candidate list by searching an initial motion information candidate list. The initial motion information candidate list may include multiple pieces of (initial) motion information. Through the refinement, at least some of the multiple pieces of motion information in the motion information candidate list may be refined.

For example, each piece of motion information in the refined motion information candidate list may be one of 1) the initial motion information or 2) refined motion information generated by performing refinement using the decoder-side motion information derivation method on the initial motion information. Also, each piece of motion information is not limited to 1) the initial motion information and 2) the refined motion information. The initial motion information may refer to one of multiple pieces of motion information included in the initial motion information candidate list.

In an embodiment, the decoder-side motion information derivation method 1) may compare matching costs of multiple candidates in the (initial) motion information candidate list, and 2) may adjust the orders of the multiple candidates in the motion information candidate list depending on the matching costs of the multiple candidates. In other words, reordering of multiple candidates may be performed based on the matching costs of the multiple candidates in the motion information candidate list. The multiple candidates may be multiple pieces of motion information.

For example, the multiple candidates in the (initial) motion information candidate list may be sorted in ascending order of the matching costs of the multiple candidates.

In embodiments, the initial motion information may be 1) motion information to which the decoder-side motion information derivation method is applied and/or 2) motion information to which each search step of the decoder-side motion information derivation method is applied.

For example, the initial motion information may be at least one of a Motion Vector Predictor (MVP), a motion information candidate, and motion information of a neighboring block.

At least one of the following processes may be applied to the initial motion information. The motion information to which the following processes are applied may be used as the initial motion information of the decoder-side motion information derivation method.

Process 1: The initial motion information may be refined using the decoder-side motion information derivation method.

Process 2: The initial motion information may be refined using a motion information offset.

For example, a motion vector difference may be added to the initial motion information.

For example, a motion information offset may be added to the initial motion information.

For example, the initial motion information or a portion of the initial motion information may be changed to the same value as the motion information offset.

For example when an Advanced Motion Vector Prediction (AMVP) mode is used for the target block, the initial motion information may be a motion vector predictor.

For example, when the AMVP mode is used for the target block, the initial motion information may be the sum of a Motion Vector Predictor (MVP) and a motion vector difference.

For example, when the decoder-side motion information derivation method is performed, at least one motion information offset may be added to at least one of pieces of refined motion information generated at search steps.

For example, when the decoder-side motion information derivation method is composed of N search steps, first refined motion information may be generated at a first search step. A first motion information offset may be added to the first refined motion information. A second search step may be performed on the first refined motion information. Thereafter, a second motion information offset may be added to N−1-th refined motion information generated at an N−1-th search step. An N-th search step may be performed on the N−1-th refined motion information.

For example, information about the motion information offset may be signaled/encoded/decoded.

The motion information offset may be determined by a rate-distortion optimization process. In this case, the encoding efficiency of the target block may be improved.

For example, the motion information offset may be a predefined value. The predefined value may be 0. The predefined value may be (0, 0).

For example, the motion information offset may refer to a motion vector difference.

For example, when bidirectional inter-prediction is performed for the target block, at least one of the motion information offsets may be added to each of motion information in L0 direction and motion information in L1 direction.

For example, at least one of the motion information offsets may be added only to motion information in LX direction.

For example, when bidirectional inter-prediction is performed for the target block, the corresponding motion information offset may be added only to the motion information in LX direction.

X may be 0, 1 or a positive integer.

X may be a predefined value.

For example, the predefined value may be 0.

For example, the predefined value may be a value indicating a direction having lower matching cost of L0 direction and L1 direction. Here, the matching cost may be matching cost of the motion information.

For example, the predefined value may be a value indicating a direction having higher matching cost of L0 direction and L1 direction. Here, the matching cost may be matching cost of the motion information.

When the predefined value X is used, the decoding apparatus 1700 may determine the motion information or direction (to which the motion information offset is to be added), without signaling/encoding/decoding the predefined value. By means of this determination, the number of bits required for signaling may be reduced.

Information indicating the predefined X may be value signaled/encoded/decoded. When signaling/encoding/decoding is performed on the information indicating the predefined value X, the predefined value X used in each block may be determined through rate-distortion optimization. By means of this determination, prediction performance for the target block may be improved.

For example, the motion information offset may be a motion vector.

For example, the motion information offset may be determined using a combination of angles in an angle list and distance offsets in a distance offset list. The angle list may include a plurality of angles. The distance offset list may include a plurality of distance offsets.

In embodiments, the angle list may be a list of angles from X-axis/Y-axis.

In embodiments, "X-axis/Y-axis" may be replaced with "width axis/height axis" or "horizontal axis/vertical axis".

The angle list may be configured to include angles having values of "i_ANGLE×π/NUM_ANGLE". i_ANGLE may be an integer of 0, 1, . . . , or (2×NUM_ANGLE-1).

The number of angles in the angle list may be 2×NUM_ANGLE.

NUM_ANGLE may be a predefined value. NUM_ANGLE may be 4, 8 or 16.

NUM_ANGLE may be a positive integer.

NUM_ANGLE and/or the angles constituting the angle list may be determined based on the coding parameters of the target block. For example, the coding parameters may include motion information.

For example, when an affine mode is used for the target block, the value of NUM_ANGLE may be 8 (or a first value). When an affine mode is not used for the target block, the value of NUM_ANGLE may be 16 (or a second value).

For example, when the affine mode is used for a current prediction block, the value of NUM_ANGLE may be 8 (or a third value). When an affine mode is not used for the current prediction block, the value of NUM_ANGLE may be 4 (or a fourth value).

The values of the above-described NUM_ANGLE may be only examples. Each of the first value, the second value, the third value, and the fourth value may be a specific integer of 1 or more.

For example, the distance offset list may be a list indicating distances from the location indicated by a current motion vector. Alternatively, the distance offset list may be a list indicating locations relative to the location indicated by the current motion vector.

For example, the current motion vector may refer to the motion vector of the target block.

For example, when the motion vector (of the target block) indicates a first location, a second location may be specified by the angle in the angle list and the distance offset in the distance offset list. Here, the angle in the angle list may indicate an angle between a first line and a second line. The first line may be an x-axis or a y-axis. The second line may be a straight line passing through the first location and the second location. The distance offset in the distance offset list may refer to the distance between the first location and the second location.

For example, the distance offset list may be configured to include at least one of 0, 1, 2, 4 and 8. In other words, the distance offsets in the distance offset list may be some or all of 0, 1, 2, 4 and 8.

For example, the distance offset list may include a value corresponding to $multi_{offset}$-Pel as a distance offset. Each distance offset in the distance offset list may denote the value of $multi_{offset}$-Pel.

For example, $multi_{offset}$ may be 1/8, 1/4, 1/2, 1, 2, 4, 8, 16, 32 or a positive integer.

For example, the distance offsets constituting the distance offset list and the size of the distance offset list may be determined based on the coding parameters of the target block or the motion information of the target block.

In embodiments, the size of the list may denote the number of elements (or candidates) in the corresponding list.

For example, when an affine mode is not used for the target block, the distance offset list may be {4, 8, 16, 32, 64, 128}. When the affine mode is used for the target block, the distance offset list may be {1, 2, 4, 8, 16}.

The values of distance offsets in the foregoing distance offset list may be only examples. The value of each distance offset may be a specific integer of 1 or more.

For example, the location determined using a combination of a specific angle θ and a specific distance offset ρ may indicate a location that is at the distance ρ in the direction of the angle θ from X-axis/Y-axis.

For example, the motion vector determined using a combination of a specific angle θ and a specific distance offset ρ may refer to a motion vector indicating a location that is at the distance ρ in the direction of the angle θ from X-axis/Y-axis.

For example, the motion information offset may be added to a reference image index.

For example, when the value of the reference image index of the target block is a first value and the value of the motion information offset added to the reference image index is a second value, the value of the reference image index of the target block may be changed to the first value+the second value. The first value may be 0, 1 or a positive integer. The second value may be −2, −1, 0, 1, 2, or an integer.

For example, when the value of the reference image index of the target block is a first value and the value of the motion information offset added to the reference image index is a second value, the value of the reference image index of the target block may be changed to the second value. The first value may be 0, 1 or a positive integer. The second value may be 0, 1 or a positive integer.

For example, when the decoder-side motion information derivation method is performed, at least one of pieces of refined motion information generated at respective search steps may be changed to have a value equal to the value of at least one motion information offset.

For example, when the decoder-side motion information derivation method is composed of N search steps, the motion vector of refined motion information, generated at a first search step, may be changed to a first motion information offset. A second search step may be performed on the motion information having the changed motion vector. Thereafter, the reference image index of refined motion information generated at an N−1-th search step may be changed to a second motion information offset. An N-th search step may be performed on the motion information having the changed reference image index.

For example, the motion information offset may refer to a coding parameter. Alternatively, the motion information offset may refer to the motion information.

For example, the motion information offset may refer to a motion vector or a reference image index.

For example, when bidirectional inter-prediction is used for the target block, motion information in L0 direction and motion information in L1 direction may be changed to values equal to motion information offsets for respective directions.

For example, only motion information in LX direction among pieces of motion information in multiple directions may be changed to a value equal to the motion information offset.

For example, when bidirectional inter-prediction is used for the target block, only motion information in LX direction among pieces of motion information in multiple directions may be changed to a value equal to the motion information offset.

X may be 0, 1 or a positive integer.

X may be a predefined value.

For example, the predefined value may be 0.

For example, the predefined value may be a value corresponding to a direction having lower matching cost of motion information between L0 direction and L1 direction.

For example, the predefined value may be a value corresponding to a direction having higher matching cost of motion information between L0 direction and L1 direction.

When the predefined value X is used, the decoder-side may determine X without signaling/encoding/decoding information indicating the predefined value. By means of this determination, the number of bits required for signaling may be reduced.

Information indicating X may be signaled/encoded/decoded. When the information indicating X is signaled/encoded/decoded, X used in each block may be determined through rate-distortion optimization. By means of this determination, prediction performance for the target block may be improved.

For example, a search in embodiments may be performed using the calculation of a cost function for determining similarity between NUM_TEMPLATE_COMPARE templates.

The search in embodiments may refer to a process of determining motion information satisfying a specific condition within a predefined search range.

For example, the motion information satisfying the specific condition may refer to motion information having the lowest matching cost among pieces of motion information within the search range.

In embodiments, NUM_TEMPLATE_COMPARE may be 0, 1, 2 or a positive integer.

The refined motion information may refer to motion information satisfying the specific condition.

The refined motion information may refer to at least one of 1) motion information determined through the decoder-side motion information derivation method, and 2) motion information determined at each search step of the decoder-side motion information derivation method.

In embodiments, the search range may be a specific range having a location indicated by initial motion information as the center. In other words, the center of the search range may be the location indicated by the initial motion information. The specific range may be a range having a predefined area.

For example, the center of the search range may be a point indicated by the initial motion information. The search range may have a rectangular shape, a horizontal length of which is SR_X and a vertical length of which is SR_Y. Alternatively, the search range may have a diamond shape, a horizontal length of which is SR_X and a vertical length of which is SR_Y. However, the shape and size of the search range are not limited by the above-described embodiments.

Each of SR_X and SR_Y may be a predefined positive integer.

Each template may be a subset of pixels included in a specific region.

For example, the template of the target block may include one or more of 1) a subset of pixels included in TMSIZE_LEFT lines adjacent to the left of the target block and 2) a subset of pixels included in TMSIZE_ABOVE lines adjacent to the above (top) of the target block. However, a relationship between the location of the template and the location of the target block or a template configuration method is not limited to the above-described embodiments.

For example, the template of the reference block may include one or more of 1) a subset of pixels included in TMSIZE_LEFT lines adjacent to the left of the reference block and 2) a subset of pixels included in TMSIZE_ABOVE lines adjacent to the top of the reference block. However, a relationship between the location of the template and the location of the reference block or a template configuration method is not limited to the above-described embodiments.

Each of TMSIZE_LEFT and TMSIZE_ABOVE may be a predefined integer of 0 or more. TMSIZE_LEFT and TMSIZE_ABOVE may be identical to or different from each other.

For example, a cost function for the template of the target block and a cost function for the templates of reference blocks in L0 direction and/or L1 direction may be calculated.

For example, the cost function for the template of the reference block in the L0 direction and the cost function for the template of the reference block in the L1 direction may be calculated.

In embodiments, the cost function may be one or more of the Sum of Absolute Differences (SAD), the Sum of Absolute Transformed Differences (SATD), the Mean-Removed Sum of Absolute Differences (MR-SAD), Mean Squared Error (MSE), and the Sum of Squared Error (SSE). However, the cost functions may not be limited to the above-listed items.

When the decoder-side motion information derivation method is performed on the target block, the cost function used in the decoder-side motion information derivation method may be predefined.

When the decoder-side motion information derivation method is performed on the target block, information about the cost function used in the decoder-side motion information derivation method may be signaled/encoded/decoded.

The template may be all or part of the block information of one or more blocks included in a specific region.

For example, the template of the target block may include one or more of 1) a subset of block information of blocks included in TMSIZE_LEFT lines adjacent to the left of the target block and a subset of block information of blocks included in TMSIZE_ABOVE lines adjacent to the top of the target block. However, a relationship between the locations of the template and the target block or a template configuration method is not limited to the above-described embodiments.

For example, the template of the reference block may include one or more of 1) a subset of block information of blocks included in TMSIZE_LEFT lines adjacent to the left of the reference block and 2) a subset of block information of blocks included in TMSIZE_ABOVE lines adjacent to the top of the reference block. However, a relationship between the locations of the template and the reference block or a template configuration method is not limited to the above-described embodiments.

Each of TMSIZE_LEFT and TMSIZE_ABOVE may be a predefined integer of 0 or more.

In embodiments, the block information may refer to at least one of information about the target block, information about a neighboring block, information about a reference block, and information about a col block.

Further, the block information may include at least one of coding parameters.

Furthermore, the block information may include at least one of pieces of information used in inter-prediction, intra-prediction, transform, inverse transform, quantization, dequantization, entropy encoding/decoding, and in-loop filtering.

That is, the block information may include at least one value, a combined value, or a statistical value of block size, block depth, block partition information, block shape (square or non-square), information indicating whether the block is partitioned in a quadtree form, information indicating whether the block is partitioned in binary tree form, partitioning direction in binary tree form (horizontal or vertical), partitioning shape in binary tree form (symmetrical or asymmetrical), prediction mode (intra-prediction or inter-prediction), intra luma prediction mode/direction, intra chroma prediction mode/direction, intra partitioning information, inter partitioning information, coding block partitioning flag, block partitioning flag, transform block partitioning flag, reference sample filter tap, reference sample filter coefficient, block filter tap, block filter coefficient, block boundary filter tap, block boundary filter coefficient, motion vector (motion vector for at least one of L0, L1, L2, and L3), motion vector difference (motion vector difference for at least one of L0, L1, L2, and L3), inter-prediction direction (inter-prediction direction for at least one of unidirectional prediction and bidirectional prediction), reference image (picture) index (reference image index for at least one of L0, L1, L2, and L3), inter-prediction indicator, prediction list utilization flag, reference image list, motion vector prediction index, motion vector prediction candidate, motion information candidate list, information indicating whether a merge mode is used, merge index, merge candidate, merge candidate list, information indicating whether a skip mode is used, interpolation filter type, interpolation filter tap, interpolation filter coefficient, motion vector magnitude, precision of motion vector representation (the unit or resolution used for representing motion vectors such as an integer sample, 1/2 sample, 1/4 sample, 1/8 sample, 1/16 sample, and 1/32 sample), transform type, transform size, information indicating whether a primary transform is used, information indicating whether a secondary transform is used, primary transform index, secondary transform index, information indicating whether a residual signal is present, coding block pattern, coding block flag, quantization parameter, residual quantization parameter, quantization matrix, information indicating whether an intra-loop filter is applied, intra-loop filter coefficient, intra-loop filter tap, intra-loop filter shape/type, information indicating whether a deblocking filter is applied, deblocking filter coefficient, deblocking filter tap, deblocking filter strength, deblocking filter shape/type, information indicating whether an adaptive sample offset is applied, adaptive sample offset value, adaptive sample offset category, adaptive sample offset type, information indicating whether an adaptive loop filter is applied, adaptive loop filter coefficient, adaptive loop filter tap, adaptive loop filter shape/type, binarization/debinarization method, context model determination method, context model update method, information indicating whether a regular mode is performed, information indicating whether a bypass mode is performed, context bin, bypass bin, significant coefficient flag, last significant coefficient flag, flag indicating whether encoding/decoding of the unit of a coefficient group is applied, location of the last significant coefficient, flag indicating whether a coefficient value is greater than 1, flag indicating whether the coefficient value is greater than 2, flag indicating whether the coefficient value is greater than 3, remaining coefficient value information, sign information, reconstructed luma sample, reconstructed chroma sample, residual luma sample, residual chroma sample, luma transform coefficient, chroma transform coefficient, luma quantization level, chroma quantization level, transform coefficient level scanning method, size of the motion vector search range at the decoder-side, shape of a motion vector search range at the decoder-side, number of motion vector search iterations at the decoder-side, CTU size information, minimum block size information, maximum block size information, maximum block depth information, minimum block depth information, slice identification information, slice partition information, tile identification information, tile type, tile partition information, input sample bit depth, reconstructed sample bit depth, residual sample bit depth, transform coefficient bit depth, quantization level bit depth, indicator for Overlapped Block Motion Compensation (OBMC) mode, indicator for Local Illumination Compensation (LIC) mode, and motion information offset.

For example, the cost function may be a function of determining similarity between pieces of motion information and/or coding parameters of templates.

In embodiments, the similarity between a first value and a second value may be determined using at least one of 1) the difference between the two values, 2) the ratio of the two values, and 3) an operation of comparing the difference between two values with a specific value.

For example, the fact that the pieces of motion information (or coding parameters) of the templates are similar to each other may mean the case where the difference between the pieces of motion information (or coding parameters) of the templates is less than or equal to a predefined positive number THRES_PARAMETER. However, a criterion based on which similarity is determined is not limited to the above-described comparison.

For example, the fact that the pieces of motion information (or coding parameters) of the templates are similar to each other may mean the case where the sum of the differences between the pieces of motion information (or coding parameters) of the templates is less than or equal to a predefined positive number THRES_PARAMETER. However, a criterion based on which similarity is determined is not limited to the above-described comparison.

For example, the fact that the pieces of motion information (or coding parameters) of the templates are similar to each other may mean the case where the ratio of the pieces of motion information (or coding parameters) of the templates is less than or equal to a predefined positive number WEIGHT_THRES_PARAMETER. However, a criterion based on which similarity is determined is not limited to the above-described comparison.

For example, the fact that the pieces of motion information (or coding parameters) of the templates are similar to each other may mean the case where the ratio of the pieces of motion information (or coding parameters) of the templates is equal to or greater than the predefined positive number WEIGHT_THRES_PARAMETER. However, a criterion based on which similarity is determined is not limited to the above-described comparison.

For example, the fact that the pieces of motion information (or coding parameters) of the templates are similar to each other may mean the case where the number of pieces of identical motion information (or coding parameters) in the templates is equal to or greater than a predefined positive number THRES_PARAMETER, but a criterion based on which similarity is determined is not limited to the above-described comparison.

Each of THRES_PARAMETER and WEIGHT_THRES_PARAMETER may be a predefined positive integer.

Each of THRES_PARAMETER and WEIGHT_THRES_PARAMETER may be set based on the motion information (or coding parameters). Each of THRES_PARAMETER and WEIGHT_THRES_PARAMETER may vary depending on the motion information (or coding parameters). Each of THRES_PARAMETER and WEIGHT_THRES_PARAMETER may be set based on the type of motion information (or coding parameters). Each of THRES_PARAMETER and WEIGHT_THRES_PARAMETER may vary depending on the type of motion information (or coding parameters).

For example, a refined motion information candidate list may include DMVG_NUM pieces of motion information.

DMVG_NUM may be a predefined positive integer of 1 or more.

Information indicating DMVG_NUM may be signaled/encoded/decoded.

DMVG_NUM may be equal to the size of an initial motion information candidate list.

DMVG_NUM may be different from the size of the initial motion information candidate list.

For example, DMVD_NUM may be less than the size of the initial motion information candidate list.

Each candidate of the refined motion information candidate list may be initial motion information or refined motion information generated based on the initial motion information.

For example, the refined motion information candidate list may be configured to include DMVG_NUM pieces of initial motion information having the lowest matching costs among candidates in the initial motion information candidate list.

In embodiments, "pieces of information having the lowest matching costs" may refer to "pieces of information selected in ascending order of matching cost".

For example, pieces of refined motion information may be generated by applying refinement to the candidates in the initial motion information candidate list. The refined motion information candidate list may be configured to include DMVG_NUM pieces of refined motion information having the lowest matching costs among pieces of refined motion information.

For example, in the case where motion information in LX direction is already determined to be MVP_LX when an initial motion information candidate list for L(1−X) direction is refined, each candidate in the initial motion information candidate list for the L(1−X) direction may be refined to minimize bilateral matching cost with the MVP_LX.

For example, in the case where motion information in LX direction is already determined to be MVP_LX when an initial motion information candidate list for L(1−X) direction is refined, the order of candidates in the initial motion information candidate list for the L(1−X) direction may be reordered in ascending order of bilateral matching cost with the MVP_LX.

X may be 0, 1 or a positive integer.

X may be a predefined value. The predefined value may be 0.

For example, the predefined value may refer to a value indicating a direction having lower matching cost of L0 direction and L1 direction. Here, the matching cost for the specific direction may be matching cost of motion information in the specific direction.

For example, the predefined value may refer to a value indicating a direction having higher matching cost of the L0 direction and the L1 direction. Here, the matching cost for the specific direction may be matching cost of motion information in the specific direction.

Information indicating X may be signaled/encoded/decoded.

The information indicating X may be determined through a rate-distortion optimization process. By means of this determination, the encoding efficiency of the target block may be improved.

For example, when a search is performed in the decoder-side motion information derivation method, a location-based weight w may be used for matching cost of motion information in each search procedure.

For example, matching cost of specific motion information in each search procedure may be refined by an operation using weight w. This operation may be at least one of four arithmetic operations.

Whether the weight w is used and/or the value of the weight w may be determined based on the location indicated by the initial motion information.

The initial motion information may refer to the initial motion information of the decoder-side motion information derivation method. Alternatively, the initial motion information may refer to motion information that is the target on which refinement is to be performed in each search procedure of the decoder-side motion information derivation method.

In embodiments, the weight w may be a value multiplied by the matching cost of specific motion information in each search procedure.

For example, the weight w may be determined based on the distance between a location indicated by the specific motion information and a location indicated by the initial motion information.

For example, whether the weight w has a value other than 1 in the search procedure may be determined based on the distance between the location indicated by the specific motion information and the location indicated by the initial motion information.

For example, whether the weight w is to be multiplied by the matching cost of the specific motion information in the search procedure may be determined based on the distance between the location indicated by the specific motion information and the location indicated by the initial motion information.

The weight w may be predefined.

For example, a predefined weight W may be multiplied by matching cost at the location indicated by the initial motion information. Here, W may be a value less than or equal to 1, or a value equal to or greater than 1.

For example, when an AMVP mode is used for the target block, W at the location indicated by the initial motion information may be a value equal to or greater than 1.

For example, when a merge mode is used for the target block, W at the location indicated by the initial motion information may be a value less than or equal to 1.

For example, when the AMVP mode is used for the target block, the weight W may have a larger value as the specific location is closer to the location indicated by the initial motion information.

For example, when the merge mode is used for the target block, the weight W may have a smaller value as the specific location is closer to the location indicated by the initial motion information.

For example, in the case where the value of the weight W multiplied by the matching cost of the specific motion information is less than or equal to 1 when a specific search step in the decoder-side motion information derivation method is performed, the possibility that the initial motion information at the current search step will be refined to the specific motion information may increase.

For example, in the case where the value of the weight W multiplied by the matching cost of the specific motion information is equal to or greater than 1 when a specific search step in the decoder-side motion information derivation method is performed, the possibility that the initial motion information at the current search step will be refined to the specific motion information may decrease.

The decoder-side motion information derivation method may include one or more search steps.

At each search step, refined motion information may be determined through a search from initial motion information at the search step.

Two different search steps may be different from each other in at least one of initial motion information, a template configuration method, the type of cost function for determining similarity, the unit by which refinement of the motion information is performed, a search range, a search pattern, search resolution, and a search method.

For example, each search step of the decoder-side motion information derivation method may be regarded as an independent decoder-side motion information derivation method implemented using one search step.

For example, a first decoder-side motion information derivation method composed of L-search steps and a second decoder-side motion information derivation method composed of M-search steps may be regarded as one decoder-side motion information derivation method composed of N-search steps. N may be the sum of L and M.

The types of the search method may be different from each other depending on one or more of 1) a search pattern, 2) research resolution, 3) a search range, and 4) the unit by which motion information is derived. However, criteria based on which the types of search method are classified are not limited to such conditions.

The search resolution may be one of 4-pel, full-pel, half-pel, and quarter-pel. However, the search resolution is not limited to the above-described pel values.

The search pattern may be one of a diamond pattern, a cross pattern, and a full-search pattern. However, the search pattern is not limited to the above-listed patterns.

A search using the diamond pattern may refer to an operation of searching for one or more of locations of (0, 2×RR), (RR, RR), (2×RR, 0), (RR, −RR), (0, −RR), (−RR, −RR), (−RR, 0), (−RR, RR), and (0, 0) when (0, 0) represents a location indicated by initial motion information. RR may refer to search resolution, and may be a predefined positive number.

A search using the cross pattern may be an operation of searching for one or more of locations of (0, RR), (RR, 0), (0, −RR), (−RR, 0) and (0, 0) when (0, 0) represents a location indicated by initial motion information.

The search using the full-search pattern may be an operation of searching for all locations within a predefined search range.

For example, assuming that FS_i has values ranging from −FS_X to FS_X and FS_j has values from −FS_Y to FS_Y, the search using the full-search pattern may refer to an operation of searching for locations corresponding to (FS_i×RR, FS_j×RR). Here, (0, 0) may be a location indicated by the initial motion information. However, the search range is not limited to the above-described locations. Each of FS_X and FS_Y may be a predefined positive number.

For example, the decoder-stage motion information derivation method may be configured in the order of 1) the step of deriving motion information of the entire block, and 2) the step of deriving motion information of a subblock of the block. However, methods of deriving the motion information, performed at respective steps, and the order of respective steps are not limited to the methods and orders, described above in embodiments.

For example, the decoder-side motion information derivation method may be composed of N search steps. At the first search step, motion information of a first block may be derived. At a second search step located subsequent to the first search step, motion information of a second block may be derived. Here, the unit of the second block may be smaller than the unit of the first block. In other words, the second block may be the subblock of the first block. Alternatively, the unit of the first block and the unit of the second block may be identical to each other. In other words, the first block and the second block may be identical to each other.

For example, assuming that derivation of motion information of the entire block is performed at the first search step, derivation of motion information of the entire block or motion information of a subblock of the block may be performed at the second search step.

A search method at each step may be predefined based on the coding parameters or the motion information of the target block.

When the decoder-side motion information derivation method is composed of two or more search steps, initial motion information input at a specific search step after a first search step may be motion information refined at a search step before the specific search step.

For example, the decoder-side motion information derivation method may be composed of three search steps. 1) At a first search step, motion information may be refined using bilateral matching for the entire block. 2) At a second search step, motion information may be refined through bilateral matching in units of subblocks, each having a size of 16×16. 3) At a third search step, motion information may be refined using optical flow-based motion information prediction in units of subblocks, each having a size of 8×8.

The motion information refined through the decoder-side motion information derivation method according to embodiments may replace the initial motion information. For example, the refined motion information may be used to determine the motion information for inter-prediction in the L0 direction and/or L1 direction of the target block.

The decoder-side motion information derivation methods according to embodiments may be one or more of Template Matching (TM), Bilateral Matching (BM), Decoder-side Motion Vector Refinement (DMVR), Symmetric Motion Vector Difference (SMVD), and optical flow-based motion information prediction. However, the decoder-side motion information derivation methods are not limited to the above-described methods.

Symmetric Motion Vector Difference (Symmetric MVD; SMVD) Mode

Figure 20:
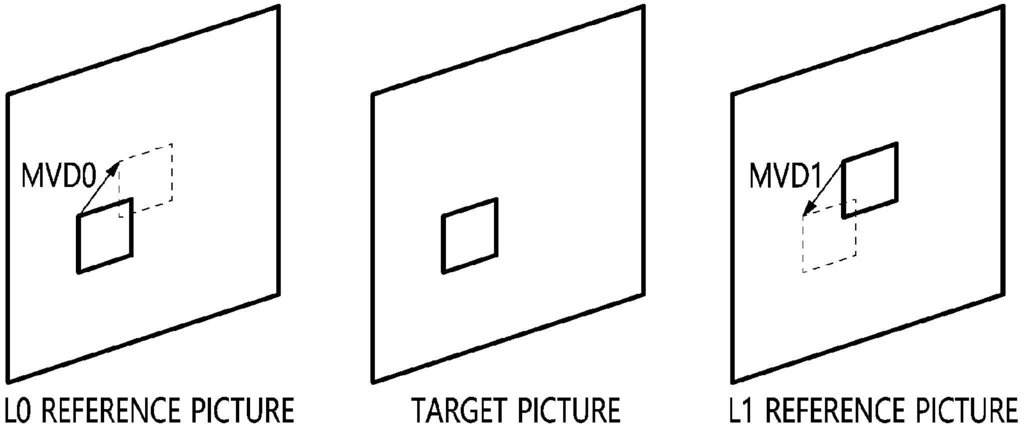
FIG. 20 illustrates motion vector differences in a symmetrical motion vector difference mode according to an example.

FIG. 20 illustrates motion vector differences in a symmetric motion vector difference mode according to an example.

The SMVD mode may be a prediction mode using bidirectional prediction, and may be one of AMVP modes.

For example, when bidirectional inter-prediction is used for the target block, the symmetric motion vector difference mode may be signaled as a sub-mode of the AMVP mode.

For example, when the symmetric motion vector difference mode is used, a reference image index may be determined based on a predefined method.

For example, signaling of a reference image (picture) list may be skipped.

For example, when the SMVD mode is used, a pair of reference images may be specified in a reference image list for L0 direction and a reference image list for L1 direction. Here, the specified reference images may be a first reference image in reference image list L0 and a second reference image in reference image list L1. A first POC interval may be the difference between the POC of the target image and the POC of the first reference image. A second POC interval may be the difference between the POC of the target image and the POC of the second reference image. The target image may be an image including the target block. The first POC interval and the second POC interval may be equal to each other. The direction of the first reference image with respect to the target image and the direction of the second reference image with respect to the target image may be opposite to each other.

In other words, reference picture indices used in the SMVD mode may be the reference picture indices of reference pictures having the same POC interval.

When the SMVD mode is used, a motion vector prediction index may be signaled/encoded/decoded for a reference image in each direction, and information about one motion vector difference may be signaled/encoded/decoded. In the SMVD mode, two MVP indices and one MVD may be signaled.

When the SMVD mode is used, motion vector differences for reference images in respective directions may include a first motion vector difference that is encoded/decoded and a second motion vector difference symmetrical to the first motion vector difference.

For example, when only a motion vector difference MVD0 for L0 direction is signaled/encoded/decoded, a motion vector difference MVD1 for L1 direction may be −MVD0.

FIG. 21 illustrates syntax elements signaled/encoded/decoded in a symmetric motion vector difference mode according to an example.

x0 and y0 may mean that the top-left location of a luma block in a target block is (x0, y0).

sps_smvd_enabled_flag may be a syntax element determined in a sequence parameter set, and may be an indicator indicating whether a symmetric motion vector difference mode is to be enabled in a target sequence.

When the value of sps_smvd_enabled_flag is a first value, the symmetric motion vector difference mode may be disabled in a target sequence. The first value may be 0 or false.

When the value of sps_smvd_enabled_flag is a second value, the symmetric motion vector difference mode may be enabled in the target sequence. The second value may be 1 or true.

inter_pred_idc may be a syntax element for an inter-prediction direction. inter_pred_idc may be an inter-prediction indicator.

When the value of inter_pred_idc is a first value, unidirectional inter-prediction in the L0 direction may be performed for the target block. The first value may be 1 or PRED_L0.

When the value of inter_pred_idc is a second value, unidirectional inter-prediction in the L1 direction may be performed for the target block. The second value may be 2 or PRED_L1.

When the value of inter_pred_idc is a third value, bidirectional inter-prediction may be performed for the target block. The third value may be 3 or PRED_BI.

inter_affine_flag may be an indicator indicating whether an affine mode is performed on the target block.

When the value of inter_affine_flag is a first value, an affine mode may not be performed on the target block. The first value may be 0 or false.

When the value of inter_affine_flag is a second value, the affine mode may be performed on the target block. The second value may be 1 or true.

RefIdxSymL0 may be a reference image index for L0 direction determined for the symmetric motion vector difference mode. RefIdxSymL1 may be a reference image index for L1 direction determined for the symmetric motion vector difference mode.

For example, RefIdxSymL0 may be an index indicating a reference image having a minimum POC interval among reference images in the reference image list for the L0 direction. Here, the POC interval may be the difference between the POC of the target image and the POC of the reference image.

For example, RefIdxSymL1 may be an index indicating a reference image having a minimum POC interval among reference images in the reference image list for the L1 direction. Here, the POC interval may be the difference between the POC of the target image and the POC of the reference image.

ph_mvd_l1_zero_flag may be a syntax element determined in a picture parameter set, and may be an indicator indicating whether signaling/encoding/decoding of the motion vector difference in the L1 direction in the target image is to be performed.

When the value of ph_mvd_l1_zero_flag is a first value, signaling/encoding/decoding of the motion vector difference in the L1 direction in the target image may be performed. The first value may be 0 or false.

When the value of ph_mvd_l1_zero_flag is a second value, signaling/encoding/decoding of the motion vector difference in the L1 direction in the target image may not be performed. The second value may be 1 or true.

NumRefIdxActive[X] may specify the maximum number of available reference images upon performing inter-prediction in LX direction. X may be 0, 1 or a positive integer.

sym_mvd_flag may be an indicator indicating whether a symmetric motion vector difference mode is to be performed.

For example, when the value of sym_mvd_flag is a first value, a symmetric motion vector difference mode may not be performed on the target block. The first value may be 0 or false.

For example, when the value of sym_mvd_flag is a second value, the symmetric motion vector difference mode may be performed on the target block. The second value may be 1 or true.

MotionModelIdc may specify 1) whether an affine mode is used for the target block and 2) the number of control point motion vectors used in the affine mode when the affine mode is to be used for the target mode.

MotionModelIdc equal to a first value may mean that an affine mode is not performed on the target block. The first value may be 0.

MotionModelIdc equal to a second value may mean that the affine mode is performed on the target block and that two control point motion vectors are used. The second value may be 1.

MotionModelIdc equal to a third value may mean that the affine mode is performed on the target block and that three control point motion vectors are used. The third value may be 2.

mvp_l0_flag may specify a motion information index in L0 direction.

mvp_l1_flag may specify a motion information index in L1 direction.

mvd_coding(x0, y0, X, Y) may indicate that the encoding/decoding of a motion vector difference for Y-th motion information in the LX direction is performed. When an affine mode is not performed on the target block, Y may always be 0. When the affine mode is performed on the target block, Y may be one of 0, 1 and 2. The range of values that Y can have may be determined based on MotionModelIdc.

MvdL0[x0][y0][0] may refer to a horizontal component of the motion vector difference in the L0 direction. MvdL0 [x0][y0][1] may refer to a vertical component of the motion vector difference in the L0 direction.

MvdL1 [x0][y0][0] may refer to a horizontal component of a motion vector difference in the L1 direction. MvdL1 [x0][y0][1] may refer to a vertical component of the motion vector difference in the L1 direction.

Bilateral Matching (BM)

Bilateral matching may be a decoder-side motion information derivation method which refines motion information by utilizing a reference block in L0 direction and a reference block in L1 direction as templates and by calculating a cost function (or bilateral matching cost) between the two templates.

The bilateral matching cost may refer to the result value of calculation of the cost function between the templates of the reference block in the L0 direction and the reference block in the L1 direction, which are used in bilateral matching.

The reference block may refer to a reference block indicated by 1) initial motion information, 2) motion information derived in a bilateral matching search process, or 3) motion information finally refined through bilateral matching.

Bilateral matching may be operated only when a predefined enabling condition is satisfied.

For example, bilateral matching may always be operated.

For example, bilateral matching may be performed when an inter-prediction mode is used for the target block and two reference blocks are used.

For example, bilateral matching may be performed only when the first direction and the second direction are different from each other and a first POC interval and a second POC interval are identical to each other. The first direction may be a direction from the target image to a reference image in the L0 direction. The second direction may be a direction from the target image to a reference image in the L1 direction. The first POC interval may be the difference between the POC of the target image and the POC of the reference image in the L0 direction. The second POC interval may be the difference between the POC of the target image and the POC of the reference image in the L1 direction.

For example, bilateral matching may be performed only when the first direction and the second direction are different from each other. The first direction may be a direction from the target image to the reference image in the L0 direction. The second direction may be a direction from the target image to the reference image in the L1 direction.

Here, the fact that the first direction and the second direction are different from each other may mean that the following Equation 1 is satisfied.

$$(POC_t - POC0)\times(POC_t - POC1) < 0 \quad \text{[Equation 1]}$$

Here, the fact that the first direction and the second direction are identical to each other may mean that the following Equation 2 is satisfied.

$$(POC_t - POC0)\times(POC_t - POC1) > 0 \quad \text{[Equation 2]}$$

$POC_t$ may be the POC of the target image.

POC0 may be the POC of the reference image in the L0 direction.

POC1 may be the POC of the reference image in the L1 direction.

Bilateral matching may include one or more search steps.

For example, bilateral matching may be configured to sequentially include 1) the step of deriving motion information of the entire block and 2) the step of deriving motion information of subblocks of the block. However, the methods of deriving motion information, performed at respective steps, and the order of respective steps are not limited to the above-described configurations.

At each search step of bilateral matching, motion information in BM_NUM directions among the motion information in the L0 direction and the motion information in the L1 direction may be refined. BM_NUM may be 0, 1, 2 or a positive integer. BM_NUM values used at steps of bilateral matching may be identical to or different from each other.

For example, when BM_NUM is 1 at the specific search step, refinement of the motion information may be performed only for motion information in $LX_{BM}$ direction at the specific search step.

For example, when BM_NUM is 1 and $X_{BM}$ is 0 at the specific search step, only a search in the L0 direction may be performed in the state in which the template in the L1 direction and the motion information in the L1 direction are fixed, at the specific search step.

$X_{BM}$ may be 0, 1 or a positive integer.

$X_{BM}$ may be predefined.

For example, the $X_{BM}$ direction may be a direction having a greater POC interval out of the L0 direction and the L1 direction. POC interval may be the difference between the POC of the reference image (in a specific direction) and the POC of the target image.

For example, the $X_{BM}$ direction may be a direction having higher template matching cost of the L0 direction and the L1 direction. Here, the template matching cost for the specific direction may be template matching cost for motion information in the specific direction.

The information about $X_{BM}$ may be signaled/encoded/decoded.

At the search steps of bilateral matching processes, the same $X_{BM}$ may be used. Alternatively, at the search steps of bilateral matching processes, different $X_{BM}$ values may be respectively used.

For example, when bilateral matching is performed, a cost function used for the calculation of the bilateral matching cost may be determined based on the weights in inter bi-prediction with weights for the target block and/or the weight indices of inter bi-prediction with weights.

In embodiments, bi-prediction with weights may refer to bi-prediction with CU-level weights (BCW).

For example, when a first weight and a second weight of the target block are identical to each other, bilateral matching cost may be calculated using SAD or SATD. When the first weight and the second weight of the target block are different from each other, bilateral matching cost may be calculated using MRSAD or MRSATD. Here, the first weight may be the weight of inter bi-prediction with weights in the L0 direction. The second weight may be the weight of inter bi-prediction with weights in the L1 direction.

BM_NUM may be 0, 1, 2 or a positive integer.

BM_NUM may be predefined.

BM_NUM at each search step of bilateral matching may be determined based on coding parameters. Alternatively, BM_NUM may be determined based on at least one of motion information, the search step of bilateral matching, matching cost at a previous search step, matching cost for initial motion information at a current search step, and BM_NUM at the previous search step.

For example, at the first search step of bilateral matching, BM_NUM may be 1 or 2.

For example, BM_NUM at the current search step may be determined based on the matching cost at the previous search step.

For example, when the difference between the matching cost for the initial motion information at the previous search step and matching cost for refined motion information at the previous search step is less than COSTDIFF_FORBMNUM, BM_NUM at the current search step may be 0.

COSTDIFF_FORBMNUM may be 0, 1, 2, 4, 8, 16 or a positive integer.

For example, COSTDIFF_FORBMNUM may be determined based on the size of the target block. COSTDIFF_FORBMNUM may be the product of the number of pixels in the target block and a specific value. The specific value may be 0, 1, 2, 4, 8 or a positive integer.

For example, when BM_NUM at the previous search step is 0, BM_NUM at the current search step may be 0.

For example, when matching cost for the initial motion information at the current search step is less than COSTDIFF_FORBMNUM_INIT, BM_NUM of the target block may be 0.

COSTDIFF_FORBMNUM may be 0, 1, 2, 4, 8, 16 or a positive integer.

For example, COSTDIFF_FORBMNUM_INIT may be determined based on the size of the target block. COSTDIFF_FORBMNUM_INIT may be the product of the number of pixels in the target block and a specific value. The specific value may be 0, 1, 2, 4, 8 or a positive integer.

For example, when motion refinement is performed at the search step of bilateral matching, refinement of motion information in the L0 direction may be performed only in the case where matching cost for L0 direction motion information of the initial motion information at the current search step is greater than COSTDIFF_FORBMNUM_INIT.

For example, when motion refinement is performed at the search step of bilateral matching, refinement of motion information in the L1 direction may be performed only in the case where matching cost for L1 direction motion information of the initial motion information at the current search step is greater than COSTDIFF_FORBMNUM_INIT.

COSTDIFF_FORBMNUM may be 0, 1, 2, 4, 8, 16 or a positive integer.

For example, COSTDIFF_FORBMNUM_INIT may be determined based on the size of the target block. COSTDIFF_FORBMNUM_INIT may be the product of the number of pixels in the target block and a specific value. The specific value may be 0, 1, 2, 4, 8 or a positive integer.

The case where BM_NUM at the specific search step of bilateral matching is 0 may indicate that the refinement of motion information is not performed at the specific search step. Alternatively, the case where BM_NUM at the specific search step of bilateral matching is 0 may indicate that the specific search step is not performed.

For example, when bilateral matching is performed, BM_NUM at a motion information derivation step for the entire block may be 1, and BM_NUM at a motion information derivation step for a subblock may be 2. In this case, at the motion information derivation step for the entire block, only motion information in the $LX_{BM}$ direction may be refined, and at the motion information derivation step for the subblock, both motion information in the L0 direction and motion information in the L1 direction may be refined.

Figure 22:
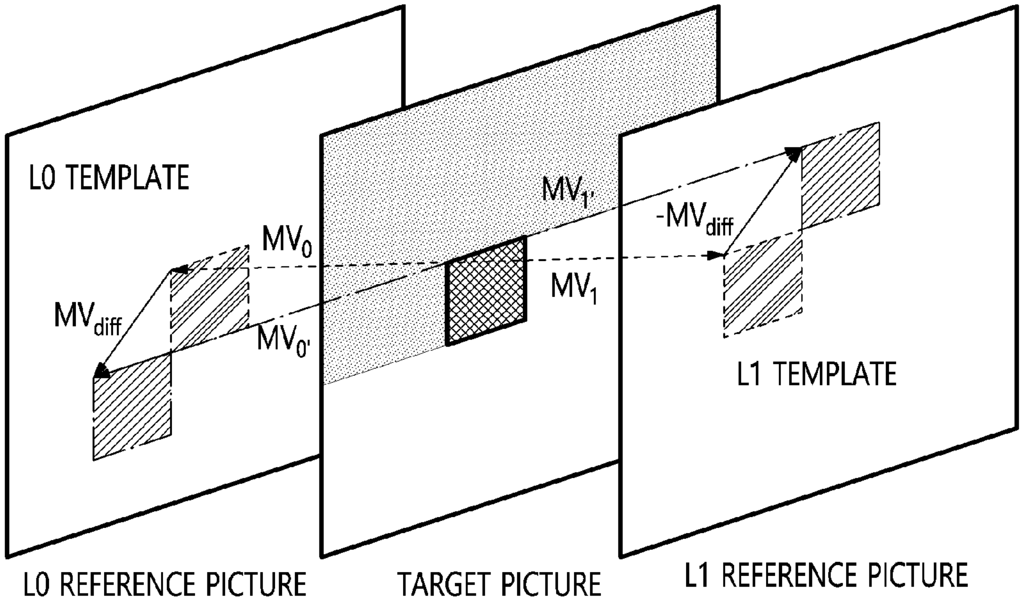
FIG. 22 illustrates bilateral matching according to an example.

FIG. 22 illustrates bilateral matching according to an example.

In FIG. 22, the case where BM_NUM at a motion information derivation step for the entire block in bilateral matching is 2 is illustrated.

MV0 may be initial motion information in L0 direction.

MV1 may be initial motion information in L1 direction.

$MV_{diff}$ may refer to a motion information refinement value derived through bilateral matching.

MV0' and MV1' may be pieces of motion information derived through bilateral matching.

In bilateral matching, the magnitude of the motion information refinement value for the L0 direction and the magnitude of the motion information refinement value for the L1 direction may be identical to each other. The direction of the motion information refinement value for the L0 direction and the direction of the motion information refinement value for the L1 direction may be opposite to each other. That is, the following Equations 3 and 4 may be satisfied.

$$MV0' = MV0 + MV_{diff} \quad \text{[Equation 3]}$$

$$MV1' = MV1 - MV_{diff} \quad \text{[Equation 4]}$$

The motion information refined through a decoder-side motion information derivation method may refer to the sum of the initial motion information and the motion information refinement value.

Decoder-Side Motion Vector (MV) Refinement (DMVR)

A decoder-side motion vector refinement mode may be a mode in which the refinement of motion information is performed using bilateral matching.

The decoder-side motion vector refinement mode may be decide-side motion vector refinement technology that is used in the case where POC intervals of reference pictures are identical to each other when bidirectional prediction is used.

The decoder-side motion vector refinement mode may be used when a specific condition is satisfied without being explicitly signaled.

For example, the decoder-side motion vector refinement mode may be performed only when a bidirectional merge mode is used for a target block and a first POC interval and a second POC interval are identical to each other. However, the condition for performing the decoder-side motion vector refinement mode is not limited to the above-described conditions. The first POC interval may be the difference between the POC of the target image and the POC of the reference image in L0 direction. The second POC interval may be the difference between the POC of the target image and the POC of the reference image in L1 direction.

Template Matching (TM)

Figure 23:
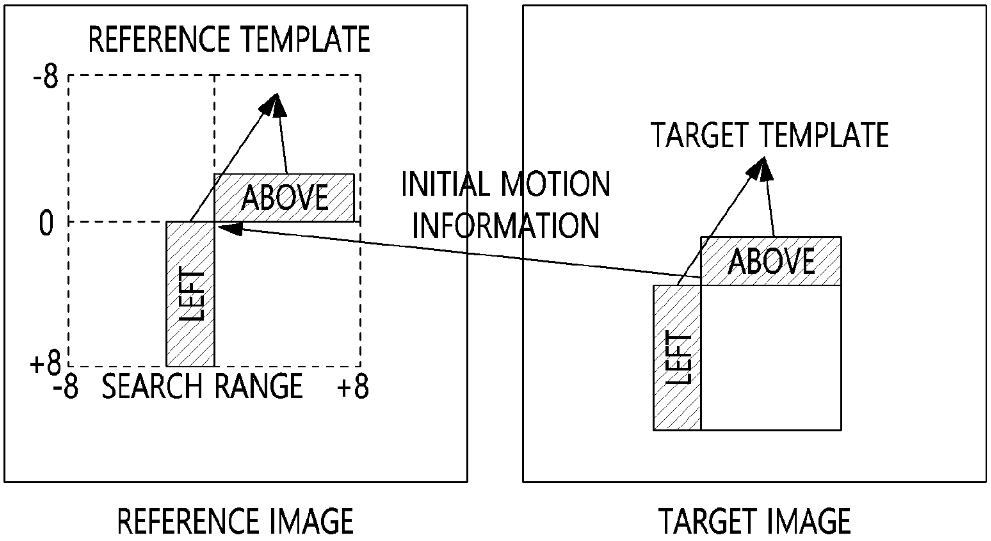
FIG. 23 illustrates template matching according to an embodiment.

FIG. 23 illustrates template matching according to an embodiment.

In template matching, motion information may be refined through the calculation of a cost function for templates of a target block and a reference block.

Template matching cost may refer to the result of calculation which uses the cost function for the template of the target block and the template of the reference block, which is used in template matching.

The reference block may be at least one of 1) a reference block indicated by initial motion information, 2) a reference block indicated by motion information derived in a template matching search process, and 3) a reference block indicated by motion information finally refined through template matching.

The motion information refined through template matching may be motion information having the lowest matching cost, derived in the template matching search process. However, a method for deriving the motion information is not limited to the above-described criteria.

For example, the template in template matching may include one or more of 1) a subset of pixels included in TMSIZE_LEFT lines adjacent to the left of the target block (or reference block) and 2) a subset of pixels included in TMSIZE_ABOVE lines adjacent to the top of the target block. However, a relationship between the location of the template and the location of the target block (or reference block) or a template configuration method is not limited to the above-described relationship or method. Here, each of TMSIZE_LEFT and TMSIZE_ABOVE may be a predefined value, and may be 0, 1, 2, 3, 4 or a positive integer of 4 or more. TMSIZE_LEFT and TMSIZE_ABOVE may be equal to each other. Alternatively, TMSIZE_LEFT and TMSIZE_ABOVE may be different from each other.

TMSIZE_LEFT and/or TMSIZE_ABOVE may be determined based on coding parameters. TMSIZE_LEFT and/or TMSIZE_ABOVE may be determined based on the motion information of the target block.

FIG. 24 illustrates a first relationship between a search pattern and resolution according to an example.

FIG. 25 illustrates a second relationship between a search pattern and resolution according to an example.

FIG. 26 illustrates a third relationship between a search pattern and resolution according to an example.

FIG. 27 illustrates a fourth relationship between a search pattern and resolution according to an example.

FIG. 28 illustrates a fifth relationship between a search pattern and resolution according to an example.

FIG. 29 illustrates a sixth relationship between a search pattern and resolution according to an example.

The search pattern and the resolution may be configured based on coding parameters for the target block and the motion information of the target block. The search pattern and resolution may vary depending on the coding parameters for the target block and the motion information of the target block.

The search pattern and the resolution at the search step of template matching may be configured based on the coding parameters or motion information of the target block depending on the order of tables shown in FIGS. 24 to 29.

For example, when an AMVP mode is used for the target block and resolution determined through adaptive motion vector resolution is 4-pel, a search for a diamond pattern using 4-pel search resolution is performed, after which a search for a cross pattern using the 4-pel search resolution may be performed.

In the tables of FIGS. 24 and 29, ALT_IF may denote the index of an adaptive interpolation filter. In order to calculate a pixel value at the sample location of specific resolution, an interpolation filter may be applied. An adaptive interpolation filter may be an interpolation filter selected by an index among multiple interpolation filters. In other words, when the adaptive interpolation filter is applied, different interpolation filters may be used depending on the index so as to calculate a pixel value at the sample location of specific resolution.

For example, the specific resolution may be half-pel. However, the specific resolution is not limited to the half-pel.

For example, the interpolation filter determined by the index may be one of a 6-tap interpolation filter and an 8-tap interpolation filter. However, a method for determining the interpolation filter is not limited to the above-described determination method.

Figure 30:
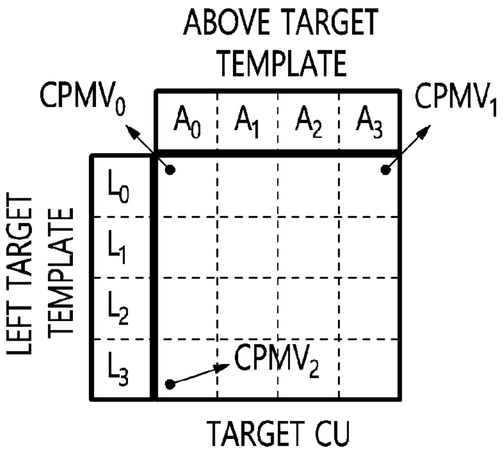
FIG. 30 illustrates a first template configuration method in an affine mode according to an example.

FIG. 30 illustrates a first template configuration method in an affine mode according to an example.

Figure 31:
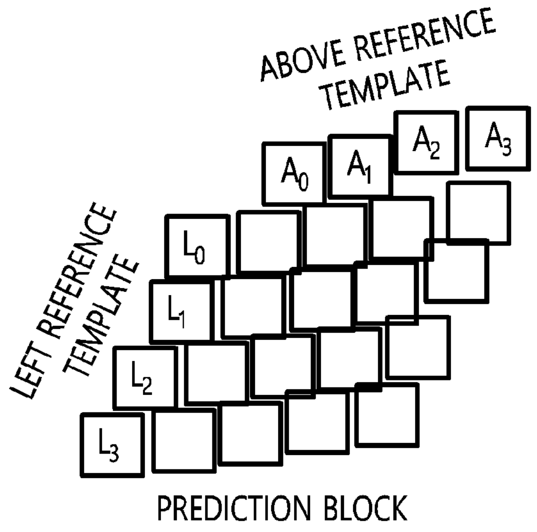
FIG. 31 illustrates a second template configuration method in an affine mode according to an example.

FIG. 31 illustrates a second template configuration method in an affine mode according to an example.

A CPMV may be an affine control point motion vector.

For example, template matching cost in the affine mode may be the sum of template matching costs of subblock templates A0, A1, A2, A3, L0, L1, L2, and L3, or the average of template matching costs of the subblock templates A0, A1, A2, A3, L0, L1, L2, and L3.

Motion Information

In embodiments, motion information includes one or more of a motion vector, a reference image index, an inter-prediction indicator, mode information, a merge flag, a motion information index, a reference image index, a prediction list usage flag, reference image list information, a reference image, a motion vector candidate, a motion information index, a merge candidate, a merge index, the magnitude of a motion vector difference, the sign of each component of the motion vector difference, the indicator of an overlapped block motion compensation mode, and the indicator of a local illumination compensation mode. However, the motion information is not limited to the above-described pieces of information.

Motion Information Search Method

A motion information search method may refer to an inter-prediction method including one or more decoder-side motion information derivation methods.

For example, when the motion information search method is performed on a target block, bidirectional inter-prediction may always be performed for the target block.

For example, when the motion information search method is performed on the target block, information about the inter-prediction direction of the target block may be signaled/encoded/decoded.

In the motion information search method, at least one of the configuration of a motion information candidate list and the determination of motion information may be performed.

The motion information candidate list may be a list including one or more motion information candidates. In the motion information search method, it can be considered that, even when only one motion information candidate is used, a motion information candidate list having a size of 1 is configured.

For example, in the motion information search method, one or more motion information candidate lists may be configured.

A decoder-side motion information derivation method in the motion information search method may be performed at least once in at least one of the configuration of a motion information candidate list and the determination of final motion information.

For example, in the motion information search method, DMVDMODE_NUM decoder-side motion information derivation methods may be performed. DMVDMODE_NUM may be 0 or a positive integer. The decoder-side motion information derivation methods may be identical to or different from each other.

In the motion information search method, decoder-side motion information derivation methods used in the configuration of the motion information candidate list may be identical to or different from each other.

In the motion information search method, decoder-side motion information derivation methods used in the determination of the motion information may be identical to or different from each other.

The decoder-side motion information derivation methods used in the motion information search method may be specified depending on a predefined scheme, and may be specified through signaling/encoding/decoding of information about the decoder-side motion information derivation methods.

For example, when a motion information candidate list is configured using two or more decoder-side motion information derivation methods, methods for specifying the decoder-side motion information derivation methods may be different from each other.

For example, when two or more decoder-side motion information derivation methods are used to determine the final motion information, methods for specifying the decoder-side motion information derivation methods may be different from each other.

For example, a first method for specifying a decoder-side motion information derivation method used to configure the motion information candidate list and a second method for specifying a decoder-side motion information derivation method used to determine the final motion information may be identical to each other. Alternatively, the first method and the second method may be different from each other.

For example, the decoder-side motion information derivation method may be specified using at least one of 1) the coding parameters of the target block, 2) the motion information of the target block, 3) a reference image for the target block, 4) the motion vector of the target block, 5) the coding parameters of a neighboring block, 6) the motion information of the neighboring block, 7) a reference image for the neighboring block, and 8) the motion vector of the neighboring block.

For example, when the target block satisfies the enabling condition of bilateral matching, bilateral matching may be specified as the decoder-side motion information derivation method. When the target block does not satisfy the enabling condition of bilateral matching, template matching may be specified as the decoder-side motion information derivation method.

When the target block satisfies neither the enabling condition of bilateral matching nor the enabling condition of template matching, the decoder-side motion information derivation method may not be performed on the target block. Alternatively, when the target block satisfies neither the enabling condition of bilateral matching nor the enabling condition of template matching, the motion information search method may not be performed on the target block.

In embodiments, the enabling condition of bilateral matching may indicate 1) the case where bidirectional inter-prediction is used for the target block, 2) the case where a first POC difference and a second POC difference are identical to each other, and 3) the case where a first direction and a second direction are different from each other. Alternatively, the enabling condition of bilateral matching may include 1) whether bidirectional inter-prediction is used for the target block, 2) whether a first POC difference and a second POC difference are identical to each other, and 3) whether a first direction and a second direction are different from each other. Here, the first POC difference may be the difference between the POC of a target image and the POC of a reference image in L0 direction. The second POC difference may be the difference between the POC of the target image and the POC of a reference image in L1 direction. The first direction may be a direction from the target image to the reference image in the L0 direction. The second direction may be a direction from the target image to the reference image in the L1 direction.

In embodiments, the enabling condition of bilateral matching may indicate 1) the case where bidirectional inter-prediction is used for the target block and 2) the case where the first direction and the second direction are different from each other. Alternatively, the enabling condition of bilateral matching may include 1) whether bidirectional inter-prediction is used for the target block and 2) whether the first direction and the second direction are different from each other. The first direction may be a direction from the target image to the reference image in the L0 direction. The second direction may be a direction from the target image to the reference image in the L1 direction.

For example, when the target block satisfies the enabling condition of bilateral matching, the refinement of motion information using bilateral matching in the motion information search method may be performed. When the target block does not satisfy the enabling condition of the target block, the refinement of the motion information using bilateral matching may not be performed when the motion information search method is performed.

Configuration of Motion Information Candidate List and Determination of Final Motion Information As described above with reference to steps 1810 and 1930, prediction information may include a motion information candidate list and final motion information, which will be described later. Determination of the prediction information may include the configuration of the motion information candidate list and the determination of the final motion information.

For example, the final motion information of the motion information search method or motion information derived from the final motion information may be determined to be motion information that is used for inter-prediction for the target block.

Image encoding/decoding may be performed using the motion information used for inter-prediction for the target block. For example, image encoding/decoding may include one or more of inter-prediction, transform, inverse transform, quantization, dequantization, entropy encoding/decoding, and in-loop filtering. However, image encoding/decoding is not limited to the above-listed processes.

For example, a reference block for the target block may be determined from the final motion information of the motion information search method or the motion information derived from the final motion information.

Image encoding/decoding may be performed using the determined reference block. For example, image encoding/decoding may include one or more of inter-prediction, transform, inverse transform, quantization, dequantization, entropy encoding/decoding, and in-loop filtering. However, image encoding/decoding is not limited to the above-described processes.

The motion information of a block on which the motion information search method is performed may be referenced by a neighboring block. The motion information referenced by the neighboring block may be at least one of 1) initial motion information of the motion information search method, and 2) motion information derived at each search step of the decoder-side motion information derivation method in the motion information search method.

For example, the target block may refer to the motion information of a neighboring block in a target image including the target block. Here, when the motion information search method is performed on the neighboring block, the motion information referenced by the neighboring block may be the initial motion information of the motion information search method.

For example, the target block may refer to the motion information of a neighboring block in an additional image other than the target image including the target block. Here, when the motion information search method is performed on the neighboring block, the motion information referenced by the neighboring block may be the final motion information of the motion information search method.

For example, the target block may refer to motion information of a neighboring block in an additional image other than the target image including the target block. Here, when the motion information search method is performed on the neighboring block, motion information referenced by the neighboring block may be motion information refined at a first search step of the motion information search method.

For example, the target block may refer to motion information of a neighboring block in an additional image other than the target image including the target block. Here, when the motion information search method is performed on the neighboring block, motion information corresponding to one of the initial motion information and the final motion information of the motion information search method for the neighboring block may be selected. The selected motion information may be determined to be motion information referenced by the neighboring block. For example, this selection may be performed based on matching costs of pieces of motion information.

For example, of two pieces of motion information, motion information having lower template matching cost or lower bilateral matching cost may be selected and referenced.

When the motion information search method is performed on the target block, in-loop filtering may be performed on the target block and/or the neighboring block.

When in-loop filtering is performed on the target block and/or the neighboring block, information related to an in-loop filter may be determined based on the motion information of the target block and/or the neighboring block.

The information related to the in-loop filter may be one or more of 1) information indicating whether the in-loop filter is applied, 2) the coefficient of the in-loop filter, 3) a filter tap for the in-loop filter, 4) the shape of the in-loop filter, and 5) the type of in-loop filter. However, the information related to the in-loop filter is not limited to the above-listed pieces of information.

The motion information of the target block used to determine the information related to the in-loop filter may include one or more of 1) the initial motion information of the motion information search method and 2) motion information derived at each search step of the decoder-side motion information derivation method in the motion information search method.

For example, the motion information of the target block used to determine the information related to the in-loop filter may be the initial motion information of the motion information search method.

For example, the motion information of the target block used to determine the information related to the in-loop filter may be the final motion information of the motion information search method.

For example, the motion information of the target block used to determine the information related to the in-loop filter may be motion information refined at the first search step of the motion information search method.

For example, when the difference between the motion information of the target block and the motion information of the neighboring block is less than or equal to a specific value, a deblocking filter having low strength may be used. For example, when the difference between the motion information of the target block and the motion information of the neighboring block is greater than the specific value, a deblocking filter having high strength may be used.

The specific value may be a positive integer. The specific value may be at least one of 1, 2, 4, 8, and 16. However, the specific value is not limited to the above-listed values.

The in-loop filter may be at least one of the deblocking filter and an adaptive in-loop filter. However, the in-loop filter is not limited to the above-listed filters.

For example, DMVDMODE_FLAG may be an indicator indicating whether the motion information search method for the target block is performed. When encoding/decoding is performed on DMVDMODE_FLAG, a probability model and/or a context model may be used. The probability model and/or the context model used to perform encoding/decoding on DMVDMODE_FLAG of the target block may be determined depending on a predefined condition.

For example, the probability model and/or the context model may be determined based on the weights in inter bi-prediction with weights for the target block.

For example, the probability model and/or the context model may be determined depending on whether a weight for L0 direction and a weight for the L1 direction in inter bi-prediction with weights are identical to each other. A probability model and/or a context model may be selected from among a plurality of probability models and/or a plurality of context models depending on whether the weight in the L0 direction and the weight for the L1 direction are identical to each other.

For example, the probability model and/or the context model may be determined based on 1) whether an affine mode is performed on the target block and/or 2) an affine mode indicator.

For example, for the case where the affine mode is performed on the target block and the case where the affine mode is not performed on the target block, different probability models and/or different context models may be determined, respectively.

For example, for the case where the value of the affine mode indicator of the target block is 0 (or false) and the case where the value of the affine mode indicator of the target block is 1 (or true), different probability models and/or different context models may be determined, respectively.

For example, the probability model and/or the context model may be determined based on whether the target block satisfies the enabling condition of bilateral matching or part of the enabling condition.

For example, for the case where the target block satisfies the enabling condition of bilateral matching and the case where the target block does not satisfy the enabling condition of bilateral matching, different probability models and/or different context models may be determined, respectively.

For example, the probability model and/or the context model may be determined based on whether the target block satisfies the enabling condition of template matching or part of the enabling condition.

For example, for the case where the target block satisfies the enabling condition of template matching and the case where the target block does not satisfy the enabling condition of template matching, different probability models and/or different context models may be determined, respectively.

The predefined condition may be a condition in which one or more of 1) the size of the target block, 2) the magnitude of a motion vector, 3) the enabling condition of template matching, 4) the enabling condition of bilateral matching, 5) the direction of inter-prediction, 6) the index of inter bi-prediction with weights, 7) the index of Adaptive Motion Vector Resolution (AMVR), 8) the indicator of an overlapped block motion compensation mode, and 9) the indicator of a local illumination compensation mode are used. However, the predefined condition is not limited to the condition in which the above-listed information is used.

The inter bi-prediction with weights may determine a combination of weights of reference blocks in units of coding blocks when the target block is generated using a reference block in L0 direction and a reference block in L1 direction. For example, the weight of each reference block may be determined by signaling/encoding/decoding the index of a predefined table including weights.

The overlapped block motion compensation mode may be a mode in which at least two prediction blocks are generated and a weighted sum of the prediction blocks is used as a final prediction block. The weighted sum may be applied to a part of the block or the entire block. For example, a part of the block may be a set of pixels or a set of locations, corresponding to the boundary surface of the block.

The local illumination compensation mode may be a mode in which at least one of a weight and an offset is derived by calculating a correlation between the template of the target block and the template of the reference block, and at least one of the derived weight and the derived offset is multiplied by or added to a part of the target block or the entire target block.

In embodiments, a description that a specific mode is not performed on the target block may mean that the indicator of the specific mode of the target block has a specific value. The specific value may be 0 or false.

In embodiments, a description that a specific mode is performed on the target block may mean that the indicator of the specific mode of the target block has a specific value. The specific value may be 1 or true.

In embodiments, a description that the indicator of the specific mode of the target block has a specific value may mean that the specific mode is not performed on the target block. The specific value may be 0 or false.

In embodiments, a description that the indicator of the specific mode of the target block has a specific value may mean that the specific mode is performed on the target block. The specific value may be 1 or true.

In embodiments, whether the motion information search method is performed on the target block may be determined by signaling/encoding/decoding the indicator DMVDMODE_FLAG.

In embodiments, a description indicating that DMVDMODE_FLAG has a first value may mean that a motion information search method is not performed on the target block. The first value may be 0 or false.

In embodiments, a description indicating that DMVDMODE_FLAG has a second value may mean that the motion information search method is performed on the target block. The second value may be 1 or true.

In embodiments, a description that the motion information search method is not performed on the target block may mean that DMVDMODE_FLAG for the target block has a specific value. The specific value may be 0 or false.

In embodiments, a description that the motion information search method is performed on the target block may mean that DMVDMODE_FLAG for the target block has a specific value. The specific value may be 1 or true.

For example, the motion information search method may be performed on the target block only when the target block satisfies a predefined condition.

For example, signaling/encoding/decoding of DMVDMODE_FLAG may be performed only when the target block satisfies the predefined condition.

For example, the motion information search method may always be performed on the target block when the target block satisfies a predefined condition.

The predefined condition may be a condition in which one or more of 1) the size of the target block, 2) the magnitude of a motion vector, 3) the enabling condition of template matching, 4) the enabling condition of bilateral matching, 5) the direction of inter-prediction, 6) the index of inter bi-prediction with weights, 7) the index of Adaptive Motion Vector Resolution (AMVR), 8) the indicator of an overlapped block motion compensation mode, and 9) the indicator of a local illumination compensation mode are used. Alternatively, the predefined condition may be a condition in which coding parameters are used. However, the predefined condition is not limited to the condition in which the above-listed pieces of information are used.

For example, inter bi-prediction with weights may be used for the block. In this case, the motion information search method may be performed on the block only when the weight for L0 direction of the block and the weight for L1 direction of the block are identical to each other. In other words, the motion information search method may be performed only on the blocks having identical weights. Here, the weights may be weights in inter bi-prediction with weights.

For example, signaling/encoding/decoding of the index of inter bi-prediction with weights may be performed only when a motion information search method is not performed on the target block.

For example, DMVDMODE_FLAG may be the indicator of the motion information search method. Signaling/encoding/decoding of the index of inter bi-prediction with weights may be performed only when DMVDMODE_FLAG of the target block has a specific value. For example, the specific value may be 0 or false.

Alternatively, whether the motion information search method is performed may be encoded/decoded only when the weights in inter bi-prediction with weights are identical to each other for the L0 and L1 directions of the target block.

When the motion information search method is performed on the target block, the weight for the L0 direction and the weight for the L1 direction in inter bi-prediction with weights may be set to identical values.

For example, the motion information search method the target block may be performed on the target block only when adaptive motion vector resolution is not used or when adaptive motion vector resolution is identical to default resolution.

Signaling/encoding/decoding of the index of adaptive motion vector resolution may be performed only when a motion information search method is not performed on the target block.

Alternatively, information indicating whether the motion information search method is performed may be signaled/encoded/decoded only when adaptive motion vector resolution is not used for the target block or when adaptive motion vector resolution is identical to the default resolution.

In embodiments, the default resolution may refer to motion vector resolution when adaptive motion vector resolution is not applied.

When the motion information search method is performed on the target block, adaptive motion vector resolution may not be used for the target block, and adaptive motion vector resolution may be set to be identical to the default resolution.

For example, whether the motion information search method is performed may be determined based on whether bidirectional inter-prediction is performed for the block. The motion information search method may be performed only on the block for which bidirectional inter-prediction is performed.

Signaling/encoding/decoding of an inter-prediction direction may be performed only when a motion information search method is not performed on the target block.

For example, information indicating whether the motion information search method is performed may be signaled/encoded/decoded only when inter bi-prediction is used for the target block.

For example, when the motion information search method is performed on the target block, bidirectional inter-prediction may be performed for the target block.

For example, the motion information search method may be performed only when an affine mode is not used for the target block. Alternatively, the motion information search method may be performed only when an indicator indicating whether the affine mode is performed on the target block has 0 or a false value.

For example, signaling/encoding/decoding of the indicator indicating whether the affine mode is performed may be performed only when a motion information search method is not performed on the target block.

For example, an indicator indicating whether the motion information search method is performed may be signaled/encoded/decoded only when an affine mode is not performed on the target block.

For example, the motion information search method may be performed only when a first direction and a second direction are different from each other. The first direction may be a direction from the target image to L0_REFPIC_MINPOC. The second direction may be a direction from the target image to L1_REFPIC_MINPOC. Alternatively, the motion information search method may be performed only when the first direction and the second direction are different from each other and a first POC interval and a second POC interval are different from each other. The first POC interval may be the difference between the POC of the target image and the POC of L0_REFPIC_MINPOC. The second POC interval may be the difference between the POC of the target image and the POC of L1_REFPIC_MINPOC.

For example, signaling/encoding/decoding of a reference image index may be skipped when the motion information search method is performed on the target block. Signaling/encoding/decoding of the reference image index may be performed only when a motion information search method is not performed on the target block.

When the motion information search method is performed on the target block, a reference image in the L0 direction of the target block and a reference image in the L1 direction of the target block may be L0_REFPIC_MINPOC and L1_REFPIC_MINPOC, respectively.

For example, upon performing the motion information search method, signaling/encoding/decoding of DMVDMODE_FLAG may be performed only when the first direction and the second direction are different from each other. The first direction may be a direction from the target image to L0_REFPIC_MINPOC. The second direction may be a direction from the target image to L1_REFPIC_MINPOC. Alternatively, upon performing the motion information search method, signaling/encoding/decoding of DMVDMODE_FLAG may be performed only when the first direction and the second direction are different from each other and the first POC interval and the second POC interval are different from each other. The first POC interval may be the difference between the POC of the target image and the POC of L0_REFPIC_MINPOC. The second POC interval may be the difference between the POC of the target image and the POC of L1_REFPIC_MINPOC.

L0_REFPIC_MINPOC may be a reference image having a minimum POC interval among reference images in a reference image list for the L0 direction. The POC interval of the reference image may be the difference between the POC of the target image and the POC of the reference image.

The L1_REFPIC_MINPOC may be a reference image having a minimum POC interval among reference images in a reference image list for the L1 direction. The POC interval of the reference image may be the difference between the POC of the target image and the POC of the reference image.

Whether the motion information search method is performed on the target block may be determined at one or more levels of a sequence level, a picture level, a tile level, a tile group level, a slice level, a Coding Tree Unit (CTU) level, a Coding Unit (CU) level, and a Prediction Unit (PU) level. However, the level at which the determination is performed is not limited to the above-listed levels.

For example, information indicating whether the motion information search method is performed may be first signaled/encoded/decoded when signaled/encoded/decoded mergeFlag has a first value after mergeFlag is signaled/encoded/decoded. mergeFlag may be an indicator indicating whether a merge mode is used for the target block. The first value may be 0 or false. When mergeFlag has the first value, an AMVP mode may be performed on the target block.

For example, information indicating whether the motion information search method is performed may be first signaled/encoded/decoded when signaled/encoded/decoded mergeFlag has a second value after mergeFlag is signaled/encoded/decoded. mergeFlag may be an indicator indicating whether the merge mode is used for the target block. The second value may be 1 or true. When mergeFlag has the first value, an AMVP mode may be performed on the target block.

For example, the final motion information of the motion information search method may be determined to be motion information used for inter-prediction of the target block. Alternatively, motion information derived from the final motion information of the motion information search method may be determined to be motion information used for inter-prediction of the target block. Image encoding/decoding may be performed using the motion information used for inter-prediction for the target block. For example, an encoding/decoding process may include one of inter-prediction, transform, inverse transform, quantization, dequantization, entropy encoding/decoding, and in-loop filtering. However, image encoding/decoding is not limited to the above-listed processes.

The motion information of a block to which the motion information search method is applied may be referenced by a neighboring block. The motion information referenced by the neighboring block may be one or more of the initial motion information of the motion information search method, or motion information derived at each search step of the motion information search method.

Configuration of Motion Information Candidate List and Determination of Final Motion Information Hereinafter, a method for configuring a motion information candidate list in a motion information search method will be described.

For example, when a motion information candidate list is configured in the motion information search method, a motion information candidate may be derived from initial motion information.

For example, when a motion information candidate list is configured in the motion information search method, reordering may be performed on candidates in the motion information candidate list.

For example, each candidate in the motion information candidate list may be the initial motion information or motion information generated by refining the initial motion information.

For example, the motion information candidate list may be configured using only the motion information satisfying a specific condition.

Here, the specific information may include the enabling condition (or part of the enabling condition) of a decoder-side motion information derivation method.

For example, the decoder-side motion information derivation method may be one of decoder-side motion information derivation methods used at the final motion information determination step of the motion information search method.

For example, when the decoder-side motion information derivation method performed to configure the motion information candidate list is a decoder-side motion information derivation method that can be performed only for bidirectional prediction, the motion information candidate list may be configured using only motion information candidates having bidirectional motion information.

For example, when the decoder-side motion information derivation method performed to configure the motion information candidate list is bilateral matching, the motion information candidate list may be configured using only motion information candidates having bidirectional motion information.

For example, when the motion information candidate list is configured, the motion information candidate list may be configured using only motion information satisfying the following conditions 1) to 3).

Condition 1) motion information indicates bidirectional inter-prediction.

Condition 2) the first POC difference and the second POC difference of the motion information are identical to each other. Here, the first POC difference may be the difference between POC of a target image and POC in L0 direction. Here, the second POC difference may be the difference between POC of the target image and POC in L1 direction.

Condition 3) the first direction and second direction of the motion information are different from each other. Here, the first direction may be a direction from the target image to a reference image in the L0 direction. The second direction may be a direction from the target image to the reference image in the L1 direction.

For example, when the motion information candidate list is configured, the motion information candidate list may be configured using only motion information satisfying the following conditions 1) and 3).

The motion information candidate list may be equally configured for L0 and L1 directions. Alternatively, the motion information candidate list may be configured differently for L0 and L1 directions.

For example, each motion information candidate in the motion information candidate list may include one or more of motion information in L0 direction and motion information in L1 direction. That is, each motion information candidate in the motion information candidate list may be unidirectional motion information in the L0 direction, unidirectional motion information in the L1 direction, or bidirectional motion information.

For example, a single integrated motion information candidate list may be configured for the L0 direction and L1 direction.

For example, when motion information specified from the motion information candidate list includes both motion information in the L0 direction and motion information in the L1 direction, bidirectional inter-prediction may be performed for the target block.

For example, when the reference direction of the motion information specified from the motion information candidate list is bidirectional, bidirectional inter-prediction may be performed for the target block.

For example, when motion information specified from the motion information candidate list includes only one of motion information in the L0 direction and motion information in the L1 direction, unidirectional inter-prediction may be performed for the target block.

For example, when the reference direction of the motion information specified from the motion information candidate list is unidirectional, unidirectional inter-prediction may be performed for the target block.

For example, motion information candidate lists may be configured differently for L0 direction and L1 direction.

For example, a motion information candidate list for specific direction TEMP_DIR may be configured to include unidirectional motion information and/or bidirectional motion information in TEMP_DIR direction.

For example, the motion information in the TEMP_DIR direction may be determined based on the motion information specified from the motion information candidate list for the specific direction TEMP_DIR.

When the specified motion information includes both motion information in L0 direction and motion information in L1 direction, motion information in TEMP_DIR direction may be determined using only motion information in the TEMP_DIR direction of the motion information in the L0 direction and the motion information in the L1 direction which are included in the specific motion information.

When the reference direction of the specified motion information is bidirectional, the motion information in the TEMP_DIR direction may be determined using only the motion information in the TEMP_DIR direction of the specific motion information.

For example, for LX direction, a motion information candidate list may be configured using the same scheme as a scheme for configuring a merge candidate list, and for L(1−X) direction, a motion information candidate list may be configured using the same scheme as a scheme for configuring a candidate list in an AMVP mode.

For example, for LX direction, a motion information candidate list may be configured using the same scheme as a scheme for configuring a candidate list in an AMVP mode, and for L(1−X) direction, a motion information candidate list may be configured using the same scheme as a scheme for configuring a merge candidate list.

In an embodiment, the schemes for configuring each list may be classified by 1) an order in which candidates in the list are referenced, 2) motion information referenced by a neighboring block, and 3) motion information candidates constituting the list.

In embodiments, a description that a scheme for configuring a first list and a scheme for configuring a second list are identical to each other may mean that first detailed schemes used to configure the first list and second detailed schemes used to configure the second list may be identical to each other. Here, the detailed schemes may include 1) an order in which candidates in each list are referenced, 2) motion information referenced by a neighboring block, and 3) motion information candidates constituting each list.

In embodiments, a description that the scheme for configuring the first list and the scheme for configuring the second list are identical to each other may not be limited only to a meaning that first detailed schemes used to configure the first list and second detailed schemes used to configure the second list are identical to each other. In other words, when at least one of 1) the order in which candidates in each list are referenced, 2) motion information referenced by a neighboring block, and 3) motion information candidates constituting the list is equally applied to the configuration of the first list and the configuration of the second list, the two lists may be considered to be configured using the same scheme. Here, a description indicating that motion information candidates constituting the list are identical to each other may mean that all of motion information candidates are identical to each other. Alternatively, a description indicating that motion information candidates constituting the list are identical to each other may mean that some of motion information candidates are identical to each other.

For example, in the case where bidirectional inter-prediction is performed for the target block when the motion information search method is performed, motion information in the LX direction may be determined by signaling/encoding/decoding of the motion information.

For example, the motion information in the L(1−X) direction may be determined by signaling/encoding/decoding of the motion information.

For example, the motion information in the L(1−X) direction may be determined using a decoder-side motion information derivation method without signaling/encoding/decoding the motion information.

For example, the motion information in the L(1−X) direction may be determined using the motion information in the LX direction.

For example, the motion information in the L(1−X) direction may be a candidate having the lowest matching cost among candidates in the motion information candidate list for the L(1−X) direction. Here, the matching cost of each candidate may be the bilateral matching cost between the candidate and motion information in the LX direction.

For example, motion information that is signaled/encoded/decoded may be identical to the motion information that is signaled/encoded/decoded so as to determine motion information for unidirectional prediction in the AMVP mode. The motion information that is signaled/encoded/decoded may include a portion of the motion information that is signaled/encoded/decoded so as to determine motion information for unidirectional prediction in the AMVP mode.

For example, the motion information that is signaled/encoded/decoded may include one or more of a reference image index, a motion vector difference, and a motion information index.

For example, when the target block satisfies the enabling condition of template matching, signaling/encoding/decoding of the motion information index for the LX direction may not be performed, and the motion information index for the LX direction may be determined using the template matching cost. The motion information index for the LX direction may be an index indicating a candidate having the lowest template cost among candidates in the motion information candidate list for the LX direction.

For example, X may be 0, 1 or a positive integer. X may be a predefined value.

For example, the predefined value may be 0.

For example, the predefined value may be a value indicating a direction having lower matching cost of L0 direction and L1 direction. Here, matching cost may be matching cost of the motion information.

For example, the predefined value may be a value indicating a direction having higher matching cost of L0 direction and L1 direction. Here, matching cost may be matching cost of the motion information.

X may be determined through signaling/encoding/decoding.

For example, in the case where bidirectional inter-prediction is used for the target block when the motion information search method is performed, motion information or a portion of the motion information may be signaled/encoded/decoded only for the LX direction.

For example, the motion information in the L(1−X) direction may be determined through signaling/encoding/decoding of the motion information.

For example, the motion information in the L(1−X) direction may be determined using the decoder-side motion information derivation method.

For example, the motion information in the L(1−X) direction may be determined using the motion information in the LX direction.

For example, the motion information in the L(1−X) direction may be a candidate having the lowest matching cost among candidates in the motion information candidate list for the L(1−X) direction. Here, the matching cost of each candidate may be the bilateral matching cost between the candidate and motion information in the LX direction.

For example, when the target block satisfies the enabling condition of template matching, the motion information index in the LX direction may be determined using template matching cost. The motion information index for the LX direction may be an index indicating a candidate having the lowest template cost among candidates in the motion information candidate list for the LX direction.

For example, when a motion information candidate list is configured in the motion information search method, the decoder-side motion information derivation method may be performed only when the motion information index is less than or equal to DMVD_IDXTHRES.

For example, when a motion information candidate list is configured in the motion information search method, the decoder-side motion information derivation method may be performed only when the motion information index is equal to or greater than DMVD_IDXTHRES.

DMVD_IDXTHRES may be 0, 1, 2 or a positive integer.

DMVD_IDXTHRES may be a predefined value.

For example, when an initial motion information candidate list is configured in the motion information search method, the maximum size of the initial motion information candidate list may be determined based on whether the target block satisfies the enabling condition (or part of the enabling condition) of a specific decoder-side motion information derivation method.

For example, when an refined motion information candidate list is determined in the motion information search method, the maximum size of the refined motion information candidate list may be determined based on whether the target block satisfies the enabling condition (or part of the enabling condition) of the specific decoder-side motion information derivation method.

For example, when the target block satisfies the enabling condition of the specific decoder-side motion information derivation method, the maximum size of the motion information candidate list may be MAXIDX_ENABLED. When the target block does not satisfy the enabling condition of the specific decoder-side motion information derivation method, the maximum size of the motion information candidate list may be MAXIDX_DISABLED. The motion information candidate list may be the initial motion information candidate list or the refined motion information candidate list.

For example, when the initial motion information candidate list is configured in the motion information search method, the number of candidates constituting the motion information candidate list may be determined based on whether the target block satisfies the enabling condition (or part of the enabling condition) of the specific decoder-side motion information derivation method.

For example, when the initial motion information candidate list is configured in the motion information search method, the number of candidates constituting the motion information candidate list may be determined based on whether the target block satisfies the enabling condition (or part of the enabling condition) of the specific decoder-side motion information derivation method.

For example, motion information may be specified from the motion information candidate list using a motion information index in the motion information search method. When the target block satisfies the enabling condition of the specific decoder-side motion information derivation method, the motion information index may have a value falling within a range from 0 to MAXIDX_ENABLED. When the target block does not satisfy the enabling condition of the specific decoder-side motion information derivation method, the motion information index may have a value falling within a range from 0 to MAXIDX_DISABLED. The motion information candidate list may be the initial motion information candidate list or the refined motion information candidate list.

For example, motion information may be specified from the motion information candidate list using a motion information index in the motion information search method. The range of the motion information index value and/or the maximum value of the motion information index may be determined based on whether the target block satisfies the enabling condition (or part of the enabling condition) of the specific decoder-side motion information derivation method. The motion information candidate list may be the initial motion information candidate list or the refined motion information candidate list.

For example, in the motion information search method, a motion information candidate list may be configured. When the target block satisfies the enabling condition of the specific decoder-side motion information derivation method, the initial motion information candidate list may be configured using MAXIDX_ENABLED motion information candidates. When the target block does not satisfy the enabling condition of the specific decoder-side motion information derivation method, the initial motion information candidate list may be configured using MAXIDX_DISABLED motion information candidates. The motion information candidate list may be the initial motion information candidate list or the refined motion information candidate list.

For example, motion information may be specified from the motion information candidate list using the motion information index in the motion information search method. When the target block satisfies the enabling condition of a specific decoder-side motion information derivation method, the maximum value of the motion information index may be a value falling within a range from 0 to MAXIDX_ENABLED. When the target block does not satisfy the enabling condition of a specific decoder-side motion information derivation method, the maximum value of the motion information index may be a value falling within a range from 0 to MAXIDX_DISABLED. The motion information candidate list may be the initial motion information candidate list or the refined motion information candidate list.

The specific decoder-side motion information derivation method may be predefined.

The specific decoder-side motion information derivation method may be one of template matching and bilateral matching. However, the specific decoder-side motion information derivation method is not limited to the above-listed methods.

MAXIDX_ENABLED may be a predefined value, and may be 0, 1, 2, 3, 6, 12, 48, 96 or a positive integer.

MAXIDX_DISABLED may be a predefined value, and may be 0, 1, 2, 3, 6, 12, 48, 96 or a positive integer.

Figure 32:
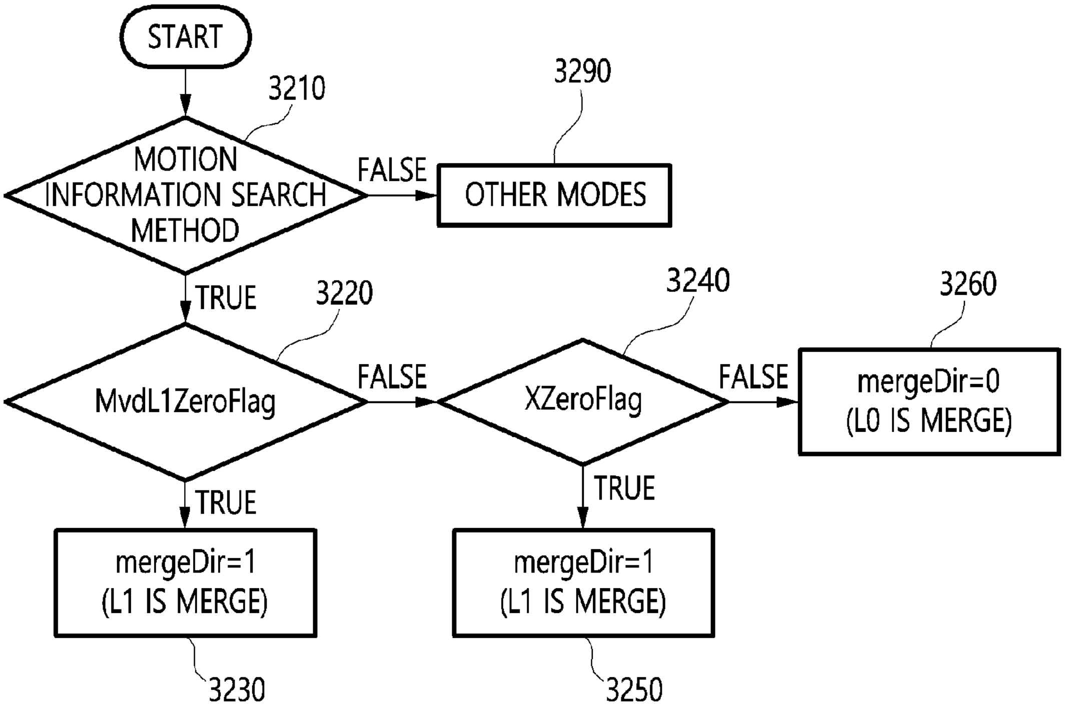
FIG. 32 is a first flowchart illustrating a method for selecting a scheme for configuring a motion information candidate list according to an example.

FIG. 32 is a first flowchart illustrating a method for selecting a scheme for configuring a motion information candidate list according to an example.

Figure 33:
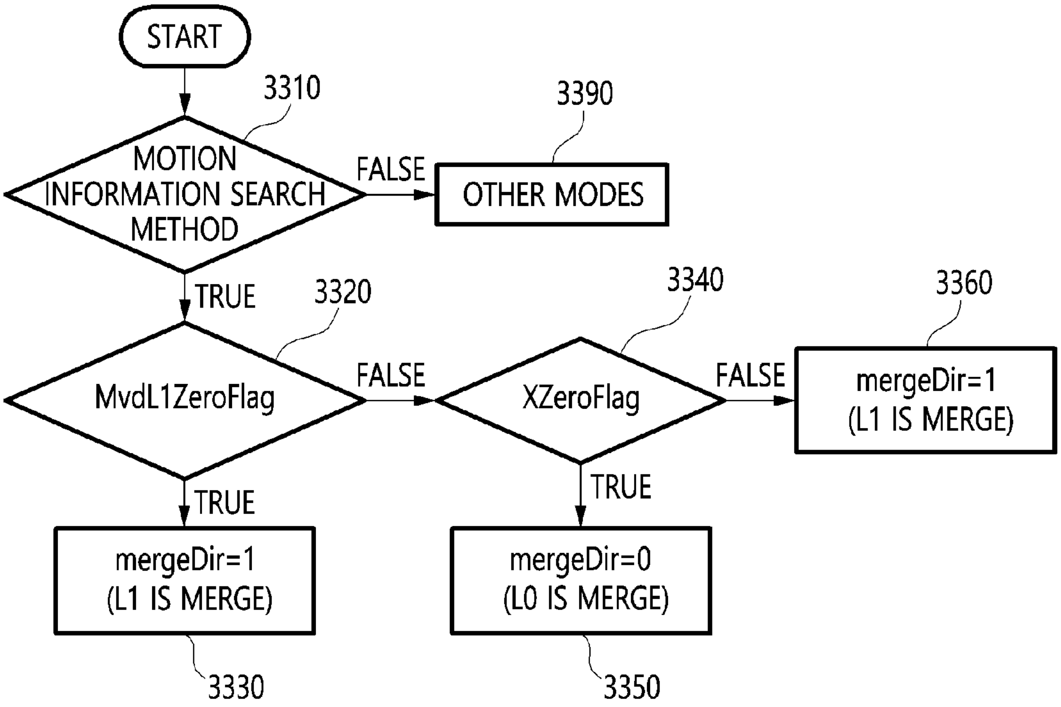
FIG. 33 is a second flowchart illustrating a method for selecting a scheme for configuring a motion information candidate list according to an example.

FIG. 33 is a second flowchart illustrating a method for selecting a scheme for configuring a motion information candidate list according to an example.

Figure 34:
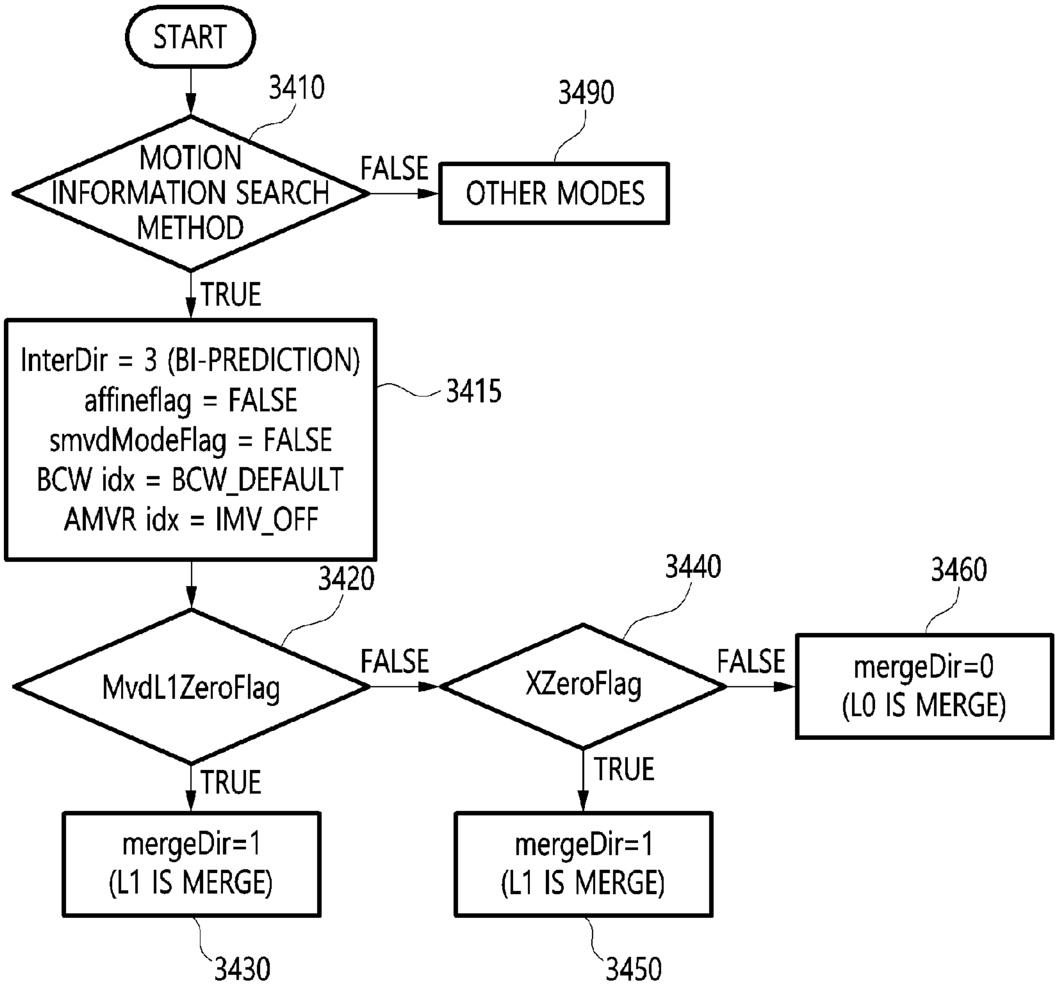
FIG. 34 is a third flowchart illustrating a method for selecting a scheme for configuring a motion information candidate list according to an example.

FIG. 34 is a third flowchart illustrating a method for selecting a scheme for configuring a motion information candidate list according to an example.

Figure 35:
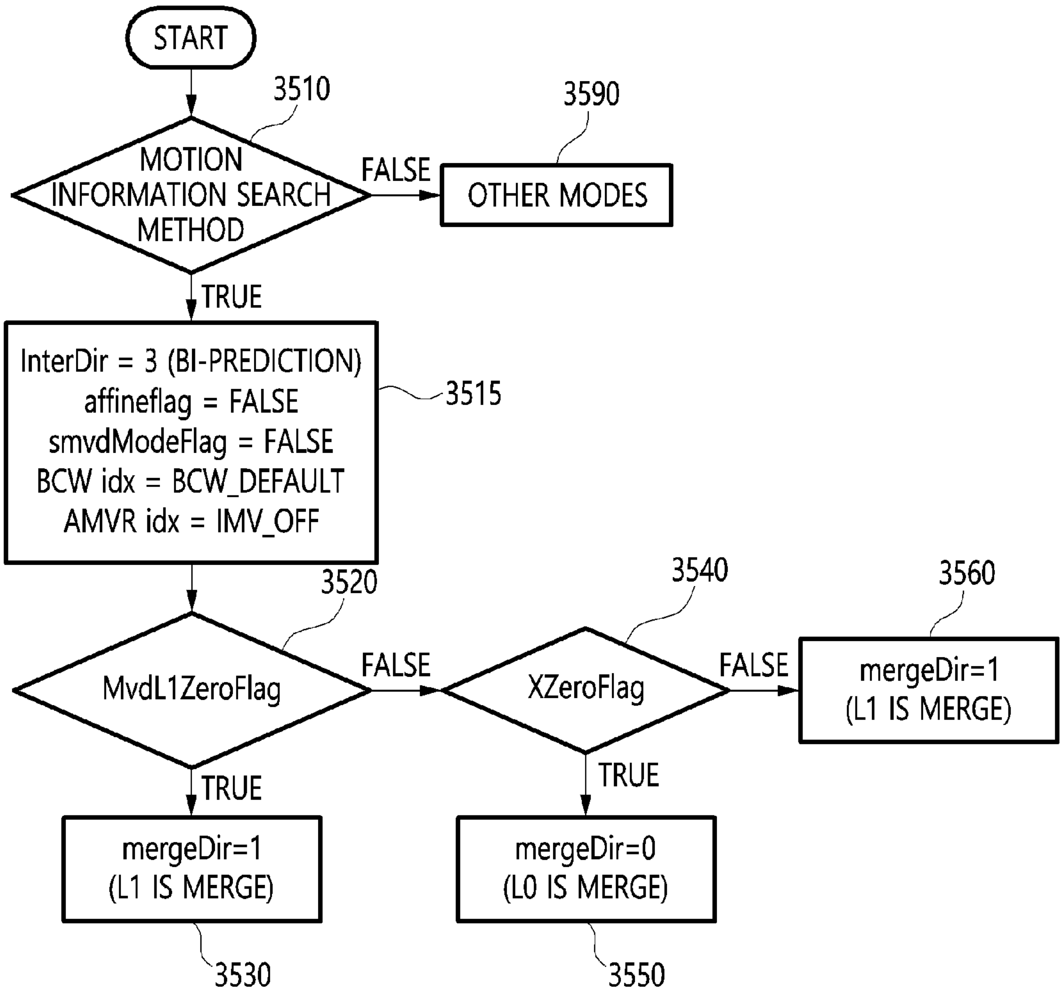
FIG. 35 is a fourth flowchart illustrating a method for selecting a scheme for configuring a motion information candidate list according to an example.

FIG. 35 is a fourth flowchart illustrating a method for selecting a scheme for configuring a motion information candidate list according to an example.

First, reference is made to FIG. 32.

At step 3210, whether a motion information search method according to an embodiment is performed may be determined.

When it is determined that the motion information search method according to the embodiment is performed, step 3220 may be performed.

When it is determined that the motion information search method according to the embodiment is not performed, step 3290 may be performed.

At step 3220, the value of MvdL1ZeroFlag may be checked.

When MvdL1ZeroFlag is true, step 3230 may be performed.

When MvdL1ZeroFlag is false, step 3240 may be performed.

At step 3230, mergeDir may be set to 1. A motion information candidate list for L1 direction may be configured using the same scheme as a scheme for configuring a merge candidate list.

At step 3240, the value of XZeroFlag may be checked.

When XZeroFlag is true, step 3250 may be performed.

When XZeroFlag is false, step 3260 may be performed.

At step 3250, mergeDir may be set to 1. The motion information candidate list for the L1 direction may be configured using the same scheme as the scheme for configuring a merge candidate list.

At step 3260, mergeDir may be set to 0. A motion information candidate list for L0 direction may be configured using the same scheme as the scheme for configuring a merge candidate list.

At step 3290, prediction modes other than the motion information search method may be used.

Next, reference is made to FIG. 33.

Steps 3210, 3220, 3230, 3240, 3250, 3260, and 3290, described above with reference to FIG. 32, may respectively correspond to steps 3310, 3320, 3330, 3340, 3350, 3360, and 3390 of FIG. 33. Repetitive descriptions will be omitted here.

At step 3330, mergeDir may be set to 1. A motion information candidate list for L1 direction may be configured using the same scheme as a scheme for configuring a merge candidate list.

At step 3350, mergeDir may be set to 0. A motion information candidate list for L0 direction may be configured using the same scheme as a scheme for configuring a merge candidate list.

At step 3360, mergeDir may be set to 1. A motion information candidate list for L1 direction may be configured using the same scheme as a scheme for configuring a merge candidate list.

Next, reference is made to FIG. 34.

Steps 3210, 3220, 3230, 3240, 3250, 3260, and 3290, described above with reference to FIG. 32, may respectively correspond to steps 3410, 3420, 3430, 3440, 3450, 3460, and 3490 of FIG. 34. Repetitive descriptions will be omitted here.

Steps of FIG. 34 may further include step 3415.

Depending on the determination at step 3410, when the motion information search method according to the embodiment is performed, step 3415 may be performed.

At step 3415, InterDir may be set to 3. When InterDir is 3, bi-prediction may be performed. affineFlag may be set to false. smvdModeFlag may be set to false. BCW idx may be set to BCW_DEFALUT. AMVR idx may be set to IMV_OFF.

After step 3415 is performed, step 3420 may be performed.

Next, reference is made to FIG. 35.

Steps 3410, 3415, 3420, 3430, 3440, 3450, 3460, and 3490, described above with reference to FIG. 34, may respectively correspond to steps 3510, 3515, 3520, 3530, 3540, 3550, 3560, and 3590 of FIG. 35. Repetitive descriptions will be omitted here.

At step 3530, mergeDir may be set to 1. A motion information candidate list for L1 direction may be configured using the same scheme as a scheme for configuring a merge candidate list.

At step 3550, mergeDir may be set to 0. A motion information candidate list for L0 direction may be configured using the same scheme as a scheme for configuring a merge candidate list.

At step 3560, mergeDir may be set to 1. A motion information candidate list for L1 direction may be configured using the same scheme as a scheme for configuring a merge candidate list.

Hereinafter, conditions, information, processing, etc., illustrated in FIGS. 32 to 34 will be described in detail.

MVDL1ZeroFlag may be an indicator indicating whether signaling/encoding/decoding is to be performed on information related to a motion vector difference in L1 direction. For example, MVDL1ZeroFlag may be determined in a picture parameter set. However, MVDL1ZeroFlag is not limited to be determined only in the picture parameter set.

For example, MVDL1ZeroFlag equal to a first value may indicate that signaling/encoding/decoding is performed on the motion vector difference in the L1 direction in the target image. The first value may be 0 or false. However, the first value is not limited to 0 or false.

For example, MVDL1ZeroFlag equal to a second value may indicate that signaling/encoding/decoding is not performed on the motion vector difference in the L1 direction in the target image. The second value may be 1 or true. However, the second value is not limited to 1 or true.

InterDir may be an indicator for a reference direction.

When InterDir has a first value, unidirectional inter-prediction in L0 direction may be performed for the target block. The first value may be 1. However, the first value is not limited to 1.

When InterDir has a second value, unidirectional inter-prediction in L1 direction may be performed for the target block. The second value may be 2. However, the second value is not limited to 2.

When InterDir has a third value, bidirectional inter-prediction may be performed for the target block. The third value may be 3. However, the third value is not limited to 3.

affineFlag may be an indicator indicating whether an affine mode is performed. smvdModeFlag is an indicator indicating whether a symmetric motion vector difference mode is performed.

affineFlag equal to a first value may mean that an affine mode is not performed on the target block. The first value may be 0 or false. However, the first value is not limited to 0 or false.

affineFlag equal to a second value may mean that an affine mode is performed on the target block. The second value may be 1 or true. However, the second value is not limited to 1 or true.

smvdModeFlag equal to a first value may mean that a symmetric motion vector difference mode is not performed on the target block. The first value may be 0 or false. However, the first value is not limited to 0 or false.

smvdModeFlag equal to a second value may mean that a symmetric motion vector difference mode is performed on the target block. The second value may be 1 or true. However, the second value is not limited to 1 or true.

BCW idx may be the index of inter bi-prediction with weights.

AMVR idx may be the index of adaptive motion vector resolution.

Based on the BCW idx, a weight in L0 direction and a weight in L1 direction in inter bi-prediction with weights for the target block may be determined. A prediction block for the target block may be generated by applying a weighted sum that uses the weight in the L0 direction and the weight in the L1 direction to a reference block in the L0 direction and a reference block in the L1 direction for the target block. The prediction block for the target block may be the weighted sum of the reference block in the L0 direction and the reference block in the L1 direction. In the weighted sum, the weight in the L0 direction may be applied to the reference block in the L0 direction, and the weight in the L1 direction may be applied to the reference block in the L1 direction.

BCW idx equal to BCW_DEFAULT may mean that the weight in the L0 direction and the weight in the L1 direction for inter bi-prediction with weights of the target block are identical to each other.

BCW idx equal to BCW_DEFAULT may mean that the weight in the L0 direction and the weight in the L1 direction for inter bi-prediction with weights of the target block are identical to each other. Alternatively, BCW idx equal to BCW_DEFAULT may mean that inter bi-prediction with weights is not performed for the target block.

BCW_DEFAULT may be 0, 2 or a positive integer.

IMV_OFF may be 0, 1 or a positive integer.

The resolution in adaptive motion vector resolution (AMVR) of the target block may be determined based on AMVR idx.

AMVR idx equal to IMV_OFF may mean that adaptive motion vector resolution is not used.

AMVR idx equal to IMV_OFF may mean that the resolution in adaptive motion vector resolution is identical to default resolution. Here, the default resolution may refer to motion vector resolution when adaptive motion vector resolution is not applied.

Other modes may refer to an additional prediction method and/or additional prediction methods other than the motion information search method.

For example, when the motion information candidate list for the L0 direction and the motion information candidate list for L1 direction are configured differently, signaling/encoding/decoding may be performed based on the methods described with reference to FIGS. 34 and 35.

Here, XZeroFlag may be an indicator used to determine a scheme for configuring a motion information candidate list for each of the L0 direction and the L1 direction.

"mergeDir=0" or "L0 is merge" may mean that the motion information candidate list for the L0 direction is configured using the same scheme as a scheme for configuring a merge candidate list. Here, the motion information candidate list for L1 direction may be configured using the same scheme as a scheme for configuring a candidate list in an AMVP mode.

"mergeDir=1" or "L1 is merge" may mean that the motion information candidate list for the L1 direction is configured using the same scheme as a scheme for configuring a merge candidate list. Here, the motion information candidate list for L0 direction may be configured using the same scheme as the scheme for configuring a candidate list in an AMVP mode.

For example, the motion information or part of the motion information may be signaled/encoded/decoded only for L(1−XZeroFlag) direction of the L0 and L1 directions. In this case, signaling/encoding/decoding may be performed based on the methods described with reference to FIGS. 34 and 35.

XZeroFlag may be signaled/encoded/decoded.

XZeroFlag may be an indicator indicating which one of motion information in L0 direction and motion information in L1 direction is used to perform signaling/encoding/decoding.

"mergeDir=0" or "L0 is merge" may indicate that signaling/encoding/decoding is performed only for the motion information in the L1 direction of the motion information in the L0 direction and the motion information in the L1 direction.

"mergeDir=1" or "L1 is merge" may indicate that signaling/encoding/decoding is performed only for the motion information in the L0 direction of the motion information in the L0 direction and the motion information in the L1 direction.

In embodiments, a motion information candidate in each direction may include one or more of the motion information in the L0 direction and the motion information in the L1 direction.

For example, the motion information candidates in the L0 direction may include the motion information in the L0 direction or the motion information in the L0 and L1 directions.

For example, even though the motion information candidate includes both the motion information in the L0 direction and the motion information in the L1 direction, only the L0 direction motion information of the motion information candidate may be used. Even though the motion information candidate includes both the motion information in the L0 direction and the motion information in the L1 direction, only the L1 direction motion information of the motion information candidate may be used.

For example, reordering may be performed on the order of candidates in the motion information candidate list.

For example, reordering may be performed using the decoder-side motion information derivation method. However, a reordering method is not limited to the decoder-side motion information derivation method.

For example, the same decoder-side motion information derivation method may be applied both to the L0 direction and to the L1 direction.

For example, different decoder-side motion information derivation methods may be applied to the L0 direction and L1 direction, respectively.

For example, for LX direction, candidates in the motion information candidate list may be reordered in ascending order of template matching cost. For L(1−X) direction, candidates in the motion information candidate list may be reordered in ascending order of bilateral matching cost. X may be 0, 1 or a positive integer. Information indicating X may be signaled/encoded/decoded.

For example, the candidates in the motion information candidate list may be reordered in ascending order of the matching costs of the candidates.

For example, the matching cost may be template matching cost.

For example, motion information candidate lists for multiple directions may be differently configured. Here, when motion information MVP_LX for the LX direction is specified, the candidates in the motion information candidate list for the L(1−X) direction may be reordered using the MVP_LX.

For example, each motion information candidate in the motion information candidate list may include one or more of motion information in L0 direction and motion information in L1 direction. That is, each motion information candidate in the motion information candidate list may be unidirectional motion information in the L0 direction, unidirectional motion information in the L1 direction, or bidirectional motion information.

For example, when motion information specified from the motion information candidate list includes both motion information in the L0 direction and motion information in the L1 direction, bidirectional inter-prediction may be performed for the target block. For example, when the reference direction of the motion information specified from the motion information candidate list is bidirectional, bidirectional inter-prediction may be performed for the target block.

For example, when motion information specified from the motion information candidate list includes only one of motion information in the L0 direction and motion information in the L1 direction, unidirectional inter-prediction may be performed for the target block. For example, when the reference direction of the motion information specified from the motion information candidate list is unidirectional, unidirectional inter-prediction may be performed for the target block.

For example, $MVP\_L(1-X)_i$ may denote an i-th motion information candidate in the motion information candidate list for the L(1−X) direction. For each $MVP\_L(1-X)_i$, matching cost for motion information ($MVP\_LX$, $MVP\_L(1-X)_i$) or motion information ($MVP\_L(1-X)_i$, $MVP\_LX$) may be calculated. The candidates in the motion information candidate list for the L(1−X) direction may be reordered in ascending order of matching cost. Here, a reordering method is not limited to the above-described methods.

X may be 0, 1 or a positive integer.

Information indicating X may be signaled/encoded/decoded.

For example, $MVP\_LX_i$ may refer to i-th candidate motion information included in the motion information candidate list for the LX direction.

For example, motion information candidate lists for multiple directions may be differently configured. Here, when motion information MVP_LX for the LX direction is specified, the motion information candidate list for the L(1−X) direction may be reconfigured using the MVP_LX.

For example, $MVP\_L(1-X)_i$ may denote each motion information candidate in the motion information candidate list for the L(1−X) direction. The following process may be applied to each $MVP\_L(1-X)_i$. When motion information ($MVP\_LX$, $MVP\_L(1-X)_i$) or motion information ($MVP\_L(1-X)_i$, $MVP\_LX$) does not satisfy a specific condition, $MVP\_L(1-X)_i$ may be removed from the motion information candidate list for the ¬L(1−X) direction. Here, X may be 0, 1 or a positive integer. Information indicating X may be signaled/encoded/decoded. A reconfiguration method is not limited to the above-described methods. Here, the above-described specific information may be the enabling condition (or part of the enabling condition) of a decoder-side motion information derivation method.

$MVP\_L(1-X)_i$ may denote each motion information candidate in the motion information candidate list for the L(1−X) direction. The following process may be applied to each $MVP\_L(1-X)_i$. $MVP\_L(1-X)_i$ may be used as a motion information candidate for the ¬L(1−X) direction only when motion information ($MVP\_LX$, $MVP\_L(1-X)_i$) or motion information ($MVP\_L(1-X)_i$, $MVP\_LX$) satisfies the specific condition. Here, X may be 0, 1 or a positive integer. Information indicating X may be signaled/encoded/decoded. The reconfiguration method is not limited to the above-described methods. Here, the above-described specific information may be the enabling condition (or part of the enabling condition) of a decoder-side motion information derivation method.

For example, motion information candidate lists for multiple directions may be differently configured. Here, when motion information MVP_LX for the LX direction is specified, the motion information candidate list for the L(1−X) direction may be configured using the MVP_LX.

The motion information candidate list for the L(1−X) direction may be configured such that, for each motion information candidate $MVP\_L(1-X)_i$, motion information ($MVP\_LX$, $MVP\_L(1-X)_i$) or motion information ($MVP\_L(1-X)_i$, $MVP\_LX$) satisfies a specific condition. Here, $MVP\_L(1-X)_i$ may denote each motion information candidate in the motion information candidate list for the L(1−X) direction. X may be 0, 1 or a positive integer. Information indicating X may be signaled/encoded/decoded. The reconfiguration method is not limited to the above-described methods. Here, the above-described specific information may be the enabling condition (or part of the enabling condition) of the decoder-side motion information derivation method.

In order to determine each motion information candidate $MVP\_L(1-X)_i$, information of a neighboring block may be referenced. The motion information candidate list for the L(1−X) direction may be configured using only a neighboring block that allows, for each motion information candidate $MVP\_L(1-X)_i$, motion information ($MVP\_LX$, $MVP\_L(1-X)_i$) or motion information ($MVP\_L(1-X)_i$, $MVP\_LX$) to always satisfy the specific condition. Here, the above-described specific information may be the enabling condition (or part of the enabling condition) of the decoder-side motion information derivation method.

For example, the above-described specific condition may include conditions related to 1) whether bidirectional inter-prediction is used for a target block, 2) whether a first POC difference and a second POC difference are equal to each other, and 3) whether a first direction and a second direction are different from each other. The first POC difference may be the difference between the POC of the target image and the POC of the reference image in L0 direction. The second POC difference may be the difference between the POC of the target image and the POC of the reference image in L1 direction. The first direction may be a direction from the target image to the reference image in the L0 direction. The second direction may be a direction from the target image to the reference image in the L1 direction.

For example, a description indicating that the specific condition is satisfied may mean that 1) bidirectional inter-prediction is used for the target block, 2) the first POC difference and the second POC difference are identical to each other, and 3) the first direction and the second direction are different from each other.

For example, the above-described specific condition may include conditions related to 1) whether bidirectional inter-prediction is used for the target block and 2) whether the first direction and the second direction are different from each other. The first direction may be a direction from the target image to the reference image in the L0 direction. The second direction may be a direction from the target image to the reference image in the L1 direction.

For example, a description indicating that the specific condition is satisfied may mean that 1) bidirectional inter-prediction is used for the target block and 2) the first direction and the second direction are different from each other.

Motion information in the LX direction may be specified using a predefined index. Alternatively, the motion information in the LX direction may be specified by signaling/encoding/decoding coding parameters for determining the motion information in the LX direction.

For example, the predefined index may be 0.

For example, the predefined index may be the index value of a motion information candidate having the lowest matching cost among the motion information candidates in the LX direction.

For example, the predefined index may be the index value of a motion information candidate having the highest matching cost among the motion information candidates in the LX direction.

Figure 36:
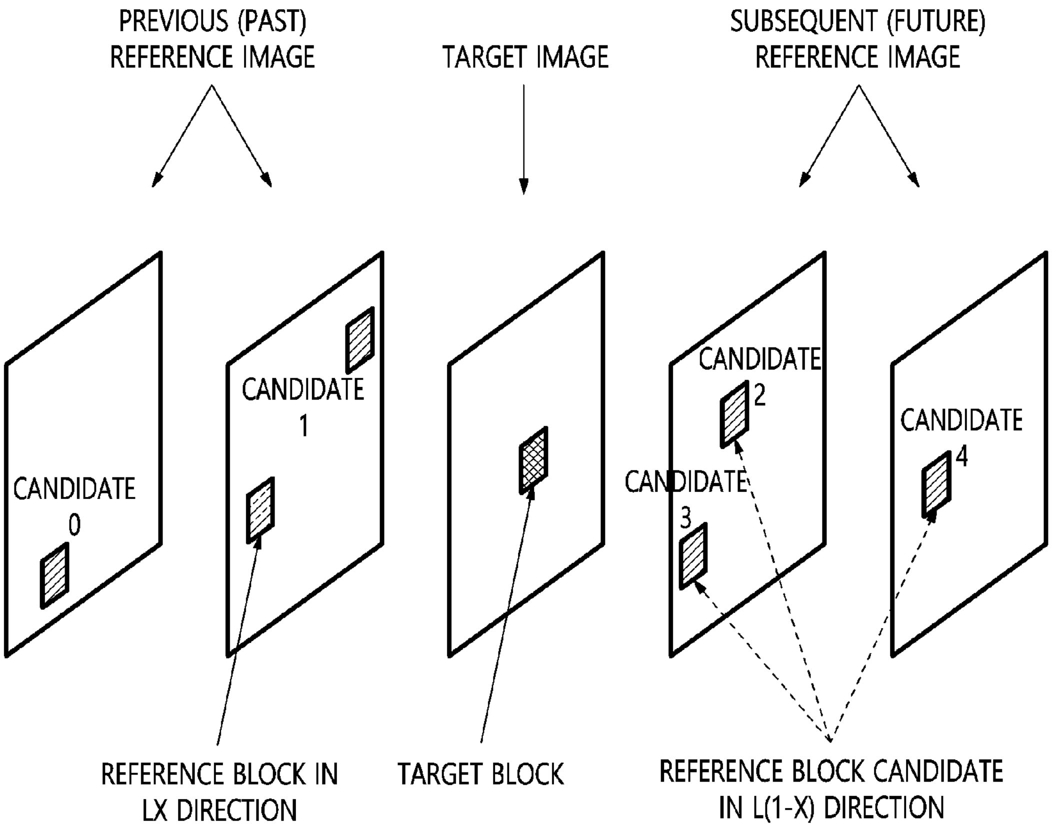
FIG. 36 illustrates reconfiguration of a motion information candidate list according to an embodiment.

FIG. 36 illustrates reconfiguration of a motion information candidate list according to an embodiment.

In FIG. 36, the reconfiguration of a motion information candidate list for L(1−X) direction is illustrated.

A target image may be an image including a target block.

A past reference image may be an image having a POC smaller than that of the target image.

A future reference image may be an image having a POC larger than that of the target image.

An LX direction reference block may be specified by 1) a predefined index and/or 2) motion information MVP_LX. Motion information MVP_LX may be determined by signaling/encoding/decoding.

Candidate 0 to candidate 4 may refer to motion information candidate $MVP\_L1_i$ in L(1−X) direction before reconfiguration. i may be an integer that is equal to or greater than 0 and less than or equal to 4. A motion information candidate list for the L(1−X) direction may be reconfigured such that motion information (MVP_L0, $MVP\_L1_i$) satisfies the enabling condition (or part of the enabling condition) of bilateral matching.

Therefore, among the motion information candidates in the L(1−X) direction illustrated in FIG. 36, candidate 0 and candidate 1 may be removed from the motion information candidate list for the L(1−X) direction. The reason for this is that the direction of MVP_LX and the direction of candidate 0 to a reference image are identical to each other, and the direction of MVP_LX and the direction of candidate 1 to the reference image are identical to each other.

Consequently, the motion information candidate list for the L(1−X) direction may be reconfigured to include only candidate 2, candidate 3, and candidate 4. Alternatively, consequently, the motion information candidate list for the L(1−X) direction may be reconfigured to include candidate 2, candidate 3, candidate 4, and at least one new motion information candidate.

In embodiments, the case where the LX direction reference image is a past reference image has been described. The LX direction reference image may not be limited to past reference images. The LX direction reference image may be a future reference image.

In embodiments, the enabling condition of bilateral matching may be a condition related to 1) whether bidirectional inter-prediction is used for the target block, 2) whether a first POC difference and a second POC difference are identical to each other, and 3) whether a first direction and a second direction are different from each other. The first POC difference may be the difference between the POC of the target image and the POC of a reference image in L0 direction. The second POC difference may be the difference between the POC of the target image and the POC of a reference image in L1 direction. The first direction may be a direction from the target image to the reference image in the L0 direction. The second direction may be a direction from the target image to the reference image in the L1 direction.

In embodiments, the enabling condition of bilateral matching may be a condition related to 1) whether bidirectional inter-prediction is used for the target block and 2) whether the first direction and the second direction are different from each other. The first direction may be a direction from the target image to the reference image in the L0 direction. The second direction may be a direction from the target image to the reference image in the L1 direction.

A value indicating X may be predefined.

For example, the predefined value may be 0.

For example, the predefined value may be a value indicating a direction having lower matching cost of L0 direction and L1 direction. Here, the matching cost may be matching cost of the motion information.

For example, the predefined value may be a value indicating a direction having higher matching cost of the L0 direction and the L1 direction. Here, the matching cost may be matching cost of the motion information.

A value indicating X may be signaled/encoded/decoded.

Motion information in the LX direction may be specified using a predefined index. Alternatively, the motion information in the LX direction may be specified by signaling/encoding/decoding coding parameters for determining the motion information in the LX direction.

For example, the predefined index may be 0.

For example, the predefined index may be the index value of a motion information candidate having the lowest matching cost among the motion information candidates in the LX direction.

For example, the predefined index may be the index value of a motion information candidate having the highest matching cost among the motion information candidates in the LX direction.

For example, the motion information candidate list may be reconfigured using only some of motion information candidates in the motion information candidate list. Alternatively, some of the candidates in the motion information candidate list may be removed from the list.

When this reconfiguration or removal is performed, the maximum value of the index may be reduced. Due to the reduction of the maximum value of the index, the number of bits required for information indicating the index in a process of signaling/encoding/decoding the information indicating the index may be decreased.

For example, candidates having an index equal to or greater than MVPLIST_NUM may be removed from each motion information candidate list. Here, MVPLIST_NUM may be predefined. Alternatively, different MVPLIST_NUM values may be used for motion information candidate lists. MVPLIST_NUM may be 1, 2 or a positive integer.

Determination of Final Motion Information in Motion Information Search Method

The final motion information determined in the motion information search method or motion information derived from the final motion information may be determined to be motion information that is used for inter-prediction for the target block. An image encoding/decoding process may be performed using the motion information that is used for inter-prediction for the target block. The encoding/decoding process may include one or more of inter-prediction, transform, inverse transform, quantization, dequantization, entropy encoding/decoding, and in-loop filtering. However, image encoding/decoding is not limited to the above-described processes.

For example, a reference block for the target block may be determined using the final motion information determined through the motion information search method or the motion information derived from the final motion information. An image encoding/decoding process may be performed using the determined reference block. The encoding/decoding process may include one or more of inter-prediction, transform, inverse transform, quantization, dequantization, entropy encoding/decoding, and in-loop filtering. However, image encoding/decoding is not limited to the above-described processes.

For example, the final motion information may refer to the motion information determined from the motion information candidate list. Alternatively, the final motion information may refer to motion information derived from the motion information determined from the motion information candidate list.

At least one piece of final motion information may be determined in the motion information search method.

For example, the final motion information may be determined from the motion information candidate list.

The motion information candidate list may refer to an initial motion information candidate list or a refined motion information candidate list.

For example, the final motion information may be determined using a motion information index.

For example, the motion information index may be a predefined value.

The predefined value may be the smallest index value. For example, the predefined value may be 0.

When the predefined value is used, the number of bits required for signaling may be reduced. Due to the reduction of the number of bits, encoding efficiency may be improved.

For example, the motion information index may be an index determined through signaling/encoding/decoding.

The motion information index may be determined through a rate-distortion optimization process. By means of this determination, the encoding efficiency of the target block may be improved.

For example, the motion information index may be an index derived using a decoder-side motion information derivation method.

The motion information index may be the index value of a motion information candidate having the lowest matching cost among the motion information candidates in the motion information candidate list.

The decoder-side motion information derivation method may be one or more of bilateral matching and template matching. However, the type of the decoder-side motion information derivation method is not limited to bilateral matching and/or template matching.

For example, the same decoder-side motion information derivation method may be used for L0 direction and L1 direction.

For example, different decoder-side motion information derivation methods may be used for L0 direction and L1 direction, respectively.

For example, when the motion information index is determined, a motion information index in LX direction may be determined by comparing the template matching costs of the motion information candidates in the LX direction. The motion information index in L(1−X) direction may be determined by comparing bilateral matching costs of the motion information candidates in the L(1−X) direction.

X may be a predefined value.

X may be 0, 1 or a positive integer.

Information indicating X may be signaled/encoded/decoded.

The bilateral matching cost of the motion information candidate in L(1−X) direction may be bilateral matching cost between the motion information candidate in L(1−X) direction and motion information in LX direction.

For example, the final motion information may be specified using the decoder-side motion information derivation method.

For example, the specified motion information may be a motion information candidate having the lowest matching cost among the motion information candidates in the motion information candidate list.

The decoder-side motion information derivation method may be one or more of bilateral matching and template matching. However, the type of the decoder-side motion information derivation method is not limited to bilateral matching and/or template matching.

For example, the same decoder-side motion information derivation method may be used for L0 direction and L1 direction.

For example, different decoder-side motion information derivation methods may be used for L0 direction and L1 direction, respectively.

For example, when the motion information is specified, the motion information in LX direction may be specified using the template matching cost of the motion information candidate in the LX direction, and the motion information in the L(1−X) direction may be specified using bilateral matching cost of the motion information candidate in the L(1−X) direction.

X may be 0, 1 or a positive integer.

Information indicating X may be signaled/encoded/decoded.

The bilateral matching cost of the motion information candidate in L(1−X) direction may be bilateral matching cost between the motion information candidate in L(1−X) direction and motion information in LX direction.

For example, when the motion information is specified, template matching cost may be used for the LX direction, and bilateral matching cost may be used for the L(1−X) direction. X may be 0, 1 or a positive integer. Information indicating X may be signaled/encoded/decoded.

The same final motion information determination method may be used for the L0 direction and the L1 direction.

For example, the final motion information in the L0 direction and the final motion information in the L1 direction may be determined by signaling/encoding/decoding the motion information index.

For example, the final motion information in the L0 direction and the final motion information in the L1 direction may be determined by signaling/encoding/decoding the motion information index for each direction.

Different final motion information determination methods may be used for the L0 direction and the L1 direction, respectively.

For example, for the LX direction, motion information MVP_LX may be determined using a predefined scheme and/or an index determined by signaling/encoding/decoding, and the MVP_LX may be used to determine motion information in the L(1−X) direction.

For example, $MVP\_L(1-X)_i$ may denote each motion information candidate in the motion information candidate list for the L(1−X) direction. The following process may be applied to each $MVP\_L(1-X)_i$. $MVP\_L(1-X)_i$ may be used to determine the motion information in the L(1−X) direction only when the motion information ($MVP\_LX$, $MVP\_L(1-X)_i$) or motion information ($MVP\_L(1-X)_i$, $MVP\_LX$) satisfies the enabling condition (or part of the enabling condition) of a specific decoder-side motion information derivation method.

The specific decoder-side motion information derivation method may be one of decoder-side motion information derivation methods used in the motion information search method for the target block. For example, the decoder-side motion information derivation method may be bilateral matching.

For example, the final motion information in the LX direction may be derived using only N candidates having the smallest index among the candidates in the motion information candidate list for the LX direction. N may be 1, 2 or a positive integer. X may be 0, 1 or a positive integer. Information indicating X may be signaled/encoded/decoded.

For example, the motion information candidate list for the LX direction may be reconfigured to include only N motion information candidates having the smallest index among the motion information candidates in the motion information candidate list for the LX direction. N may be 1, 2 or a positive integer. X may be 0, 1 or a positive integer. Information indicating X may be signaled/encoded/decoded.

For example, the final motion information may be determined by utilizing a predefined scheme and/or signaling/encoding/decoding of motion information in $LX_{signal}$ direction. Thereafter, for $L(1-LX_{signal})$ direction, candidates in the motion information candidate list may be reordered in ascending order of matching cost for specific motion information. Here, when $LX_{signal}$ is 0, the specific motion information may be ($MVP\_L0$, $MVP\_L1_i$). When $LX_{signal}$ is 1, the specific motion information may be ($MVP\_L0_i$, $MVP\_L1$). The final motion information in the $L(1\text{-}LX_{signal})$ direction may be determined by a predefined scheme and/or signaling/encoding/decoding of the motion information. However, the scheme for determining the motion information in each direction is not limited to the above-described scheme.

For example, the final motion information in the $L(1-X_{signal})$ direction may be reconfigured to include only N motion information candidates having the smallest index among motion information candidates in a motion information candidate list for $L(1-X_{signal})$ direction. N may be 1, 2 or a positive integer. X may be 0, 1 or a positive integer. Information indicating X may be signaled/encoded/decoded.

For example, the motion information candidate list for the $L(1-X_{signal})$ direction may be reconfigured to include only N motion information candidates having the smallest index among motion information candidates in a motion information candidate list for $L(1-X_{signal})$ direction. N may be 1, 2 or a positive integer. X may be 0, 1 or a positive integer. Information indicating X may be signaled/encoded/decoded.

$X_{signal}$ may be a predefined value. Alternatively, $X_{signal}$ may be determined by signaling/encoding/decoding the information indicating $X_{signal}$.

Processes Applied to Final Motion Information in Motion Information Search Method One or more of processes, which will be described later, may be applied to the final motion information in the motion information search method. The motion information to which the processes, which will be described, are applied may be used as the final motion information of the motion information search method.

The final motion information may be refined using the decoder-side motion information derivation method.

The final motion information may be refined using a motion information offset.

For example, a motion vector difference may be added to the final motion information.

For example, the motion information offset may be added to the final motion information.

For example, the final motion information or a portion of the final motion information may be changed to the same value as the motion information offset.

For example, for each of the L0 direction and the L1 direction, the final motion information of the motion information search method may be determined. Next, refined motion information may be generated by performing refinement on the final motion information in at least one of L0 direction and L1 direction using the decoder-side motion information derivation method. Next, the refined motion information may be used as the final motion information.

For example, a direction to which the refinement of the motion information is applied may be a predefined direction.

For example, the direction to which the refinement of the motion information is applied may be a direction having higher template matching cost of the L0 direction and the L1 direction. Here, the template matching cost for the specific direction may be template matching cost of motion information in the specific direction.

For example, the direction to which the refinement of the motion information is applied may be a direction having lower template matching cost of the L0 direction and the L1 direction. Here, the template matching cost for the specific direction may be template matching cost of motion information in the specific direction.

For example, the refinement of motion information using the decoder-side motion information derivation method may always be individually performed on the final motion information of the motion information search method for the L0 direction and on the final motion information of the motion information search method for the L1 direction.

For example, information about the direction in which the refinement of motion information is to be performed may be signaled/encoded/decoded.

For example, when the matching cost of the final motion information of the motion information search method is equal to or greater than THRES_FOR_AFTERREFINE, the refinement of the final motion information may be performed using the decoder-side motion information derivation method, and the refined motion information may be used as the final motion information. THRES_FOR_AFTERREFINE may be the product of the number of pixels in a target block and a specific value. The specific value may be 0, 1, 2, 4, 8 or a positive integer.

For example, the decoder-side motion information derivation method used to refine the motion information of the motion information search method may be at least one of template matching, bilateral matching, and optical flow-based motion information prediction technology.

For example, $X_{signal}$ may be determined based on a predefined scheme or signaled/encoded/decoded information. For the determined $X_{signal}$, motion information in $LX_{signal}$ direction may be determined based on 1) comparison between template matching costs and/or 2) signaling/encoding/decoding of motion information in the $LX_{signal}$ direction. Next, among motion information candidates in $L(1-X_{signal})$ direction, a motion information candidate having the lowest matching cost may be set as motion information in the $L(1-X_{signal})$ direction. Here, the matching cost of the motion information candidate may be bilateral matching cost with the motion information in the $LX_{signal}$ direction. Alternatively, two motion information candidates having the lowest matching cost may be selected from among motion information candidates in the $L(1-X_{signal})$ direction. Here, the matching cost of the motion information candidate may be bilateral matching cost with the motion information in the $LX_{signal}$ direction. Of the two selected motion candidates, one motion information candidate may be specified. Here, an index may be used to specify the motion information candidate. Signaling/encoding/decoding of the index may be performed. The one specified motion information candidate may be determined to be the motion information in the $L(1-X_{signal})$ direction.

For example, the information signaled/encoded/decoded for the motion information in the $LX_{signal}$ direction may include one or more of a motion information index, a reference image index, and an inter-prediction indicator. However, the information signaled/encoded/decoded for the motion information in the $LX_{signal}$ direction is not limited to the above-listed pieces of information.

For example, a motion information candidate having the lowest template matching cost among motion candidates in the $LX_{signal}$ direction may be specified as the motion information candidate in the $LX_{signal}$ direction.

For example, at least one of decoder-side motion information derivation methods, used when the final motion information of the motion information search method is determined using the decoder-side motion information derivation method, may be predefined.

For example, when the target block satisfies the enabling condition of bilateral matching, bilateral matching may be specified as the decoder-side motion information derivation method. When the target block does not satisfy the enabling condition of bilateral matching, template matching may be specified as the decoder-side motion information derivation method. However, the type of the decoder-side motion information derivation method and a scheme for specifying the decoder-side motion information derivation method are not limited to the above-described examples.

In embodiments, the enabling condition of bilateral matching may indicate 1) the case where bidirectional inter-prediction is used for the target block, 2) the case where a first POC difference and a second POC difference are identical to each other, and 3) the case where a first direction and a second direction are different from each other. Alternatively, the enabling condition of bilateral matching may include 1) whether bidirectional inter-prediction is used for the target block, 2) whether a first POC difference and a second POC difference are identical to each other, and 3) whether a first direction and a second direction are different from each other. Here, the first POC difference may be the difference between the POC of a target image and the POC of a reference image in L0 direction. The second POC difference may be the difference between the POC of the target image and the POC of a reference image in L1 direction. The first direction may be a direction from the target image to the reference image in the L0 direction. The second direction may be a direction from the target image to the reference image in the L1 direction.

In embodiments, the enabling condition of bilateral matching may indicate 1) the case where bidirectional inter-prediction is used for the target block and 2) the case where the first direction and the second direction are different from each other. Alternatively, the enabling condition of bilateral matching may include 1) whether bidirectional inter-prediction is used for the target block and 2) whether the first direction and the second direction are different from each other. The first direction may be a direction from the target image to the reference image in the L0 direction. The second direction may be a direction from the target image to the reference image in the L1 direction.

For example, when bidirectional inter-prediction is used for the target block, refinement of motion information may be performed only in the LX direction of the final motion information of the motion information search method in at least one of search steps of the specific decoder-side motion information derivation method.

X may be a predefined value.

For example, X may be a direction having higher matching cost of the L0 direction and the L1 direction. Here, the matching cost for the specific direction may be the matching cost of motion information in the specific direction.

X may be 0, 1 or a positive integer.

Information indicating X may be signaled/encoded/decoded.

For example, when the final motion information is determined in the motion information search method, one or more of 1) whether a decoder-side motion information derivation method is performed, 2) the number of decoder-side motion information derivation methods used, and 3) the type of each decoder-side motion information derivation method used may be determined based on the value of the motion information index. Alternatively, one or more of 1) whether a decoder-side motion information derivation method is performed, 2) the number of decoder-side motion information derivation methods used, and 3) the type of each decoder-side motion information derivation method used may be irrelevant to the value of the motion information index.

For example, when the value of the motion information index for a specific direction is a first value, the refinement of the motion information using the decoder-side motion information derivation method may not be performed for the specific direction. The first value may be 0. However, the first value is not limited to 0.

For example, when the value of the motion information index for a specific direction is a second value, the refinement of the motion information using the decoder-side motion information derivation method may be performed for the specific direction. The second value may be 1, 2, or a positive integer. However, the second value is not limited to the above-listed values.

For example, when the value of the motion information index for the specific direction is the first value, the refinement of the motion information may be performed using a first decoder-side motion information derivation method for the specific direction. The first value may be 0. However, the first value is not limited to 0. The first decoder-side motion information derivation method may be bilateral matching. However, the first decoder-side motion information derivation method is not limited to the above-described bilateral matching.

For example, when the value of the motion information index for the specific direction is the second value, the refinement of the motion information may be performed using a first decoder-side motion information derivation method for the specific direction. The second value may be 1, 2 or a positive integer. However, the second value is not limited to the above-listed values. The second decoder-side motion information derivation method may be template matching. However, the second decoder-side motion information derivation method is not limited to the above-described template matching.

For example, when the value of the motion information index for the specific direction is a first value, the matching costs of pieces of motion information in the specific direction may not be calculated. The first value may be 0. However, the first value is not limited to 0.

For example, when the motion information index for the specific direction is a second value, the matching costs of pieces of motion information in the specific direction may be performed. The second value may be 1, 2, or a positive integer. However, the second value is not limited to the above-listed values.

For example, when the value of the motion information index for the specific direction is a first value, matching cost used to perform the calculation of the matching costs of pieces of motion information in the specific direction may be template matching cost. The first value may be 0. However, the first value is not limited to 0.

For example, when the value of the motion information index for the specific direction is a first value, matching cost used to perform the calculation of the matching costs of pieces of motion information in the specific direction may be bilateral matching cost. The first value may be 0. However, the first value is not limited to 0.

For example, when motion information refinement for the final motion information is performed in the motion information search method, one or more of 1) whether a decoder-side motion information derivation method is performed, 2) the number of decoder-side motion information derivation methods used, and 3) the type of each decoder-side motion information derivation method used may be determined based on the value of the motion information index. Alternatively, one or more of 1) whether a decoder-side motion information derivation method is performed, 2) the number of decoder-side motion information derivation methods used, and 3) the type of each decoder-side motion information derivation method used may be irrelevant to the value of the motion information index.

For example, when the value of the motion information index for a specific direction is a first value, the refinement of the motion information using the decoder-side motion information derivation method may not be performed for the specific direction. The first value may be 0. However, the first value is not limited to 0.

For example, when the value of the motion information index for a specific direction is a second value, the refinement of the motion information using the decoder-side motion information derivation method may be performed for the specific direction. The second value may be 1, 2, or a positive integer. However, the second value is not limited to the above-listed values.

For example, when the value of the motion information index for the specific direction is the first value, the refinement of the motion information may be performed using the first decoder-side motion information derivation method for the specific direction. The first value may be 0. However, the first value is not limited to 0. The first decoder-side motion information derivation method may be bilateral matching. However, the first decoder-side motion information derivation method is not limited to the above-described bilateral matching.

For example, when the value of the motion information index for the specific direction is the second value, the refinement of the motion information may be performed using a second decoder-side motion information derivation method for the specific direction. The second value may be 1, 2 or a positive integer. However, the second value is not limited to the above-listed values. The second decoder-side motion information derivation method may be template matching. However, the second decoder-side motion information derivation method is not limited to the above-described template matching. For example, when the value of the motion information index for the specific direction is the second value, the refinement of the motion information may be performed using a first decoder-side motion information derivation method for the specific direction. The second value may be 1, 2 or a positive integer. However, the second value is not limited to the above-listed values. The second decoder-side motion information derivation method may be template matching. However, the second decoder-side motion information derivation method is not limited to the above-described template matching.

For example, when a motion information candidate list is configured in the motion information search method or when the final motion information is determined, MVD_NUM_STEP motion vector differences may be added to the motion information.

For example, when the motion information search method is performed, the motion vector differences are added to the motion information, after which the decoder-side motion information derivation method may be performed.

The motion information to which the motion vector differences are added may be 1) each candidate in an initial motion information candidate list, 2) each candidate in a refined motion information candidate list, 3) final motion information determined from the motion information candidate list, or 4) one of pieces of motion information derived from the search steps of the decoder-side motion information derivation method when the decoder-side motion information derivation method is applied to the initial motion information or the final motion information. However, the motion information to which the motion vector differences are added is not limited to the above-described pieces of motion information.

MVD_NUM_STEP may be 0 or a positive integer.

MVD_NUM_STEP may be a predefined value.

For example, MVD_NUM_STEP may be determined to be 0, 1, or a positive integer depending on the enabling condition of the decoder-side motion information derivation method.

For example, the decoder-side motion information derivation method may be at least one of bilateral matching and template matching. However, the decoder-side motion information derivation method is not limited to bilateral matching and/or template matching.

When the value of MVD_NUM_STEP is 0, signaling/encoding/decoding of the motion vector differences for the target block may not be performed. That is, signaling/encoding/decoding of the motion vector differences for the target block may be performed only when the value of MVD_NUM_STEP is equal to or greater than 1.

For example, signaling/encoding/decoding of the motion vector differences may be performed only when the motion information index of the target block is equal to or greater than MVD_IDXTHRES.

For example, signaling/encoding/decoding of the motion vector differences may be performed only when the motion information index of the target block is less than or equal to MVD_IDXTHRES.

For example, MVD_NUM_STEP motion vector differences may be added to the motion information only when a motion information search index is equal to or greater than MVD_IDXTHRES.

For example, MVD_NUM_STEP motion vector differences may be added to the motion information only when the motion information search index is less than or equal to MVD_IDXTHRES.

MVD_IDXTHRES may be 0, 1, 2 or a positive integer.

MVD_IDXTHRES may be a predefined value.

For example, the motion vector differences may be signaled/encoded/decoded only when the target block does not satisfy the enabling condition of the specific decoder-side motion information derivation method.

The decoder-side motion information derivation method may be template matching and/or bilateral matching. However, the decoder-side motion information derivation method is not limited to template matching and/or bilateral matching.

In embodiments, the enabling condition of the specific decoder-side motion information derivation method may indicate 1) the case where bidirectional inter-prediction is used for the target block, 2) the case where a first POC difference and a second POC difference are identical to each other, and 3) the case where a first direction and a second direction are different from each other. Alternatively, the enabling condition of the specific decoder-side motion information derivation method may include 1) whether bidirectional inter-prediction is used for the target block, 2) whether a first POC difference and a second POC difference are identical to each other, and 3) whether a first direction and a second direction are different from each other. Here, the first POC difference may be the difference between the POC of a target image and the POC of a reference image in L0 direction. The second POC difference may be the difference between the POC of the target image and the POC of a reference image in L1 direction. The first direction may be a direction from the target image to the reference image in the L0 direction. The second direction may be a direction from the target image to the reference image in the L1 direction.

In embodiments, the enabling condition of the specific decoder-side motion information derivation method may indicate 1) the case where bidirectional inter-prediction is used for the target block and 2) the case where the first direction and the second direction are different from each other. Alternatively, the enabling condition of the specific decoder-side motion information derivation method may include 1) the case where bidirectional inter-prediction is used for the target block and 2) the case where the first direction and the second direction are different from each other. The first direction may be a direction from the target image to the reference image in the L0 direction. The second direction may be a direction from the target image to the reference image in the L1 direction.

The motion vector differences may be added only to motion information in LX direction of motion information in L0 direction and motion information in L1 direction.

X may be 0, 1 or a positive integer.

X may be a predefined value.

X may be determined through signaling/encoding/decoding.

For example, when the motion vector difference for the L0 direction and the motion vector difference for the L1 direction are respectively signaled/encoded/decoded, the motion vector differences for respective directions may be added to pieces of motion information in the respective directions.

For example, when one motion vector difference MVD_ONLY is signaled/encoded/decoded, MVD_ONLY may be added to the motion vector in the L0 direction, and −MVD_ONLY may be added to the motion vector in the L1 direction.

For example, when only one motion vector difference MVD_ONLY is signaled/encoded/decoded, MVD_ONLY may be added only to the LX_MVD direction.

X_MVD may be 0 or 1. However, the value of X_MVD is not limited to 0 and/or 1.

X_MVD may be a predefined value.

For example, LX_MVD may be a direction having lower matching cost of the L0 direction and the L1 direction. Here, matching cost for a specific direction may be the matching cost of motion information in the specific direction.

For example, LX_MVD may be a direction having higher matching cost of the L0 direction and the L1 direction. Here, matching cost for a specific direction may be the matching cost of motion information in the specific direction.

X_MVD may be determined through signaling/encoding/decoding.

For example, the motion vector difference may be applied only to motion information in the LX direction. The motion information in L(1−X) direction may be refined by the decoder-side motion information derivation method using the motion information in the LX direction to which the motion vector difference is added.

The refined motion information in the L(1−X) direction may be motion information having the lowest matching cost among pieces of motion information falling within the search range of the decoder-side motion information derivation method. Here, the matching cost may be bilateral matching cost with the motion information in the LX direction.

The refined motion information in the L(1−X) direction may be motion information having the lowest template matching cost among pieces of motion information falling within the search range of the decoder-side motion information derivation method.

For example, when the motion information in the L(1−X) direction is refined by the decoder-side motion information derivation method, the motion information in the LX direction may not be refined.

For example, when the motion information in the L(1−X) direction is refined by the decoder-side motion information derivation method, the motion information in the LX direction may also be refined.

For example, when the decoder-side motion information derivation method is performed, only the motion information in the L(1−X) direction may be refined at some of the search steps of the decoder-side motion information derivation method.

For example, when the decoder-side motion information derivation method is performed, only the motion information in the LX direction may be refined at some of the search steps of the decoder-side motion information derivation method.

X may be 0, 1 or a positive integer.

X may be a predefined value.

X may be determined through signaling/encoding/decoding.

For example, the motion vector difference may be applied only to motion information in the LX direction. Next, the motion information in the L0 direction and/or the motion information in the L1 direction may be refined by the decoder-side motion information derivation method.

For example, the motion information may be refined only in the direction having lower template matching cost of the L0 direction and the L1 direction.

For example, the motion information may be refined only in the direction having higher template matching cost of the L0 direction and the L1 direction.

When the motion information in the L(1−X) direction is refined by the decoder-side motion information derivation method, the motion information in the LX direction may also be refined.

For example, when the decoder-side motion information derivation method is performed, only the motion information in the L(1−X) direction may be refined at some search steps of the decoder-side motion information derivation method.

For example, when the decoder-side motion information derivation method is performed, only the refinement of the motion information in the LX direction may be performed at some search steps of the decoder-side motion information derivation method.

X may be 0, 1 or a positive integer.

X may be a predefined value.

X may be determined through signaling/encoding/decoding.

For example, when four arithmetic operations using a motion information offset are applied to the motion information of the target block, four arithmetic operations using the motion information offset may be applied to the motion information only in the LX direction.

X may be 0, 1 or a positive integer.

X may be a predefined value.

X may be determined through signaling/encoding/decoding.

For example, when the motion information of the target block is changed to the same value as the motion information offset, only the motion information in the LX direction may be changed to the same value as the motion information offset.

X may be 0, 1 or a positive integer.

X may be a predefined value.

X may be determined through signaling/encoding/decoding.

FIG. 37 illustrates the setting of flags depending on the values of motion information indices according to an example.

For example, when a motion information index for L0 direction for a target block and a motion information index for L1 direction are signaled/encoded/decoded, one or more of IDENTICAL_MVP_FLAG and be MVP_LX_FLAG may signaled/encoded/decoded. IDENTICAL_MVP_FLAG may be an indicator indicating whether the motion information index for the L0 direction is identical to the motion information index for the L1 direction. MVP_LX_FLAG may be a predefined motion information index for the LX direction.

X of MVP_LX_FLAG may be 0, 1 or a positive integer.

In FIG. 37, a method for signaling/encoding/decoding the motion information index for the L0 direction and the motion information index for the L1 direction, which use IDENTICAL_MVP_FLAG and MVP_LX_FLAG, is exemplified.

When signaling/encoding/decoding of IDENTICAL_MVP_FLAG and/or MVP_LX_FLAG is performed, signaling/encoding/decoding using a probability model or a context model may be performed.

If the case where the motion information index for the L0 direction is identical to the motion information index for the L1 direction frequently appears when signaling/encoding/decoding of the motion information index for the L0 direction and the motion information index for the L1 direction is performed using the above-described syntax elements, the above-described signaling/encoding/decoding scheme may have higher encoding efficiency than a scheme for individually signaling/encoding/decoding the motion information index for the L0 direction and the motion information index for the L1 direction.

FIG. 38 illustrates first setting of indices depending on the values of motion information indices according to an example.

FIG. 39 illustrates second setting of indices depending on the values of motion information indices according to an example.

When a motion information index for L0 direction and a motion information index for L1 direction for a target block are signaled/encoded/decoded, signaling/encoding/decoding of MVP_L01_IDX is performed, after which a combination of the motion information index for the L0 direction and the motion information index for the L1 direction may be derived from MVP_L01_IDX.

In FIGS. 38 and 39, embodiments of a for method signaling/encoding/decoding the motion information index for the L0 direction and the motion information index for the L1 direction, which use MVP_L01_IDX, are exemplified.

For example, values of a combination indicated by the value of MVP_L01_IDX equal to 1 may be determined through a predefined method. Here, the values of the combination may be the value of the motion information index for the L0 direction and the value of the motion information index for the L1 direction.

For example, values of a combination indicated by the value of MVP_L01_IDX equal to 2 may be determined through a predefined method. Here, the values of the combination may be the value of the motion information index for the L0 direction and the value of the motion information index for the L1 direction.

For example, the predefined method may be a method of comparing the matching costs of pieces of motion information specified by the combinations of motion information indices.

For example, a combination (a, b) of motion information indices may represent a combination in which the motion information index for the L0 direction is a and the motion information index for the L1 direction is b. A lower index MVP_L01_IDX may be allocated to a combination having lower matching cost of the combination (0, 1) and the combination (1, 0).

When signaling/encoding/decoding of MVP_L01_IDX is performed, signaling/encoding/decoding using a probability model or a context model may be performed.

If the case where each of the motion information index for the L0 direction and the motion information index for the L1 direction has a lower index value frequently appears when signaling/encoding/decoding of the motion information index for the L0 direction and the motion information index for the L1 direction is performed using the above-described syntax elements, the above-described signaling/encoding/decoding scheme may have higher encoding efficiency than a scheme for individually signaling/encoding/decoding the motion information index for the L0 direction and the motion information index for the L1 direction.

When signaling/encoding/decoding of MVP_L01_IDX is performed, one or more of the following binarization, debinarization, and entropy encoding/decoding methods may be used.

- Signed 0-th order Exp_Golomb binarization/debinarization method (abbreviated as se(v))
- Signed k-th order Exp_Golomb binarization/debinarization method (abbreviated as sek(v))
- 0-th order Exp_Golomb binarization/debinarization method for an unsigned positive integer (abbreviated as ue(v))
- k-th order Exp_Golomb binarization/debinarization method for an unsigned positive integer (abbreviated as uek(v))
- Fixed-length binarization/debinarization method (abbreviated as f(n))
- Truncated Rice binarization/debinarization method or truncated unary binarization/debinarization method (abbreviated as tu(v))
- Truncated binary binarization/debinarization method (abbreviated as tb(v))
- Context-adaptive arithmetic encoding/decoding method (abbreviated as ae(v))
- Bit string in bytes (abbreviated as b(8))
- Signed integer binarization/debinarization method (abbreviated as i(n))
- Unsigned positive integer binarization/debinarization method (abbreviated as u(n)) (where 'u(n)' may denote a fixed-length binarization/debinarization method).
- Unary binarization/debinarization method FIG. 40 illustrates first setting of indices depending on the values of reference image indices according to an example.

FIG. 41 illustrates second setting of indices depending on the values of reference image indices according to an example.

For example, in the motion information search method, reordering in which a decoder-side motion information derivation method is used for candidates in a reference image list may be applied.

For example, a reference block may be specified from a motion vector in L0 direction and a reference image in a reference image list for the L0 direction. A reference block may be specified from a motion vector in L1 direction and a reference image in a reference image list for the L1 direction. For each reference image list, the order of candidates in the reference image list may be sorted in ascending order of the matching cost of the specified reference block.

For example, in order to signal/encode/decode the reference image index for the L0 direction and the reference image index for the L1 direction for the target block, REFIDX_L01 may be signaled/encoded/decoded. A combination of the reference image index for the L0 direction and the reference image index for the L1 direction may be derived from REFIDX_L01.

In FIGS. 40 and 41, embodiments of a method for signaling/encoding/decoding the reference image index for the L0 direction and the reference image index for the L1 direction, which use REFIDX_L01, are exemplified.

For example, values of a combination indicated by the value of REFIDX_L01 equal to 1 may be determined through a predefined method. Here, the values of the combination may be the value of the reference image index for the L0 direction and the value of the reference image index for the L1 direction.

For example, values of a combination indicated by the value of REFIDX_L01 equal to 2 may be determined through a predefined method. Here, the values of the combination may be the value of the reference image index for the L0 direction and the value of the reference image index for the L1 direction.

For example, the predefined method may be a method of comparing the matching costs of reference blocks for the L0 direction and the reference blocks for the L1 direction, which are specified by combinations of reference image indices.

For example, a combination (a, b) of the reference information index for the L0 direction and the reference image index for the L1 direction may represent a combination in which the reference information index for the L0 direction is a and the reference image index for the L1 direction is b. A lower index REFIDX_L01 may be allocated to a combination having lower matching cost of the combination (0, 1) and the combination (1, 0).

When signaling/encoding/decoding of REFIDX_L01 is performed, signaling/encoding/decoding using a probability model or a context model may be performed.

If the case where each of the reference image index for the L0 direction and the reference image index for the L1 direction has a lower index value frequently appears when signaling/encoding/decoding of the reference image index for the L0 direction and the reference image index for the L1 direction is performed using the above-described syntax elements, the above-described signaling/encoding/decoding scheme may have higher encoding efficiency than a scheme for individually signaling/encoding/decoding the reference image index for the L0 direction and the reference image index for the L1 direction.

When signaling/encoding/decoding of REFIDX_L01 is performed, one or more of the following binarization, debinarization, and entropy encoding/decoding methods may be used.

- Signed 0-th order Exp_Golomb binarization/debinarization method (abbreviated as se(v))
- Signed k-th order Exp_Golomb binarization/debinarization method (abbreviated as sek(v))
- 0-th order Exp_Golomb binarization/debinarization method for an unsigned positive integer (abbreviated as ue(v))
- k-th order Exp_Golomb binarization/debinarization method for an unsigned positive integer (abbreviated as uek(v))
- Fixed-length binarization/debinarization method (abbreviated as f(n))
- Truncated Rice binarization/debinarization method or truncated unary binarization/debinarization method (abbreviated as tu(v))
- Truncated binary binarization/debinarization method (abbreviated as tb(v))
- Context-adaptive arithmetic encoding/decoding method (abbreviated as ae(v))
- Bit string in bytes (abbreviated as b(8))
- Signed integer binarization/debinarization method (abbreviated as i(n))
- Unsigned positive integer binarization/debinarization method (abbreviated as u(n)) (where 'u(n)' may denote a fixed-length binarization/debinarization method).
- Unary binarization/debinarization method.

FIG. 42 illustrates the setting of flags depending on the values of reference image indices according to an example.

For example, when a reference image index for L0 direction and a reference image index for L1 direction for a target block are signaled/encoded/decoded, one or more of IDENTICAL_REFIDX_FLAG and REFIDX_LX_FLAG may be signaled/encoded/decoded. IDENTICAL_REFIDX_FLAG may be an indicator indicating whether the reference image index for the L0 direction is identical to the reference image index for the L1 direction. MEFIDX_LX_FLAG may be a reference image index for predefined LX direction.

X of REFIDX_LX_FLAG may be 0, 1 or a positive integer.

In FIG. 42, a method for signaling/encoding/decoding the reference image index for the L0 direction and the reference image index for the L1 direction, which use IDENTICAL_REFIDX_FLAG and REFIDX_LX_FLAG, is exemplified.

When signaling/encoding/decoding of IDENTICAL_REFIDX_FLAG and/or REFIDX_LX_FLAG is performed, signaling/encoding/decoding using a probability model or a context model may be performed.

If the case where the reference image index for the L0 direction and the reference image index for the L1 direction are identical to each other frequently appears when signaling/encoding/decoding of the reference image index for the L0 direction and the reference image index for the L1 direction is performed using the above-described syntax elements, the above-described signaling/encoding/decoding scheme may have higher encoding efficiency than a scheme for individually signaling/encoding/decoding the reference image index for the L0 direction and the reference image index for the L1 direction.

Determination of Sign of Each Component of Motion Vector Difference

For example, when the sign of each component of a motion vector difference is determined, a list of combinations may be configured based on a predefined scheme. Each combination of the list may be a combination of signs of the components of the motion vector difference. Next, the signs of the components may be determined using an index specifying one of combinations in the list.

An index for the motion vector difference may be a predefined index. The index for the motion vector difference may be an index having the lowest value (e.g., 0). Alternatively, the index for the motion vector difference may be signaled/encoded/decoded.

Each of the components in the motion vector difference may be a vertical component or a horizontal component.

When signaling/encoding/decoding of the index for the motion vector difference is performed, signaling/entropy encoding/decoding which uses a probability model or a context model may be performed.

Here, the index for the motion vector difference may be an index for determining the sign of the motion vector difference.

When the sign of each component of the motion vector difference is determined, the list may be configured as described above, and information indicating the index of the list may be signaled/encoded/decoded. When the list and the index are used, the probability that an index having a lower value will be selected as the index for the motion vector difference of the target block may be increased. Therefore, the efficiency of signaling/encoding/decoding may be improved.

When signaling/encoding/decoding of the index for the motion vector difference is performed, one or more of the following binarization, debinarization, and entropy encoding/decoding methods may be used.

- Signed 0-th order Exp_Golomb binarization/debinarization method (abbreviated as se(v))
- Signed k-th order Exp_Golomb binarization/debinarization method (abbreviated as sek(v))
- 0-th order Exp_Golomb binarization/debinarization method for an unsigned positive integer (abbreviated as ue(v))
- k-th order Exp_Golomb binarization/debinarization method for an unsigned positive integer (abbreviated as uek(v))
- Fixed-length binarization/debinarization method (abbreviated as f(n))
- Truncated Rice binarization/debinarization method or truncated unary binarization/debinarization method (abbreviated as tu(v)) ae(v))
- Truncated binary binarization/debinarization method (abbreviated as tb(v))
- Context-adaptive arithmetic encoding/decoding method (abbreviated as
- Bit string in bytes (abbreviated as b(8))
- Signed integer binarization/debinarization method (abbreviated as i(n))
- Unsigned positive integer binarization/debinarization method (abbreviated as u(n)) (where 'u(n)' may denote a fixed-length binarization/debinarization method).
- Unary binarization/debinarization method The magnitudes of the components of the motion vector difference may be determined to be (mag_X, mag_Y). When the magnitudes of the components are determined, a combination of components having changed signs may be added to a motion vector difference candidate list while the signs of respective components are changed. The combination may include the vertical component of the motion vector difference and the horizontal component of the motion vector difference. Here, the magnitude sets of combinations may be identical to each other. A magnitude set of the combination may be the magnitudes of components of the motion vector difference. Here, the sign sets of combinations may be different from each other. The sign sets of the combinations may represent the signs of components of the motion vector difference.

For example, motion vector difference candidates in the motion vector difference candidate list may include one or more of (mag_X, mag_Y), (−mag_X, mag_Y), (mag_X, −mag_Y), and (−mag_X, −mag_Y). However, the motion vector difference candidates are not limited to the above-listed combinations.

Reordering of Candidates in Motion Vector Difference Candidate List Using Decoder-Side Motion Information Derivation Method For example, reordering that uses a decoder-side motion information derivation method may be performed on candidates in a motion vector difference candidate list.

For example, the candidates in the motion vector difference candidate list may be sorted in ascending order of matching cost.

For example, the matching cost may be template matching cost and/or bilateral matching cost. However, the matching cost is not limited to template matching cost and/or bilateral matching cost.

For example, when the target block satisfies the enabling condition of bilateral matching, the bilateral matching cost may be used. When the target block does not satisfy the enabling condition of bilateral matching, the template matching cost may be used.

A template used for calculation of matching cost may be changed based on the motion information (or coding parameter) of the target block. Alternatively, the template used for calculation of matching cost may be uniform regardless of the motion information (or coding parameter) of the target block.

For example, when a specific mode is performed on the target block, matching cost may be calculated using only a template for a reference block in L0 direction. When a specific mode is not performed on the target block, matching cost may be calculated using both a template in the L0 direction and a template in the L1 direction.

For example, the specific mode may be one of 1) a symmetric motion vector difference mode, 2) a merge mode including a motion vector difference, or 3) an affine merge mode including a motion vector difference. However, the specific mode is not limited to the above-listed modes.

In embodiments, the merge mode including the motion vector difference (i.e., Merge with Motion Vector Difference (MMVD) mode) may be a merge mode using only a limited motion vector difference based on a predefined table. The motion vector difference may be determined by signaling/encoding/decoding the index of the table.

In embodiments, the table may be at least one of 1) a table related to the magnitude of the motion vector difference, 2) a table related to the signs of components of the motion vector difference, and 3) a table related to the direction of the motion vector difference. For example, the table related to the direction of the motion vector difference may include k candidate directions. k may be an integer. Each candidate may indicate a direction corresponding to $2 \times i \times \pi / K_{MAX}$. K_MAX may be a predefined positive integer. i may be an integer that is equal to or greater than 0 and less than or equal to (k−1).

In embodiments, an affine merge mode including the motion vector difference (i.e., an affine MMVD mode) may be an affine merge mode using only a limited motion vector difference based on a predefined table. A motion vector difference for at least one of affine control point motion vectors of the affine mode may be signaled/encoded/decoded. The table may be identical to a predefined table of the merge mode including the motion vector difference. Alternatively, the table may be different from a predefined table of the merge mode including the motion vector difference.

For example, when the target block satisfies the enabling condition (part of the enabling condition) of a specific decoder-side motion information derivation method, matching cost may be calculated using only the template for the reference block in L0 direction. When the target block does not satisfy the enabling condition (part of the enabling condition) of the specific decoder-side motion information derivation method, matching cost may be calculated using both the template for the L0 direction and the template for the L1 direction.

For example, when the target block does not satisfy the enabling condition (part of the enabling condition) of a specific decoder-side motion information derivation method, matching cost may be calculated using only a template for a reference block in L0 direction. When the target block satisfies the enabling condition (part of the enabling condition) of the specific decoder-side motion information derivation method, matching cost may be calculated using both the template for the L0 direction and the template for the L1 direction.

The specific decoder-side motion information derivation method may be one or more of bilateral matching and template matching. However, the type of the specific decoder-side motion information derivation method is not limited to bilateral matching and/or template matching.

In embodiments, the enabling condition of bilateral matching may indicate 1) the case where bidirectional inter-prediction is used for the target block, 2) the case where a first POC difference and a second POC difference are identical to each other, and 3) the case where a first direction and a second direction are different from each other. Alternatively, the enabling condition of bilateral matching may include 1) whether bidirectional inter-prediction is used for the target block, 2) whether a first POC difference and a second POC difference are identical to each other, and 3) whether a first direction and a second direction are different from each other. Here, the first POC difference may be the difference between the POC of a target image and the POC of a reference image in L0 direction. The second POC difference may be the difference between the POC of the target image and the POC of a reference image in L1 direction. The first direction may be a direction from the target image to the reference image in the L0 direction. The second direction may be a direction from the target image to the reference image in the L1 direction.

In embodiments, the enabling condition of bilateral matching may indicate 1) the case where bidirectional inter-prediction is used for the target block and 2) the case where the first direction and the second direction are different from each other. Alternatively, the enabling condition of bilateral matching may include 1) whether bidirectional inter-prediction is used for the target block and 2) whether the first direction and the second direction are different from each other. The first direction may be a direction from the target image to the reference image in the L0 direction. The second direction may be a direction from the target image to the reference image in the L1 direction.

Figure 43:
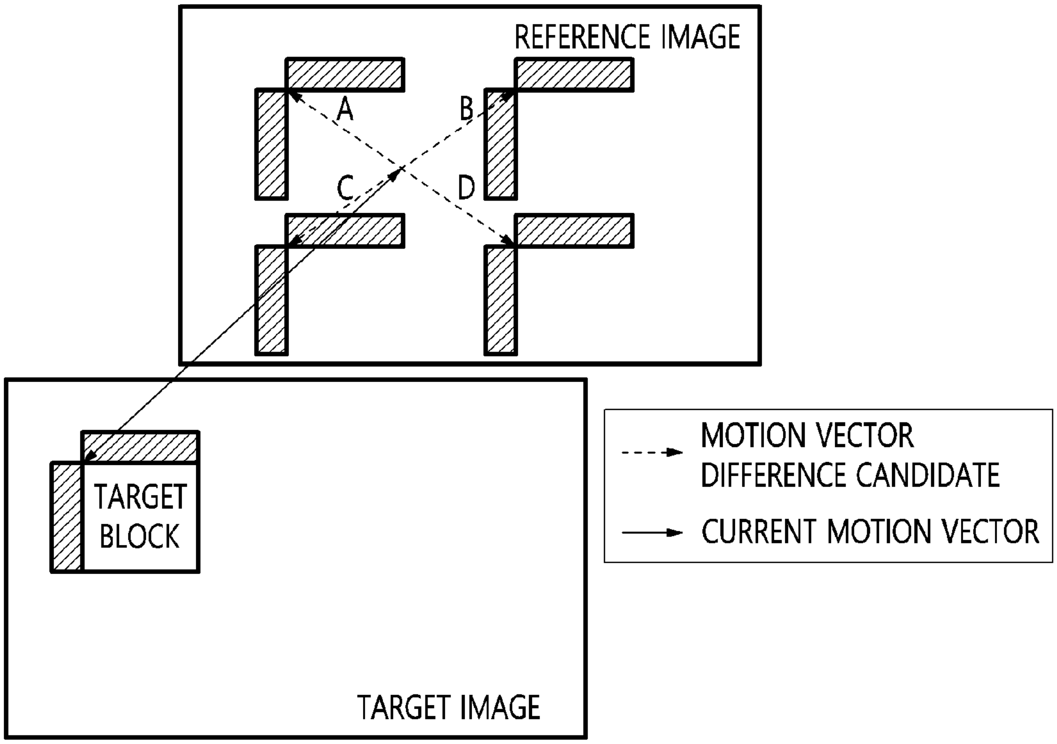
FIG. 43 illustrates a method for determining the sign of each component of a motion vector difference according to an embodiment.

FIG. 43 illustrates a method for determining the sign of each component of a motion vector difference according to an embodiment.

For example, MVP may denote the motion information of a target block.

For example, motion vector difference candidates may be (mag_X, mag_Y), (−mag_X, mag_Y), (mag_X, −mag_Y), and (−mag_X, −mag_Y).

For example, motion information A, motion information B, motion information C, and motion information D may be generated by adding respective motion vector difference candidates to the motion information of the target block.

For example, motion information A may be the sum of the motion information of the target block and a first motion vector difference candidate (i.e., (mag_X, mag_Y)). Motion information A may be motion vector MVP+(−mag_X, −mag_Y).

For example, motion information B may be the sum of the motion information of the target block and a second motion vector difference candidate (i.e., (−mag_X, mag_Y)). Motion information B may be motion vector MVP+(mag_X, −mag_Y).

For example, motion information C may be the sum of the motion information of the target block and a third motion vector difference candidate (i.e., (mag_X, −mag_Y)). Motion information C may be motion vector MVP+(−mag_X, mag_Y). Motion information D may be motion vector MVP+(mag_X, mag_Y).

For example, motion information D may be the sum of the motion information of the target block and a third motion vector difference candidate (i.e., (−mag_X, −mag_Y)).

For example, the candidates in the motion vector candidate list may be reordered by comparing the matching costs of motion information A, motion information B, motion information C, and motion information D with each other.

For example, when the matching cost of motion vector A is higher than the matching cost of motion vector B, the matching cost of motion vector B is higher than the matching cost of motion vector C, and the matching cost of motion vector C is higher than the matching cost of motion vector D, the candidates may be reordered in the order of (−mag_X, −mag_Y), (mag_X, −mag_Y), (−mag_X, mag_Y), (mag_X, mag_Y). In other words, the candidates may be reordered such that a candidate corresponding to a motion vector having lower matching cost is located in a more front position of the list.

A motion vector difference candidate may be specified from the motion vector difference candidate list to which reordering is applied, through the index, and the sign of each component of the motion vector difference may be determined from the specified motion vector difference candidate.

For example, in the above-described embodiments, when the index for the motion vector difference of the target block is 1, the motion vector difference of the target block may be (mag_X, −mag_Y).

The index may be a predefined value. For example, the index may be 0.

The index may be determined through signaling/encoding/decoding.

FIG. 44 illustrates first code for signaling/encoding/decoding of a motion vector difference according to an example.

FIG. 45 illustrates second code for signaling/encoding/decoding of a motion vector difference according to an example.

FIG. 46 illustrates third code for signaling/encoding/decoding of a motion vector difference according to an example.

FIG. 47 illustrates fourth code for signaling/encoding/decoding of a motion vector difference according to an example.

FIG. 48 illustrates fifth code for signaling/encoding/decoding of a motion vector difference according to an example.

In FIGS. 44 to 48, examples of codes for signaling/encoding/decoding of the motion vector difference are illustrated. Here, the motion vector difference information may include one or more of pieces of information, which will be described below, as illustrated in FIGS. 44 to 48.

MVD_NUM_ATSAMETIME may be a predefined positive integer. For example, MVD_NUM_ATSAMETIME may be 1, 2 or 3.

The motion vector difference information may include an indicator indicating whether the absolute value of the motion vector difference is greater than a specific value. (e.g., abs_mvd_greater0_flag and abs_mvd_greater1_flag) The specific value may be an integer of 0 or more. For example, abs_mvd_greater0_flag may be an indicator indicating whether the absolute value of the motion vector difference is greater than 0.

The motion vector difference information may include 1) the absolute value of the motion vector difference, 2) the sum of the absolute value of the motion vector difference and the specific value, or 3) the difference between the absolute value of the motion vector difference and the specific value. (e.g., abs_mvd_minus2) The specific value may be an integer. For example, abs_mvd_minus2 may represent the difference between the absolute value of the motion vector difference and 2.

mvd[refList] may indicate a motion vector difference or the absolute value of a motion vector difference for refList direction.

The motion vector difference information may include indices for determining the index of a combination of motion vector difference signs. (e.g., sign_idx_hor and sign_idx_ver)

For example, when the motion vector difference information is signaled/encoded/decoded, context and/or probability information used in signaling/encoding/decoding may be changed based on the motion information (or coding parameter) of the target block. Alternatively, the context and/or probability information used in signaling/encoding/decoding may be uniform regardless of the motion information (or coding parameter) of the target block.

For example, the motion information and/or coding parameter may be one or more of the magnitude of the motion vector difference and an affine mode indicator.

Process of Signaling/Encoding/Decoding Motion Vector Difference Information

Below, the process of signaling/encoding/decoding motion vector difference information will be described. The signaling/encoding/decoding process may be performed in the order of 1) to 4), which will be described blow. However, the signaling/encoding/decoding process is not limited to the order of the following 1) to 4).

1) A list of possible MVD candidates may be generated based on a sign combination and the absolute value of MVD.

2) A motion vector (MV) may be derived by adding MVD to a MV predictor, and template matching cost may be calculated.
3) Reordering of candidates in the MVD list may be performed based on the calculated template matching cost.
4) A true (i.e., final) MVD may be retrieved based on a signaled MVD sign prediction index.

Hereinafter, descriptions of a motion information search method according to an example will be made.

Initial motion information may be bidirectional motion information. In this case, for one direction, the initial motion information may be configured using an AMVP predictor. For another direction, the initial motion information may be configured using a merge predictor.

A valid pair of merge reference blocks (or AMVP reference blocks) may have one reference picture from the past relative to a target picture and one reference picture from the future relative to the target picture.

An AMVR parameter and a BCW parameter may be set to default values IMV_OFF and BCW_DEFAULT.

An AMVP part may be signaled as a regular unidirectional AMVP. The AMVP part may refer to motion information in a direction in which an AMVP predictor is used when the initial motion information is configured.

A merge part may be implicitly derived by minimizing bilateral matching cost between the AMVP predictor and the merge predictor. The merge part may refer to motion information in a direction in which the merge predictor is used when the initial motion information is configured.

Affine and SMVD may not be used together in modes according to embodiments.

A valid merge candidate may have a predictor in (1−LX) direction. Alternatively, only a merge candidate having a predictor in (1−LX) direction may be valid. The valid merge candidate may refer to at least one of a merge predictor candidate and an initial motion information candidate of the merge part.

AMVP part of each mode according to embodiments may be signaled as a regular unidirectional AMVP. That is, the reference index and the MVD may be signaled, and the MVP index (or motion information index) may be signaled when the template matching is disabled. When template matching is enabled (i.e., when TM_AMVP is enabled), the AMVP part may have a derived MVP index (or a motion information index), and in this case, signaling of the MVP index (or motion information index) may not be performed.

The merge index of the merge part (or the motion information index of the merge part) may not be signaled. Among the candidates in the motion information candidate list of the merge part, a candidate having the lowest template matching cost (or the lowest bilateral matching cost) may be selected as a merge predictor (or the motion information of the merge part).

When a selected merge predictor and an AMVP predictor satisfy a DMVR condition, the refinement of the bilateral matching motion vector may be applied, as a starting point, to a merge motion vector candidate and an AMVP MVP. Otherwise, when template matching functionality is enabled, refinement of the motion information using template matching may be applied to a merge predictor or an AMVP predictor having higher matching cost. Here, a description that the AMVP predictor satisfies a DMVR condition may mean that 1) there are at least one reference picture from the past relative to the target picture and at least one reference picture from the future relative to the target picture, and 2) distances from two reference pictures to the target picture are equal to each other.

At least one decode-side motion information derivation method may be performed on a selected merge predictor (or the motion information of the merge part) and an AMVP predictor (or the motion information of the AMVP part). For example, the decoder-side motion information derivation method may be at least one of bilateral matching, some search steps of bilateral matching, template matching, some search steps of template matching, and an optical-flow-based motion information correction method. For example, the decoder-side motion information derivation method may be an optical flow-based motion information correction method in units of 8×8 subblocks. For example, the decoder-side motion information derivation method may be a BiDirectional Optical Flow (BDOF) in units of 8×8 subblocks.

When template matching is enabled, the AMVP MVP may be first refined through template matching, and may then be refined through bilateral matching. The final MV of the AMVP part may be derived by applying TM-refined MVD, BM-refined MVD, and signal MVD to the AMVP MVP.

Hereinafter, steps at which the motion information search method is performed according to an example will be described. The motion information search method may be performed in the order of 1) to 4), which will be described below. However, performance of the motion information search method is not limited to the order of the following 1) to 4).

1) An AMVP part having signaled information may be determined.
2) A merge part may be determined using bilateral matching cost between an AMVP predictor and a merge predictor. (Search may not be performed. BM cost only at the predictor location may be used).
3) When a DMVR condition is satisfied, refinement using DMVR may then be performed. When the DMVR condition is not satisfied, refinement using TM may be performed (in case TM is enabled).
4) MVD may be added to the AMVP part.

Motion Vector Search Mode

In motion vector search according to embodiments, a motion vector search mode, which will be described later, may be used.

When the motion vector search mode is selected, two reference picture indices may be signaled through a bitstream, and an MVP for each of the two reference pictures may be signaled through the bitstream.

When the motion vector search mode is selected, an MVP for each of the two reference pictures may be signaled through the bitstream.

In this case, the reference picture index may be derived based on a specific rule without signaling.

For example, the reference picture index may be a specified value IDX. IDX may be 0 or 1. However, the value of IDX is not limited to 0 and/or 1.

A pair of reference images may be specified in a reference image (picture) list for L0 direction and a reference image list for L1 direction. Here, the specified reference images may be a first reference image in reference image list L0 and a second reference image in reference image list L1. A first POC interval may be the difference between the POC of the target image and the POC of the first reference image. A second POC interval may be the difference between the POC of the target image and the POC of the second reference image. A target image may be an image including a target block. The first POC interval and the second POC interval may be equal to each other. The direction of the first reference image to the target image and the direction of the second reference image to the target image may be opposite to each other.

The reference picture index may indicate the first reference image and the second reference image. The reference picture index may be selected such that the first POC interval of the first reference image and the second POC interval of the second reference image are identical to each other.

For example, the reference picture index may be selected to indicate reference pictures having the same POC interval to the target picture in list 0 and list 1. When two or more pairs of reference pictures having the same POC interval are present, a reference picture index that enables the POC interval to be minimized may be selected.

When the motion vector search mode is used, signaling of MVD may be skipped. Here, MVD may be derived through a motion vector search by the decoding apparatus 1700.

When the motion vector search mode is used, MVD may be transmitted only for one of list 0 or list 1.

For example, when MVD is transmitted for list_X, a search for a motion vector may start by utilizing a motion vector (MVP_X+MVD) for list_X and a motion vector MVP_(1−X) for list_(1−X) as starting points. X may be 0 or 1.

For example, when MVD is transmitted for list_X, a search for a motion vector may start by utilizing a motion vector (MVP_X+MVD) for list_X and a motion vector (MVP_(1−X)−MVD) for list_(1−X) as starting points.

For example, X may always be 0. X may always be 1.

For example, X may be specified through signaling. For example, X may be specified for a CU by signaling the CU. However, the unit by which X is signaled is not limited to the CU.

When a motion vector search mode is used, a weight may be assigned to a motion vector for which the search starts.

For example, a weight W may be multiplied by search cost (matching cost) at a motion vector location at which the search starts. Here, W may be a value of 1 or less. W may be a value of 1 or more.

For example, when the motion vector search mode is one of AMVP modes, W may be a value of 1 or more. However, the value of W is not limited to 1 or more.

For example, when the motion vector search mode is one of merge modes, W may be a value of 1 or less. However, the value of W is not limited to 1 or less.

When the motion vector of the target block is referenced by neighboring blocks in one picture, one of the MVP of the current block or a motion vector refined through a motion vector search may be referenced. However, the referenced information is not limited to the above-listed information.

The refined motion vector may be a refined motion vector for a block. The refined motion vector may be a refined motion vector for a subblock. In other words, the unit to which refinement is applied may be a block or a subblock.

The motion vector search method may be one or more of template matching and bilateral matching. However, the motion vector search method is not limited to template matching and/or bilateral matching.

When the motion vector search method is performed, a motion vector may be fixed for one direction of two directions, and a motion search may be performed only for the other direction.

For example, when a motion vector search method corresponds to bilateral matching, a motion vector for list X may be fixed, and a search may be performed only for the motion vector of list (1−X). Here, X may be 0 or 1.

For example, X may always be 0. X may always be 1.

For example, X may be specified through signaling.

For example, when the motion vector search is performed at multiple steps, a motion vector for list X may be fixed up to a specific search step, and a search may be performed only for a motion vector of list (1−X). From a subsequent search step, a motion vector search may be performed for list 0 and list 1.

For example, X may always be 0. X may always be 1.

For example, X may be specified through signaling.

For example, the multiple steps of the motion vector search may be motion vector search steps performed in units of blocks or motion vector search steps performed in units of subblocks. However, the unit of the motion vector search is not limited to a block and/or a subblock.

The motion vector search may be performed in units of one or more of blocks and subblocks.

The range of the motion vector search may be a search range (SR). The search range according to the above-described embodiments may be applied to the motion vector search range.

For example, SR may be one of 2, 4, and 8. However, the SR is not limited to the above-listed values.

For example, SR may be identical to the search range of the DMVR mode.

For example, SR may be flexibly changed depending on the magnitude of MVP.

After the motion vector search mode is performed, motion vector refinement methods may be performed by the encoding apparatus 1600 and the decoding apparatus 1700. For example, as a motion vector refinement method, at least one of BDOF, LIC, and OBMC may be performed. However, the motion vector refinement method is not limited to the above-listed methods.

Signaling of Information Indicating Whether Motion Vector Search Mode is Performed Whether a motion vector search mode is performed may be determined through a specific conditional statement or signaling based on a bitstream.

The specific conditional statement may be a conditional statement related to one or more of a block size, an MVP magnitude, whether an SMVD mode is applied, and whether a DMVR mode is applicable. However, the condition in the conditional statement is not limited to the above-listed items.

When the target block does not satisfy a condition that allows a motion vector search mode to be applied, signaling related to the motion vector search mode may be skipped, and the motion vector search mode may not be performed.

When the motion vector search mode is applied to the target block, signaling of information related to one or more other modes may be skipped.

For example, when the motion vector search mode can be performed only when a BCW index is BCW_DEFAULT and an AMVR mode index is 0, signaling of the BCW index and the AMVR mode index may be skipped.

For example, when the motion vector search mode is performed, at least one of LICFlag and OBMCFlag may always be true. LICFlag may be a flag indicating whether a LIC mode is used. OBMCFlag may be a flag indicating whether an OBMC mode is used.

For example, when the motion vector search mode is performed, at least one of LICFlag and OBMCFlag may always be false.

Whether the motion vector search mode, as a detailed mode of the MVD mode, is performed may be determined, as a detailed mode of the SMVD mode, by a specific conditional statement or signaling based on a bitstream.

When there are multiple motion vector search methods, one of the multiple motion vector search methods may be specified by the specific conditional statement or signaling based on the bitstream. For example, when POC intervals between two reference pictures and the target picture are identical to each other, a motion vector may be searched for using bilateral matching. When POC intervals are different from each other, a motion vector may be searched for using template matching. However, a specific condition for the search method is not limited to the above-described condition.

The motion vector search range SR may be specified by a specific conditional statement or signaling based on the bitstream.

For example, the specific conditional statement may include the size of the target block or a condition related to the SR of a neighboring block. However, the specific conditional statement is not limited to the above-listed conditions.

For example, SR may be signaled through the bitstream at a video level, a sequence level, a picture level, a slice level, and a CU level. However, the level at which the SR is signaled is not limited to the above-described levels.

FIG. 49 illustrates a method for signaling information for a motion vector search mode according to an example.

In a motion vector search mode and an SMVD mode, identical_mvp_flag and mvp_L0_flag may be signaled so as to signal the mvp index of list 0 and list 1. identical_mvp_flag may indicate whether the values of mvp_L0 and mvp_L1 are equal to each other. mvp_L0 may be mvp_L0_flag. mvp_L1 may be mvp_L1_flag.

In the motion vector search mode and the SMVD mode, mvp_both_zero_flag, mvp_both_one_flag, and mvp_L0_flag may be signaled so as to signal the mvp index of list 0 and the mvp index of list 1.

mvp_both_zero_flag may indicate whether both mvp_L0 and mvp_L0 are 0. When mvp_both_zero_flag is 1, both mvp_L0 and mvp_L1 may be set to 0. When mvp_both_zero_flag is 1, the values of mvp_L0 and mvp_L1 are determined by mvp_both_zero_flag, and thus mvp_both_one_flag and mvp_L0_flag may not be signaled.

When mvp_both_zero_flag is 0, mvp_both_one_flag may then be signaled. Here, when mvp_both_one_flag is 1, both mvp_L0 and mvp_L1 may be set to 1. When mvp_both_one_flag is 1, the values of mvp_L0 and mvp_L1 are determined by mvp_both_one_flag, and thus mvp_L0_flag may not be signaled.

When mvp_both_zero_flag is 0 and mvp_both_one_flag is 0, one of mvp_L0 and mvp_L1 may be 0, and the other may be 1. Here, mvp_L0_flag may be signaled. When mvp_L0_flag is signaled, mvp_L1_flag may be set to 1-mvp_L1_flag.

In the motion vector search mode and the SMVD mode, when the mvp index of list 0 and the mvp index of list 1 are signaled, MVP candidates may be rearranged by comparing matching costs of mvp combinations with each other.

For example, when candidates in list 0 are mvp0_0 and mvp0_1 and candidates in list 1 are mvp1_0 and mvp1_1, a combination composed of one of the candidates in list 0 and one of the candidates in list 1 may be configured. Here, the combination may be an mvp combination. Four combinations (i.e., (mvp0_0, mvp1_0), (mvp0_1, mvp1_0), (mvp0_0, mvp1_1) and (mvp0_1, mvp1_1)) may be configured using two candidates in list 0 and two candidates in list 1.

The costs of the motion vector search mode may be compared with respect to the combinations (mvp0_0, mvp1_0), (mvp0_1, mvp1_0), (mvp0_0, mvp1_1) and (mvp0_1, mvp1_1), and indices of 0 to 3 may be respectively assigned to (mvp0_0, mvp1_0), (mvp0_1, mvp1_0), (mvp0_0, mvp1_1) and (mvp0_1, mvp1_1) in ascending order of costs. In other words, an index of 0 may be assigned to a combination having the lowest cost among the combinations (mvp0_0, mvp1_0), (mvp0_1, mvp1_0), (mvp0_0, mvp1_1) and (mvp0_1, mvp1_1). However, the number of mvp candidates in the list is not limited to 2.

For example, after rearrangement is performed, signaling of the mvp index may be skipped, and a combination having the lowest cost may be selected from among the combinations. The cost may be the matching cost of the motion vector search mode. Inter-prediction may be performed for the target block using the selected combination.

For example, matching cost may be calculated using one of template matching or bilateral matching. However, the method of calculating the matching cost is not limited to template matching and/or bilateral matching.

A motion vector search method for the motion vector search mode and a motion vector search method used to obtain matching costs may be different from each other.

Size of Block to which Motion Vector Search Mode is Applied

A motion vector search method may be applied to a target block when the horizontal length or vertical length of the target block is equal to or greater than Min_bm_smvd_size. For example, Min_bm_smvd_size may be 0 or 8. However, Min_bm_smvd_size may not be limited to 0 or 8.

The motion vector search method may be applied to the target block when the horizontal length or vertical length of the target block is less than or equal to Max_bm_smvd_size. For example, Max_bm_smvd_size may be 128. However, Max_bm_smvd_size is not limited to 128.

The motion vector search method may be applied to the target block when the total number of samples in the target block is equal to or greater than Min_bm_smvd_sample. For example, Min_bm_smvd_sample may be 0 or 128. However, Min_bm_smvd_sample may not be limited to 0 or 128.

The motion vector search method may be applied to the target block when the total number of samples in the target block is less than or equal to Max_bm_smvd_sample. For example, Max_bm_smvd_sample may be 256. However, Max_bm_smvd_sample is not limited to 256.

Signaling/Encoding/Decoding of Coding Information Related to Inter-Prediction

FIG. 50 illustrates first code indicating coding information signaled in association with a block partitioning structure according to an example.

FIG. 51 illustrates second code indicating coding information signaled in association with a block partitioning structure according to an example.

The second code of FIG. 51 may succeed to the first code of FIG. 50.

Hereinafter, signaling/encoding/decoding of coding information at steps 1820 and 1930 will be described in detail.

The coding information used to perform inter-prediction may include one or more of pred_mode_flag, sps_smvd_e-nabled_flag, inter_pred_idc, inter_affine_flag, ph_mvd_11_zero_flag, NumRefIdxactive, sym_mvd_flag, MotionModelIdc, mvp_10_flag, mvp_11_flag, MvdL0, MvdL1, cu_skip_flag, merge_flag, merge_idx, cu_cbf, tu_cbf_luma, tu_cbf_cb, tu_cbf_cr, information for performing a motion information search method, and a motion vector difference.

The coding information for performing the motion information search method may include one or more of a motion vector difference, a motion information offset, an indicator for specifying a decoder-side motion information derivation method to be used in the target block, an indicator for indicating a direction in which refinement of motion information is performed when a motion information candidate list is configured, an indicator for indicating a direction in which the refinement of motion information is performed when the final motion information is determined, BM_NUM, a motion information index for determining the final motion information, and a reference image index.

BM_NUM may be an indicator indicating the number of directions in which the refinement of motion information is to be performed when the specific search step of a specific decoder-side motion information derivation method in the motion information search method is performed. BM_NUM may be plural. A plurality of BM_NUM values may be applied to different decoder-side motion information derivation methods, respectively. Alternatively, the plurality of BM_NUM values may be applied to different search steps of the decoder-side motion information derivation methods, respectively.

For example, when encoding is performed on coding information related to inter-prediction, or when decoding is performed on coding information, a plurality of pieces of coding information for performing the motion information search method may be signaled/encoded/decoded. The pieces of coding information for performing the motion information search method may be pieces of information about different decoder-side motion information derivation methods of the motion information search method, or pieces of information about different search steps in the corresponding decoder-side motion information derivation method.

pred_mode_flag may be information indicating whether an inter-prediction mode is applied. pred_mode_flag may be signaled/encoded/decoded for one or more units among a coding block, a prediction block, and an encoding unit. For example, the case where information indicating whether the inter-prediction mode is applied is a first value (e.g., 0) may indicate that the inter-prediction mode is applied. The case where the information indicating whether the inter-prediction mode is applied is a second value (e.g., 1) may indicate that an inter-prediction mode is not applied.

sps_smvd_enabled_flag may be a syntax element determined at the level of a sequence parameter set. sps_smvd_enabled_flag may be an indicator indicating whether a symmetric motion vector difference mode is enabled in a target sequence.

When the value of sps_smvd_enabled_flag is a first value, the symmetric motion vector difference mode may be disabled in a target sequence. The first value may be 0 or false.

When the value of sps_smvd_enabled_flag is a second value, the symmetric motion vector difference mode may be enabled in the target sequence. The second value may be 1 or true.

inter_pred_idc may be a syntax element for an inter-prediction direction. inter_pred_idc may be an inter-prediction indicator.

When the value of inter_pred_idc is a first value, unidirectional inter-prediction in the L0 direction may be performed for the target block. The first value may be 1 or PRED_L0.

When the value of inter_pred_idc is a second value, unidirectional inter-prediction in the L1 direction may be performed for the target block. The second value may be 2 or PRED_L1.

When the value of inter_pred_idc is a third value, bidirectional inter-prediction may be performed for the target block. The third value may be 3 or PRED_BI.

inter_affine_flag may be an indicator indicating whether an affine mode is performed on the target block.

When the value of inter_affine_flag is a first value, an affine mode may not be performed on the target block. The first value may be 0 or false.

When the value of inter_affine_flag is a second value, the affine mode may be performed on the target block. The second value may be 1 or true.

RefIdxSymL may be a reference image index in L0 direction determined for the symmetric motion vector difference mode. RefIdxSymL1 may be a reference image index in L1 direction determined for the symmetric motion vector difference mode. For example, RefIdxSymL0 may be an index indicating a reference image having a minimum POC interval among reference images in the reference image list for the L0 direction. The POC interval of the reference image may be the difference between the POC of the target image and the POC of the reference image. For example, RefIdxSymL1 may be an index indicating a reference image having a minimum POC interval among reference images in the reference image list for the L1 direction.

ph_mvd_11_zero_flag may be a syntax element determined at the level of a picture parameter set. ph_mvd_11_zero_flag may be an indicator indicating whether signaling/encoding/decoding is to be performed on an L1 direction motion vector difference for the target image.

When the value of ph_mvd_11_zero_flag is a first value, signaling/encoding/decoding of the motion vector difference in the L1 direction in the target image may be performed. The first value may be 0 or false.

When the value of ph_mvd_11_zero_flag is a second value, signaling/encoding/decoding of the motion vector difference in the L1 direction in the target image may not be performed. The second value may be 1 or true.

sym_mvd_flag may be an indicator indicating whether a symmetric motion vector difference mode is to be performed.

For example, when the value of sym_mvd_flag is a first value, a symmetrical motion vector difference mode may not be performed on the target block. The first value may be 0 or false.

For example, when the value of sym_mvd_flag is a second value, the symmetric motion vector difference mode may be performed on the target block. The second value may be 1 or true.

MotionModelIdc may be a syntax element indicating 1) whether an affine mode is used for the target block and 2) the number of control point motion vectors used in the affine mode when the affine mode is to be used for the target mode.

MotionModelIdc equal to a first value may mean that an affine mode is not performed on the target block. The first value may be 0.

MotionModelIdc equal to a second value may mean that the affine mode is performed on the target block and that two control point motion vectors are used. The second value may be 1.

MotionModelIdc equal to a third value may mean that the affine mode is performed on the target block and that three control point motion vectors are used. The third value may be 2.

mvp_10_flag may specify a motion information index in L0 direction.

mvp_11_flag may specify a motion information index in L1 direction.

mvd_coding(x0, y0, X, Y) may indicate that signaling/encoding/decoding of the motion vector difference for Y-th motion information in the LX direction is performed. When an affine mode is not performed on the target block, Y may always be 0. When the affine mode is performed on the target block, Y may be one of 0, 1 and 2. The range of Y values may be determined based on the value of MotionModelIdc.

MvdL0[x0][y0][0] may refer to a horizontal component of a motion vector difference in the L0 direction. MvdL0 [x0][y0][1] may refer to a vertical component of the motion vector difference in the L0 direction.

MvdL1 [x0][y0][0] may refer to a horizontal component of the motion vector difference in the L1 direction. MvdL1 [x0][y0][1] may refer to a vertical component of the motion vector difference in the L1 direction.

cu_skip_flag may be a skip mode indication information indicating whether a skip mode is used. cu_skip_flag may be signaled/encoded/decoded in units of one or more of a coding block and a prediction block. For example, the skip mode indication information equal to a first value (e.g., 1) may indicate that a skip mode is to be used. The skip mode indication information equal to a second value (e.g., 0) may not indicate that a skip mode is to be used. Here, cu_skip_flag may indicate the use of an inter-skip mode.

merge_flag may be merge mode indication information indicating whether a merge mode is used. merge_flag may be signaled/encoded/decoded in units of at least one of a coding block and a prediction block. For example, the merge mode indication information equal to a first value (e.g., 1) may indicate that a merge mode is to be used. The merge mode indication information equal to a second value (e.g., 0) may not indicate that a merge mode is to be used. Here, merge_flag may indicate the use of an inter-merge mode.

merge_idx may be information indicating a merge candidate in a merge candidate list. merge_idx may be signaled/encoded/decoded in units of one or more of a coding block and a prediction block. Also, merge_idx may refer to merge index information. Also, merge_idx may indicate a block for deriving a merge candidate among blocks reconstructed to be spatially adjacent to the target block. Further, merge_idx may indicate at least one pieces of motion information included in the merge index. For example, when the merge index information is a first value (e.g., 0), a first merge candidate in the merge candidate list may be indicated. When the merge index information is a second value (e.g., 1), a second merge candidate in the merge candidate list may be indicated. When the merge index information is a third value (e.g., 2), a third merge candidate in the merge candidate list may be indicated. Similarly, when the merge index information is one of a third value to an N-th value, a merge candidate corresponding to the value of the merge index information may be indicated depending on the order of merge candidates in the merge candidate list. Here, N may be a positive integer including 0. Here, merge_idx may indicate a merge index when the inter-merge mode is used.

That is, the merge candidate list may refer to a motion information candidate list. A merge candidate may refer to a block information candidate.

A block vector difference (motion vector difference) may be the difference between the motion vector of an AMVP mode and the motion vector of a motion information candidate. For the target block, the motion vector difference may be signaled/encoded/decoded. A prediction block for the target block may be derived using the motion vector difference.

cu_cbf, tu_cbf_luma, tu_cbf_cb, and tu_cbf_cr may indicate whether a quantized transform coefficient is present in a residual block.

cu_cbf may be information indicating whether a quantized transform coefficient is present.

When the block partition structure of a luma component and the block partition structure of a chroma component are identical to each other, cu_cbf may be information indicating whether a quantized transform coefficient of a luma component block and a quantized transform coefficient of a chroma component block are present. When the luma component and the chroma component have independent partition structures, respectively, cu_cbf may be information indicating whether a quantized transform coefficient of a luma component block or a chroma component block is present.

cu_cbf equal to a first value (e.g., 1) may mean that a quantized transform coefficient of the block is present. cu_cbf equal to a second value (e.g., 0) may mean that a quantized transform coefficient of the block is not present.

tu_cbf_luma may indicate whether a quantized transform coefficient of the luma component block is present.

tu_cbf_cr may indicate whether a quantized transform coefficient of a chroma component Cr is present.

tu_cbf_cb may indicate whether a quantized transform coefficient of a chroma component Cb is present.

tu_cbf_luma equal to a first value (e.g., 1) may mean that a quantized transform coefficient of the luma component block is present.

tu_cbf_luma equal to a second value (e.g., 0) may mean that a quantized transform coefficient of the luma component block is not present.

tu_cbf_cr equal to a first value (e.g., 1) may mean that a quantized transform coefficient of a chroma cr component block is present.

tu_cbf_cr equal to a second value (e.g., 0) may mean that a quantized transform coefficient of a chroma cr component block is not present.

tu_cbf_cb equal to a first value (e.g., 1) may mean that a quantized transform coefficient of a chroma cb component block is present.

tu_cbf_cb equal to a second value (e.g., 0) may mean that a quantized transform coefficient of a chroma cb component block is not present.

At least one of pieces of coding information for performing the motion information search method may be signaled/encoded/decoded in at least one of a parameter set, a header, a brick, a Coding Tree Unit (CTU), a Coding Unit (CU), a Prediction Unit (PU), a Transform Unit (TU), a Coding Block (CB), a prediction block, and a transform block.

Here, at least one of the parameter set, header, brick, CTU, CU, PU, TU, CB, PB, or TB may be at least one of a video parameter set, a decoding parameter set, a sequence parameter set, an adaptation parameter set, a picture parameter set, a picture header, a sub-picture header, a slice header, a tile group header, a tile header, a brick, CTU, CU, PU, TU, CB, PB, or TB.

Here, prediction using the motion information search method may be performed using coding information for performing the motion information search method in at least one of the signaled parameter set, header, brick, CTU, CU, PU, TU, CB, PB, and TB.

In an example, when at least one of pieces of coding information for performing the motion information search method is signaled/encoded/decoded in the sequence parameter set, the encoding apparatus 1600 and the decoding apparatus 1700 may perform prediction using the motion information search method by utilizing at least one of the pieces of coding information related to the motion information search method having the same syntax element value in a sequence unit.

In another example, when at least one of pieces of coding information for performing the motion information search method is signaled/encoded/decoded in a slice header, the encoding apparatus 1600 and the decoding apparatus 1700 may perform prediction using the motion information search method by utilizing at least one of the pieces of coding information related to the motion information search method having the same syntax element value in a slice unit.

In a further example, when at least one of pieces of coding information for performing the motion information search method is signaled/encoded/decoded in an adaptation parameter set, the encoding apparatus 1600 and the decoding apparatus 1700 may perform prediction using the motion information search method by utilizing at least one of the pieces of coding information related to the motion information search method having the same syntax element value in the adaptation parameter set.

In still another example, when at least one of pieces of coding information for performing the motion information search method is signaled/encoded/decoded in a specific block, the encoding apparatus 1600 and the decoding apparatus 1700 may perform prediction using the motion information search method by utilizing at least one of the pieces of coding information related to the motion information search method having the same syntax element value in the specific block. The specific block may be CU, CB, PU, PB, TU or TB.

Here, at least one of pieces of coding information for performing the motion information search method may be derived using at least one of coding parameters of a target tile, a target slice, a target sequence, a target image, a target block, a CTB, and a CTU.

When at least one of the pieces of coding information for performing the motion information search method is not present in a bitstream, at least one of the pieces of coding information for performing the motion information search method may be inferred as a first value (e.g., 0).

The adaptation parameter set may refer to a parameter set that can be referenced and shared by different pictures, different sub-pictures, different slices, different tile groups, different tiles, or different bricks.

Also, different adaptation parameter sets may be referenced by sub-pictures, slices, tile groups, tiles, or bricks in a picture, respectively, and information in the referenced adaptation parameter sets may be used.

Further, different adaptation parameter sets may be referenced by sub-pictures, slices, tile groups, tiles, or bricks in a picture, respectively, using the identifiers of the different adaptation parameter sets.

Further, different adaptation parameter sets may be referenced by slices, tile groups, tiles, or bricks in a sub-picture, respectively, using the identifiers of the different adaptation parameter sets.

Furthermore, different adaptation parameter sets may be referenced by tiles or bricks in a slice, respectively, using the identifiers of the different adaptation parameter sets.

Furthermore, different adaptation parameter sets may be referenced by bricks in a tile, respectively, using the identifiers of the different adaptation parameter sets.

The parameter set or header of a sub-picture may include information about the identifier of the adaptation parameter set. By utilizing the adaptation parameter set identifier, an adaptation parameter set corresponding to the adaptation parameter set identifier may be used for the sub-picture.

The parameter set or header of a tile may include information about the identifier of the adaptation parameter set. By utilizing the adaptation parameter set identifier, an adaptation parameter set corresponding to the adaptation parameter set identifier may be used for the tile.

The parameter set or header of a brick may include information about the identifier of the adaptation parameter set. By utilizing the adaptation parameter set identifier, an adaptation parameter set corresponding to the adaptation parameter set identifier may be used for the brick.

A picture may be partitioned into one or more tile rows and one or more tile columns.

A sub-picture may be partitioned into one or more tile rows and one or more time columns in a picture. A sub-picture may be an area having a rectangular or square shape in a picture. A sub-picture may have one or more CTUs. Further, one sub-picture may include one or more tiles, one or more bricks, and/or one or more slices.

A tile may be an area having a rectangular/square shape in a picture. A tile may have one or more CTUs. Also, the tile may be partitioned into one or more bricks.

A brick may represent one or more CTU rows in a tile. A tile may be partitioned into one or more bricks. Each brick may have one or more CTU rows. A tile that is not partitioned into two or more bricks may also represent a brick.

A slice may include one or more tiles in a picture. Also, a slice may include one or more bricks in a tile.

In embodiments, a description that "specific information is predefined" may mean that the specific information has been determined using the same value/method by the encoding apparatus 1600 and the decoding apparatus 1700 based on the same rule and/or scheme in the encoding apparatus 1600 and the decoding apparatus 1700. Such specific information may include one or more of a coding parameter, block information, a search pattern, a search order, and use/non-use of the specific mode. However, the specific information is not limited to the above-listed pieces of information.

Entropy encoding/decoding may be performed at one or more of sequence level, picture level, tile level, tile group level, slice level, CTU level, CU level, and PU level. However, the unit by which entropy encoding/decoding is performed is not limited to the above-listed levels.

In embodiments, motion information (MI_L0, MI_L1) may be motion information having motion information MI_L0 in L0 direction and motion information MI_L1 in L1 direction.

In embodiments, a description that "motion information is refined" may mean that, as an intermediate search step and/or a final search step of the decoder-side motion information derivation method are performed on the motion information, refined motion information is derived.

In embodiments, a neighboring block may be a block temporally or spatially close to a target block.

The representation "temporally adjacent" and "temporally neighboring" may mean that a specific entity belongs to a col image or an adjacent image of a target image. The adjacent image may be an image to which an interval from the target image is smaller than POC_THRES. The interval (distance) between the adjacent image and the target image may be the difference between the POC of the adjacent image and the POC of the target image.

POC_THRES may be a positive number of 1 or more. POC_THRES may be predefined. Information indicating POC_THRES may be signaled/encoded/decoded.

The expression "spatially adjacent" and "spatially neighboring" may mean that a distance between a specific entity and a predefined location of the target block is less than SPATIAL_THRES.

For example, the predefined location of the target block may be one of left-above, center, right-above, left-below, and right-below of the target block. However, the predefined location of the target block is not limited to the above-listed locations.

For example, SPATIAL_THRES may be a positive number of 1 or more. SPATIAL_THRES may be predefined. Information indicating SPATIAL_THRES may be signaled/encoded/decoded.

In embodiments, "matching cost" may be a result value determined by a cost function. The cost function may be a cost function between templates in the decoder-side motion information derivation method. For example, the matching cost may be at least one of bilateral matching cost and template matching cost. However, matching cost is not limited to the bilateral matching cost and/or template matching cost.

In embodiments, "matching cost of specific motion information" may be one of 1) matching cost between templates determined from the specific motion information and 2) matching cost between templates determined from the motion information derived using the decoder-side motion information derivation method from the specific motion information.

In embodiments, "motion vector" may be one of 1) a motion vector of inter-prediction and 2) a block vector (BV) of Intra Block Copy (IBC).

In embodiments, the terms "bi-prediction", "bidirectional prediction", "inter bi-prediction", "bidirectional inter-prediction" may have the same meaning, and may be used interchangeably with each other.

The encoding apparatus 1600 may perform 1) determination of a neighboring block to be included in a motion information candidate list, 2) configuration, reconfiguration and determination of a motion information candidate list, 3) determination of motion information (determination of a motion information index, derivation of an index using a decoder-side motion information derivation method and derivation of motion information using the decoder-side motion information derivation method), 4) an operation with a motion information offset, 5) an operation of adding a motion vector difference to motion information, 6) refinement of motion information using the decoder-side motion information derivation method, 7) determination of a neighboring block using at least one of the above-described embodiments for a process of signaling/encoding/decoding the motion information, 8) configuration, reconfiguration and determination of a motion information candidate list, 9) determination of motion information, 10) an operation using a motion information offset, 11) an operation of adding a motion vector difference to the motion information, and 12) refinement of motion information using the decoder-side motion information derivation method.

Further, the decoding apparatus 1700 may perform 1) determination of a neighboring block using at least one of the above-described embodiments, 2) configuration, reconfiguration and determination of a motion information candidate list, 3) determination of motion information, 4) an operation using a motion information offset, 5) an operation of adding a motion vector difference to motion information, 6) refinement of motion information using the decoder-side motion information derivation method, 7) signaling/decoding the motion information.

The embodiments have been described with respect to the case where two reference picture lists are used. However, inter-prediction to which the embodiments are applied is not limited to inter-prediction using two reference picture lists. The embodiments may be used even in the case where NUM_REFPICLIST reference picture lists are used. For example, NUM_REFPICLIST may be 1, 2, 3 or a positive integer.

In embodiments, a description has been made for the case where one or two motion information candidate lists are used. However, inter-prediction to which the embodiments are applied is not limited to inter-prediction using one or two motion information candidate lists. The embodiments may be applied to the case where NUM_MILIST motion information candidate lists are used. NUM_MILIST may be, for example, 1, 2, 3 or a positive integer.

The embodiments may be applied depending on the size of at least one of a coding block, a prediction block, a block, and a unit. Here, the size may refer to a minimum size and/or maximum size to which the embodiments are to be applied, and may indicate a fixed size to which the embodiments are applied. Further, a first embodiment may be applied to a first size, and a second embodiment may be applied to a second size. That is, the embodiments may be compositely applied depending on the sizes of the target. Further, the embodiments may be applied to the case where the size of the target is equal to or greater than the minimum size and less than or equal to the maximum size. That is, the embodiments may be applied only to the case where the size of the target falls within a specific range.

Furthermore, the embodiments may be applied only to the case where the size of the target is equal to or greater than the minimum size and less than or equal to the maximum size. Here, each of the minimum size and the maximum size may be the size of one of a block and a unit. That is, a block to which the limitation of the minimum size is applied and a block to which the limitation of the maximum size is applied may be different from each other. For example, embodiments may be applied only to the case where the size of the target block is equal to or greater than the minimum size and less than or equal to the maximum size of the block.

For example, the embodiments may be applied only to the case where the size of the target block is equal to or greater than 8×8. For example, the embodiments may be applied only to the case where the size of the target block is equal to or greater than 16×16. For example, the embodiments may be applied only to the case where the size of the target block is equal to or greater than 32×32. For example, the embodiments may be applied only to the case where the size of the target block is equal to or greater than 64×64. For example, the embodiments may be applied only to the case where the size of the target block is equal to or greater than 128×128. For example, the embodiments may be applied only to the case where the size of the target block is 4×4. For example, the embodiments may be applied only to the case where the size of the target block is less than or equal to 8×8. For example, the embodiments may be applied only to the case where the size of the target block is less than or equal to 16×16. For example, the embodiments may be applied only to the case where the size of the target block is equal to or greater than 8×8 and less than or equal to 16×16. For example, the embodiments may be applied only to the case where the size of the target block is equal to or greater than 16×16 and less than or equal to 64×64.

The embodiments may be selectively applied depending on a temporal layer. In order to identify temporal layers to which embodiments can be applied, separate identifiers may be signaled. The embodiments may be applied to temporal layers specified by identifiers. Here, the identifiers may be defined to indicate the smallest layer and/or the largest layer to which the embodiments can be applied, and may be defined to indicate a specific layer to which the embodiments are applied.

For example, the embodiments may be applied only to the case where the temporal layer of a target image is the lowest layer. For example, the embodiments may be applied only to the case where the temporal layer identifier of the target image is 0. For example, the embodiments may be applied only to the case where the temporal layer identifier of the target image is equal to or greater than 1. For example, the embodiments may be applied only to the case where the temporal layer of the target image is the uppermost layer.

In the foregoing embodiments, 1) determination of a neighboring block to be included in a motion information candidate list, 2) configuration, reconfiguration, and determination of a motion information candidate list, 3) determination of the motion information, 4) determination of whether refinement of motion information using a decoder-side motion information derivation method is to be performed, 5) determination of a direction in which refinement of motion information using the decoder-side motion information derivation method is to be performed, 6) determination of whether a motion information offset is used, 7) determination of motion information on which an operation with the motion information offset is to be performed, 8) determination of whether signaling/encoding/decoding of the motion vector difference is to be performed, 9) determination of whether signaling/encoding/decoding of the motion information offset is to be performed, 10) determination of whether signaling/encoding/decoding of a motion information index is to be performed, 11) determination of the type of a decoder-side motion information derivation method to be used for refinement of motion information in the target block, and 12) determination of a probability model or a context model to be used for signaling/encoding/decoding of the motion information based on a least one of coding parameters such as the motion information of the target block, an intra-prediction mode for a block, an inter-prediction mode, a reference image list, a color component, size, shape, motion information index, type of cost function, and the type of decoder-side motion information derivation method.

As described above in embodiments, a reference image set (reference picture set) used for a process of reference image list generation (reference picture list construction) and reference picture list modification may use one or more reference image (picture) lists among reference picture list L0, reference picture list L1, reference picture list L2, and reference picture list L3.

In accordance with an embodiment, the motion information of the target block may be used to calculate boundary strength in a deblocking filter. Here, one or more pieces of motion information may be used. A maximum of N pieces of motion information may be used. N may be a positive integer of 1 or more. For example, N may be 2, 3 or 4.

The embodiments may be applied even to the case where the unit of a motion vector is one or more of a 16-pel unit, 8-pel unit, 4-pel unit, integer-pel unit, 1/2-pel unit, 1/4-pel unit, 1/8-pel unit, 1/16-pel unit, 1/32-pel unit, and 1/64-pel unit. At least one of the above-described pel-units may be selectively used as the unit of a motion vector in the process of signaling/encoding/decoding the target block.

A slice type to which the embodiments are applied may be defined. Based on the slice type, the embodiments may be applied.

Each block to which the embodiments are to be applied may have a square shape or a non-square shape.

One or more of the following binarization, debinarization, and encoding/decoding methods may be used for one or more of indicators, indexes, and flags which are encoded by encoding apparatus 1600 and are decoded by the decoding apparatus 1700, such as syntax elements related to 1) determination of a neighboring block to be included in a motion information candidate list, 2) configuration, reconfiguration, and determination of a motion information candidate list, 3) determination of motion information (determination of a motion information index, derivation of an index using a decoder-side motion information derivation method, and derivation of motion information using the decoder-side motion information derivation method), 4) an operation with a motion information offset, 5) an operation of adding a motion vector difference to motion information, 6) refinement of motion information using a decoder-side motion information derivation method, 7) motion vector difference, 8) reference picture index, and 9) motion information index.

- Signed 0-th order Exp_Golomb binarization/debinarization method (abbreviated as se(v))
- Signed k-th order Exp_Golomb binarization/debinarization method (abbreviated as sek(v))
- 0-th order Exp_Golomb binarization/debinarization method for an unsigned positive integer (abbreviated as ue(v))
- k-th order Exp_Golomb binarization/debinarization method for an unsigned positive integer (abbreviated as uek(v))
- Fixed-length binarization/debinarization method (abbreviated as f(n))
- Truncated Rice binarization/debinarization method or truncated unary binarization/debinarization method (abbreviated as tu(v))
- Truncated binary binarization/debinarization method (abbreviated as tb(v))
- Context-adaptive arithmetic encoding/decoding method (abbreviated as ae(v))
- Bit string in bytes (abbreviated as b(8))
- Signed integer binarization/debinarization method (abbreviated as i(n))
- Unsigned positive integer binarization/debinarization method (abbreviated as u(n)) (where 'u(n)' may denote a fixed-length binarization/debinarization method).
- Unary binarization/debinarization method Only one limited embodiment among the embodiments is not necessarily applied to signaling/encoding/decoding of a target block. A specific embodiment or at least one combination of embodiments may be used for signaling/encoding/decoding of the target block.

The embodiments may be performed using the same method by the encoding apparatus 1600 and by the decoding apparatus 1700. Also, the image may be encoded/decoded using at least one of the embodiments or at least one combination thereof.

The order of application of the embodiments may be different from each other by the encoding apparatus 1600 and the decoding apparatus 1700, and the order of application of the embodiments may be (at least partially) identical to each other by the encoding apparatus 1600 and the decoding apparatus 1700.

The embodiments may be performed for each of a luma signal and a chroma signal, and may be equally performed for the luma signal and the chroma signal.

The form of a block to which the embodiments are applied may have a square or non-square shape.

Whether at least one of the above-described embodiments is to be applied and/or performed may be determined based on a condition related to the size of a block. In other words, at least one of the above-described embodiments may be applied and/or performed when the condition related to the size of a block is satisfied. The condition includes a minimum block size and a maximum block size. The block may be one of blocks described above in connection with the embodiments and the units described above in connection with the embodiments. The block to which the minimum block size is applied and the block to which the maximum block size is applied may be different from each other.

For example, when the block size is equal to or greater than the minimum block size and/or less than or equal to the maximum block size, the above-described embodiments may be applied and/or performed. When the block size is greater than the minimum block size and/or less than or equal to the maximum block size, the above-described embodiments may be applied and/or performed.

For example, the above-described embodiments may be applied only to the case where the block size is a predefined block size. The predefined block size may be 2×2, 4×4, 8×8, 16×16, 32×32, 64×64, or 128×128. The predefined block size may be $(2*SIZE_X)\times(2*SIZE_Y)$. $SIZE_X$ may be one of integers of 1 or more. $SIZE_Y$ may be one of integers of 1 or more.

For example, the above-described embodiments may be applied only to the case where the block size is equal to or greater than the minimum block size. The above-described embodiments may be applied only to the case where the block size is greater than the minimum block size. The minimum block size may be 2×2, 4×4, 8×8, 16×16, 32×32, 64×64, or 128×128. Alternatively, the minimum block size may be $(2*SIZE_{MIN\_X})\times(2*SIZE_{MIN\_Y})$. $SIZE_{MIN\_X}$ may be one of integers of 1 or more. $SIZE_{MIN\_Y}$ may be one of integers of 1 or more.

For example, the above-described embodiments may be applied only to the case where the block size is less than or equal to the maximum block size. The above-described embodiments may be applied only to the case where the block size is less than the maximum block size. The maximum block size may be 2×2, 4×4, 8×8, 16×16, 32×32, 64×64, or 128×128. Alternatively, the maximum block size may be $(2*SIZE_{MAX\_X})\times(2*SIZE_{MAX\_Y})$. $SIZE_{MAX\_X}$ may be one of integers of 1 or more. $SIZE_{MAX\_Y}$ may be one of integers of 1 or more.

For example, the above-described embodiments may be applied only to the case where the block size is equal to or greater than the minimum block size and is less than or equal to the maximum block size. The above-described embodiments may be applied only to the case where the block size is greater than the minimum block size and is less than or equal to the maximum block size. The above-described embodiments may be applied only to the case where the block size is equal to or greater than the minimum block size and is less than the maximum block size. The above-described embodiments may be applied only to the case where the block size is greater than the minimum block size and is less than the maximum block size.

In the above-described embodiments, the block size may be a horizontal size (width) or a vertical size (height) of a block. The block size may indicate both the horizontal size and the vertical size of the block. The block size may indicate the area of the block. Each of the area, minimum block size, and maximum block size may be one of integers equal to or greater than 1. In addition, the block size may be the result (or value) of a well-known equation using the horizontal size and the vertical size of the block, or the result (or value) of an equation in embodiments.

Further, in the embodiments, a first embodiment may be applied to a first size, and a second embodiment may be applied to a second size. That is, the embodiments may be compositely applied according to the size.

The embodiments may be applied depending on a temporal layer. In order to identify a temporal layer to which the embodiments are applicable, a separate identifier may be signaled, and the embodiments may be applied to the temporal layer specified by the corresponding identifier. Here, the identifier may be defined as the lowest (bottom) layer and/or the highest (top) layer to which the embodiments are applicable, and may be defined as being indicating a specific layer to which the embodiments are applied. Further, a fixed temporal layer to which the embodiments are applied may also be defined.

For example, the embodiments may be applied only to the case where the temporal layer of a target image is the lowermost layer. For example, the embodiments may be applied only to the case where the temporal layer identifier of a target image is equal to or greater than 1. For example, the embodiments may be applied only to the case where the temporal layer of a target image is the highest layer.

A slice type or a tile group type to which the embodiments to which the embodiments are applied may be defined, and the embodiments may be applied depending on the corresponding slice type or tile group type.

In the above-described embodiments, it may be construed that, during the application of specific processing to a specific target, assuming that specified conditions may be required and the specific processing is performed under a specific determination, a specific coding parameter may be replaced with an additional coding parameter when a description has been made such that whether the specified conditions are satisfied is determined based on the specific coding parameter, or such that the specific determination is made based on the specific coding parameter. In other words, it may be considered that a coding parameter that influences the specific condition or the specific determination is merely exemplary, and it may be understood that, in addition to the specific coding parameter, a combination of one or more additional coding parameters functions as the specific coding parameter.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments include examples in various aspects. Although all possible combinations for indicating various aspects cannot be described, those skilled in the art will appreciate that other combinations are possible in addition to explicitly described combinations. Therefore, it should be understood that the present disclosure includes other replacements, changes, and modifications belonging to the scope of the accompanying claims.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software.

A computer-readable storage medium may include information used in the embodiments of the present disclosure. For example, the computer-readable storage medium may include a bitstream, and the bitstream may contain the information described above in the embodiments of the present disclosure.

A bitstream may include computer-executable code and/or program. The computer-executable code and/or program may include pieces of information described in the embodiments, and may include syntax elements described in the embodiments. In other words, the pieces of information and syntax elements described in the embodiments may be regarded as a computer-executable code in the bitstream, and may be regarded as at least a part of the computer-executable code and/or program represented by the bitstream. The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

The invention claimed is:

1. An image encoding method, comprising:

determining prediction information to be used for encoding of a target block in a current picture;

generating encoded coding information by performing encoding for the target block based on the prediction information; and generating a bitstream including the encoded coding information, wherein the encoding comprises bi-directional inter-prediction for the target block using a first reference picture and a second reference picture, a first motion information for a first direction of the bi-directional inter-prediction is determined, a second motion information for a second direction of the bi-directional inter-prediction is determined based on the first motion information, the first motion information comprises Advanced Motion Vector Prediction (AMVP) predictor information, the second motion information is derived based on a merge candidate in a merge list, the merge candidate is one of a plurality of merge candidates of the merge list, and the plurality of merge candidates is sorted according to an ascending order of bilateral matching costs of the plurality of merge candidates.

2. The image encoding method of claim 1, wherein:

a bilateral matching cost of the merge candidate is derived based on a coding parameter about the bi-directional inter-prediction with weights.

3. An image encoding method, comprising:

determining prediction information to be used for encoding of a target block in a current picture;

generating encoded coding information by performing encoding for the target block based on the prediction information; and generating a bitstream including the encoded coding information, wherein the encoding comprises bi-directional inter-prediction for the target block using a first reference picture and a second reference picture, a first motion information for a first direction of the bi-directional inter-prediction is determined, a second motion information for a second direction of the bi-directional inter-prediction is determined based on the first motion information, the first motion information comprises Advanced Motion Vector Prediction (AMVP) predictor information, the second motion information is derived based on a merge candidate in a merge list, the merge candidate is one of a plurality of merge candidates of the merge list, one of the bi-directional inter-prediction for the target block and another prediction according to a prediction mode is performed based on a state of the other one, and the prediction mode comprises at least one of a bi-prediction with weights for the target block, an adaptive motion vector resolution, and an affine mode.

4. An image encoding method, comprising:

determining prediction information to be used for encoding of a target block in a current picture;

generating encoded coding information by performing encoding for the target block based on the prediction information; and generating a bitstream including the encoded coding information, wherein the encoding comprises bi-directional inter-prediction for the target block using a first reference picture and a second reference picture, a first motion information for a first direction of the bi-directional inter-prediction is determined, a second motion information for a second direction of the bi-directional inter-prediction is determined based on the first motion information, the first motion information comprises Advanced Motion Vector Prediction (AMVP) predictor information, the second motion information is derived based on a merge candidate in a merge list, the merge candidate is one of a plurality of merge candidates of the merge list, the first motion information comprises a motion vector difference, and at least one of a usage of the motion vector difference and a signaling of the motion vector difference is determined based on an index for the first motion information.

5. An image decoding method, comprising:

acquiring a bitstream including encoded coding information;

generating coding information by performing decoding on the encoded coding information;

determining prediction information to be used for decoding of a target block in a current picture based on the encoded coding information; and performing decoding for the target block using the prediction information, wherein the decoding comprises bi-directional inter-prediction for the target block using a first reference picture and a second reference picture, a first motion information for a first direction of the bi-directional inter-prediction is determined, a second motion information for a second direction of the bi-directional inter-prediction is determined based on the first motion information, the first motion information comprises Advanced Motion Vector Prediction (AMVP) predictor information, the second motion information is derived based on a merge candidate in a merge list, the merge candidate is selected from a plurality of merge candidates, and the plurality of merge candidates is sorted according to an ascending order of bilateral matching costs of the plurality of merge candidates.

6. The image decoding method of claim 5, wherein:

a bilateral matching cost of the merge candidate is derived based on a coding parameter about the bi-directional inter-prediction with weights.

7. An image decoding method, comprising:

acquiring a bitstream including encoded coding information;

generating coding information by performing decoding on the encoded coding information;

determining prediction information to be used for decoding of a target block in a current picture based on the encoded coding information; and performing decoding for the target block using the prediction information, wherein the decoding comprises bi-directional inter-prediction for the target block using a first reference picture and a second reference picture, a first motion information for a first direction of the bi-directional inter-prediction is determined, a second motion information for a second direction of the bi-directional inter-prediction is determined based on the first motion information, the first motion information comprises Advanced Motion Vector Prediction (AMVP) predictor information, the second motion information is derived based on a merge candidate in a merge list, the merge candidate is selected from a plurality of merge candidates, one of the bi-directional inter-prediction for the target block and another prediction according to a prediction mode is performed based on a state of the other one, and the prediction mode comprises at least one of bi-prediction with weights for the target block, an adaptive motion vector resolution, and an affine mode.

8. An image decoding method, comprising:

acquiring a bitstream including encoded coding information;

generating coding information by performing decoding on the encoded coding information;

determining prediction information to be used for decoding of a target block in a current picture based on the encoded coding information; and performing decoding for the target block using the prediction information, wherein the decoding comprises bi-directional inter-prediction for the target block using a first reference picture and a second reference picture, a first motion information for a first direction of the bi-directional inter-prediction is determined, a second motion information for a second direction of the bi-directional inter-prediction is determined based on the first motion information, the first motion information comprises Advanced Motion Vector Prediction (AMVP) predictor information, the second motion information is derived based on a merge candidate in a merge list, the merge candidate is selected from a plurality of merge candidates, the first motion information comprises a motion vector difference, and at least one of a usage of the motion vector difference and a signaling of the motion vector difference is determined based on an index for the first motion information.

9. A non-transitory computer-readable storage medium for storing program instructions for transmitting a bitstream executed by a processor, the program instructions comprising:

an instruction to perform generating the bitstream; and an instruction to transmit the bitstream, wherein the generating the bitstream comprises:

generating the bitstream comprising encoded coding information generated by an image encoding method, wherein the image encoding method comprises:

determining prediction information to be used for encoding of a target block in a current picture; and generating the encoded coding information by performing encoding for the target block based on the prediction information, wherein the encoding comprises bi-directional inter-prediction for the target block using a first reference picture and a second reference picture, a first motion information for a first direction of the bi-directional inter-prediction is determined, a second motion information for a second direction of the bi-directional inter-prediction is determined based on the first motion information, the first motion information comprises Advanced Motion Vector Prediction (AMVP) predictor information, the second motion information is derived based on a merge candidate in a merge list, the merge candidate is one of a plurality of merge candidates of the merge list, and the plurality of merge candidates is sorted according to an ascending order of bilateral matching costs of the plurality of merge candidates.

10. The non-transitory computer-readable storage medium of claim 9, wherein:

a bilateral matching cost of the merge candidate is derived based on a coding parameter about the bi-directional inter-prediction with weights.

11. A non-transitory computer-readable storage medium for storing program instructions for transmitting a bitstream executed by a processor, the program instructions comprising:

an instruction to perform generating the bitstream; and an instruction to transmit the bitstream, wherein the generating the bitstream comprises:

generating the bitstream comprising encoded coding information generated by an image encoding method, wherein the image encoding method comprises:

determining prediction information to be used for encoding of a target block in a current picture; and generating the encoded coding information by performing encoding for the target block based on the prediction information, wherein the encoding comprises bi-directional inter-prediction for the target block using a first reference picture and a second reference picture, a first motion information for a first direction of the bi-directional inter-prediction is determined, a second motion information for a second direction of the bi-directional inter-prediction is determined based on the first motion information, the first motion information comprises Advanced Motion Vector Prediction (AMVP) predictor information, the second motion information is derived based on a merge candidate in a merge list, one of the bi-directional inter-prediction for the target block and another prediction according to a prediction mode is performed based on a state of the other one, and the prediction mode comprises at least one of bi-prediction with weights for the target block, an adaptive motion vector resolution, and an affine mode.

12. A non-transitory computer-readable storage medium for storing instructions for transmitting a bitstream executed by a processor, the program instructions comprising:

an instruction to perform generating the bitstream; and an instruction to transmit the bitstream, wherein the generating the bitstream comprises:

generating the bitstream comprising encoded coding information generated by an image encoding method, wherein the image encoding method comprises:

determining prediction information to be used for encoding of a target block in a current picture; and generating the encoded coding information by performing encoding for the target block based on the prediction information, wherein the encoding comprises bi-directional inter-prediction for the target block using a first reference picture and a second reference picture, a first motion information for a first direction of the bi-directional inter-prediction is determined, a second motion information for a second direction of the bi-directional inter-prediction is determined based on the first motion information, the first motion information comprises Advanced Motion Vector Prediction (AMVP) predictor information, the second motion information is derived based on a merge candidate in a merge list, the first motion information comprises a motion vector difference, and at least one of a usage of the motion vector difference and a signaling of the motion vector difference is determined based on an index for the first motion information.

* * * * *